(12) United States Patent
Hansen et al.

(10) Patent No.: US 9,184,781 B2
(45) Date of Patent: Nov. 10, 2015

(54) HUMANIZED ANTIBODIES AND METHODS OF HUMANIZING ANTIBODIES

(75) Inventors: Hans Hansen, Picayune, MS (US); Edmund Rossi, Woodland Park, NJ (US); Chien-Hsing Ken Chang, Downingtown, PA (US); David M. Goldenberg, Mendham, NJ (US)

(73) Assignee: IMMUNOMEDICS, INC., Morris Plains, NJ (US)

( * ) Notice: Subject to any disclaimer, the term of this patent is extended or adjusted under 35 U.S.C. 154(b) by 1675 days.

(21) Appl. No.: 12/250,396

(22) Filed: Oct. 13, 2008

(65) Prior Publication Data

US 2009/0240037 A1    Sep. 24, 2009

Related U.S. Application Data

(63) Continuation of application No. 11/534,103, filed on Sep. 21, 2006, now Pat. No. 7,435,803, and a continuation of application No. 10/270,071, filed on Oct. 15, 2002, now abandoned, said application No. 11/534,103 is a continuation of application No. 10/366,709, filed on Feb. 14, 2003, now Pat. No. 7,151,164.

(60) Provisional application No. 60/416,232, filed on Oct. 7, 2002, provisional application No. 60/356,132, filed on Feb. 14, 2002, provisional application No. 60/341,881, filed on Dec. 21, 2001, provisional application No. 60/328,835, filed on Oct. 15, 2001.

(51) Int. Cl.
*A61K 39/395* (2006.01)
*H04B 1/48* (2006.01)

(52) U.S. Cl.
CPC ........................................ *H04B 1/48* (2013.01)

(58) Field of Classification Search
None
See application file for complete search history.

(56) References Cited

U.S. PATENT DOCUMENTS 5,498,531 A * 3/1996 Jarrell
5,530,101 A * 6/1996 Queen et al.
6,767,996 B1 * 7/2004 Gorman et al.

OTHER PUBLICATIONS

Fundamental Immunology, William E. Paul, M.D. ed., 3rd ed., p. 242, 1993.*
Benhar et al. Proc. Natl. Acad. Sci. USA, 91(25):12051-12055, Dec. 1994.*
Leung et al. Molecular Immunology, 32(17/18):1413-1427, 1995.*
Gorman et al. Proc. Natl. Acad. Sci. USA, 88:4181-4185, May 1991.*

* cited by examiner

*Primary Examiner* — Laura B Goddard
*Assistant Examiner* — Meera Natarajan
(74) *Attorney, Agent, or Firm* — Rossi, Kimms & McDowell LLP

(57) ABSTRACT

Humanized, chimeric and human anti-CD20 antibodies and CD20 antibody fusion proteins that bind to a human B cell marker, referred to as CD20, which are useful for the treatment and diagnosis of B-cell disorders, such as B-cell malignancies and autoimmune diseases, and methods of treatment and diagnosis are disclosed. Methods of making the humanized, chimeric and human anti-CD20 antibodies are disclosed. A humanized anti-HSG (histamine-succinyl-glycyl) monoclonal antibody designated h679 which binds with high affinity to molecules containing the moiety histamine-succinyl-glycyl (HSG), and methods of making the humanized anti-HSG antibody also are disclosed.

3 Claims, 53 Drawing Sheets

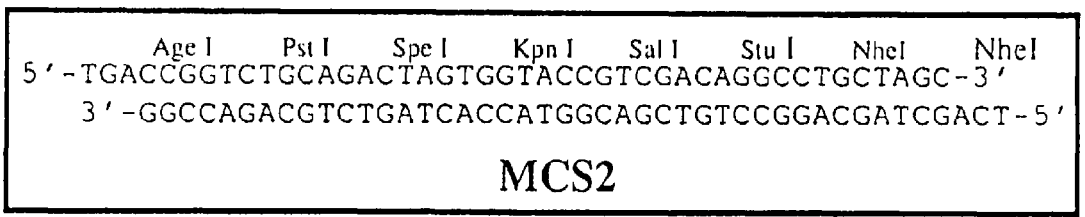
FIGURE 8A
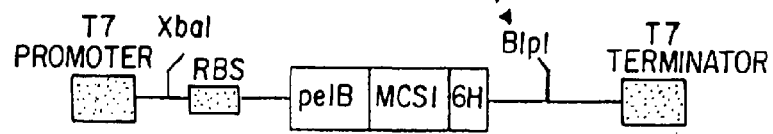
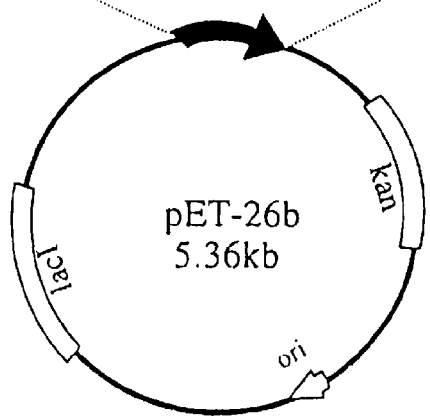
FIGURE 8B
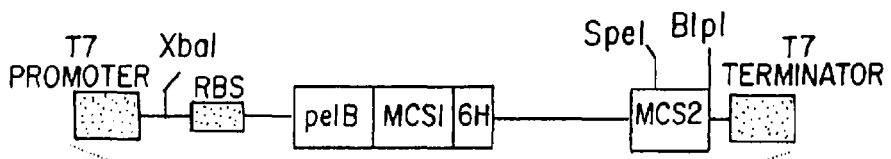
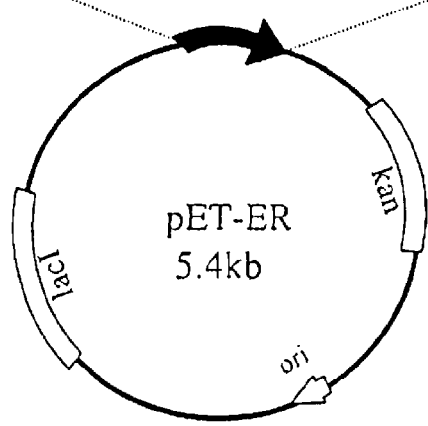
FIGURE 8C

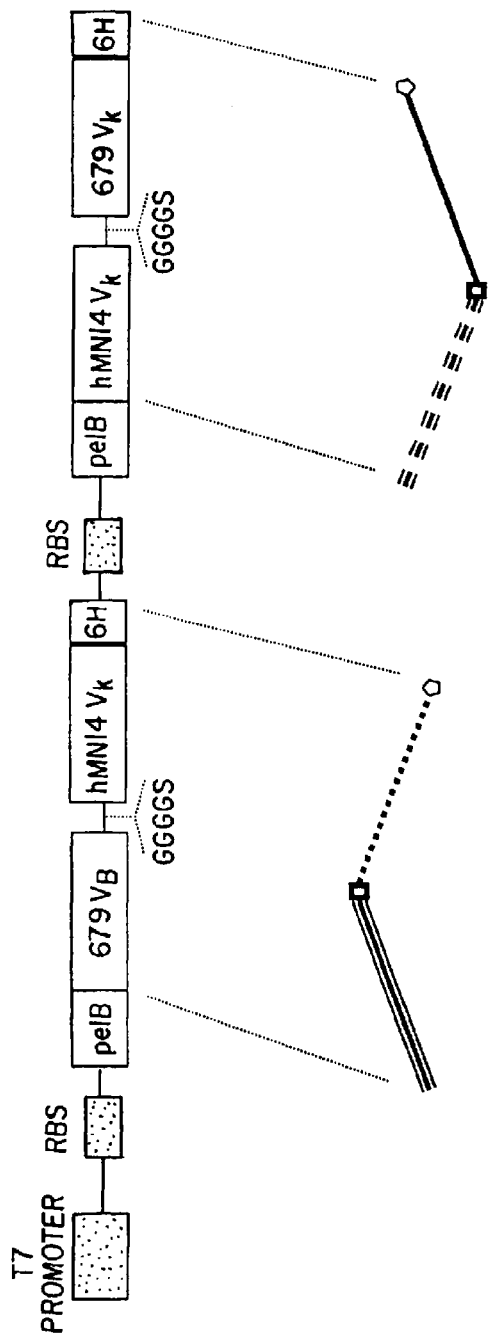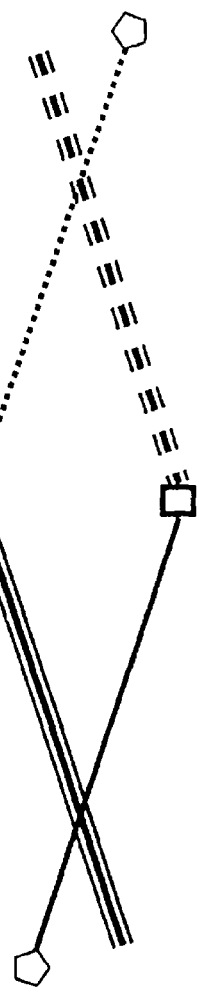
FIGURE 10
679 x hMN14 BISPECIFIC DIABODY

```
              V_H FR-1              CDR-H1     V_H FR-2
         1         11      20      30    33   36    41        49
m679VH   EVILVESGGDLVKPGGSLKLSCAASGFTFS   IYTMS    WLRQTPEKRLEWVA
              ▼                                      ▼ ▼
h679VH   EVQLVESGGDLVKPGGSLKLSCAASGFTFS   IYTMS    WLRQTPGKGLEWVA

CDR-H2                  V_H FR-2    82
         52A          61    65    66     71       81 abc              91
m679VH   TLSGDGDDIYYPDSVKG       RFTISRDNAKNNLYLQMNSLRSADTALYYCAR
                                            ▼           ▼▼
h679VH   TLSGDGDDIYYPDSVKG       RFTISRDNAKNSLYLQMNSLRAEDTALYYCAR CDR-H3        V_H FR-4
                 100
         95   ab     103       113
m679VH   VRLGDWDFDV    WGQGTTVSVSS h679VH   VRLGDWDFDV    WGQGTTVSVSS V_K FR-1             CDR-K1       V_K FR-2        CDR-K2
                                 27
         1         11      21   24 abcdef       34     41        49    53
m679VK   DIVMSQSPSSLAVSPGEKVTMTC   KSSQSLFNSRTRKNYLG   WYQQKPGQSPKLLIY  WASTRES
             ▼              ▼ ▼
h679VK   DIVMTQSPSSLAVSPGERVTLTC   KSSQSLFNSRTRKNYLG   WYQQKPGQSPKLLIY  WASTRES V_K FR-3              CDR-K3    V_K FR-4
         57 61     71     81      88         98         108
m679VK   GVPDRFTGSGSGTDFTLTINSVQSEDLAVYYC    TQVYYLCT    FGAGTKLELKR
              ▼         ▼▼▼ ▼
h679VK   GVPDRFSGSGSGTDFTLTINSLQAEDVAVYYC    TQVYYLCT    FGAGTKLELKR
```

FIGURE 20

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAA GTG CAG CTG GTG GAG TCA GGG GGA
     Ala Gln Pro Ala Met Ala Met Glu Val Gln Leu Val Glu Ser Gly Gly

97  GAC TTA GTG AAG CCT GGA GGG TCC CTG AAA CTC TCC TGT GCA GCC TCT
     Asp Leu Val Lys Pro Gly Gly Ser Leu Lys Leu Ser Cys Ala Ala Ser

145  GGA TTC ACT TTC AGT ATT TAC ACC ATG TCT TGG CTT CGC CAG ACT CCG
     Gly Phe Thr Phe Ser Ile Tyr Thr Met Ser Trp Leu Arg Gln Thr Pro

193  GGA AAG GGG CTG GAG TGG GTC GCA ACC CTG AGT GGT GAT GGT GAT GAC
     Gly Lys Gly Leu Glu Trp Val Ala Thr Leu Ser Gly Asp Gly Asp Asp

241  ATC TAC TAT CCA GAC AGT GTG AAG GGT CGA TTC ACC ATC TCC AGA GAC
     Ile Tyr Tyr Pro Asp Ser Val Lys Gly Arg Phe Thr Ile Ser Arg Asp

289  AAT GCC AAG AAC AGC CTA TAT CTG CAG ATG AAC AGT CTA AGG GCT GAG
     Asn Ala Lys Asn Ser Leu Tyr Leu Gln Met Asn Ser Leu Arg Ala Glu

337  GAC ACG GCC TTG TAT TAC TGT GCA AGG GTG CGA CTT GGG GAC TGG GAC
     Asp Thr Ala Leu Tyr Tyr Cys Ala Arg Val Arg Leu Gly Asp Trp Asp

385  TTC GAT GTC TGG GGC CAA GGG ACC ACG GTC TCC GTC TCC TCA GGA GGT
     Phe Asp Val Trp Gly Gln Gly Thr Thr Val Ser Val Ser Ser Gly Gly

433  GGC GGA TCC GAC ATT GTG ATG ACA CAA TCT CCA TCC TCC CTG GCT GTG
     Gly Gly Ser Asp Ile Val Met Thr Gln Ser Pro Ser Ser Leu Ala Val

481  TCA CCC GGG GAG AGG GTC ACT CTG ACC TGC AAA TCC AGT CAG AGT CTG
     Ser Pro Gly Glu Arg Val Thr Leu Thr Cys Lys Ser Ser Gln Ser Leu

529  TTC AAC AGT AGA ACC CGA AAG AAC TAC TTG GGT TGG TAC CAG CAG AAA
     Phe Asn Ser Arg Thr Arg Lys Asn Tyr Leu Gly Trp Tyr Gln Gln Lys

577  CCA GGG CAG TCT CCT AAA CTT CTG ATC TAC TGG GCA TCT ACT CGG GAA
     Pro Gly Gln Ser Pro Lys Leu Leu Ile Tyr Trp Ala Ser Thr Arg Glu

625  TCT GGG GTC CCT GAT CGC TTC TCA GGC AGT GGA TCC GGA ACA GAT TTC
     Ser Gly Val Pro Asp Arg Phe Ser Gly Ser Gly Ser Gly Thr Asp Phe

673  ACT CTC ACC ATC AAC AGT CTG CAG GCT GAA GAC GTG GCA GTT TAT TAC
     Thr Leu Thr Ile Asn Ser Leu Gln Ala Glu Asp Val Ala Val Tyr Tyr

721  TGC ACT CAA GTT TAT TAT CTG TGC ACG TTC GGT GCT GGG ACC AAG CTG
     Cys Thr Gln Val Tyr Tyr Leu Cys Thr Phe Gly Ala Gly Thr Lys Leu

769  GAG CTG AAA CGG CTC GAG CAC CAC CAC CAC CAC CAC TGA
     Glu Leu Lys Arg Leu Glu His His His His His His ---
```

Nucleic acids and encoded amino acids for 679-scF$_V$-L5

Figure 25

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAA GTG CAG CTG GTG GAG TCA GGG GGA
     Ala Gln Pro Ala Met Ala Met Glu Val Gln Leu Val Glu Ser Gly Gly

97  GAC TTA GTG AAG CCT GGA GGG TCC CTG AAA CTC TCC TGT GCA GCC TCT
     Asp Leu Val Lys Pro Gly Gly Ser Leu Lys Leu Ser Cys Ala Ala Ser

145  GGA TTC ACT TTC AGT ATT TAC ACC ATG TCT TGG CTT CGC CAG ACT CCG
     Gly Phe Thr Phe Ser Ile Tyr Thr Met Ser Trp Leu Arg Gln Thr Pro

193  GAA AAG AGG CTG GAG TGG GTC GCA ACC CTG AGT GGT GAT GGT GAT GAC
     Glu Lys Arg Leu Glu Trp Val Ala Thr Leu Ser Gly Asp Gly Asp Asp

241  ATC TAC TAT CCA GAC AGT GTG AAG GGT CGA TTC ACC ATC TCC AGA GAC
     Ile Tyr Tyr Pro Asp Ser Val Lys Gly Arg Phe Thr Ile Ser Arg Asp

289  AAT GCC AAG AAC AAC CTA TAT CTG CAA ATG AAC AGT CTA AGG TCT GCG
     Asn Ala Lys Asn Asn Leu Tyr Leu Gln Met Asn Ser Leu Arg Ser Ala

337  GAC ACG GCC TTG TAT TAC TGT GCA AGG GTG CGA CTT GGG GAC TGG GAC
     Asp Thr Ala Leu Tyr Tyr Cys Ala Arg Val Arg Leu Gly Asp Trp Asp

385  TTC GAT GTC TGG GGC CAA GGG ACC ACG GTC TCC GTC TCC TCA GGA GGT
     Phe Asp Val Trp Gly Gln Gly Thr Thr Val Ser Val Ser Ser Gly Gly

433  GGC GGA TCC GAC ATT GTG ATG TCA CAA TCT CCA TCC TCC CTG GCT GTG
     Gly Gly Ser Asp Ile Val Met Ser Gln Ser Pro Ser Ser Leu Ala Val

481  TCA CCA GGA GAG AAG GTC ACT ATG ACC TGC AAA TCC AGT CAG AGT CTG
     Ser Pro Gly Glu Lys Val Thr Met Thr Cys Lys Ser Ser Gln Ser Leu

529  TTC AAC AGT AGA ACC CGA AAG AAC TAC TTG GGT TGG TAC CAG CAG AAA
     Phe Asn Ser Arg Thr Arg Lys Asn Tyr Leu Gly Trp Tyr Gln Gln Lys

577  CCA GGG CAG TCT CCT AAA CTT CTG ATC TAC TGG GCA TCT ACT CGG GAA
     Pro Gly Gln Ser Pro Lys Leu Leu Ile Tyr Trp Ala Ser Thr Arg Glu

625  TCT GGG GTC CCT GAT CGC TTC ACA GGC AGT GGA TCT GGG ACA GAT TTC
     Ser Gly Val Pro Asp Arg Phe Thr Gly Ser Gly Ser Gly Thr Asp Phe

673  ACT CTC ACC ATC AAC AGT GTG CAG TCT GAA GAC CTG GCA GTT TAT TAC
     Thr Leu Thr Ile Asn Ser Val Gln Ser Glu Asp Leu Ala Val Tyr Tyr

721  TGC ACT CAA GTT TAT TAT CTG TGC ACG TTC GGT GCT GGG ACC AAG CTG
     Cys Thr Gln Val Tyr Tyr Leu Cys Thr Phe Gly Ala Gly Thr Lys Leu

769  GAG CTG AAA CGG CTC GAG CAC CAC CAC CAC CAC CAC TGA
     Glu Leu Lys Arg Leu Glu His His His His His His ---
```

Nucleic acids and encoded amino acids for 679-l3Q

Figure 26

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAA GTG ATC CTG GTG GAG TCA GGG GGA
     Ala Gln Pro Ala Met Ala Met Glu Val Ile Leu Val Glu Ser Gly Gly

97  GAC TTA GTG AAG CCT GGA GGG TCC CTG AAA CTC TCC TGT GCA GCC TCT
     Asp Leu Val Lys Pro Gly Gly Ser Leu Lys Leu Ser Cys Ala Ala Ser

145  GGA TTC ACT TTC AGT ATT TAC AsCC ATG TCT TGG CTT CGC CAG ACT CCG
     Gly Phe Thr Phe Ser Ile Tyr Thr Met Ser Trp Leu Arg Gln Thr Pro

193  GAA AAG AGG CTG GAG TGG GTC GCA ACC CTG AGT GGT GAT GGT GAT GAC
     Glu Lys Arg Leu Glu Trp Val Ala Thr Leu Ser Gly Asp Gly Asp Asp

241  ATC TAC TAT CCA GAC AGT GTG AAG GGT CGA TTC ACC ATC TCC AGA GAC
     Ile Tyr Tyr Pro Asp Ser Val Lys Gly Arg Phe Thr Ile Ser Arg Asp

289  AAT GCC AAG AAC AAC CTA TAT CTG CAA ATG AAC AGT CTA AGG TCT GCG
     Asn Ala Lys Asn Asn Leu Tyr Leu Gln Met Asn Ser Leu Arg Ser Ala

337  GAC ACG GCC TTG TAT TAC TGT GCA AGG GTG CGA CTT GGG GAC TGG GAC
     Asp Thr Ala Leu Tyr Tyr Cys Ala Arg Val Arg Leu Gly Asp Trp Asp

385  TTC GAT GTC TGG GGC CAA GGG ACC ACG GTC TCC GTC TCC TCA GGA GGT
     Phe Asp Val Trp Gly Gln Gly Thr Thr Val Ser Val Ser Ser Gly Gly

433  GGC GGA TCC GAC ATT GTG ATG TCA CAA TCT CCA TCC TCC CTG GCT GTG
     Gly Gly Ser Asp Ile Val Met Ser Gln Ser Pro Ser Ser Leu Ala Val

481  TCA CCA GGA GAG AAG GTC ACT ATG ACC TGC AAA TCC AGT CAG AGT CTG
     Ser Pro Gly Glu Lys Val Thr Met Thr Cys Lys Ser Ser Gln Ser Leu

529  TTC AAC AGT AGA ACC CGA AAG AAC TAC TTG GGT TGG TAC CAG CAG AAA
     Phe Asn Ser Arg Thr Arg Lys Asn Tyr Leu Gly Trp Tyr Gln Gln Lys

577  CCA GGG CAG TCT CCT AAA CTT CTG ATC TAC TGG GCA TCT ACT CGG GAA
     Pro Gly Gln Ser Pro Lys Leu Leu Ile Tyr Trp Ala Ser Thr Arg Glu

625  TCT GGG GTC CCT GAT CGC TTC ACA GGC AGT GGA TCT GGG ACA GAT TTC
     Ser Gly Val Pro Asp Arg Phe Thr Gly Ser Gly Ser Gly Thr Asp Phe

673  ACT CTC ACC ATC AAC AGT GTG CAG TCT GAA GAC CTG GCA GTT TAT TAC
     Thr Leu Thr Ile Asn Ser Val Gln Ser Glu Asp Leu Ala Val Tyr Tyr

721  TGC ACT CAA GTT TAT TAT CTG AGC ACG TTC GGT GCT GGG ACC AAG CTG
     Cys Thr Gln Val Tyr Tyr Leu Ser Thr Phe Gly Ala Gly Thr Lys Leu

769  GAG CTG AAA CGG CTC GAG CAC CAC CAC CAC CAC CAC TGA
     Glu Leu Lys Arg Leu Glu His His His His His His ---
```

Nucleic acids and encoded amino acids for 679-C101S

Figure 27

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAA GTG CAG CTG GTG GAG TCA GGG GGA
     Ala Gln Pro Ala Met Ala Met Glu Val Gln Leu Val Glu Ser Gly Gly

97  GAC TTA GTG AAG CCT GGA GGG TCC CTG AAA CTC TCC TGT GCA GCC TCT
     Asp Leu Val Lys Pro Gly Gly Ser Leu Lys Leu Ser Cys Ala Ala Ser

145  GGA TTC ACT TTC AGT ATT TAC ACC ATG TCT TGG CTT CGC CAG ACT CCG
     Gly Phe Thr Phe Ser Ile Tyr Thr Met Ser Trp Leu Arg Gln Thr Pro

193  GAA AAG AGG CTG GAG TGG GTC GCA ACC CTG AGT GGT GAT GGT GAT GAC
     Glu Lys Arg Leu Glu Trp Val Ala Thr Leu Ser Gly Asp Gly Asp Asp

241  ATC TAC TAT CCA GAC AGT GTG AAG GGT CGA TTC ACC ATC TCC AGA GAC
     Ile Tyr Tyr Pro Asp Ser Val Lys Gly Arg Phe Thr Ile Ser Arg Asp

289  AAT GCC AAG AAC AAC CTA TAT CTG CAA ATG AAC AGT CTA AGG TCT GCG
     Asn Ala Lys Asn Asn Leu Tyr Leu Gln Met Asn Ser Leu Arg Ser Ala

337  GAC ACG GCC TTG TAT TAC TGT GCA AGG GTG CGA CTT GGG GAC TGG GAC
     Asp Thr Ala Leu Tyr Tyr Cys Ala Arg Val Arg Leu Gly Asp Trp Asp

385  TTC GAT GTC TGG GGC CAA GGG ACC ACG GTC TCC GTC TCC TCA GGA GGT
     Phe Asp Val Trp Gly Gln Gly Thr Thr Val Ser Val Ser Ser Gly Gly

433  GGC GGA TCC GAC ATT GTG ATG TCA CAA TCT CCA TCC TCC CTG GCT GTG
     Gly Gly Ser Asp Ile Val Met Ser Gln Ser Pro Ser Ser Leu Ala Val

481  TCA CCA GGA GAG AAG GTC ACT ATG ACC TGC AAA TCC AGT CAG AGT CTG
     Ser Pro Gly Glu Lys Val Thr Met Thr Cys Lys Ser Ser Gln Ser Leu

529  TTC AAC AGT AGA ACC CGA AAG AAC TAC TTG GGT TGG TAC CAG CAG AAA
     Phe Asn Ser Arg Thr Arg Lys Asn Tyr Leu Gly Trp Tyr Gln Gln Lys

577  CCA GGG CAG TCT CCT AAA CTT CTG ATC TAC TGG GCA TCT ACT CGG GAA
     Pro Gly Gln Ser Pro Lys Leu Leu Ile Tyr Trp Ala Ser Thr Arg Glu

625  TCT GGG GTC CCT GAT CGC TTC ACA GGC AGT GGA TCT GGG ACA GAT TTC
     Ser Gly Val Pro Asp Arg Phe Thr Gly Ser Gly Ser Gly Thr Asp Phe

673  ACT CTC ACC ATC AAC AGT GTG CAG TCT GAA GAC CTG GCA GTT TAT TAC
     Thr Leu Thr Ile Asn Ser Val Gln Ser Glu Asp Leu Ala Val Tyr Tyr

721  TGC ACT CAA GTT TAT TAT CTG AGC ACG TTC GGT GCT GGG ACC AAG CTG
     Cys Thr Gln Val Tyr Tyr Leu Ser Thr Phe Gly Ala Gly Thr Lys Leu

769  GAG CTG AAA CGG CTC GAG CAC CAC CAC CAC CAC CAC TGA
     Glu Leu Lys Arg Leu Glu His His His His His His ---
```

Coding sequence and encoded amino acids for 679 I3Q/C101S

Figure 28

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAG GTC CAA CTG GTG GAG AGC GGT GGA
     Ala Gln Pro Ala Met Ala Met Glu Val Gln Leu Val Glu Ser Gly Gly

97  GGT GTT GTG CAA CCT GGC CGG TCC CTG CGC CTG TCC TGC TCC GCA TCT
     Gly Val Val Gln Pro Gly Arg Ser Leu Arg Leu Ser Cys Ser Ala Ser

145  GGC TTC GAT TTC ACC ACA TAT TGG ATG AGT TGG GTG AGA CAG GCA CCT
     Gly Phe Asp Phe Thr Thr Tyr Trp Met Ser Trp Val Arg Gln Ala Pro

193  GGA AAA GGT CTT GAG TGG ATT GGA GAA ATT CAT CCA GAT AGC AGT ACG
     Gly Lys Gly Leu Glu Trp Ile Gly Glu Ile His Pro Asp Ser Ser Thr

241  ATT AAC TAT GCG CCG TCT CTA AAG GAT AGA TTT ACA ATA TCG CGA GAC
     Ile Asn Tyr Ala Pro Ser Leu Lys Asp Arg Phe Thr Ile Ser Arg Asp

289  AAC GCC AAG AAC ACA TTG TTC CTG CAA ATG GAC AGC CTG AGA CCC GAA
     Asn Ala Lys Asn Thr Leu Phe Leu Gln Met Asp Ser Leu Arg Pro Glu

337  GAC ACC GGG GTC TAT TTT TGT GCA AGC CTT TAC TTC GGC TTC CCC TGG
     Asp Thr Gly Val Tyr Phe Cys Ala Ser Leu Tyr Phe Gly Phe Pro Trp

385  TTT GCT TAT TGG GGC CAA GGG ACC CCG GTC ACC GTC TCC GGA GGC GGT
     Phe Ala Tyr Trp Gly Gln Gly Thr Pro Val Thr Val Ser Gly Gly Gly

433  GGA TCC GAC ATC CAG CTG ACC CAG AGC CCA AGC AGC CTG AGC GCC AGC
     Gly Ser Asp Ile Gln Leu Thr Gln Ser Pro Ser Ser Leu Ser Ala Ser

481  GTG GGT GAC AGA GTG ACC ATC ACC TGT AAG GCC AGT CAG GAT GTG GGT
     Val Gly Asp Arg Val Thr Ile Thr Cys Lys Ala Ser Gln Asp Val Gly

529  ACT TCT GTA GCC TGG TAC CAG CAG AAG CCA GGT AAG GCT CCA AAG CTG
     Thr Ser Val Ala Trp Tyr Gln Gln Lys Pro Gly Lys Ala Pro Lys Leu

577  CTG ATC TAC TGG ACA TCC ACC CGG CAC ACT GGT GTG CCA AGC AGA TTC
     Leu Ile Tyr Trp Thr Ser Thr Arg His Thr Gly Val Pro Ser Arg Phe

625  AGC GGT AGC GGT AGC GGT ACC GAC TTC ACC TTC ACC ATC AGC AGC CTC
     Ser Gly Ser Gly Ser Gly Thr Asp Phe Thr Phe Thr Ile Ser Ser Leu

673  CAG CCA GAG GAC ATC GCC ACC TAC TAC TGC CAG CAA TAT AGC CTC TAT
     Gln Pro Glu Asp Ile Ala Thr Tyr Tyr Cys Gln Gln Tyr Ser Leu Tyr

721  CGG TCG TTC GGC CAA GGG ACC AAG GTG GAA ATC AAA CGT CTC GAG CAC
     Arg Ser Phe Gly Gln Gly Thr Lys Val Glu Ile Lys Arg Leu Glu His

769  CAC CAC CAC CAC CAC TGA
     His His His His His ---
```

Coding sequence of nucleic acids and encoded amino acids for hMN14-scF$_v$-L5

Figure 29

```
  1 ATG AAA TAC CTG CTG CCG ACC GCT GCT GCT GGT CTG CTG CTC CTC GCT
    Met Lys Tyr Leu Leu Pro Thr Ala Ala Ala Gly Leu Leu Leu Leu Ala

49 GCC CAG CCG GCG ATG GCC ATG GAA GTG ATC CTG GTG GAG TCA GGG GGA
    Ala Gln Pro Ala Met Ala Met Glu Val Ile Leu Val Glu Ser Gly Gly

97 GAC TTA GTG AAG CCT GGA GGG TCC CTG AAA CTC TCC TGT GCA GCC TCT
    Asp Leu Val Lys Pro Gly Gly Ser Leu Lys Leu Ser Cys Ala Ala Ser

145 GGA TTC ACT TTC AGT ATT TAC ACC ATG TCT TGG CTT CGC CAG ACT CCG
    Gly Phe Thr Phe Ser Ile Tyr Thr Met Ser Trp Leu Arg Gln Thr Pro

193 GAA AAG AGG CTG GAG TGG GTC GCA ACC CTG AGT GGT GAT GGT GAT GAC
    Glu Lys Arg Leu Glu Trp Val Ala Thr Leu Ser Gly Asp Gly Asp Asp

241 ATC TAC TAT CCA GAC AGT GTG AAG GGT CGA TTC ACC ATC TCC AGA GAC
    Ile Tyr Tyr Pro Asp Ser Val Lys Gly Arg Phe Thr Ile Ser Arg Asp

289 AAT GCC AAG AAC AAC CTA TAT CTG CAA ATG AAC AGT CTA AGG TCT GCG
    Asn Ala Lys Asn Asn Leu Tyr Leu Gln Met Asn Ser Leu Arg Ser Ala

337 GAC ACG GCC TTG TAT TAC TGT GCA AGG GTG CGA CTT GGG GAC TGG GAC
    Asp Thr Ala Leu Tyr Tyr Cys Ala Arg Val Arg Leu Gly Asp Trp Asp

385 TTC GAT GTC TGG GGC CAA GGG ACC ACG GTC TCC GTC TCC TCA GGA GGT
    Phe Asp Val Trp Gly Gln Gly Thr Thr Val Ser Val Ser Ser Gly Gly

433 GGC GGA TCC GAC ATC CAG CTG ACC CAG AGC CCA AGC AGC CTG AGC GCC
    Gly Gly Ser Asp Ile Gln Leu Thr Gln Ser Pro Ser Ser Leu Ser Ala

481 AGC GTG GGT GAC AGA GTG ACC ATC ACC TGT AAG GCC AGT CAG GAT GTG
    Ser Val Gly Asp Arg Val Thr Ile Thr Cys Lys Ala Ser Gln Asp Val

529 GGT ACT TCT GTA GCC TGG TAC CAG CAG AAG CCA GGT AAG GCT CCA AAG
    Gly Thr Ser Val Ala Trp Tyr Gln Gln Lys Pro Gly Lys Ala Pro Lys

577 CTG CTG ATC TAC TGG ACA TCC ACC CGG CAC ACT GGT GTG CCA AGC AGA
    Leu Leu Ile Tyr Trp Thr Ser Thr Arg His Thr Gly Val Pro Ser Arg

625 TTC AGC GGT AGC GGT AGC GGT ACC GAC TTC ACC TTC ACC ATC AGC AGC
    Phe Ser Gly Ser Gly Ser Gly Thr Asp Phe Thr Phe Thr Ile Ser Ser

673 CTC CAG CCA GAG GAC ATC GCC ACC TAC TAC TGC CAG CAA TAT AGC CTC
    Leu Gln Pro Glu Asp Ile Ala Thr Tyr Tyr Cys Gln Gln Tyr Ser Leu

721 TAT CGG TCG TTC GGC CAA GGG ACC AAG GTG GAA ATC AAA CGT CTC GAG
    Tyr Arg Ser Phe Gly Gln Gly Thr Lys Val Glu Ile Lys Arg Leu Glu

769 CAC CAC CAC CAC CAC CAC TGA
    His His His His His His ---
```

Nucleic acids and encoded amino acids for polypeptide #1 of BS1
(679 x hMN14 bispecific diabody)
Figure 30

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAG GTC CAA CTG GTG GAG AGC GGT GGA
     Ala Gln Pro Ala Met Ala Met Glu Val Gln Leu Val Glu Ser Gly Gly

97  GGT GTT GTG CAA CCT GGC CGG TCC CTG CGC CTG TCC TGC TCC GCA TCT
     Gly Val Val Gln Pro Gly Arg Ser Leu Arg Leu Ser Cys Ser Ala Ser

145  GGC TTC GAT TTC ACC ACA TAT TGG ATG AGT TGG GTG AGA CAG GCA CCT
     Gly Phe Asp Phe Thr Thr Tyr Trp Met Ser Trp Val Arg Gln Ala Pro

193  GGA AAA GGT CTT GAG TGG ATT GGA GAA ATT CAT CCA GAT AGC AGT ACG
     Gly Lys Gly Leu Glu Trp Ile Gly Glu Ile His Pro Asp Ser Ser Thr

241  ATT AAC TAT GCG CCG TCT CTA AAG GAT AGA TTT ACA ATA TCG CGA GAC
     Ile Asn Tyr Ala Pro Ser Leu Lys Asp Arg Phe Thr Ile Ser Arg Asp

289  AAC GCC AAG AAC ACA TTG TTC CTG CAA ATG GAC AGC CTG AGA CCC GAA
     Asn Ala Lys Asn Thr Leu Phe Leu Gln Met Asp Ser Leu Arg Pro Glu

337  GAC ACC GGG GTC TAT TTT TGT GCA AGC CTT TAC TTC GGC TTC CCC TGG
     Asp Thr Gly Val Tyr Phe Cys Ala Ser Leu Tyr Phe Gly Phe Pro Trp

385  TTT GCT TAT TGG GGC CAA GGG ACC CCG GTC ACC GTC TCC GGA GGC GGT
     Phe Ala Tyr Trp Gly Gln Gly Thr Pro Val Thr Val Ser Gly Gly Gly

433  GGA TCC GAC ATT GTG ATG TCA CAA TCT CCA TCC TCC CTG GCT GTG TCA
     Gly Ser Asp Ile Val Met Ser Gln Ser Pro Ser Ser Leu Ala Val Ser

481  CCA GGA GAG AAG GTC ACT ATG ACC TGC AAA TCC AGT CAG AGT CTG TTC
     Pro Gly Glu Lys Val Thr Met Thr Cys Lys Ser Ser Gln Ser Leu Phe

529  AAC AGT AGA ACC CGA AAG AAC TAC TTG GGT TGG TAC CAG CAG AAA CCA
     Asn Ser Arg Thr Arg Lys Asn Tyr Leu Gly Trp Tyr Gln Gln Lys Pro

577  GGG CAG TCT CCT AAA CTT CTG ATC TAC TGG GCA TCT ACT CGG GAA TCT
     Gly Gln Ser Pro Lys Leu Leu Ile Tyr Trp Ala Ser Thr Arg Glu Ser

625  GGG GTC CCT GAT CGC TTC ACA GGC AGT GGA TCT GGG ACA GAT TTC ACT
     Gly Val Pro Asp Arg Phe Thr Gly Ser Gly Ser Gly Thr Asp Phe Thr

673  CTC ACC ATC AAC AGT GTG CAG TCT GAA GAC CTG GCA GTT TAT TAC TGC
     Leu Thr Ile Asn Ser Val Gln Ser Glu Asp Leu Ala Val Tyr Tyr Cys

721  ACT CAA GTT TAT TAT CTG TGC ACG TTC GGT GCT GGG ACC AAG CTG GAG
     Thr Gln Val Tyr Tyr Leu Cys Thr Phe Gly Ala Gly Thr Lys Leu Glu

769  CTG AAA CGG CTC GAG CAC CAC CAC CAC CAC CAC TGA
     Leu Lys Arg Leu Glu His His His His His His ---
```

Nucleic acids and encoded amino acids for polypeptide #2 of BS1 (679 x hMN14 bispecific diabody)

Figure 31

```
  1 ATG AAA TAC CTG CTG CCG ACC GCT GCT GCT GGT CTG CTG CTC CTC GCT
    Met Lys Tyr Leu Leu Pro Thr Ala Ala Ala Gly Leu Leu Leu Leu Ala

49 GCC CAG CCG GCG ATG GCC ATG GAA GTG CAG CTG GTG GAG TCA GGG GGA
    Ala Gln Pro Ala Met Ala Met Glu Val Gln Leu Val Glu Ser Gly Gly

97 GAC TTA GTG AAG CCT GGA GGG TCC CTG AAA CTC TCC TGT GCA GCC TCT
    Asp Leu Val Lys Pro Gly Gly Ser Leu Lys Leu Ser Cys Ala Ala Ser

145 GGA TTC ACT TTC AGT ATT TAC ACC ATG TCT TGG CTT CGC CAG ACT CCG
    Gly Phe Thr Phe Ser Ile Tyr Thr Met Ser Trp Leu Arg Gln Thr Pro

193 GAA AAG AGG CTG GAG TGG GTC GCA ACC CTG AGT GGT GAT GGT GAT GAC
    Glu Lys Arg Leu Glu Trp Val Ala Thr Leu Ser Gly Asp Gly Asp Asp

241 ATC TAC TAT CCA GAC AGT GTG AAG GGT CGA TTC ACC ATC TCC AGA GAC
    Ile Tyr Tyr Pro Asp Ser Val Lys Gly Arg Phe Thr Ile Ser Arg Asp

289 AAT GCC AAG AAC AAC CTA TAT CTG CAA ATG AAC AGT CTA AGG TCT GCG
    Asn Ala Lys Asn Asn Leu Tyr Leu Gln Met Asn Ser Leu Arg Ser Ala

337 GAC ACG GCC TTG TAT TAC TGT GCA AGG GTG CGA CTT GGG GAC TGG GAC
    Asp Thr Ala Leu Tyr Tyr Cys Ala Arg Val Arg Leu Gly Asp Trp Asp

385 TTC GAT GTC TGG GGC CAA GGG ACC ACG GTC TCC GTC TCC TCA GGA GGT
    Phe Asp Val Trp Gly Gln Gly Thr Thr Val Ser Val Ser Ser Gly Gly

433 GGC GGA TCC GAC ATC CAG CTG ACC CAG AGC CCA AGC AGC CTG AGC GCC
    Gly Gly Ser Asp Ile Gln Leu Thr Gln Ser Pro Ser Ser Leu Ser Ala

481 AGC GTG GGT GAC AGA GTG ACC ATC ACC TGT AAG GCC AGT CAG GAT GTG
    Ser Val Gly Asp Arg Val Thr Ile Thr Cys Lys Ala Ser Gln Asp Val

529 GGT ACT TCT GTA GCC TGG TAC CAG CAG AAG CCA GGT AAG GCT CCA AAG
    Gly Thr Ser Val Ala Trp Tyr Gln Gln Lys Pro Gly Lys Ala Pro Lys

577 CTG CTG ATC TAC TGG ACA TCC ACC CGG CAC ACT GGT GTG CCA AGC AGA
    Leu Leu Ile Tyr Trp Thr Ser Thr Arg His Thr Gly Val Pro Ser Arg

625 TTC AGC GGT AGC GGT AGC GGT ACC GAC TTC ACC TTC ACC ATC AGC AGC
    Phe Ser Gly Ser Gly Ser Gly Thr Asp Phe Thr Phe Thr Ile Ser Ser

673 CTC CAG CCA GAG GAC ATC GCC ACC TAC TAC TGC CAG CAA TAT AGC CTC
    Leu Gln Pro Glu Asp Ile Ala Thr Tyr Tyr Cys Gln Gln Tyr Ser Leu

721 TAT CGG TCG TTC GGC CAA GGG ACC AAG GTG GAA ATC AAA CGT CTC GAG
    Tyr Arg Ser Phe Gly Gln Gly Thr Lys Val Glu Ile Lys Arg Leu Glu

769 CAC CAC CAC CAC CAC CAC TGA
    His His His His His His ---
```

Nucleic acids and encoded amino acids for polypeptide #1 of BS1.5
(679 x hMN14 bispecific diabody)

Figure 32

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAG GTC CAA CTG GTG GAG AGC GGT GGA
     Ala Gln Pro Ala Met Ala Met Glu Val Gln Leu Val Glu Ser Gly Gly

97  GGT GTT GTG CAA CCT GGC CGG TCC CTG CGC CTG TCC TGC TCC GCA TCT
     Gly Val Val Gln Pro Gly Arg Ser Leu Arg Leu Ser Cys Ser Ala Ser

145  GGC TTC GAT TTC ACC ACA TAT TGG ATG AGT TGG GTG AGA CAG GCA CCT
     Gly Phe Asp Phe Thr Thr Tyr Trp Met Ser Trp Val Arg Gln Ala Pro

193  GGA AAA GGT CTT GAG TGG ATT GGA GAA ATT CAT CCA GAT AGC AGT ACG
     Gly Lys Gly Leu Glu Trp Ile Gly Glu Ile His Pro Asp Ser Ser Thr

241  ATT AAC TAT GCG CCG TCT CTA AAG GAT AGA TTT ACA ATA TCG CGA GAC
     Ile Asn Tyr Ala Pro Ser Leu Lys Asp Arg Phe Thr Ile Ser Arg Asp

289  AAC GCC AAG AAC ACA TTG TTC CTG CAA ATG GAC AGC CTG AGA CCC GAA
     Asn Ala Lys Asn Thr Leu Phe Leu Gln Met Asp Ser Leu Arg Pro Glu

337  GAC ACC GGG GTC TAT TTT TGT GCA AGC TTA TAC TTC GGC TTC CCC TGG
     Asp Thr Gly Val Tyr Phe Cys Ala Ser Leu Tyr Phe Gly Phe Pro Trp

385  TTT GCT TAT TGG GGC CAA GGG ACC CCG GTC ACC GTC TCC GGA GGC GGT
     Phe Ala Tyr Trp Gly Gln Gly Thr Pro Val Thr Val Ser Gly Gly Gly

433  GGA TCC GAC ATT GTG ATG TCA CAA TCT CCA TCC TCC CTG GCT GTG TCA
     Gly Ser Asp Ile Val Met Ser Gln Ser Pro Ser Ser Leu Ala Val Ser

481  CCA GGA GAG AAG GTC ACT ATG ACC TGC AAA TCC AGT CAG AGT CTG TTC
     Pro Gly Glu Lys Val Thr Met Thr Cys Lys Ser Ser Gln Ser Leu Phe

529  AAC AGT AGA ACC CGA AAG AAC TAC TTG GGT TGG TAC CAG CAG AAA CCA
     Asn Ser Arg Thr Arg Lys Asn Tyr Leu Gly Trp Tyr Gln Gln Lys Pro

577  GGG CAG TCT CCT AAA CTT CTG ATC TAC TGG GCA TCT ACT CGG GAA TCT
     Gly Gln Ser Pro Lys Leu Leu Ile Tyr Trp Ala Ser Thr Arg Glu Ser

625  GGG GTC CCT GAT CGC TTC ACA GGC AGT GGA TCT GGG ACA GAT TTC ACT
     Gly Val Pro Asp Arg Phe Thr Gly Ser Gly Ser Gly Thr Asp Phe Thr

673  CTC ACC ATC AAC AGT GTG CAG TCT GAA GAC CTG GCA GTT TAT TAC TGC
     Leu Thr Ile Asn Ser Val Gln Ser Glu Asp Leu Ala Val Tyr Tyr Cys

721  ACT CAA GTT TAT TAT CTG TGC ACG TTC GGT GCT GGG ACC AAG CTG GAG
     Thr Gln Val Tyr Tyr Leu Cys Thr Phe Gly Ala Gly Thr Lys Leu Glu

769  CTG AAA CGG CTC GAG CAC CAC CAC CAC CAC CAC TGA
     Leu Lys Arg Leu Glu His His His His His His ---
```

Nucleic acids and encoded amino acids for polypeptide #2 of BS1.5 (679 x hMN14 bispecific diabody)

Figure 33

```
  1 ATG AAA TAC CTG CTG CCG ACC GCT GCT GCT GGT CTG CTG CTC CTC GCT
    Met Lys Tyr Leu Leu Pro Thr Ala Ala Ala Gly Leu Leu Leu Leu Ala

49 GCC CAG CCG GCG ATG GCC ATG GAA GTG CAG CTG GTG GAG TCA GGG GGA
    Ala Gln Pro Ala Met Ala Met Glu Val Gln Leu Val Glu Ser Gly Gly

97 GAC TTA GTG AAG CCT GGA GGG TCC CTG AAA CTC TCC TGT GCA GCC TCT
    Asp Leu Val Lys Pro Gly Gly Ser Leu Lys Leu Ser Cys Ala Ala Ser

145 GGA TTC ACT TTC AGT ATT TAC ACC ATG TCT TGG CTT CGC CAG ACT CCG
    Gly Phe Thr Phe Ser Ile Tyr Thr Met Ser Trp Leu Arg Gln Thr Pro

193 GAA AAG AGG CTG GAG TGG GTC GCA ACC CTG AGT GGT GAT GGT GAT GAC
    Glu Lys Arg Leu Glu Trp Val Ala Thr Leu Ser Gly Asp Gly Asp Asp

241 ATC TAC TAT CCA GAC AGT GTG AAG GGT CGA TTC ACC ATC TCC AGA GAC
    Ile Tyr Tyr Pro Asp Ser Val Lys Gly Arg Phe Thr Ile Ser Arg Asp

289 AAT GCC AAG AAC AAC CTA TAT CTG CAA ATG AAC AGT CTA AGG TCT GCG
    Asn Ala Lys Asn Asn Leu Tyr Leu Gln Met Asn Ser Leu Arg Ser Ala

337 GAC ACG GCC TTG TAT TAC TGT GCA AGG GTG CGA CTT GGG GAC TGG GAC
    Asp Thr Ala Leu Tyr Tyr Cys Ala Arg Val Arg Leu Gly Asp Trp Asp

385 TTC GAT GTC TGG GGC CAA GGG ACC ACG GTC TCC GTC TCC TCA GGA GGT
    Phe Asp Val Trp Gly Gln Gly Thr Thr Val Ser Val Ser Ser Gly Gly

433 GGC GGA TCC GAC ATC CAG CTG ACC CAG AGC CCA AGC AGC CTG AGC GCC
    Gly Gly Ser Asp Ile Gln Leu Thr Gln Ser Pro Ser Ser Leu Ser Ala

481 AGC GTG GGT GAC AGA GTG ACC ATC ACC TGT AAG GCC AGT CAG GAT GTG
    Ser Val Gly Asp Arg Val Thr Ile Thr Cys Lys Ala Ser Gln Asp Val

529 GGT ACT TCT GTA GCC TGG TAC CAG CAG AAG CCA GGT AAG GCT CCA AAG
    Gly Thr Ser Val Ala Trp Tyr Gln Gln Lys Pro Gly Lys Ala Pro Lys

577 CTG CTG ATC TAC TGG ACA TCC ACC CGG CAC ACT GGT GTG CCA AGC AGA
    Leu Leu Ile Tyr Trp Thr Ser Thr Arg His Thr Gly Val Pro Ser Arg

625 TTC AGC GGT AGC GGT AGC GGT ACC GAC TTC ACC TTC ACC ATC AGC AGC
    Phe Ser Gly Ser Gly Ser Gly Thr Asp Phe Thr Phe Thr Ile Ser Ser

673 CTC CAG CCA GAG GAC ATC GCC ACC TAC TAC TGC CAG CAA TAT AGC CTC
    Leu Gln Pro Glu Asp Ile Ala Thr Tyr Tyr Cys Gln Gln Tyr Ser Leu

721 TAT CGG TCG TTC GGC CAA GGG ACC AAG GTG GAA ATC AAA CGT CTC GAG
    Tyr Arg Ser Phe Gly Gln Gly Thr Lys Val Glu Ile Lys Arg Leu Glu

769 CAC CAC CAC CAC CAC CAC TGA
    His His His His His His ---
```

Nucleic acids and encoded amino acids for polypeptide #1 of BS2
(679 x hMN14 bispecific diabody)

Figure 34

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAG GTC CAA CTG GTG GAG AGC GGT GGA
     Ala Gln Pro Ala Met Ala Met Glu Val Gln Leu Val Glu Ser Gly Gly

97  GGT GTT GTG CAA CCT GGC CGG TCC CTG CGC CTG TCC TGC TCC GCA TCT
     Gly Val Val Gln Pro Gly Arg Ser Leu Arg Leu Ser Cys Ser Ala Ser

145  GGC TTC GAT TTC ACC ACA TAT TGG ATG AGT TGG GTG AGA CAG GCA CCT
     Gly Phe Asp Phe Thr Thr Tyr Trp Met Ser Trp Val Arg Gln Ala Pro

193  GGA AAA GGT CTT GAG TGG ATT GGA GAA ATT CAT CCA GAT AGC AGT ACG
     Gly Lys Gly Leu Glu Trp Ile Gly Glu Ile His Pro Asp Ser Ser Thr

241  ATT AAC TAT GCG CCG TCT CTA AAG GAT AGA TTT ACA ATA TCG CGA GAC
     Ile Asn Tyr Ala Pro Ser Leu Lys Asp Arg Phe Thr Ile Ser Arg Asp

289  AAC GCC AAG AAC ACA TTG TTC CTG CAA ATG GAC AGC CTG AGA CCC GAA
     Asn Ala Lys Asn Thr Leu Phe Leu Gln Met Asp Ser Leu Arg Pro Glu

337  GAC ACC GGG GTC TAT TTT TGT GCA AGC CTT TAC TTC GGC TTC CCC TGG
     Asp Thr Gly Val Tyr Phe Cys Ala Ser Leu Tyr Phe Gly Phe Pro Trp

385  TTT GCT TAT TGG GGC CAA GGG ACC CCG GTC ACC GTC TCC GGA GGC GGT
     Phe Ala Tyr Trp Gly Gln Gly Thr Pro Val Thr Val Ser Gly Gly Gly

433  GGA TCC GAC ATT GTG ATG TCA CAA TCT CCA TCC TCC CTG GCT GTG TCA
     Gly Ser Asp Ile Val Met Ser Gln Ser Pro Ser Ser Leu Ala Val Ser

481  CCA GGA GAG AAG GTC ACT ATG ACC TGC AAA TCC AGT CAG AGT CTG TTC
     Pro Gly Glu Lys Val Thr Met Thr Cys Lys Ser Ser Gln Ser Leu Phe

529  AAC AGT AGA ACC CGA AAG AAC TAC TTG GGT TGG TAC CAG CAG AAA CCA
     Asn Ser Arg Thr Arg Lys Asn Tyr Leu Gly Trp Tyr Gln Gln Lys Pro

577  GGG CAG TCT CCT AAA CTT CTG ATC TAC TGG GCA TCT ACT CGG GAA TCT
     Gly Gln Ser Pro Lys Leu Leu Ile Tyr Trp Ala Ser Thr Arg Glu Ser

625  GGG GTC CCT GAT CGC TTC ACA GGC AGT GGA TCT GGG ACA GAT TTC ACT
     Gly Val Pro Asp Arg Phe Thr Gly Ser Gly Ser Gly Thr Asp Phe Thr

673  CTC ACC ATC AAC AGT GTG CAG TCT GAA GAC CTG GCA GTT TAT TAC TGC
     Leu Thr Ile Asn Ser Val Gln Ser Glu Asp Leu Ala Val Tyr Tyr Cys

721  ACT CAA GTT TAT TAT CTG AGC ACG TTC GGT GCT GGG ACC AAG CTG GAG
     Thr Gln Val Tyr Tyr Leu Ser Thr Phe Gly Ala Gly Thr Lys Leu Glu

769  CTG AAA CGG CTC GAG CAC CAC CAC CAC CAC CAC TGA
     Leu Lys Arg Leu Glu His His His His His His ---
```

Nucleic acids and encoded amino acids for polypeptide #2 of BS2
(679 x hMN14 bispecific diabody)

Figure 35

```
  1  ATG AAA TAC CTG CTG CCG ACC GCT GCT GCT GGT CTG CTG CTC CTC GCT
     Met Lys Tyr Leu Leu Pro Thr Ala Ala Ala Gly Leu Leu Leu Leu Ala

49  GCC CAG CCG GCG ATG GCC ATG GAA GTG CAG CTG GTG GAG TCA GGG GGA
     Ala Gln Pro Ala Met Ala Met Glu Val Gln Leu Val Glu Ser Gly Gly

97  GAC TTA GTG AAG CCT GGA GGG TCC CTG AAA CTC TCC TGT GCA GCC TCT
     Asp Leu Val Lys Pro Gly Gly Ser Leu Lys Leu Ser Cys Ala Ala Ser

145  GGA TTC ACT TTC AGT ATT TAC ACC ATG TCT TGG CTT CGC CAG ACT CCG
     Gly Phe Thr Phe Ser Ile Tyr Thr Met Ser Trp Leu Arg Gln Thr Pro

193  GGA AAG GGG CTG GAG TGG GTC GCA ACC CTG AGT GGT GAT GGT GAT GAC
     Gly Lys Gly Leu Glu Trp Val Ala Thr Leu Ser Gly Asp Gly Asp Asp

241  ATC TAC TAT CCA GAC AGT GTG AAG GGT CGA TTC ACC ATC TCC AGA GAC
     Ile Tyr Tyr Pro Asp Ser Val Lys Gly Arg Phe Thr Ile Ser Arg Asp

289  AAT GCC AAG AAC AGC CTA TAT CTG CAG ATG AAC AGT CTA AGG GCT GAG
     Asn Ala Lys Asn Ser Leu Tyr Leu Gln Met Asn Ser Leu Arg Ala Glu

337  GAC ACG GCC TTG TAT TAC TGT GCA AGG GTG CGA CTT GGG GAC TGG GAC
     Asp Thr Ala Leu Tyr Tyr Cys Ala Arg Val Arg Leu Gly Asp Trp Asp

385  TTC GAT GTC TGG GGC CAA GGG ACC ACG GTC TCC GTC TCC TCA GGA GGT
     Phe Asp Val Trp Gly Gln Gly Thr Thr Val Ser Val Ser Ser Gly Gly

433  GGC GGA TCC GAC ATT GTG ATG ACA CAA TCT CCA TCC TCC CTG GCT GTG
     Gly Gly Ser Asp Ile Val Met Thr Gln Ser Pro Ser Ser Leu Ala Val

481  TCA CCC GGG GAG AGG GTC ACT CTG ACC TGC AAA TCC AGT CAG AGT CTG
     Ser Pro Gly Glu Arg Val Thr Leu Thr Cys Lys Ser Ser Gln Ser Leu

529  TTC AAC AGT AGA ACC CGA AAG AAC TAC TTG GGT TGG TAC CAG CAG AAA
     Phe Asn Ser Arg Thr Arg Lys Asn Tyr Leu Gly Trp Tyr Gln Gln Lys

577  CCA GGG CAG TCT CCT AAA CTT CTG ATC TAC TGG GCA TCT ACT CGG GAA
     Pro Gly Gln Ser Pro Lys Leu Leu Ile Tyr Trp Ala Ser Thr Arg Glu

625  TCT GGG GTC CCT GAT CGC TTC TCA GGC AGT GGA TCC GGA ACA GAT TTC
     Ser Gly Val Pro Asp Arg Phe Ser Gly Ser Gly Ser Gly Thr Asp Phe

673  ACT CTC ACC ATC AAC AGT CTG CAG GCT GAA GAC GTG GCA GTT TAT TAC
     Thr Leu Thr Ile Asn Ser Leu Gln Ala Glu Asp Val Ala Val Tyr Tyr

721  TGC ACT CAA GTT TAT TAT CTG TGC ACG TTC GGT GCT GGG ACC AAG CTG
     Cys Thr Gln Val Tyr Tyr Leu Cys Thr Phe Gly Ala Gly Thr Lys Leu

769  GAG CTG AAA CGG CTC GAG CAC CAC CAC CAC CAC CAC TGA
     Glu Leu Lys Arg Leu Glu His His His His His His ---
```

Nucleic acids and encoded amino acids for h679-scF$_v$-L5

Figure 36

```
  1 ATG AAA TAC CTG CTG CCG ACC GCT GCT GCT GGT CTG CTG CTC CTC GCT
    Met Lys Tyr Leu Leu Pro Thr Ala Ala Ala Gly Leu Leu Leu Leu Ala

49 GCC CAG CCG GCG ATG GCC ATG GAA GTG CAG CTG GTG GAG TCA GGG GGA
    Ala Gln Pro Ala Met Ala Met Glu Val Gln Leu Val Glu Ser Gly Gly

97 GAC TTA GTG AAG CCT GGA GGG TCC CTG AAA CTC TCC TGT GCA GCC TCT
    Asp Leu Val Lys Pro Gly Gly Ser Leu Lys Leu Ser Cys Ala Ala Ser

145 GGA TTC ACT TTC AGT ATT TAC ACC ATG TCT TGG CTT CGC CAG ACT CCG
    Gly Phe Thr Phe Ser Ile Tyr Thr Met Ser Trp Leu Arg Gln Thr Pro

193 GGA AAG GGG CTG GAG TGG GTC GCA ACC CTG AGT GGT GAT GGT GAT GAC
    Gly Lys Gly Leu Glu Trp Val Ala Thr Leu Ser Gly Asp Gly Asp Asp

241 ATC TAC TAT CCA GAC AGT GTG AAG GGT CGA TTC ACC ATC TCC AGA GAC
    Ile Tyr Tyr Pro Asp Ser Val Lys Gly Arg Phe Thr Ile Ser Arg Asp

289 AAT GCC AAG AAC AGC CTA TAT CTG CAG ATG AAC AGT CTA AGG GCT GAG
    Asn Ala Lys Asn Ser Leu Tyr Leu Gln Met Asn Ser Leu Arg Ala Glu

337 GAC ACG GCC TTG TAT TAC TGT GCA AGG GTG CGA CTT GGG GAC TGG GAC
    Asp Thr Ala Leu Tyr Tyr Cys Ala Arg Val Arg Leu Gly Asp Trp Asp

385 TTC GAT GTC TGG GGC CAA GGG ACC ACG GTC TCC GTC TCC TCA GGA GGT
    Phe Asp Val Trp Gly Gln Gly Thr Thr Val Ser Val Ser Ser Gly Gly

433 GGC GGA TCC GAC ATC CAG CTG ACC CAG AGC CCA AGC AGC CTG AGC GCC
    Gly Gly Ser Asp Ile Gln Leu Thr Gln Ser Pro Ser Ser Leu Ser Ala

481 AGC GTG GGT GAC AGA GTG ACC ATC ACC TGT AAG GCC AGT CAG GAT GTG
    Ser Val Gly Asp Arg Val Thr Ile Thr Cys Lys Ala Ser Gln Asp Val

529 GGT ACT TCT GTA GCT TGG TAC CAG CAG AAG CCA GGT AAG GCT CCA AAG
    Gly Thr Ser Val Ala Trp Tyr Gln Gln Lys Pro Gly Lys Ala Pro Lys

577 CTG CTG ATC TAC TGG ACA TCC ACC CGG CAC ACT GGT GTG CCA AGC AGA
    Leu Leu Ile Tyr Trp Thr Ser Thr Arg His Thr Gly Val Pro Ser Arg

625 TTC AGC GGT AGC GGT AGC GGT ACC GAC TTC ACC TTC ACC ATC AGC AGC
    Phe Ser Gly Ser Gly Ser Gly Thr Asp Phe Thr Phe Thr Ile Ser Ser

673 CTC CAG CCA GAG GAC ATC GCC ACC TAC TAC TGC CAG CAA TAT AGC CTC
    Leu Gln Pro Glu Asp Ile Ala Thr Tyr Tyr Cys Gln Gln Tyr Ser Leu

721 TAT CGG TCG TTC GGC CAA GGG ACC AAG GTG GAA ATC AAA CGT CTC GAG
    Tyr Arg Ser Phe Gly Gln Gly Thr Lys Val Glu Ile Lys Arg Leu Glu

769 CAC CAC CAC CAC CAC CAC TGA
    His His His His His His ---
```

Nucleic acids and encoded amino acids for polypeptide #1 of BS1.5h
(h679 x hMN14 bispecific diabody)

Figure 37

```
  1 ATG AAA TAC CTG CTG CCG ACC GCT GCT GCT GGT CTG CTG CTC CTC GCT
    Met Lys Tyr Leu Leu Pro Thr Ala Ala Ala Gly Leu Leu Leu Leu Ala

49 GCC CAG CCG GCG ATG GCC ATG GAG GTC CAA CTG GTG GAG AGC GGT GGA
    Ala Gln Pro Ala Met Ala Met Glu Val Gln Leu Val Glu Ser Gly Gly

97 GGT GTT GTG CAA CCT GGC CGG TCC CTG CGC CTG TCC TGC TCC GCA TCT
    Gly Val Val Gln Pro Gly Arg Ser Leu Arg Leu Ser Cys Ser Ala Ser

145 GGC TTC GAT TTC ACC ACA TAT TGG ATG AGT TGG GTG AGA CAG GCA CCT
    Gly Phe Asp Phe Thr Thr Tyr Trp Met Ser Trp Val Arg Gln Ala Pro

193 GGA AAA GGT CTT GAG TGG ATT GGA GAA ATT CAT CCA GAT AGC AGT ACG
    Gly Lys Gly Leu Glu Trp Ile Gly Glu Ile His Pro Asp Ser Ser Thr

241 ATT AAC TAT GCG CCG TCT CTA AAG GAT AGA TTT ACA ATA TCG CGA GAC
    Ile Asn Tyr Ala Pro Ser Leu Lys Asp Arg Phe Thr Ile Ser Arg Asp

289 AAC GCC AAG AAC ACA TTG TTC CTG CAA ATG GAC AGC CTG AGA CCC GAA
    Asn Ala Lys Asn Thr Leu Phe Leu Gln Met Asp Ser Leu Arg Pro Glu

337 GAC ACC GGG GTC TAT TTT TGT GCA AGC CTT TAC TTC GGC TTC CCC TGG
    Asp Thr Gly Val Tyr Phe Cys Ala Ser Leu Tyr Phe Gly Phe Pro Trp

385 TTT GCT TAT TGG GGC CAA GGG ACC CCG GTC ACC GTC TCC GGA GGC GGT
    Phe Ala Tyr Trp Gly Gln Gly Thr Pro Val Thr Val Ser Gly Gly Gly

433 GGA TCC GAC ATT GTG ATG ACA CAA TCT CCA TCC TCC CTG GCT GTG TCA
    Gly Ser Asp Ile Val Met Thr Gln Ser Pro Ser Ser Leu Ala Val Ser

481 CCC GGG GAG AGG GTC ACT CTG ACC TGC AAA TCC AGT CAG AGT CTG TTC
    Pro Gly Glu Arg Val Thr Leu Thr Cys Lys Ser Ser Gln Ser Leu Phe

529 AAC AGT AGA ACC CGA AAG AAC TAC TTG GGT TGG TAC CAG CAG AAA CCA
    Asn Ser Arg Thr Arg Lys Asn Tyr Leu Gly Trp Tyr Gln Gln Lys Pro

577 GGG CAG TCT CCT AAA CTT CTG ATC TAC TGG GCA TCT ACT CGG GAA TCT
    Gly Gln Ser Pro Lys Leu Leu Ile Tyr Trp Ala Ser Thr Arg Glu Ser

625 GGG GTC CCT GAT CGC TTC TCA GGC AGT GGA TCC GGA ACA GAT TTC ACT
    Gly Val Pro Asp Arg Phe Ser Gly Ser Gly Ser Gly Thr Asp Phe Thr

673 CTC ACC ATC AAC AGT CTG CAG GCT GAA GAC GTG GCA GTT TAT TAC TGC
    Leu Thr Ile Asn Ser Leu Gln Ala Glu Asp Val Ala Val Tyr Tyr Cys

721 ACT CAA GTT TAT TAT CTG TGC ACG TTC GGT GCT GGG ACC AAG CTG GAG
    Thr Gln Val Tyr Tyr Leu Cys Thr Phe Gly Ala Gly Thr Lys Leu Glu

769 CTG AAA CGG CTC GAG CAC CAC CAC CAC CAC CAC TGA
    Leu Lys Arg Leu Glu His His His His His His ---
```

Nucleic acids and encoded amino acids for polypeptide #2 of BS1.5h
(h679 x hMN14 bispecific diabody)
Figure 38

A20Vk

```
GACATTCAGCTGACCCAGTCTCCAGCAATCCTGTCTGCTGCATCTCCAGGGGAGAAGGTCACAATGACTTGCAGGGCCAGCTCAAGTGTAAGT
----+----+----+----+----+----+----+----+----+----+----+----+----+----+----+----+----+----+   90
CTGTAAGTCGACTGGGTCAGAGGTCGTTAGGACAGACGACGTAGAGGTCCCCTCTTCCAGTGTTACTGAACGTCCCGGTCGAGTTCACATTCA
     1               10                20              27 29 30
    D  I  Q  L  T  Q  S  P  A  I  L  S  A  S  P  G  E  K  V  T  M  T  C  R  A  S  S  V  S      30
                                                                           ─────────────────
                                                                                  CDR1

TACATTCCACTGGTTCCAGCAGAAGCCAGGATCCTCCCCCAAACCCTGGATTTATGCCACATCCAACCTGGCTTCTGGAGTCCCTGTTCGC
----+----+----+----+----+----+----+----+----+----+----+----+----+----+----+----+----+----+  180
ATGTAAGGTGACCAAGGTCGTCTTCGGTCCTAGGAGGGGGTTTGGGACCTAAATACGGTGTAGGTTGGACCGAAGACCTCAGGGACAAGCG
                              40                  50
    Y  I  H  W  F  Q  Q  K  P  G  S  S  P  K  P  W  I  Y  A  T  S  N  L  A  S  G  V  P  V  R   60
    ───                                           ──────────────
    CDR1 (cont)                                        CDR2

TTCAGTGGCAGTGGGTCTGGGACTTCTTACTCTCTCACAATCAGCAGAGTGGAGGCTGAAGATGCTGCCACTTATTACTGCCAGCAGTGG
----+----+----+----+----+----+----+----+----+----+----+----+----+----+----+----+----+----+  270
AAGTCACCGTCACCCAGACCCTGAAGAATGAGAGAGTGTTAGTCGTCTCACCTCCGACTTCTACGACGGTGAATAATGACGGTCGTCACC
                     70                  80                   90
    F  S  G  S  G  S  G  T  S  Y  S  L  T  I  S  R  V  E  A  E  D  A  A  T  Y  Y  C  Q  Q  W   90
                                                                                    ──────
                                                                                     CDR3

ACTAGTAACCCCACCCCACGTTCGGAGGGGGGACCAAGCTGGAGATCTAAC
----+----+----+----+----+----+----+----+----+----   359
TGATCATTGGGGTGGGGTGCAAGCCTCCCCCCCTGGTTCGACCCTCTAGATTG
             100
    T  S  N  P  P  T  F  G  G  G  T  K  L  E  I                                              105
    ─────────────
       CDR3
```

```
GTACAACTGCAGCAGCCTGGGGCTGAGCTGGTGAAGCCTGGGGCCTCAGTGAAGATGTCCTGCAAGGCTTCTGGCTACACATTTACCAGT
---------+---------+---------+---------+---------+---------+---------+---------+---------+   90
CATGTTGACGTCGTCGGACCCCGACTCGACCACTTCGGACCCCGGAGTCACTTCCGAAGACCGATGTGTAAATGGTCA
  2                    10                   20                   30
  V  Q  L  Q  Q  P  G  A  E  L  V  K  P  G  A  S  V  K  M  S  C  K  A  S  G  Y  T  F  T  S
```
```
TACAATATGCACTGGGTAAAACAGACACCTGGTCGGGGCCTGGAATGGATTGGAGCTATTTATCCCGGAAATGGTGATACTTCCTACAAT
---------+---------+---------+---------+---------+---------+---------+---------+---------+  180
ATGTTATACGTGACCCATTTTGTCTGTGGACCAGCCCCGGACCTTACCTAACCTCGATAAATAGGCCTTTACCACTATGAAGGATGTTA
                  40                   50       52 A         60
  Y  N  M  H  W  V  K  Q  T  P  G  R  G  L  E  W  I  G  A  I  Y  P  G  N  G  D  T  S  Y  N
  CDR1                                                  CDR 2
```
```
CAGAAGTTCAAAGGCAAGGCCACATTGACTGCAGACAAATCCTCCAGCACAGCCTACATGCAGCTCAGCAGCCTGACATCTGAGGACTCT
---------+---------+---------+---------+---------+---------+---------+---------+---------+  270
GTCTTCAAGTTTCCGTTCCGGTGTAACTGACGTCTGTTTAGGAGGTCGTGTCGGATGTACGTCGAGTCGTCGGACTGTAGACTCCTGAGA
                    70                   80     82 A B C
  Q  K  F  K  G  K  A  T  L  T  A  D  K  S  S  S  T  A  Y  M  Q  L  S  S  L  T  S  E  D  S
```
```
GCGGTCTATTACTGTGCAAGATCGACTTACTACGGCGGTGACTGGTACTTCGATGTCTGGGGCCAAGGGACCACGGTCACCGTCTCCTCA
---------+---------+---------+---------+---------+---------+---------+---------+---------+  360
CGCCAGATAATGACACGTTCTAGCTGAATGATGCCGCCACTGACCATGAAGCTACAGACCCCGGTTCCCTGGTGCCAGTGGCAGAGGAGT
                 90              100 A B C D                  110
  A  V  Y  Y  C  A  R  S  T  Y  Y  G  G  D  W  Y  F  D  V  W  G  Q  G  T  T  V  T  V  S  S
                       CDR3
```

FIGURE 39B cA20Vk

```
GACATCCAGCTGACCCAGTCTCCAGCAATCCTGTCTGCATCTCCAGGGGAGAAGGTCACAATGACTTGCAGGGCCAGCTCAAGTGTAAGT    90
 1                        10                      20                    27 29 30
 D  I  Q  L  T  Q  S  P  A  I  L  S  A  S  P  G  E  K  V  T  M  T  C  R  A  S  S  S  V  S
                                                                         ─────────────────
                                                                                CDR1

TACATCCACTGGTTCCAGCAGAAGCCAGGATCCTCCCCCAAACCCTGGATTTATGCCACATCCAACCTGGCTTCTGGAGTCCCTGTTCGC   180
                 40                          50                         60
 Y  I  H  W  F  Q  Q  K  P  G  S  S  P  K  P  W  I  Y  A  T  S  N  L  A  S  G  V  P  V  R
 ─────                                           ───────────────────────
                                                          CDR2

TTCAGTGGCAGTGGGTCTGGGACTTCTTACTCTCTCACAATCAGCAGAGTGGAGGCTGAAGATGCTGCCACTTATTACTGCCAGCAGTGG   270
                        70                          80                       90
 F  S  G  S  G  T  S  Y  S  L  T  I  S  R  V  E  A  E  D  A  A  T  Y  Y  C  Q  Q  W
                                                                          ──────────

ACTAGTAACCCACCCACGTTCGGAGGGGGGACCAAGCTGGAGATCAAA   318
                             100              107
 T  S  N  P  P  T  F  G  G  G  T  K  L  E  I  K
 ────────────
    CDR3
```

FIGURE 40A cA20VH

```
CAGGTCCAACTGCAGCAGCCTGGGGCTGAGCTGGTGAAGCCTGGGGCCTCAGTGAAGATGTCCTGCAAGGCTTCTGGCTACACATTTACC      90
 1                        10                        20                        30
 Q  V  Q  L  Q  Q  P  G  A  E  L  V  K  P  G  A  S  V  K  M  S  C  K  A  S  G  Y  T  F  T

AGTTACAATATGCACTGGGTAAAACAGACACCTGGTCGGGGCCTGGAATGGATTGGAGCTATTTATCCCGGAAATGGTGATACTTCCTAC     180
                              40                        50    52 A                   
 S  Y  N  M  H  W  V  K  Q  T  P  G  R  G  L  E  W  I  G  A  I  Y  P  G  N  G  D  T  S  Y
     CDR1                                                      CDR 2

AATCAGAAGTTCAAAGGCAAGGCCACATTGACTGCAGACAAATCCTCCAGCACAGCCTACATGCAGCTCAGCAGCCTGACATCTGAGGAC     270
60                      70                        80    82 A B C
 N  Q  K  F  K  G  K  A  T  L  T  A  D  K  S  S  S  T  A  Y  M  Q  L  S  S  L  T  S  E  D

TCTGCGGTCTATTACTGTGCAAGATCGACTTACTACGGCGGTGACTTCGATGTCTGGGGCCAAGGGACCACGGTCACCGTCTCC          360
         90                         100 A B C D                      110
 S  A  V  Y  Y  C  A  R  S  T  Y  Y  G  G  D  W  Y  F  D  V  W  G  Q  G  T  T  V  T  V  S
                           CDR3

TCA                                                                                          363
113
 S
```

```
                1                   10                  20                  30             40
REIVk           DIQMTQSPSSLSASVGDRVTITCQASQDIIKYLNWYQQTP
cA20Vk          ...L....AI....P.EK..M...R..S-SVS.IH.F..K.
hA20Vk          ...L..........M...R..S-SVS.IH.F..K.

50                  60                  70             80
REIVk           GKAPKLLIYEASNLQAGVPSRFSGSGSGTDYTFTISSLQP
cA20Vk          .SS..PW..AT...AS....V........S..SL...RVEA.
hA20Vk          .....PW..AT...AS....V........S..SL...RVEA.

90                  100        107
REIVk           EDIATYYCQQYQSLPYTFGQGTKLQIT
cA20Vk          ..A......WT.N.P....G....E.K
hA20Vk          .........WT.N.P....G....E.K
```

FIGURE 42B

```
                                                                                    XbaI
                                                           tctagaacacaggacctcaccATGGGATGGAGCTGTATCATCCTCTTCTTGGTAGCAACAGCTACaggta    -91
                                                                                  M  G  W  S  C  I  I  L  F  L  V  A  T  A  T         -5

AgggctcacagtagcaggcttgaggtctgactatatggtgacatatccactttgcctttctctccacAGGTGTCCACTCC    -1
                                                                  G  V  H  S       -1

PvuII
GACATCCAGCTGACCCAGTCTCCATCATCTCTGAGCGCATCTGTTGGAGATAGGGTCACTATGACTTGTAGGGCCAGCTCAAGTGTAAGT    90
 D   I   Q   L   T   Q   S   P   S   S   L   S   A   S   V   G   D   R   V   T   M   T   C   R   A   S   S   V   S    30
                                                                                              CDR1

TACATCCACTGGTTCCAGCAGAAACCAGGGAAAGCACCTAAACCCTGGATTTATGCCACTTCGAACCTGGCTTCTGGTGTCCCTGTCCGA   180
 Y   I   H   W   F   Q   Q   K   P   G   K   A   P   K   P   W   I   Y   A   T   S   N   L   A   S   G   V   P   V   R    61
                                                                       CDR2

TTCTCTGGCAGCGGATCTGGGACAGATTACACTTTCACCATCAGCTCTCTTCAACCAGAAGACATTGCAACATATTATTGTCAGCAGTGG   270
 F   S   G   S   G   S   G   T   D   Y   T   F   T   I   S   S   L   Q   P   E   D   I   A   T   Y   Y   C   Q   Q   W    91

BglII/BclI                                      BamHI
ACTAGTAACCCACCCACGTTCGGTGGAGGGACCAAGCTGGAGATCAAACgtgagtagaattaaactttgctcctcagttggatcc       357
 T   S   N   P   P   T   F   G   G   G   T   K   L   E   I   K                            107
 CDR3
```

Figure 43A

```
                                                                                              -91
XhoI                                                                                          -5
ctcgagcacacaggacctcaccATGGGATGGAGCTGTATCATCCTCTTCTTGGTAGCAACAGCTACAggta
                       M  G  W  S  C  I  I  L  F  L  V  A  T  A  T
                                                                                              -1
                                                                                              -1
AggggctcacagtagcaggcttgaggtctgacatatatggtgacaatgacatccacttgcctttctctccacAGGTGTCCACTCC
                                                                         G  V  H  S
     PstI                                                                                     90
CAGGTCCAACTGCAGCAATCAGGGGCTGAAGTCAAGAAACCTGGGTCATCGGTGAAGGTCTCCTGCAAGGCTTCTGGCTACACCTTTACT    30
Q  V  Q  L  Q  Q  S  G  A  E  V  K  K  P  G  S  S  V  K  V  S  C  K  A  S  G  Y  T  F  T AGTTACAATATGCACTGGGTCAAGCAGGCACCTGGACAGGGTCTTGGAATGGATTGGAGCTATTTATCCCGGAAATGGTGATACTTCCTAC  180
 S  Y  N  M  H  W  V  K  Q  A  P  G  Q  G  L  E  W  I  G  A  I  Y  P  G  N  G  D  T  S  Y    59
    CDR1                                                                CDR2

AATCAGAAGTTCAAGGGTAAAGCCACACTGACTGCCGACGAATCCACCAATACAGCCTACATGGAGCTGAGCAGCCTGAGGTCTGAGGAC   270
 N  Q  K  F  K  G  K  A  T  L  T  A  D  E  S  T  N  T  A  Y  M  E  L  S  S  L  R  S  E  D    86
                                                                                    BstEII

ACGGCATTTTATTACTGTGCAAGATCGACTTACTACGGCGGTGACTGGTACTTCGATGTCTGGGGCCAAGGCACCACGGTCACCGTCTCC   360
 T  A  F  Y  Y  C  A  R  S  T  Y  Y  G  G  D  W  Y  F  D  V  W  G  Q  G  T  T  V  T  V  S    112
                         CDR3

TCAGgtgagtccttacaacctctctcttctattcagcttaaatagatttttactgcattgttgggggaaatgtgtgtatctgaatttc    450
 S                                                                                            113

Aggtcatgaaggactaggacacttggagtcagaaaggtcattgggagcccggctgatgcagacagacatcctcagctcccagact        540
     BamHI
tcatggccagagatttataggatcc                                                                    565
```

Figure 43B

```
XhoI
ctcgagcacacaggacctcaccATGGGATGGAGCTGTATCATCCTCTTCTTGGTAGCAACAGCTACAggta    -91
                      M  G  W  S  C  I  I  L  F  L  V  A  T  A  T         -5

AggggctcacagtagcaggcttgaggtctggacatatatgggtgacaatgacatccactttgcctttctctccacAGGTGTCCACTCC    -1
                                                                      G  V  H  S         -1

CAGGTCCAACTGCAGCAATCAGGGGCTGAAGTCAAGAAACCTGGCTCATCAGTCAAGGTCTCCTGCAAGGCTTCTGGCTACACCTTTAGT    90
 Q  V  Q  L  Q  Q  S  G  A  E  V  K  K  P  G  S  S  V  K  V  S  C  K  A  S  G  Y  T  F  S   30

AGTTACAATATGCACTGGGTCAGACAGGCACCTGGACAGGGTCTGGAATGGATGGGAGCTATTTATCCCGGAAATGGTGATACTTCCTAC    180
 S  Y  N  M  H  W  V  R  Q  A  P  G  Q  G  L  E  W  M  G  A  I  Y  P  G  N  G  D  T  S  Y   59
 CDR1                                                     CDR2

AATCAGAAGTTCAAGGGTAGAGCCACAATAACTGCCGACGAATCCACAATCACAGCCTACATGGAGCTGAGCAGCCTGAGGTCTGAGGAC    270
 N  Q  K  F  K  G  R  A  T  I  T  A  D  E  S  T  N  T  A  Y  M  E  L  S  S  L  R  S  E  D   86

ACGGCATTTTATTTTTGTGCAAGATCGACTTACTACGGGGTGACTGGTACTTCGATGTCTGGGGCCAAGGCACCACGGTCACCGTCTCC    360
 T  A  F  Y  F  C  A  R  S  T  Y  Y  G  G  D  W  Y  F  D  V  W  G  Q  G  T  T  V  T  V  S   112
                         CDR3

TCAGgtgagtccttacaacctctctcttctattcagcttaaatagatttttactgcatttgttgttggggggaaatgtgtatctgaatttc    450
 S                                                                                           113

Aggtcatgaaggactagggacacctttgggagtcagaaaggtcattgggagcccggggctgatgcagacagacatcctcagctcccagact    540

BamHI
Tcatgccagagatttataggatcc                                                                    565
```

Figure 43C

Fig. 45A. The CH sequence of hIgG1.

```
108  CGAACTGTGGCTGCACCATCTGTCTTCATCTTCCCGCCATCTGATGAGCAGTTGAAATCTGGAACTGCCTCTGTTGTGCCTGCTGAATAACTTCTATCCCAGAGAGGCCAAAGTACAG  120
     R  T  V  A  A  P  S  V  F  I  F  P  P  S  D  E  Q  L  K  S  G  T  A  S  V  V  C  L  L  N  N  F  Y  P  R  E  A  K  V  Q

148  TGGAAGGTGGATAACGCCCTCCAATCGGGTAACTCCCAGGAGAGTGTCACAGAGCAGGACAGCAAGGACACCACCTACAGCCTCAGCAGCACCCTGACGCTGAGCAAAGCAGACTACGAG  240
     W  K  V  D  N  A  L  Q  S  G  N  S  Q  E  S  V  T  E  Q  D  S  K  D  S  T  Y  S  L  S  S  T  L  T  L  S  K  A  D  Y  E

188  AAACACAAAGTCTACGCCTGCGAAGTCACCCATCAGGGCCTGAGCTCCCCGTCACAAAGAGCTTCAACAGGGGAGAGTGTTGA  324
     K  H  K  V  Y  A  C  E  V  T  H  Q  G  L  S  S  P  V  T  K  S  F  N  R  G  E  C  *
```

Fig. 45B The constant region sequence of human kappa chain.

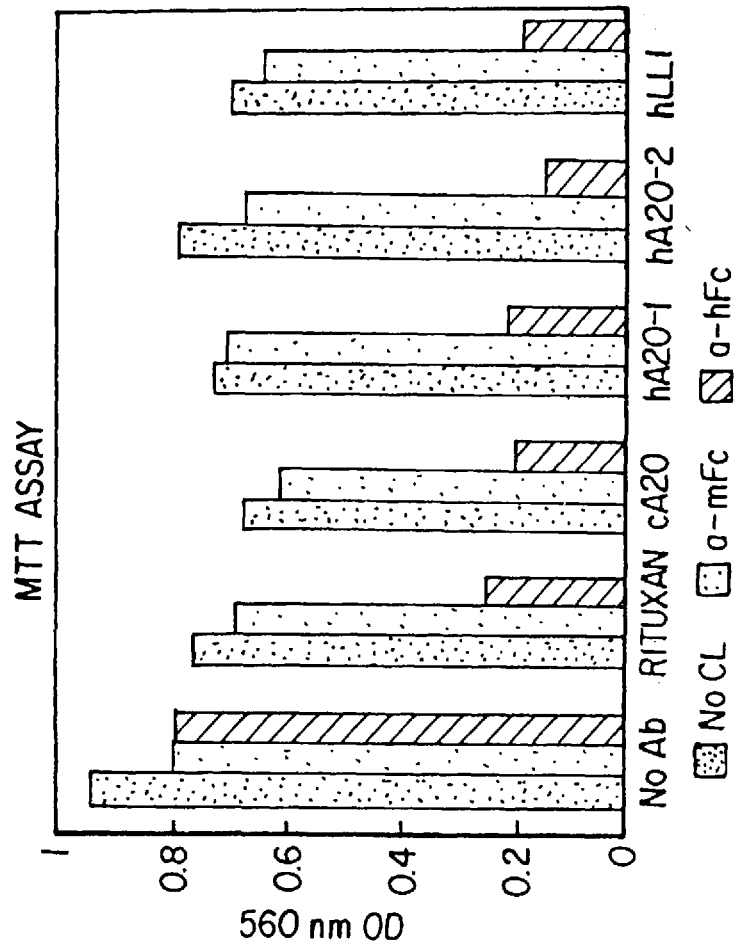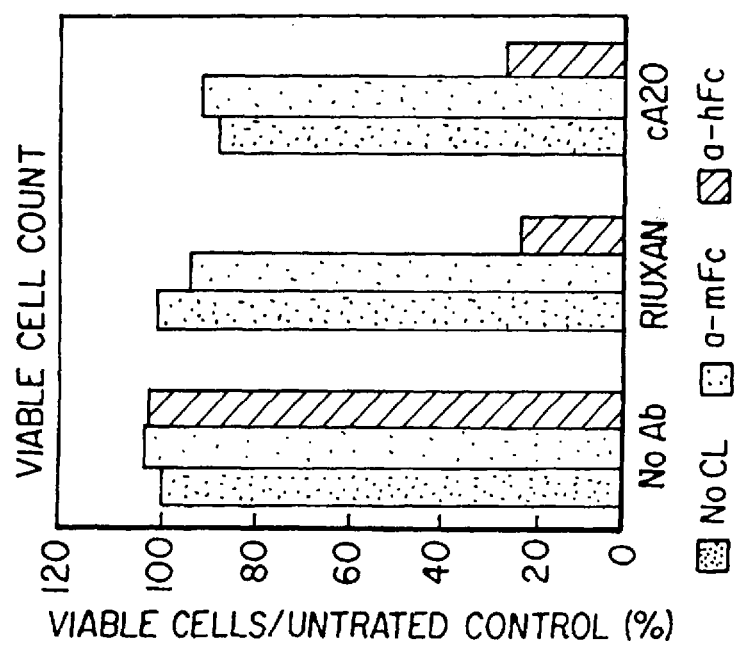
FIGURE 48A
FIGURE 48B

HUMANIZED ANTIBODIES AND METHODS OF HUMANIZING ANTIBODIES

CROSS REFERENCE TO RELATED APPLICATIONS

This application claims priority from application Ser. No. 11/534,103, filed Sep. 21, 2006, now U.S. Pat. No. 7,435,803, which is a continuation of Ser. No. 10/366,709, filed on Feb. 14, 2003, now U.S. Pat. No. 7,151,164, which claims priority to U.S. Provisional application Ser. Nos. 60/416,232, filed Oct. 7, 2002, and 60/356,132, filed Feb. 14, 2002, the entire contents of all of these applications being incorporated by reference in their entirety herein. It also claims priority from application Ser. No. 10/270,071, filed Oct. 15, 2002, now abandoned, which claims priority to U.S. Provisional applications Ser. Nos. 60/341,881 filed Dec. 21, 2001 and 60/328,835, filed Oct. 15, 2001. application Ser. No. 10/270,071 was incorporated by reference in application Ser. No. 10/366,709, portions of which are expressly incorporated herein.

BACKGROUND OF THE INVENTION

1. Field of the Invention

The present invention relates to humanized, chimeric and human anti-CD20 antibodies, particularly monoclonal antibodies (mAbs) therapeutic and diagnostic conjugates of humanized, chimeric and human anti-CD20 antibodies and methods of treating B cell lymphomas and leukemias and various autoimmune diseases using humanized, chimeric and human anti-CD20 antibodies. The present invention relates to antibody fusion proteins or fragments thereof comprising at least two anti-CD20 mAbs or fragments thereof or at least one anti-CD20 MAb or fragment thereof and at least one second MAb or fragment thereof, other than the antiCD20 MAb or fragment thereof. The humanized, chimeric and human anti-CD20 mAbs, fragments thereof, antibody fusion proteins thereof or fragments thereof may be administered alone, as a therapeutic conjugate or in combination with a therapeutic immunoconjugate, with other naked antibodies, or with therapeutic agents or as a diagnostic conjugate. The present invention relates to DNA sequences encoding humanized, chimeric and human anti-CD20 antibodies, and antibody fusion proteins, vectors and host cells containing the DNA sequences, and methods of making the humanized, chimeric and human anti-CD20 antibodies. The present invention also relates to a humanized anti-HSG (histamine-succinyl-glycyl) monoclonal antibody designated h679 which binds with high affinity to molecules containing the moiety histamine-succinyl-glycyl (HSG), and methods of making the humanized anti-HSG antibody.

2. Background

The immune system of vertebrates consists of a number of organs and cell types which have evolved to accurately recognize foreign antigens, specifically bind to, and eliminate/destroy such foreign antigens. Lymphocytes, amongst others are critical to the immune system. Lymphocytes are divided into two major sub-populations, T cells and B cells. Although inter-dependent, T cells are largely responsible for cell-mediated immunity and B cells are largely responsible for antibody production (humoral immunity).

In humans, each B cell can produce an enormous number of antibody molecules. Such antibody production typically ceases (or substantially decreases) when a foreign antigen has been neutralized. Occasionally, however, proliferation of a particular B cell will continue unabated and may result in a cancer known as a B cell lymphoma. B-cell lymphomas, such as the B-cell subtype of non-Hodgkin's lymphoma, are significant contributors to cancer mortality. The response of B-cell malignancies to various forms of treatment is mixed. For example, in cases in which adequate clinical staging of non-Hodgkin's lymphoma is possible, field radiation therapy can provide satisfactory treatment. Still, about one-half of the patients die from the disease. Devesa et al., *J. Nat'l Cancer Inst.* 79:701 (1987).

The majority of chronic lymphocytic leukemias are of B-cell lineage. Freedman, *Hematol. Oncol. Clin. North Am.* 4:405 (1990). This type of B-cell malignancy is the most common leukemia in the Western world. Goodman et al., *Leukemia and Lymphoma* 22:1 (1996). The natural history of chronic lymphocytic leukemia falls into several phases. In the early phase, chronic lymphocytic leukemia is an indolent disease, characterized by the accumulation of small mature functionally-incompetent malignant B-cells having a lengthened life span. Eventually, the doubling time of the malignant B-cells decreases and patients become increasingly symptomatic. While treatment can provide symptomatic relief, the overall survival of the patients is only minimally affected. The late stages of chronic lymphocytic leukemia are characterized by significant anemia and/or thrombocytopenia. At this point, the median survival is less than two years. Foon et al., *Annals Int. Medicine* 113:525 (1990). Due to the very low rate of cellular proliferation, chronic lymphocytic leukemia is resistant to cytotoxic drug treatment.

Traditional methods of treating B-cell malignancies, including chemotherapy and radiotherapy, have limited utility due to toxic side effects. The use of monoclonal antibodies to direct radionuclides, toxins, or other therapeutic agents offers the possibility that such agents can be delivered selectively to tumor sites, thus limiting toxicity to normal tissues. Also, the presence of B-cell antigens on these B-cell malignancies makes them optimal targets for therapy with unconjugated B-cell antibodies, such as against CD19, CD20, CD21, CD23, and CD22 markers on B-cells. HLA-DR and other antigens may serve as targets for normal and malignant B-cells although they are also expressed on other cell types. Further, certain MUC1, MUC2, MUC3, and MUC4 antigens, preferably MUC1, are also expressed in different hematopoietic malignancies, including B-cell tumors expressing CD20 and other B-cell markers. Still other antigen targets, such as those associated with the vascular endothelium of tumors, including tenascin, vascular endothelium growth factor (VEGF), and placental growth factor (PlGF), as well as other categories of antigens associated with B-cell malignancies, such as oncogene products, are also suitable targets for said complementary antibodies for use in the present invention.

B cells comprise cell surface proteins which can be utilized as markers for differentiation and identification. One such human B-cell marker is the human B lymphocyte-restricted differentiation antigen Bp35, referred to as CD20. CD20 is expressed during early pre-B cell development and remains until plasma cell differentiation. CD20 is expressed on both normal B cells and malignant B cells whose abnormal growth can lead to B-cell lymphomas. Antibodies against the CD20 antigen have been investigated for the therapy of B-cell lymphomas. For example, a chimeric anti-CD20 antibody, designated as "IDEC-C2B8," has activity against B-cell lymphomas when provided as unconjugated antibodies at repeated injections of doses exceeding 500 mg per injection. Maloney et al., *Blood* 84:2457 (1994); Longo, *Curr. Opin. Oncol.* 8:353 (1996). About 50 percent of non-Hodgkin's patients, having the low-grade indolent form, treated with this regimen showed responses. Therapeutic responses have also been obtained using $^{131}$I-labeled B1 anti-CD20 murine monoclonal antibody when provided as repeated doses exceeding 600 mg per injection. Kaminski et al., *N. Engl. J. Med.* 329: 459 (1993); Press et al., *N. Engl. J. Med.* 329:1219 (1993); Press et al., *Lancet* 346:336 (1995). However, these antibodies, whether provided as unconjugated forms or radiolabeled forms, have not shown high rates of objective and durable responses in patients with the more prevalent and lethal form of B-cell lymphoma, the intermediate or aggressive type. Therefore, a need exists to develop an immunotherapy for B-cell malignancies that achieves a therapeutic response of significant duration.

Additional studies targeting CD20 surface antigen have been demonstrated using an anti-CD20 murine monoclonal antibody, IF5, which was administered by continuous intravenous infusion to B cell lymphoma patients. Extremely high levels (>2 grams) of 1F5 were reportedly required to deplete circulating tumor cells, and the results were described as being "transient." Press et al., "Monoclonal Antibody 1F5 (Anti-CD20) Serotherapy of Human B-Cell Lymphomas." *Blood* 69/2:584-591 (1987). However, a potential problem with this approach is that non-human monoclonal antibodies (e.g., murine monoclonal antibodies) typically lack human effector functionality, i.e., they are unable to mediate complement-dependent lysis or lyse human target cells through antibody-dependent cellular toxicity or Fc-receptor mediated phagocytosis. Furthermore, non-human monoclonal antibodies can be recognized by the human host as a foreign protein and, therefore, repeated injections of such foreign antibodies can lead to the induction of immune responses leading to harmful hypersensitivity reactions. For murine-based monoclonal antibodies, this is often referred to as a Human Anti-Mouse Antibody (HAMA) response.

The use of chimeric antibodies is more preferred because they do not elicit as strong a HAMA response as murine antibodies. Chimeric antibodies are antibodies which comprise portions from two or more different species. For example, Liu, A. Y. et al, "Production of a Mouse-Human Chimeric Monoclonal Antibody to CD20 with Potent Fc-Dependent Biologic Activity" *J. Immun.* 139/10:3521-3526 (1987), describe a mouse/human chimeric antibody directed against the CD20 antigen. See also, PCT Publication No. WO 88/04936. However, no information is provided as to the ability, efficacy or practicality of using such chimeric antibodies for the treatment of B cell disorders in the reference. It is noted that in vitro functional assays (e.g., complement-dependent lysis (CDC); antibody dependent cellular cytotoxicity (ADCC), etc.) cannot inherently predict the in vivo capability of a chimeric antibody to destroy or deplete target cells expressing the specific antigen. See, for example, Robinson, R. D. et al., "Chimeric mouse-human anti-carcinoma antibodies that mediate different anti-tumor cell biological activities" *Hum. Antibod. Hybridomas* 2:84-93 (1991) (chimeric mouse-human antibody having undetectable ADCC activity). Therefore, the potential therapeutic efficacy of a chimeric antibody can only truly be assessed by in vivo experimentation, preferably in the species of interest for the specific therapy.

One approach that has improved the ability of murine monoclonal antibodies to be effective in the treatment of B-cell disorders has been to conjugate a radioactive label or chemotherapeutic agent to the antibody, such that the label or agent is localized at the tumor site. For example, the above-referenced 1F5 antibody and other B-cell antibodies have been labeled with $^{131}$I and were reportedly evaluated for biodistribution in two patients. See Eary, J. F. et al., "Imaging and Treatment of B-Cell Lymphoma" *J. Nuc. Med.* 31/8: 1257-1268 (1990); see also, Press, O. W. et al., "Treatment of Refractory Non-Hodgkin's Lymphoma with Radiolabeled MB-1 (Anti-CD37) Antibody" *J. Clin. Onc.* 7/8:1027-1038 (1989) (indication that one patient treated with $^{131}$I-labeled IF-5 achieved a partial response); Goldenberg, D. M. et al. "Targeting, Dosimetry and Radioimmunotherapy of B-Cell Lymphomas with $^{131}$I-Labeled LL2 Monoclonal Antibody" *J. Clin. Oncol.* 9/4:548-564 (1991) (three of eight patients receiving multiple injections reported to have developed a HAMA response to this CD22 murine antibody); Appelbaum, F. R. "Radiolabeled Monoclonal Antibodies in the Treatment of Non-Hodgkin's Lymphoma" *Hem./Oncol. Clinics of N. A.* 5/5:1013-1025 (1991) (review article); Press, O. W. et al. "Radiolabeled-Antibody Therapy of B-Cell Lymphoma with Autologous Bone Marrow Support." *New England Journal of Medicine* 329/17: 1219-12223 (1993) ($^{131}$I-labeled anti-CD20 antibody IF5 and B1); and Kaminski, M. G. et al "Radioimmunotherapy of B-Cell Lymphoma with [$^{131}$I] Anti-B1 (Anti-CD20) Antibody". *NEJM* 329/7: 459 (1993) ($^{131}$I-labeled anti-CD20 antibody B1; hereinafter "Kaminski"); PCT published application WO 92/07466 (antibodies conjugated to chemotherapeutic agents such as doxorubicin or mitomycin). However, these approaches have not eliminated the obstacles associated with using murine antibodies, despite the fact that many patients with lymphoma who have received prior aggressive cytotoxic chemotherapy are immune suppressed, thus having lower HAMA rates than lymphoma patients who have not been heavily pretreated.

Autoimmune diseases are a class of diseases associated with B-cell disorders. Examples include immune-mediated thrombocytopenias, such as acute idiopathic thrombocytopenic purpura and chronic idiopathic thrombocytopenic purpura, myasthenia gravis, lupus nephritis, lupus erythematosus, and rheumatoid arthritis. The most common treatments are corticosteroids and cytotoxic drugs, which can be very toxic. These drugs also suppress the entire immune system, can result in serious infection, and have adverse affects on the bone marrow, liver and kidneys. Other therapeutics that have been used to treat Class III autoimmune diseases to date have been directed against T-cells and macrophages. There is a need for more effective methods of treating autoimmune diseases, particularly Class III autoimmune diseases.

To address the many issues related to B-cell disorders and their treatment, the present invention provides humanized, chimeric and human anti-CD20 monoclonal antibodies with the same complementarity determining regions (CDRs) that bind to the CD20 antigen of the present invention used alone, conjugated to a therapeutic agent or in combination with other treatment modalities, for the treatment of B cell lymphomas and leukemias and autoimmune disorders in humans and other mammals without the adverse responses associated with using murine antibodies.

SUMMARY OF THE INVENTION

Accordingly, the present invention provides humanized, chimeric and human anti-CD20 antibodies that bind to a human B cell marker, referred to as CD20 which is useful for the treatment and diagnosis of B-cell disorders, such as B-cell malignancies and autoimmune diseases.

The present invention further provides methods of treatment of mammalian subjects, such as humans or domestic animals, with one or more humanized, chimeric and human CD20 antibodies, alone, as an antibody fusion protein, as a therapeutic conjugate alone or as part of an antibody fusion protein, in combination, or as a multimodal therapy, with other antibodies, other therapeutic agents or immunomodulators or as an immunoconjugate linked to at least one therapeutic agent, therapeutic radionuclide or immunomodulator. These humanized chimeric and human CD20 antibodies can also be used as a diagnostic imaging agent alone, in combination with other diagnostic imaging agents, and/or in conjunction with therapeutic applications.

The present invention additionally is directed to anti-CD20 mAbs or fragments thereof that contain specific murine CDRs or a combination of murine CDRs from more than one murine or chimeric anti-CD20 MAb that have specificity for CD20. These mAbs can be humanized, chimeric or human anti-CD20 mAbs. The present invention is further directed to light and/or heavy chain variable regions or fragments thereof of these anti-CD20 Mabs and to light and/or heavy chains or fragments thereof that have specficity for CD20.

The present invention is also directed to antibody fusion proteins comprising at least two anti-CD20 mAbs or fragments thereof or a first MAb comprising an anti-CD20 mAbs or fragments thereof and a second MAb.

The present invention is further directed to a therapeutic or diagnostic conjugates of the anti-CD20 mAbs or fragments thereof or antibody fusion proteins of the anti-CD20 mAbs or other mAbs or fragments thereof bound to at least one therapeutic agent or at least one diagnostic agent. Antibody fusion proteins with multiple therapeutic agents of the same or different type are encompassed by the present invention.

The present invention is additionally directed to a method of using the anti-CD20 mAbs or fragments thereof or antibody fusion proteins thereof or fragments thereof for therapy, either alone, in combination with each other, as the antibody component of a therapeutic immunoconjugate with one or more therapeutic agents or each administered in combination with one or more therapeutic agents or with an immunoconjugate with one or more therapeutic agents.

The present invention further is directed to a method of using the anti-CD20 mAbs or fragments thereof or antibody fusion proteins thereof or fragments thereof as a diagnostic bound to one or more diagnostic agents.

The present invention additionally is directed to a method of pretargeting a cell in a patients suffering from a B-cell lymphoma or leukemia or an autoimmune disease using an antibody fusion protein or fragment thereof of the present invention.

BRIEF DESCRIPTION OF THE DRAWINGS

FIG. 8 shows a schematic representation of the creation of the pET-ER vector. Figure A illustrates the double stranded DNA sequence (SEQ ID NOS 44-45, respectively) of MCS2. Restriction sites are indicated above the sequence. MCS2 was ligated into the Blpl restriction site of pET26b vector shown in Figure B. Figure C shows the diagram of pET-ER vector, including the MCS2 sequence. The '6H' sequence is disclosed as SEQ ID NO: 2.

FIG. 10 shows a schematic representation of the di-cistronic expression cassette in the pET-ER vector and also stick figures of the two heterologous polypeptides as synthesized and the formation of 679×hMN14 bispecific diabodies. The di-cistronic cassette codes for a single RNA message generated from T7 RNA polymerase via the T7 promoter. This message contains two ribosomal binding sites (RBS) and the coding sequences for the two heterologous polypeptides. Stick figure drawings show the two mature heterologous polypeptides, 679V$_H$(G$_4$S)hMN14V$_K$ (Left) ('G$_4$S' disclosed as SEQ ID NO: 1)and hMN14V$_H$(G$_4$S)679V$_K$ (Right) ('G$_4$S' disclosed as SEQ ID NO: 1) that are synthesized from the di-cistronic expression cassettes. The 679×hMN14 bispecific diabody (BS1, BS1.5 or BS2) is represented as a stick figure drawing and is formed from the pairing of the heterologous polypeptides. The 'GGGGS' sequence is disclosed as SEQ ID NO: 1 and the '6H' sequence is disclosed as SEQ ID NO: 2.

FIG. 20 shows an alignment of murine (m) (SEQ ID NOS 46 and 48, respectively, in order of appearance) and humanized (h) 679 V$_H$ and V$_K$ amino acid sequences (SEQ ID NOS 47 and 49, respectively, in order of appearance) using the Kabat numbering scheme. Amino acid substitutions made during humanization are indicated with arrowheads. The CDR and framework regions are indicated.

FIG. 25 is the coding sequence of nucleic acids (SEQ ID NO: 50) and encoded amino acids (SEQ ID NO: 51) for 679-scF$_v$-L5. 1-66 is the coding sequence for the pelB leader peptide. 70-426 is the coding sequence for 679V$_H$. 427-441 is the coding sequence for the linker peptide (GGGGS) (SEQ ID NO: 1) 442-780 is the coding sequence for 679V$_K$. 787-804 is the coding sequence for the 6 histidine (SEQ ID NO: 2) affinity tag.

FIG. 26 is the coding sequence of nucleic acids (SEQ ID NO: 52) and encoded amino acids (SEQ ID NO: 53) for 679-I3Q. 1-66 is the coding sequence for the pelB leader peptide. 70-426 is the coding sequence for 679 V$_H$ (I3Q). 427-441 is the coding sequence for the linker peptide (GGGGS) (SEQ ID NO: 1). 442-780 is the coding sequence for 679 V$_K$. 787-804 is the coding sequence for the 6 histidine (SEQ ID NO: 2) affinity tag.

FIG. 27 is the coding sequence of nucleic acids (SEQ ID NO: 54) and encoded amino acids (SEQ ID NO: 55) for 679-C101S. 1-66 is the coding sequence for the pelB leader peptide. 70-426 is the coding sequence for 679 V$_H$. 427-441 is the coding sequence for the linker peptide (GGGGS)(SEQ ID NO: 1). 442-780 is the coding sequence for 679 V$_K$ (C101 S). 787-804 is the coding sequence for the 6 histidine (SEQ ID. NO: 2) affinity tag.

FIG. 28 is the coding sequence (SEQ ID NO: 56) and encoded amino acids (SEQ ID NO: 57) for 679 I3Q/C101S.

FIG. 29 is the coding sequence of nucleic acids (SEQ ID NO: 58) and encoded amino acids (SEQ ID NO: 59) for hMN14-scF$_v$-L5. 1-66 is the coding sequence for the pelB leader peptide. 70-423 is the coding sequence for hMN14 V$_H$. 424-438 is the coding sequence for the linker peptide (GGGGS)(SEQ ID NO: 1). 439-759 is the coding sequence for hMN14 V$_K$. 766-783 is the coding sequence for the 6 histidine (SEQ ID NO: 2) affinity tag.

FIG. 30 is the coding sequence of nucleic acids (SEQ ID NO: 60) and encoded amino acids (SEQ ID NO: 61) for polypeptide #1 of BS1 (679×hMN14 bispecific diabody: variant 1). 1-66 is the coding sequence for the pelB leader peptide. 70-426 is the coding sequence for 679 V$_H$. 427-441 is the coding sequence for the linker peptide (GGGGS) (SEQ ID NO: 1). 442-762 is the coding sequence for hMN14 V$_K$. 769-786 is the coding sequence for the 6 histidine (SEQ ID NO: 2) affinity tag.

FIG. 31 is the coding sequence of nucleic acids (SEQ ID NO: 62)and encoded amino acids (SEQ ID NO: 63) for polypeptide #2 of BS1 (679×hMN14 bispecific diabody: variant 1). 1-66 is the coding sequence for the pelB leader peptide. 70-423 is the coding sequence for hMN14 V$_H$. 424-438 is the coding sequence for the linker peptide (GGGGS) (SEQ ID NO: 1). 439-777 is the coding sequence for 679 V$_K$. 784-801 is the coding sequence for the 6 histidine (SEQ ID NO: 2) affinity tag.

FIG. 32 is the coding sequence of nucleic acids (SEQ ID NO: 64) and encoded amino acids (SEQ ID NO: 65) for polypeptide #1 of BS1.5 (679×hMN14 bispecific diabody: variant 2). 1-66 is the coding sequence for the pelB leader peptide. 70-426 is the coding sequence for 679 V$_H$ (I3Q). 427-441 is the coding sequence for the linker peptide (GGGGS) (SEQ ID NO: 1). 442-762 is the coding sequence for hMN14 V$_K$. 769-786 is the coding sequence for the 6 histidine (SEQ ID NO: 2) affinity tag.

FIG. 33 is the coding sequence of nucleic acids (SEQ ID NO: 66) and encoded amino acids (SEQ ID NO: 67)for polypeptide #2 of BS1.5 (679×hMN14 bispecific diabody: variant 2). 1-66 is the coding sequence for the pelB leader peptide. 70-423 is the coding sequence for hMN14V$_H$. 424-438 is the coding sequence for the linker peptide (GGGGS) (SEQ ID NO: 1). 439-777 is the coding sequence for 679V$_K$. 784-801 is the coding sequence for the 6 histidine (SEQ ID NO: 2) affinity tag.

FIG. 34 is the coding sequence of nucleic acids (SEQ ID NO: 68) and encoded amino acids (SEQ ID NO: 69) for polypeptide #1 of BS2 (679×hMN14 bispecific diabody: variant 3). 1-66 is the coding sequence for the pelB leader peptide. 70-426 is the coding sequence for 679V$_H$ (I3Q). 427-441 is the coding sequence for the linker peptide (GGGGS) (SEQ ID NO: 1). 442-762 is the coding sequence for hMN14V$_K$. 769-786 is the coding sequence for the 6 histidine (SEQ ID NO: 2) affinity tag.

FIG. 35 is the coding sequence of nucleic acids (SEQ ID NO: 70) and encoded amino acids (SEQ ID NO: 71) for polypeptide #2 of BS2 (679×hMN14 bispecific diabody: variant 3). 1-66 is the coding sequence for the pelB leader peptide. 70-423 is the coding sequence for hMN14V$_H$. 424-438 is the coding sequence for the linker peptide (GGGGS) (SEQ ID NO: 1). 439-777 is the coding sequence for 679V$_K$ C101S. 784-801 is the coding sequence for the 6 histidine (SEQ ID NO: 2) affinity tag.

FIG. 36 is the coding sequence of nucleic acids (SEQ ID NO: 72) and encoded amino acids (SEQ ID NO: 73) for h679-scF$_v$-L5. 1-66 is the coding sequence for the pelB leader peptide. 70-426 is the coding sequence for h679V$_H$. 427-441 is the coding sequence for the linker peptide (GGGGS) (SEQ ID NO: 1). 442-780 is the coding sequence for h679V$_K$. 787-804 is the coding sequence for the 6 histidine (SEQ ID NO: 2) affinity tag.

FIG. 37 is the coding sequence of nucleic acids (SEQ ID NO: 74) and encoded amino acids (SEQ ID NO: 75) for polypeptide #1 of BS1.5H (h679 x hMN14 bispecific diabody). 1-66 is the coding sequence for the pelB leader peptide. 70-426 is the coding sequence for h679V$_H$. 427-441 is the coding sequence for the linker peptide (GGGGS) (SEQ ID NO: 1). 442-762 is the coding sequence for hMN14V$_K$. 769-786 is the coding sequence for the 6 histidine (SEQ ID NO: 2) affinity tag.

FIG. 38 is the coding sequence of nucleic acids (SEQ ID NO: 76) and encoded amino acids (SEQ ID NO: 77) for polypeptide #2 of BS1.5H (h679 x hMN14 bispecific diabody). 1-66 is the coding sequence for the pelB leader peptide. 70-423 is the coding sequence for hMN14V$_H$. 424-438 is the coding sequence for the linker peptide (GGGGS) (SEQ ID NO: 1). 439-777 is the coding sequence for h679V$_K$ C101S. 784-801 is the coding sequence for the 6 histidine (SEQ ID NO: 2) affinity tag.

FIG. 39 discloses the V gene sequences cloned by RT-PCR from a hybridoma cell line producing a murine anti-CD20, and the deduced amino acid sequences of the variable light (SEQ ID NOS 78and 79,respectively, in order of appearance) (FIG. 39A) and heavy chain (SEQ ID NOS 80and 81,respectively, in order of appearance) (FIG. 39B) of the A20 antibody, designated as A20Vk and A20VH, respectively. Underlined arrows indicate the sequences of the PCR primers used for cloning. The putative CDR region sequences, as defined by the Kabat numbering scheme, are shown in bold and underlined. Amino acid sequences are given as single-letter codes below the corresponding nucleotide sequence. The Kabat numbering scheme was used for amino acid residues. Amino acid residues numbered by a letter represent the insertion residue according to Kabat, and have the same number as that of the previous residue. For example, residues 82, 82A, 82B and 82C in FIG. 39B are indicated as 82 A, B, and C, respectively.

FIG. 40 discloses the Vk, the variable light chain, and the VH, the variable heavy chain, sequences of cA20, a chimeric anti-CD20 antibody. The CDR region sequences are shown in bold and underlined. The amino acid residues and the nucleotides are numbered sequentially and same numbering system is used for humanized V sequences. The light chain variable region (SEQ ID NOS 82and 83,respectively, in order of appearance) is shown in FIG. 40A and the heavy chain variable region (SEQ ID NOS 84and 85,respectively, in order of appearance) is shown in FIG. 40B. The numbering system is the same as for FIG. 39. The restriction sites used for constructing cA20 are underlined.

FIG. 42 compares the amino acid sequences of the variable heavy chain (V$_H$) and variable light chain (Vk) of human antibodies, and chimeric and humanzied anti-CD20 antibodies. FIG. 42A compares the amino acid sequences of the variable heavy chain (VH) of the human antibodies, EU (SEQ ID NO: 86) and NEWM (SEQ ID NO: 89) (FR4 only), the chimeric antibody, (cA20VH) (SEQ ID NO: 85) and two humanized antibodies, (hA20VH1 and hA20VH2) (SEQ ID NOS 87 and 88,respectively) and FIG. 42B compares the amino acid sequences of the variable light chain (Vk) of the human antibody, (REIVk) (SEQ ID NO: 90), a chimeric antibody, (cA20Vk) (SEQ ID NO: 83), and a humanized antibody, (hA20Vk) (Residues 5-110 of SEQ ID NO: 93). Dots indicate that the residues in A20 are identical to the corresponding residue in the human antibody. The CDRs are identified as a boxed region. The Kabat numbering scheme was used to number the amino acid residues.

FIG. 43 discloses the nucleotide sequences of hA20 light chain V genes, (hA20Vk) (SEQ ID NOS 91-93,respectively, in order of appearance) (FIG. 43A), and heavy chain V genes, hA20VH1 (SEQ ID NOS 94-96,respectively, in order of appereance) (FIG. 43B) and hA20VH2 (SEQ ID NOS 97-99, respectively, in order of appereance) (FIG. 43C), as well as the adjacent flanking sequences of the VKpBR2 (FIG. 43A) and VHpBS2 (FIGS. 43B and 43C) staging vectors, respectively. The non-translated nucleotide sequences are shown in lowercase. The restriction sites used for subcloning are underlined and indicated. The secretion signal peptide sequence is indicated by a double underline. Numbering of Vk and VH amino acid residues is same as that in FIG. 40.

FIG. 44 shows the results of a cell surface competitive binding assay to compare the binding activity of two humanized A20 antibodies, (hA20-1 and hA20-2), with that of A20, cA20 and a chimeric anti-CD20 MAb, c2B8.

FIG. 45 discloses the constant region of a human IgG1 (CH-hinge) (SEQ ID NOS 100 and 101,respectively, in order of appearance) (FIG. 45A) and the constant region of a human kappa chain (Ck) (SEQ ID NOS 102 and 103,respectively, in order of appearance) (FIG. 45B).

FIG. 46 is a competitive cell surface binding assay. Ag-binding specificity and affinity studies of humanized anti-CD20 Abs (cA20, hA20, and c1F5, purified by affinity chromatography on a Protein A column) were evaluated by a cell surface competitive binding assay with murine 2B8 and rituximab (IDEC Pharmaceuticals Corp., San Diego, Calif.).

FIG. 48 depicts the cytotoxic effect of crosslinked hA20 and other CD20 Abs on cultured lymphoma cells. Total cell and viable cell cell populations were measured by (A) trypan blue staining and cell counting or (B) MTT assay.

DETAILED DESCRIPTION OF SPECIFIC EMBODIMENTS

1. Overview

Figure 1:
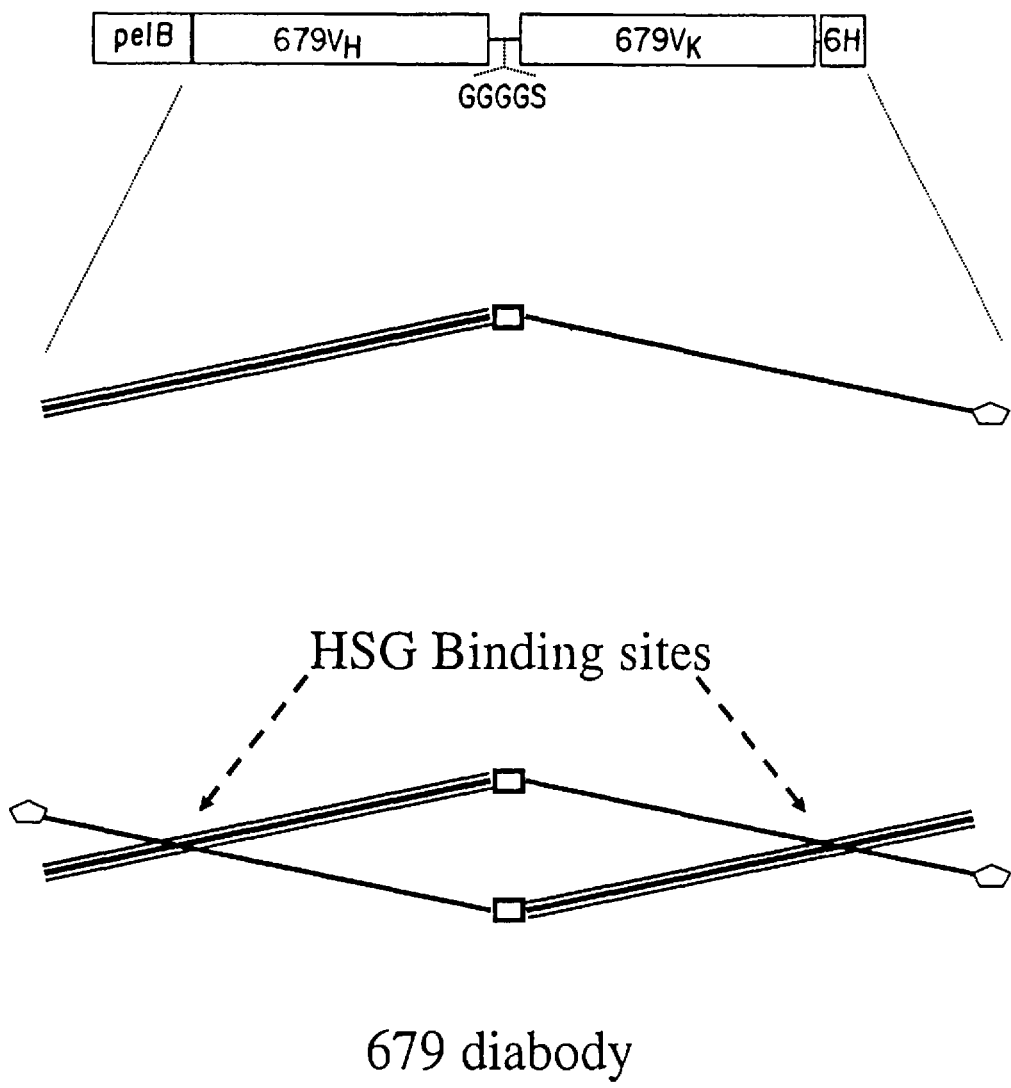
FIG. 1 shows a schematic representation of the 679 single chain Fv (scFv) polypeptide that is synthesized in E. coli from the 679-scFv-L5 expression plasmid and forms a 679 diabody. The gene construct for the un-processed polypeptide contains the pelB signal peptide, 679V$_H$ and V$_K$ coding sequences coupled by a 5 amino acid linker, Gly-Gly-Gly-Gly-Ser (G$_4$S) (SEQ ID NO: 1), and the carboxyl terminal six histidine (His) (SEQ ID NO: 2)affinity tag. The figure also shows a stick figure drawing of the mature polypeptide after proteolytic removal of the pelB leader peptide and a stick FIG. drawing of a 679 diabody, including the HSG binding sites.

As discussed above, anti-CD20 antibodies that are unconjugated or labeled with a therapeutic radionuclide, have failed to provide high rates of objective and lasting responses in patients with intermediate or aggressive forms of B-cell lymphoma. The present invention provides a humanized, a chimeric and a human anti-CD20 antibody, and antibody fusion proteins thereof, useful for treatment of mammalian subjects humans and domestic animals alone as a conjugate or administered in combination with other therapeutic agents, including other naked antibodies and antibody therapeutic conjugates.

The anti-CD20 mAbs of the present invention contain specific murine CDRs or a combination of murine CDRs from more than one murine or chimeric anti-CD20 MAb that have specificity for the CD20 antigen. The anti-CD20 mAbs of the present invention are humanized, chimeric or human mAbs, light and/or heavy chains thereof or light and/or heavy chain variable regions thereof, and they contain the amino acids of the CDRs of a murine anti-CD20 MAb and retain substantially the B-cell and B-cell lymphoma and leukemia cell targeting of the murine anti-CD20 MAb. The CDRs of the light chain variable region of the anti-CD20 MAb comprises CDR1 comprising amino acids RASSSVSYIH (SEQ ID NO: 3), RASSSLSFMH (SEQ ID NO: 4) or RASSSVSYMH; (SEQ ID NO: 5)CDR2 comprising amino acids ATSNLAS (SEQ ID NO: 6); and CDR3 comprising amino acids QQWTSNPPT, (SEQ ID NO: 7) HQWSSNPLT (SEQ ID NO: 8) or QQSFSNPPT (SEQ ID NO: 9); and the CDRs of the heavy chain variable region of the anti-CD20 MAb comprises CDR1 comprising amino acids SYNMH (SEQ ID NO: 10); CDR2 comprising amino acids AIYPGNGDTSYNQK-FKG (SEQ ID NO: 11) and CDR3 comprising amino acids STYYGGDWYFDV, (SEQ ID NO: 12) STYYGGDWYFNV (SEQ ID NO: 13), SHYGSNYVDYFDV (SEQ ID NO: 14) or VVYYSNSYWYFDV (SEQ ID NO: 15). The humanized antibody further comprises the framework regions of the light and heavy chain constant regions of a human antibody.

In one embodiment, the humanized and chimeric MAb or fragment thereof does not contain the CDR3 of the heavy chain variable region comprising STYYGGDWYFNV (SEQ ID NO: 13). More preferably, CDR1 of the light chain variable region does not comprise RASSSLSFMH (SEQ ID NO: 4) when the CDR3 of the light chain variable region comprises HQWSSNPLT (SEQ ID NO: 8) and the CDR3 of the heavy chain variable region comprises SHYGSNYVDYFDV (SEQ ID NO: 14). In another embodiment, the CDR3 of the light chain variable region does not comprise HQWSSNPLT (SEQ ID NO: 8) when CDR1 of the light chain variable region comprises RASSSLSFMH (SEQ ID NO: 4) and when CDR3 of the heavy chain variable region comprises SHYG-SNYVDYFDV (SEQ ID NO: 14). In a further embodiment, the CDR3 of the heavy chain variable region does not comprise SHYGSNYVDYFDV (SEQ ID NO: 14) when the CDR1 of the light chain variable region comprises RASSSLSFMH (SEQ ID NO: 4) and the CDR3 of the light chain variable region comprises HQWSSNPLT (SEQ ID NO: 8). In another embodiment, the CDR1 of the light chain variable region does not comprise RASSSVSYMH (SEQ ID NO: 5) when the CDR3 of the light chain variable region comprises QQSFSNPPT (SEQ ID NO: 9) and the CDR3 of the heavy chain variable region comprises VVYYSNSYWYFDV (SEQ ID NO: 15).

Further, in another embodiment, the anti-CD20 monoclonal antibody (MAb) or fragment thereof does not contain CDR3 of the light chain variable region of amino acids QQSFSNPPT (SEQ ID NO: 9) when CDR1 of the light chain variable region comprises RASSSVSYMH (SEQ ID NO: 5) and the CDR3 of the heavy chain variable region comprises VVYYSNSYWYFDV (SEQ ID NO: 15). Additionally, the anti-CD20 MAb does not contain CDR3 of the heavy chain variable region with amino acids VVYYSNSYWYFDV (SEQ ID NO: 15) when the CDR1 of the light chain variable region comprises RASSSVSYMH (SEQ ID NO: 5) and the CDR3 of the light chain variable region comprises QQSFSNPPT (SEQ ID NO: 9).

In a preferred embodiment, the humanized anti-CD20 (hCD20) monoclonal antibody or antigen-binding fragment thereof comprising the complementarity determining regions (CDRs) of at least one murine anti-CD20 MAb variable region and the framework regions (FRs) of at least one human MAb variable region, wherein said humanized anti-CD20 MAb or fragment thereof retains substantially the B-cell and B-cell lymphoma and leukemia cell targeting of said murine anti-CD20 MAb. The humanized antibody's variable region may comprise a light chain variable region, a heavy chain variable region or a both light and heavy chain variable regions. The humanized antibody or fragment thereof may further comprise light and heavy chain constant regions of at least one human antibody.

The humanized anti-CD20 MAb or fragment thereof of the present invention comprises the CDRs of a murine anti-CD20 MAb and the framework (FR) regions of the light and heavy chain variable regions of a human antibody, while retaining substantially the B-cell, and B-cell lymphoma and leukemia cell targeting of the parent murine anti-CD20 MAb, and wherein the CDRs of the light chain variable region of the murine anti-CD20 MAb comprises CDR1 comprising amino acids RASSSVSYIH (SEQ ID NO: 3), CDR2 comprising amino acids ATSNLAS (SEQ ID NO: 6) and CDR3 comprising QQWTSNPPT (SEQ ID NO: 7) and the CDRs of the heavy chain variable region of murine anti-CD20MAb comprises CDR1 comprising amino acids SYNMH (SEQ ID NO: 10), CDR2 comprising amino acids AIYPGNGDTSYNQKFKG (SEQ ID NO: 11) and CDR3 comprising amino acids STYYGGDWYFDV(SEQ ID NO: 12). But the humanized anti-CD20 MAb or fragment thereof may further contain in the FRs of the light and heavy chain variable regions of the antibody at least one amino acid from the corresponding FRs of the murine MAb. The humanized MAbs may further contain the light and heavy chain constant regions of a human antibody. Specifically, the humanized anti-CD20 MAb or fragment thereof contains at least one amino acid residue 1, 5, 27, 30, 38, 48, 67, 68, 70, 95, 115 and 116 of the murine heavy chain variable region of FIG. 42A, designated as hA20VH1 or hA20VH2 and of at least one amino acid residue 4, 21, 35, 38, 45, 46, 59, 99, 104 and 106 of the murine light chain variable region FIG. 42B, designated hA20Vk. One or more of the murine amino acid sequences can be maintained in the human FR regions of the light and heavy variable chains if necessary to maintain proper binding or to enhance binding to the CD20 antigen. More preferably the humanized anti-CD20MAb or fragment thereof of the present invention comprises the hA20Vk of FIG. 42B and the hA2VH1 of FIG. 42A. Most preferably, the humanized anti-CD20 MAb or fragment thereof of the present invention comprises the hA20Vk of FIG. 42B and the hA2VH2 of FIG. 42A. This latter sequence contains more human amino acid sequences in the FRs of the VH2 chain than the VH1, and thus is more humanized.

The preferred chimeric anti-CD20 (cCD20) MAb or fragment thereof of the present invention comprises the CDRs of a murine anti-CD20 MAb and the FR regions of the light and heavy chain variable regions of the murine anti-CD 20 MAb, i.e., the Fvs of the parental murine MAb, and the light and heavy chain constant regions of a human antibody, wherein the chimeric anti-CD20 MAb or fragment thereof retains substantially the B-cell, and B-cell lymphoma and leukemia cell targeting of the murine anti-CD20 MAb, wherein the CDRs of the light chain variable region of the chimeric anti-CD20 MAb comprise CDR1 comprising amino acids RASSSVSYIH (SEQ ID NO: 3), RASSSLSFMH (SEQ ID NO: 4) or RASSSVSYMH (SEQ ID NO: 5); CDR2 comprising amino acids ATSNLAS (SEQ ID NO: 6); and CDR3 comprising amino acids QQWTSNPPT (SEQ ID NO: 7), HQWSSNPLT (SEQ ID NO: 8) or QQSFSNPPT (SEQ ID NO: 9); and the CDRs of the heavy chain variable region of the chimeric anti-CD20 MAb comprise CDR1 comprising amino acids SYNMH (SEQ ID NO: 10); CDR2 comprising amino acids AIYPGNGDTSYNQKFKG (SEQ ID NO: 11) and CDR3 comprising STYYGGDWYFDV(SEQ ID NO: 12), STYYGGDWYFNV (SEQ ID NO: 13), SHYGSNYVDYFDV (SEQ ID NO: 14) or VVYYSNSYWYFDV (SEQ ID NO: 15) with the Following provisos, (a) wherein the CDR3 of the heavy chain variable region does not comprise STYYGGDWYFNV (SEQ ID NO: 13), when the CDR1 of the light chain variable region comprises amino acids RASSSVSYIH (SEQ ID NO: 3), CDR2 of the light chain variable region comprises amino acids ATSNLAS (SEQ ID NO: 6), CDR3 of the light chain variable region comprises amino acids QQWTSNPPT (SEQ ID NO: 7), CDR1 of the heavy chain variable region comprises amino acids SYNMH (SEQ ID NO: 10), and CDR2 of the light chain variable region comprises amino acids AIYPGNGDTSYNQKFKG (SEQ ID NO: 11);

(b) wherein the CDR3 of the heavy chain variable region does not comprise SHYGSNYVDYFDV (SEQ ID NO: 14), when the CDR1 of the light chain variable region comprises amino acids RASSSLSFMH (SEQ ID NO: 4), CDR2 of the light chain variable region comprises amino acids ATSNLAS (SEQ ID NO: 6), CDR3 of the light chain variable region comprises amino acids HQWSSNPLT (SEQ ID NO: 8), CDR1 of the heavy chain variable region comprises amino acids SYNMH (SEQ ID NO: 10), and CDR2 of the light chain variable region comprises amino acids AIYPGNGDTSYNQKFKG (SEQ ID NO: 11); and (c) wherein the CDR3 of the heavy chain variable region does not comprise VVYYSNSYWYFDV (SEQ ID NO: 15), when the CDR1 of the light chain variable region comprises amino acids RASSSVSYMH (SEQ ID NO: 5), CDR2 of the light chain variable region comprises amino acids ATSNLAS (SEQ ID NO: 6), CDR3 of the light chain variable region comprises amino acids QQSFSNPPT (SEQ ID NO: 9), CDR1 of the heavy chain variable region comprises amino acids SYNMH (SEQ ID NO: 10), and CDR2 of the light chain variable region comprises amino acids AIYPGNGDTSYNQKFKG (SEQ ID NO: 11).

Figure 42A:
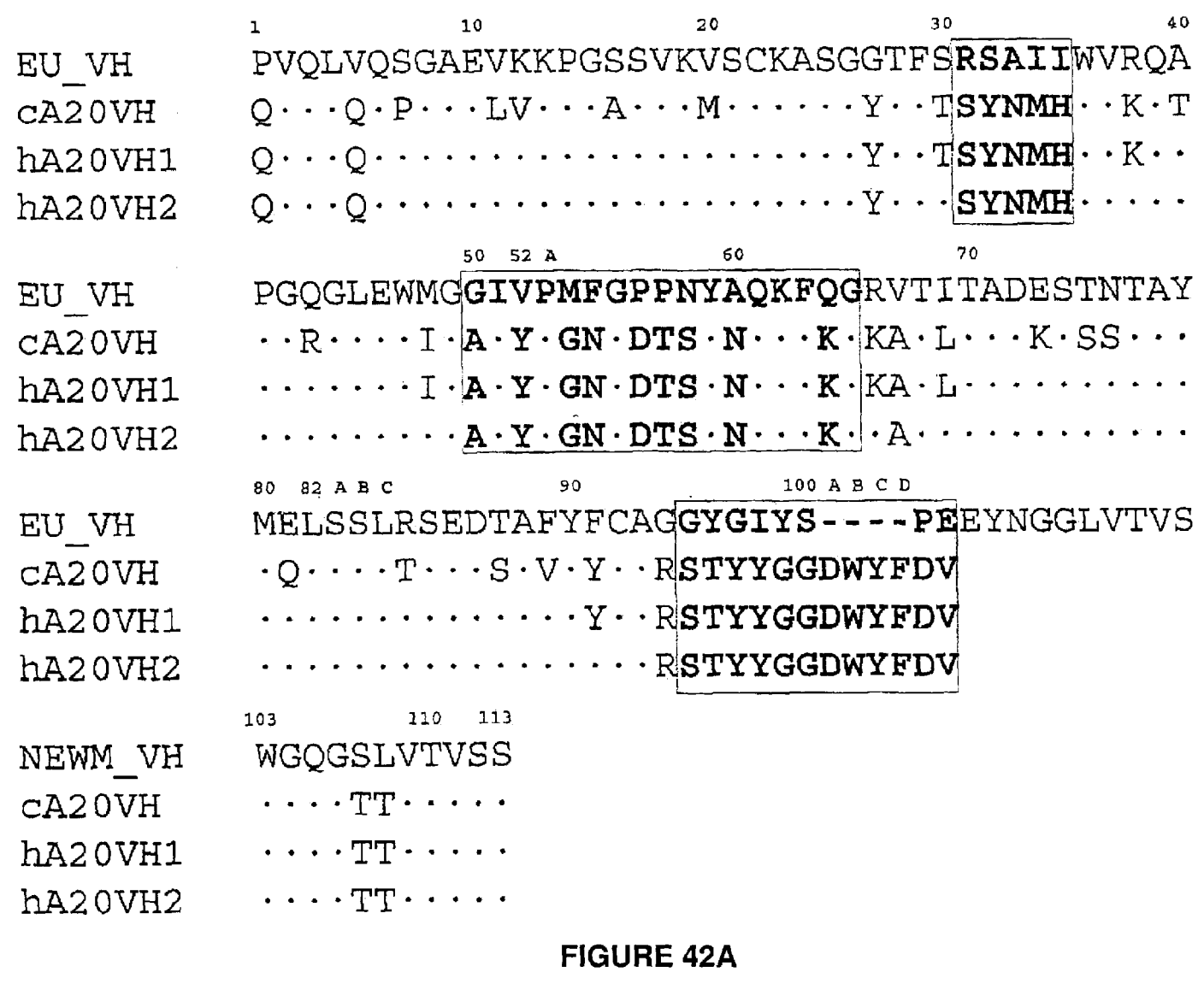

More preferably the chimeric anti-CD20 MAb or fragment thereof comprising the complementarity-determining regions (CDRS) of a murine anti-CD20MAb and the framework (FR) regions of the light and heavy chain variable regions of the murine anti-CD20 MAb and further, the light and heavy chain constant regions of a human antibody, wherein the chimeric anti-CD20 MAb or fragment thereof retains substantially the B-cell, and B-cell lymphoma and leukemia cell targeting of the murine anti-CD20 MAb, wherein the CDRs of the light chain variable region of the chimeric anti-CD20 MAb comprises the CDRs shown in FIGS. 42B and 42A, respectively, designated cA20Vk and cA20VH. Most preferably, the chimeric anti-CD20 MAb or fragment thereof comprises the light and heavy chain variable regions of murine anti-CD20 MAb shown in FIGS. 42B and 42A, respectively, designated cA20Vk and cA20 VH.

The present invention also encompasses a human anti-CD20 MAb or fragment thereof comprising the light and heavy chain variable, wherein said human CD20 MAb retains substantially the B-cell, and B-cell lymphoma and leukemia cell targeting and cell binding characteristics of a murine anti-CD20 MAb, wherein the CDRs of the light chain variable region of the human anti-CD20 MAb comprises the same CDRs as set forth above for the chimeric and humanized anti-CD20 mAbs and as shown in FIGS. 42A and 42B. This human anti-CD20 MAb or fragment thereof further comprises light and heavy chain constant regions of at least one human antibody.

The present invention is also intended to encompass antibody fusion proteins or fragments thereof comprising at least two anti-CD20 mAbs or fragments thereof, as described above. The antibody fusion protein or fragment thereof of the present invention is also intended to encompass an antibody fusion protein or fragment thereof comprising at least one first anti-CD20 MAb or fragment thereof as described above and at least one second MAb or fragment thereof, other than the antiCD20 MAb or fragment described above. More preferably this second MAb is a MAb reactive with CD4, CD5, CD8, CD14, CD15, CD19, CD21, CD22, CD23, CD25, CD33, CD37, CD38, CD40, CD40L, CD46, CD52, CD54, CD74, CD80, CD126, B7, MUC1, MUC2, MUC3, MUC4, Ia, HM1.24, HLA-DR, tenascin, VEGF, P1GF, an oncogene, oncogene product, or a combination thereof, and even an anti-CD20 MAb that is different than the anti-CD20 MAb described herein. The antibody fusion proteins of the present invention may be composed of one CD20 MAb and one or more of the second mAbs to provide specificity to different antigens, and are described in more detail below.

The humanized, chimeric and human anti-CD20 antibody may possess enhanced affinity binding with the epitope, as well as antitumor and anti-B-cell activity, as a result of CDR mutation and manipulation of the CDR and other sequences in the variable region to obtain a superior therapeutic agent for the treatment of B-cell disorders, including B-cell lymphomas and leukemias and autoimmune diseases. Modification to the binding specificity, affinity or avidity of an antibody is known and described in WO 98/44001, as affinity maturation, and this application summarizes methods of modification and is incorporated in its entirety by reference.

It may also be desirable to modify the antibodies of the present invention to improve effector function, e.g., so as to enhance antigen-dependent cell-mediated cytotoxicity (ADCC) and/or complement dependent cytotoxicity (CDC) of the antagonist. One or more amino acid substitutions or the introduction of cysteine in the Fc region may be made, thereby improving internalization capability and/or increased complement-mediated cell killing and ADCC. See Caron et al., *J. Ex. Med.* 176:1191-1195 (1991) and Shopes, *B. J. Immunol.* 148:2918-2022 (1992), incorporated herein by reference in their entirety. An antibody fusion protein may be prepared that has dual Fc regions with both enhanced complement lysis and ADCC capabilities.

The present invention is also directed to DNA sequences comprising a nucleic acid encoding a MAb or fragment thereof selected from the group consisting
(a) an anti-CD20 MAb or fragment thereof as described herein,
(b) an antibody fusion protein or fragment thereof comprising at least two of the anti-CD20 mAbs or fragments thereof
(c) an antibody fusion protein or fragment thereof comprising at least one first MAb or fragment thereof comprising the anti-CD20 MAb or fragment thereof as described herein and at least one second MAb or fragment thereof, other than the antiCD20 MAb or fragment thereof, and
(d) an antibody fusion protein or fragment thereof comprising at least one first MAb or fragment thereof comprising the anti-CD20 MAb or fragment thereof and at least one second MAb or fragment thereof, wherein the second MAb is a MAb reactive with CD4, CD5, CD8, CD14, CD15, CD19, CD21, CD22, CD23, CD25, CD33, CD37, CD38, CD40, CD40L, CD46, CD52, CD54, CD74, CD80, CD126, B7, MUC1, MUC2, MUC3, MUC4, Ia, HM1.24, HLA-DR, tenascin, VEGF, P1GF, an oncogene, oncogene product, or a combination thereof.

Also encompassed by the present invention are expression vectors comprising the DNA sequences. These vectors contain the light and heavy chain constant regions and the hinge region of the human immunoglobulin, in the case of vectors for use in preparing the humanized, chimeric and human anti-CD20 mAbs or antibody fusion proteins thereof or fragments thereof. These vectors additionally contain, where required, promoters that express the mAbs in the selected host cell immunoglobulin enhances and signal or leader sequences. Vectors that are particularly useful in the present invention are pdHL2 or GS, particularly when used to express chimeric, humanized or human antibodies, such as gigs, where the vector codes for the heavy and light chain constant regions and hinge region of IgG1. More preferably, the light and heavy chain constant regions and hinge region are from a human EU myeloma immunoglobulin, where optionally at least one of the amino acid in the allotype positions is changed to that found in a different IgG1 allotype, and wherein optionally amino acid 253 of the heavy chain of EU based on the EU number system may be replaced with alanine. See Edelman et al., *Proc. Natl. Acad. Sci. USA* 63: 78-85 (1969), incorporated herein in its entirety by reference.

Host cells containing the DNA sequences encoding the anti-CD20 mAbs or fragments thereof or antibody fusion proteins or fragments thereof of the present invention or host cells containing the vectors that contain these DNA sequences are encompassed by the present invention. Particularly useful host cells are mammalian cells, more specifically lymphocytic cells, such as myeloma cells, discussed in more detail below.

Also encompassed by the present invention is the method of expressing the anti-CD20 MAb or fragment thereof or antibody fusion protein or fragment thereof comprising: (a) transfecting a mammalian cell with a DNA sequence of encoding the anti-CD20 mAbs or fragments thereof or antibody fusion proteins or fragments thereof and (b) culturing the cell transfected with the DNA sequence that secretes the anti-CD20 or fragment thereof or antibody fusion protein or fragment thereof. Known techniques may be used that include a selection marker on the vector so that host cells that express the mAbs and the marker can be easily selected.

The present invention particularly encompasses B-lymphoma cell and leukemia cell targeting diagnostic or therapeutic conjugates comprising an antibody component comprising an anti-CD20 MAb or fragment thereof or an antibody fusion protein or fragment thereof of the present invention that binds to the B-lymphoma or leukemia cell, that is bound to at least one diagnostic or at least one therapeutic agent.

The diagnostic conjugate comprises the antibody component comprising an anti-CD20 MAb or fragment thereof or an antibody fusion protein or fragment thereof, wherein the diagnostic agent comprises at least one photoactive diagnostic agent, and more preferably wherein the label is a radioactive label with an energy between 60 and 4,000 keV or a non-radioactive label. The radioactive label is preferably a gamma-, beta-, and positron-emitting isotope and is selected from the group consisting of $^{125}I$, $^{131}I$, $^{123}I$, $^{124}I$, $^{86}Y$, $^{186}Re$, $^{188}Re$, $^{62}CU$, $^{64}Cu$, $^{111}In$, $^{67}Ga$, $^{68}Ga$, $^{99m}Tc$, $^{94m}Tc$, $^{18}F$, $^{11}C$, $^{13}N$, $^{15}O$, $^{76}Br$ and combinations thereof.

The diagnostic conjugate of the present invention also utilizes a diagnostic agent, such as a contrast agent, for example, such as manganese, iron or gadolinium.

The therapeutic conjugate of the present invention comprises an antibody component comprising an antibody fusion protein or fragment thereof wherein each of said mAbs or fragments thereof are bound to at least one therapeutic agent. The therapeutic conjugate of preferably is selected from the group consisting of a radioactive label, an immunomodulator, a hormone, a photoactive therapeutic agent, a cytotoxic agent, which may be a drug or a toxin, and a combination thereof. The drugs useful in the present invention are those drugs that possess the pharmaceutical property selected from the group consisting of antimitotic, antikinase, alkylating, antimetabolite, antibiotic, alkaloid, antiangiogenic, apoptotic agents and combinations thereof. More specifically, these drugs are selected from the group consisting of nitrogen mustards, ethylenimine derivatives, alkyl sulfonates nitrosoureas, triazenes, folic acid analogs, COX-2 inhibitors, pyrimidine analogs, purine analogs, antibiotics, enzymes, epipodophyllotoxins, platinum coordination complexes, vinca alkaloids, substituted ureas, methyl hydrazine derivatives adrenocortical suppressants, antagonists, endostatin, taxols, camptothecins, anthracyclines, taxanes, and their analogs, and a combination thereof. The toxins encompassed by the present invention are selected from the group consisting of ricin, abrin, alpha toxin, saporin, ribonuclease (RNase), e.g., onconase, DNase 1 Staphylococcal enterotoxin-A, pokeweed antiviral protein, gelonin, diphtherin toxin *Pseudomonas* exotoxin, and *Pseudomonas* endotoxin.

Useful therapeutic conjugates of the present invention are immunomodulators selected from the group consisting of a cytokine, a stem cell growth factor, a lymphotoxin, a hematopoietic factor, a colony stimulating factor (CSF), an interferon (IFN), erythropoietin, thrombopoietin and a combination thereof. Specifically useful are lymphotoxins such as tumor necrosis factor (TNF), hematopoietic factors, such as interleukin (IL), colony stimulating factor, such as granulocyte-colony stimulating factor (G-CSF) or granulocyte macrophage-colony stimulating factor (GM-CSF)), interferon, such as interferons-α, -β or -γ, and stem cell growth factor, such as designated "S1 factor". More specifically, immunomodulator, such as IL-1, IL-2, IL-3, IL-6, IL-10, IL-12, IL-18, IL-21 interferon-γ, TNF-α or a combination thereof are useful in the present invention.

Particularly useful therapeutic conjugates comprise one or more radioactive labels that have an energy between 60 and 700 keV. Such radioactive labels are selected from the group consisting of $^{225}Ac$, $^{67}Ga$, $^{90}Y$, $^{111}In$, $^{131}I$, $^{125}I$, $^{186}Re$, $^{188}Re$, $^{177}Lu$, $^{32}P$, $^{64}Cu$, $^{67}Cu$, $^{212}Bi$, $^{213}Bi$, $^{211}At$ and combinations thereof. Other useful therapeutic conjugates are photoactive therapeutic agent, such as a chromogen or dye.

Other useful therapeutic conjugates comprise oligonucleotides, especially antisense oligonucleotides that preferably are directed against oncogenes and oncogene products of B-cell malignancies, such as bcl-2.

The present invention particularly encompasses methods of treating a B-cell lymphoma or leukemia cell disease or an autoimmune disease in a subject, such as a mammal, including humans, domestic or companion pets, such as dogs and cats, comprising administering to the subject a therapeutically effective amount of an anti-CD20 MAb or a fragment thereof of the present invention, formulated in a pharmaceutically acceptable vehicle. This therapy utilizes a "naked antibody" that does not have a therapeutic agent bound to it. The administration of the "naked anti-CD20 antibody" can be supplemented by administering to the subject concurrently or sequentially a therapeutically effective amount of another "naked antibody" that binds to or is reactive with another antigen on the surface of the target cell or that has other functions, such as effector functions in the Fc portion of the MAb, that is therapeutic and which is discussed herein. Preferred additional mAbs are at least one humanized, chimeric, human or murine (in the case of non-human animals) MAb selected from the group consisting of a MAb reactive with CD4, CD5, CD8, CD14, CD15, CD19, CD20, CD21, CD22, CD23, CD25, CD33, CD37, CD38, CD40, CD40L, CD46, CD52, CD54, CD74, CD80, CD126, B7, MUC1, Ia, HM1.24, and HLA-DR, tenascin, VEGF, P1GF, an oncogene, oncogene product, or a combination thereof, formulated in a pharmaceutically acceptable vehicle.

Both the naked anti-CD20 therapy alone or in combination with other naked mAbs as discussed above can be further supplemented with the administration, either concurrently or sequentially, of a therapeutically effective amount of at least one therapeutic agent, formulated in a pharmaceutically acceptable vehicle. As discussed herein the therapeutic agent may comprises a cytotoxic agent, a radioactive label, an oligonucleotide, an immunomodulator, a hormone, an enzyme, an oligonucleotide, a photoactive therapeutic agent or a combination thereof, formulated in a pharmaceutically acceptable vehicle.

In another therapeutic method, both the naked anti-CD20 therapy alone or in combination with other naked mAbs, as discussed above, can be further supplemented with the administration, either concurrently or sequentially, of a therapeutically effective amount of at least one therapeutic conjugate, described herein and formulated in a pharmaceutically acceptable vehicle. The antibody component of the therapeutic conjugate comprises at least one humanized, chimeric, human or murine (for non-human subjects) MAb selected from the group consisting of a MAb reactive with CD4, CD5, CD8, CD14, CD15, CD19, CD20, CD21, CD22, CD23, CD25, CD33, CD37, CD38, CD40, CD40L, CD46, CD52, CD54, CD74, CD80, CD126, B7, MUC1, MUC2, MUC3, MUC4, Ia, HM1.24, and HLA-DR, tenascin, VEGF, P1GF, an oncogene, oncogene product, or a combination thereof, formulated in a pharmaceutically acceptable vehicle. As discussed herein the therapeutic agent may comprise a cytotoxic agent, a radioactive label, an immunomodulator, a hormone, a photoactive therapeutic agent or a combination thereof, formulated in a pharmaceutically acceptable vehicle.

As described herein the present invention particularly encompasses a method of treating a B-cell lymphoma or leukemia or an autoimmune disease in a subject comprising administering to a subject a therapeutically effective amount of an antibody fusion protein or fragment thereof comprising at least two anti-CD20 mAbs or fragments thereof of the present invention or comprising at least one anti-CD20 MAb or fragment thereof of the present invention and at least one additional MAb preferably selected from the group consisting of mAbs reactive with CD4, CD5, CD8, CD14, CD15, CD19, CD20, CD21, CD22, CD23, CD25, CD33, CD37, CD38, CD40, CD40L, CD46, CD52, CD54, CD74, CD80, CD126, B7, MUC1, MUC2, MUC3, MUC4, Ia, HM1.24, and HLA-DR, tenascin, VEGF, P1GF, an oncogene, oncogene product, or a combination thereof, formulated in a pharmaceutically acceptable vehicle.

This therapeutic method can further be supplemented with the administration to the subject concurrently or sequentially of a therapeutically effective amount of at least one therapeutic agent, formulated in a pharmaceutically acceptable vehicle, wherein the therapeutic agent is preferably a cytotoxic agent, a radioactive label, an immunomodulator, a hormone, a photoactive therapeutic agent or a combination thereof, formulated in a pharmaceutically acceptable vehicle.

Further, the antibody fusion proteins can be administered to a subject concurrently or sequentially a therapeutically effective amount of a therapeutic conjugate comprising at least one MAb bound to at least one therapeutic agent, wherein said MAb component of the conjugate preferably comprises at least one humanized, chimeric, human or murine (for non-human subjects) MAb selected from the group consisting of a MAb reactive with CD4, CD5, CD8, CD14, CD15, CD19, CD20, CD21, CD22, CD23, CD25, CD33, CD37, CD38, CD40, CD40L, CD46, CD52, CD54, CD74, CD80, CD126, B7, MUC1, MUC2, MUC3, MUC4, Ia, HM1.24, and HLA-DR, tenascin, VEGF, P1GF, an oncogene, oncogene product, or a combination thereof, formulated in a pharmaceutically acceptable vehicle. The antibody fusion protein itself can be conjugated to a therapeutic agent and thus provides a vehicle to attach more than one therapeutic agent to an antibody component and these therapeutic agents can be a combination of different recited agents or combinations of the same agents, such as two different therapeutic radioactive labels.

Also encompassed by the present invention is a method of diagnosing a B-cell lymphoma or leukemia in a subject comprising administering to the subject, such as a mammal, including humans and domestic and companion pets, such as dogs, cats, rabbits, guinea pigs, a diagnostic conjugate comprising an anti-CD20 MAb or fragment thereof or an antibody fusion protein or fragment thereof of the present invention that binds to the lymphoma or leukemia cell, wherein the anti-CD20 MAb or fragment thereof or antibody fusion protein or fragment thereof is bound to at least one diagnostic agent, formulated in a pharmaceutically acceptable vehicle. The useful diagnostic agents are described herein.

This invention also relates to a multivalent, multi-specific binding protein comprising at least one binding site for a hapten moiety and at least one binding site for a target antigen. The hapten is connected to a small molecule that carries a diagnostic agent and/or a therapeutic agent. The present invention further relates to bispecific diabodies that bind with hapten moieties and target antigens and to recombinant vectors useful for the expression of these functional diabodies in a microbial host.

Structurally, whole antibodies are composed of one or more copies of an Y-shaped unit that contains four polypeptides chains. Two chains are identical copies of a polypeptide, referred to as the heavy chain, and two chains are identical copies of a polypeptide, referred to as the light chain. The two heavy chains are linked together by one or more disulfide bonds and each light chain is linked to one of the heavy chains by one disulfide bond. Each chain has a N-terminal variable domains, referred to as $V_H$ and $V_L$ for the heavy and the light chains, respectively, and the non-covalent association of a pair of $V_H$ and $V_L$, referred to as the Fv fragment, forms one antigen-binding site.

Discrete Fv fragments are prone to dissociation at low protein concentrations and under physiological conditions [Glockshuber et al., Biochemistry (1990) 29: 1362-1367], and therefore are not of much practical use. To improve stability and enhance potential utility, recombinant single-chain Fv (scFv) fragments have been produced and studied extensively, in which the C-terminal of the $V_H$ domain (or $V_L$) is joined to the N-terminal of the $V_L$ domain (or $V_H$) via a peptide linker of variable length. [For a recent review, see Hudson and Kortt, J. Immunological methods (1999) 231: 177-189].

ScFvs with linkers greater than 12 amino acid residues in length (for example, 15- or 18-residue linkers) allow interaction between the $V_H$ and $V_L$ domains on the same chain and generally form a mixture of monomers, dimers (termed diabodies) and small amounts of higher mass multimers, [Kortt et al., Eur. J. Biochem. (1994) 221: 151-157]. ScFvs with linkers of 5 or less amino acid residues, however, prohibit intramolecular pairing of the $V_H$ and $V_L$ domains on the same chain, forcing pairing with $V_H$ and $V_L$ domains on a different chain. Linkers between 3- and 12-residues form predominantly dimers [Atwell et al., Protein Engineering (1999) 12: 597-604]. With linkers between 0 and 2 residues, trimeric (termed triabodies), tetrameric (termed tetrabodies) or higher oligomeric structures of scFvs are in favor; however, the exact patterns of oligomerization appear to depend on the composition as well as the orientation of the V-domains, in addition to the linker length. For example, scFvs of the anti-neuraminidase antibody NC10 formed predominantly trimers ($V_H$ to $V_L$ orientation) or tetramers ($V_L$ to $V_H$ orientation) with O-residue linkers [Dolezal et al., Protein Engineering (2000) 13: 565-574]. For scFvs constructed from NC10 with 1- and 2-residue linkers, the $V_H$ to $V_L$ orientation formed predominantly diabodies [Atwell et al., Protein Engineering (1999) 12: 597-604]; in contrast, the $V_L$ to $V_H$ orientation formed a mixture of tetramers, trimers, dimers, and higher mass multimers [Dolezal et al., Protein Engineering (2000) 13: 565-574]. For scFvs constructed from the anti-CD19 antibody HD37 in the $V_H$ to $V_L$ orientation, the 0-residue linker formed exclusively trimers and the 1-residue linker formed exclusively tetramers [Le Gall et al., FEBS Letters (1999) 453: 164-168].

As the non-covalent association of two or more identical scFv molecules can form functional diabodies, triabodies and tetrabodies, which are multivalent but monospecific, a similar association of two or more different scFv molecules, if constructed properly, may form functional multispecific scFv multimers. Bispecific diabodies are heterodimers of two different scFvs, each scFv consisting of the $V_H$ domain from one antibody connected by a short linker to the $V_L$ domain of another antibody. Several bispecific diabodies have been made using a di-cistronic expression vector that contains in one cistron a recombinant gene construct comprising $V_{H1}$-linker-$V_{L2}$ and in the other cistron a second recombinant gene construct comprising $V_{H2}$-linker-$V_{L1}$. [See Holliger et al., Proc. Natl. Acad. Sci. USA (1993) 90: 6444-6448; Atwell et al., Molecular Immunology (1996) 33: 1301-1302; Holliger et al., Nature Biotechnology (1997) 15: 632-631; Helfrich et al., Int. J. Cancer (1998) 76: 232-239; Kipriyanov et al., lnt. J. Cancer (1998) 77: 763-772; Holiger et al., Cancer Research (1999) 59: 2909-2916]. More recently, a tetravalent tandem diabody (termed tandab) with dual specificity has also been reported [Cochlovius et al., Cancer Research (2000) 60: 4336-4341]. The bispecific tandab is a homodimer of two polypeptides, each containing four variable domains of two different antibodies ($V_{H1}$, $V_{L1}$, $V_{H2}$, $V_{L2}$) linked in an orientation to facilitate the formation of two potential binding sites for each of the two different specificities upon self-association. Methods of constructing scFvs are disclosed in U.S. Pat. No. 4,946,778 (1990) and U.S. Pat. No. 5,132,405 (1992). Methods of producing scFv-based agents of multivalency and multispecificity as described above are disclosed in U.S. Pat. No. 5,837,242 (1998), U.S. Pat. No. 5,844,094 (1998) and WO 98/44001 (1998) for bispecific diabodies, and in PCT/DE99/01350 for tandem diabodies.

Alternative methods of manufacturing multispecific and multivalent antigen-binding proteins from $V_H$ and $V_L$ domains are disclosed in U.S. Pat. No. 5,989,830 and U.S. Pat. No. 6,239,259. Such multivalent and multispecific antigen-binding proteins are obtained by expressing a discistronic vector which encodes two polypeptide chains with one polypeptide chain consisting of two or more $V_H$ domains (from the same or different antibodies) connected in series by a peptide linker and the other polypeptide chain consisting of complementary $V_L$ domains connected in series by a peptide linker.

In this aspect of the invention, the present invention utilizes two monoclonal antibodies, 679 and hMN14, and two point mutations of 679, (679-$V_H$ (I3Q) and 679-$V_K$(C101S)), to produce antigen specific diabodies. In addition, a bispecific diabody is produced from hMN14 and h679, which is obtained by grafting the CDRs of 679 onto a framework of amino acid residues found in human antibodies. The murine monoclonal antibody designated 679 (an IgG1, K) binds with high affinity to molecules containing the moiety histamine-succinyl-glycyl (HSG) (Morel et al., Molecular Immunology, 27, 995-1000, 1990). The nucleotide sequence pertaining to the variable domains ($V_H$ and $V_K$) of 679 has been determined (Qu et al., unpublished results). $V_K$ is one of two isotypes of the antibody light chains, $V_L$. As depicted in FIG. 1, the design of the gene construct (679-scFv-L5) for expressing a 679 diabody possesses the following features: 1) The carboxyl terminal end of $V_H$ is linked to the amino terminal end of $V_K$ by the peptide linker Gly-Gly-Gly-Gly-Ser ($G_4S$) (SEQ ID NO: 1). The use of the $G_4S$ (SEQ ID NO: 1) peptide linker enables the secreted polypeptide to dimerize into a diabody, forming two binding sites for HSG. 2) A pelB leader signal peptide sequence precedes the $V_H$ gene to facilitate the transport of the polypeptide to the periplasmic space of *E. coli*. 3) Six histidine (His) (SEQ ID NO: 2) residues are added to the carboxyl terminus to allow purification by IMAC. The DNA coding sequence and the corresponding encoded amino acids for 679-scFv-L5 are contained in FIG. 25 (Seq IDs). The DNA coding sequence and the corresponding encoded amino acids for 679-I3Q are contained in FIG. 26 (Seq IDs). The DNA coding sequence and the corresponding encoded amino acids for 679-C 101S are contained in FIG. 27 (Seq IDs). FIG. 1 also includes a stick figure drawing of the mature polypeptide after proteolytic removal of the pelB leader peptide and a stick figure drawing of a 679 diabody, including the HSG binding sites.

Figure 3:
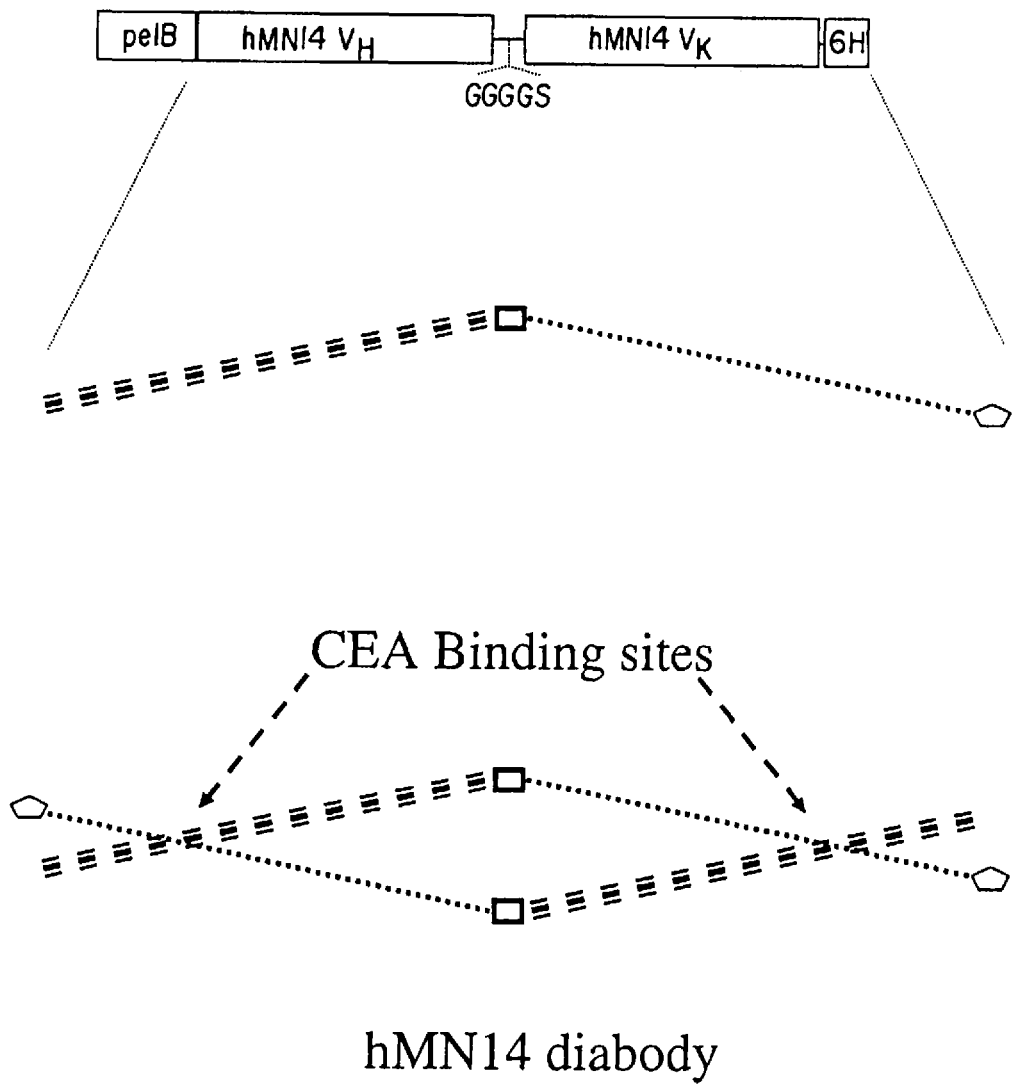
FIG. 3 shows a schematic representation of the hMN14scFv polypeptide that is synthesized in E. coli from the hMN14-scFv-L5 expression plasmid and forms a hMN14 diabody. The gene construct for the un-processed polypeptide contains the pelB signal peptide, hMN14V$_H$ and V$_K$ coding sequences coupled by a 5 amino acid linker('GGGGS' is disclosed as SEQ ID NO: 1), and the carboxyl terminal 6 histidine (SEQ ID NO: 2)affinity tag. The figure also shows a stick figure drawing of the mature polypeptide following proteolytic removal of the pelB leader peptide, and a stick figure drawing of a hMN14 diabody, including CEA binding sites.

Two site-directed point mutations were made to increase the amount of 679 diabodies in soluble extracts. Specifically, converting residue 3 in the 679$V_H$ sequence from Ile to Gln (I3Q), or residue 101 in the 679$V_K$ sequence from Cys to Ser (C101S), or both (I3Q/C101S), resulted in at least a ten-fold increase in soluble expression levels. Moreover, 679 can be humanized or fully human to help avoid an adverse response to the murine antibody.

hMN14 is a humanized monoclonal antibody (Mab) that binds specifically to CEA (Shevitz et al, J. Nucl. Med., Supp., 34, 217P, 1993; U.S. Pat. No. 6,254,868 (2001)). While the original Mabs were murine, humanized antibody reagents are now utilized to reduce the human anti-mouse antibody response. The variable regions of this antibody were engineered into an expression construct (hMN14-scFv-L5) in a similar fashion to 679-scFv-L5 as described in Example 1. As depicted in FIG. 3, the design of the gene construct (hMN14-scFv-L5) for expressing an hMN14 diabody possesses the following features: 1) The carboxyl terminal end of $V_H$ is linked to the amino terminal end of $V_K$ by the peptide linker Gly-Gly-Gly-Gly-Ser ($G_4S$) (SEQ ID NO: 1). The use of the $G_4S$ (SEQ ID NO: 1) peptide linker enables the secreted polypeptide to dimerize into a diabody, forming two binding sites for CEA. 2) A pelB leader sequence precedes the $V_H$ gene to facilitate the transport of the polypeptide to the periplasmic space of *E. coli*. 3) Six histidine (His) (SEQ ID NO: 2) residues are added to the carboxyl terminus to allow purification by IMAC. The DNA coding sequence and the corresponding encoded amino acids for hMN14-scFv-L5 are contained in FIG. 29 (Seq IDs). FIG. 3 also shows a stick figure drawing of the mature polypeptide following proteolytic removal of the pelB leader peptide, and a stick figure drawing of a hMN14 diabody, including CEA binding sites.

2. Definitions

In the description that follows, a number of terms are used and the following definitions are provided to facilitate understanding of the present invention.

An antibody, as described herein, refers to a full-length (i.e., naturally occurring or formed by normal immunoglobulin gene fragment recombinatorial processes) immunoglobulin molecule (e.g., an IgG antibody) or an immunologically active (i.e., specifically binding) portion of an immunoglobulin molecule, like an antibody fragment.

An antibody fragment is a portion of an antibody such as F(ab')$_2$, F(ab)$_2$, Fab', Fab, Fv, scFv and the like. Regardless of structure, an antibody fragment binds with the same antigen that is recognized by the intact antibody. For example, an anti-CD20 monoclonal antibody fragment binds with an epitope of CD20. The term "antibody fragment" also includes any synthetic or genetically engineered protein that acts like an antibody by binding to a specific antigen to form a complex. For example, antibody fragments include isolated fragments consisting of the variable regions, such as the "Fv" fragments consisting of the variable regions of the heavy and light chains recombinant single chain polypeptide molecules in which light and heavy variable regions are connected by a peptide linker ("scFv proteins"), and minimal recognition units consisting of the amino acid residues that mimic the hypervariable region.

A naked antibody is generally an entire antibody which is not conjugated to a therapeutic agent. This is so because the Fc portion of the antibody molecule provides effector functions, such as complement fixation and ADCC (antibody dependent cell cytotoxicity), which set mechanisms into action that may result in cell lysis. However, it is possible that the Fc portion is not required for therapeutic function, with other mechanisms, such as apoptosis, coming into play. Naked antibodies include both polyclonal and monoclonal antibodies, as well as certain recombinant antibodies, such as chimeric, humanized or human antibodies.

A chimeric antibody is a recombinant protein that contains the variable domains including the complementarity determining regions (CDRs) of an antibody derived from one species, preferably a rodent antibody, while the constant domains of the antibody molecule is derived from those of a human antibody. For veterinary applications, the constant domains of the chimeric antibody may be derived from that of other species, such as a cat or dog.

A humanized antibody is a recombinant protein in which the CDRs from an antibody from one species; e.g., a rodent antibody, is transferred from the heavy and light variable chains of the rodent antibody into human heavy and light variable domains. The constant domains of the antibody molecule is derived from those of a human antibody.

A human antibody is an antibody obtained from transgenic mice that have been "engineered" to produce specific human antibodies in response to antigenic challenge. In this technique, elements of the human heavy and light chain locus are introduced into strains of mice derived from embryonic stem cell lines that contain targeted disruptions of the endogenous heavy chain and light chain loci. The transgenic mice can synthesize human antibodies specific for human antigens, and the mice can be used to produce human antibody-secreting hybridomas. Methods for obtaining human antibodies from transgenic mice are described by Green et al., Nature Genet. 7:13 (1994), Lonberg et al., Nature 368:856 (1994), and Taylor et al., Int. Immun. 6:579 (1994). A fully human antibody also can be constructed by genetic or chromosomal transfection methods, as well as phage display technology, all of which are known in the art. See for example, McCafferty et al., Nature 348:552-553 (1990) for the production of human antibodies and fragments thereof in vitro, from immunoglobulin variable domain gene repertoires from unimmunized donors. In this technique, antibody variable domain genes are cloned in-frame into either a major or minor coat protein gene of a filamentous bacteriophage, and displayed as functional antibody fragments on the surface of the phage particle. Because the filamentous particle contains a single-stranded DNA copy of the phage genome, selections based on the functional properties of the antibody also result in selection of the gene encoding the antibody exhibiting those properties. In this way, the phage mimics some of the properties of the B cell. Phage display can be performed in a variety of formats, for their review, see e.g. Johnson and Chiswell, Current Opinion in Structural Biology 3:5564-571 (1993).

Human antibodies may also be generated by in vitro activated B cells. See U.S. Pat. Nos. 5,567,610 and 5,229,275, which are incorporated in their entirety by reference.

A therapeutic agent is a molecule or atom which is administered separately, concurrently or sequentially with an antibody moiety or conjugated to an antibody moiety, i.e., antibody or antibody fragment, or a subfragment, and is useful in the treatment of a disease. Examples of therapeutic agents include antibodies antibody fragments, drugs, toxins, nucleases, hormones, immunomodulators chelators, boron compounds, photoactive agents or dyes and radioisotopes.

A diagnostic agent is a molecule or atom which is administered conjugated to an antibody moiety, i.e., antibody or antibody fragment, or subfragment, and is useful in diagnosing a disease by locating the cells containing the antigen. Useful diagnostic agents include, but are not limited to, radioisotopes, dyes (such as with the biotin-streptavidin complex), contrast agents, fluorescent compounds or molecules and enhancing agents (e.g. paramagnetic ions) for magnetic resonance imaging (MRI). U.S. Pat. No. 6,331,175 describes MRI technique and the preparation of antibodies conjugated to a MRI enhancing agent and is incorporated in its entirety by reference. Preferably, the diagnostic agents are selected from the group consisting of radioisotopes, enhancing agents for use in magnetic resonance imaging, and fluorescent compounds. In order to load an antibody component with radioactive metals or paramagnetic ions, it may be necessary to react it with a reagent having a long tail to which are attached a multiplicity of chelating groups for binding the ions. Such a tail can be a polymer such as a polylysine, polysaccharide, or other derivatized or derivatizable chain having pendant groups to which can be bound chelating groups such as, e.g., ethylenediaminetetraacetic acid (EDTA), diethylenetriaminepentaacetic acid (DTPA), porphyrins, polyamines, crown ethers, bis-thiosemicarbazones, polyoximes, and like groups known to be useful for this purpose. Chelates are coupled to the peptide antigens using standard chemistries. The chelate is normally linked to the antibody by a group which enables formation of a bond to the molecule with minimal loss of immunoreactivity and minimal aggregation and/or internal cross-linking. other, more unusual, methods and reagents for conjugating chelates to antibodies are disclosed in U.S. Pat. No. 4,824,659 to Hawthorne, entitled "Antibody Conjugates", issued Apr. 25, 1989, the disclosure of which is incorporated herein in its entirety by reference. Particularly useful metal-chelate combinations include 2-benzyl-DTPA and its monomethyl and cyclohexyl analogs, used with diagnostic isotopes in the general energy range of 60 to 4,000 keV, such as $^{125}$I, $^{131}$I, $^{123}$I, $^{124}$I, $^{62}$Cu, $^{64}$Cu, $^{18}$F, $^{111}$In, $^{67}$Ga, $^{68}$Ga, $^{99m}$Tc, $^{94m}$Tc, $^{11}$C, $^{13}$N, $^{15}$O, $^{76}$Br , for radio-imaging. The same chelates, when complexed with non-radioactive metals, such as manganese, iron and gadolinium are useful for MRI, when used along with the antibodies of the invention. Macrocyclic chelates such as NOTA, DOTA, and TETA are of use with a variety of metals and radiometals, most particularly with radionuclides of gallium, yttrium and copper, respectively. Such metal-chelate complexes can be made very stable by tailoring the ring size to the metal of interest. Other ring-type chelates such as macrocyclic polyethers, which are of interest for stably binding nuclides, such as $^{223}$Ra for RAIT are encompassed by the invention.

An immunoconjugate is a conjugate of an antibody component with a therapeutic or diagnostic agent. The diagnostic agent can comprise a radioactive or non-radioactive label, a contrast agent (such as for magnetic resonance imaging, computed tomography or ultrasound), and the radioactive label can be a gamma-, beta-, alpha-, Auger electron-, or positron-emitting isotope.

An expression vector is a DNA molecules comprising a gene that is expressed in a host cell. Typically, gene expression is placed under the control of certain regulatory elements, including constitutive or inducible promoters, tissue-specific regulatory elements and enhancers. Such a gene is said to be "operably linked to" the regulatory elements.

A recombinant host may be any prokaryotic or eukaryotic cell that contains either a cloning vector or expression vector. This term also includes those prokaryotic or eukaryotic cells, as well as a transgenic animal, that have been genetically engineered to contain the cloned gene(s) in the chromosome or genome of the host cell or cells of the host cells. Suitable mammalian host cells include myeloma cells, such as SP2/0 cells, and NS0 cells, as well as Chinese Hamster Ovary (CHO) cells, hybridoma cell lines and other mammalian host cell useful for expressing antibodies. Also particularly useful to express mAbs and other fusion proteins, is a human cell line, PER.C6 disclosed in WO 0063403 A2, which produces 2 to 200-fold more recombinant protein as compared to conventional mammalian cell lines, such as CHO, COS, Vero, Hela, BHK and SP2-cell lines. Special transgenic animals with a modified immune system are particularly useful for making fully human antibodies.

As used herein, the term antibody fusion protein is a recombinantly produced antigen-binding molecule in which two or more of the same or different single-chain antibody or antibody fragment segments with the same or different specificities are linked. Valency of the fusion protein indicates how many binding arms or sites the fusion protein has to a single antigen or epitope; i.e., monovalent, bivalent, trivalent or mutlivalent. The multivalency of the antibody fusion protein means that it can take advantage of multiple interactions in binding to an antigen, thus increasing the avidity of binding to the antigen. Specificity indicates how many antigens or epitopes an antibody fusion protein is able to bind; i.e., monospecific, bispecific, trispecific, multispecific. Using these definitions, a natural antibody, e.g., an IgG, is bivalent because it has two binding arms but is monospecific because it binds to one epitope. Monospecific, multivalent fusion proteins have more than one binding site for an epitope but only binds with one epitope, for example a diabody with two binding site reactive with the same antigen. The fusion protein may comprise a single antibody component, a multivalent or multispecific combination of different antibody components or multiple copies of the same antibody component. The fusion protein may additionally comprise an antibody or an antibody fragment and a therapeutic agent. Examples of therapeutic agents suitable for such fusion proteins include immunomodulators ("antibody-immunomodulator fusion protein") and toxins ("antibody-toxin fusion protein"). One preferred toxin comprises a ribonuclease (RNase), preferably a recombinant RNase.

A multispecific antibody is an antibody that can bind simultaneously to at least two targets that are of different structure, e.g., two different antigens, two different epitopes on the same antigen, or a hapten and/or an antigen or epitope. One specificity would be for a B-cell, T-cell, myeloid-, plasma-, and mast-cell antigen or epitope. Another specificity could be to a different antigen on the same cell type, such as CD20, CD19, CD21, CD23, CD46, CD80, HLA-DR, CD74, MUC1, and CD22 on B-cells. Multispecific, multivalent antibodies are constructs that have more than one binding site, and the binding sites are of different specificity. For example, a diabody, where one binding site reacts with one antigen and the other with the other antigen.

A bispecific antibody is an antibody that can bind simultaneously to two targets which are of different structure. Bispecific antibodies (bsAb) and bispecific antibody fragments (bsFab) have at least one arm that specifically binds to, for example, a B-cell, T-cell, myeloid-, plasma-, and mast-cell antigen or epitope and at least one other arm that specifically binds to a targetable conjugate that bears a therapeutic or diagnostic agent. A variety of bispecific fusion proteins can be produced using molecular engineering. In one form, the bispecific fusion protein is monovalent consisting of, for example, a scFv with a single binding site for one antigen and a Fab fragment with a single binding site for a second antigen. In another form, the bispecific fusion protein is divalent, consisting of, for example, an IgG with a binding site for one antigen and two scFv with two binding sites for a second antigen.

Caninized or felinized antibodies are recombinant proteins in which rodent (or another species) complementarity determining regions of a monoclonal antibody have been transferred from heavy and light variable chains of rodent (or another species) immunoglobulin into a dog or cat, respectively, immunoglobulin variable domain.

Domestic animals include large animals such as horses, cattle, sheep, goats, llamas, alpacas, and pigs, as well as companion animals. In a preferred embodiment, the domestic animal is a horse.

Companion animals include animals kept as pets. These are primarily dogs and cats, although small rodents, such as guinea pigs, hamsters, rats, and ferrets, are also included, as are subhuman primates such as monkeys. In a preferred embodiment the companion animal is a dog or a cat.

3. Preparation of monoclonal antibodies including chimeric, humanized and Human antibodies Monoclonal antibodies (MAbs) are a homogeneous population of antibodies to a particular antigen and the antibody comprises only one type of antigen binding site and binds to only one epitope on an antigenic determinant. Rodent monoclonal antibodies to specific antigens may be obtained by methods known to those skilled in the art. See, for example, Kohler and Milstein, *Nature* 256: 495 (1975), and Coligan et al. (eds.), CURRENT PROTOCOLS IN IMMUNOLOGY, VOL. 1, pages 2.5.1-2.6.7 (John Wiley & Sons 1991) [hereinafter "Coligan"]. Briefly, monoclonal antibodies can be obtained by injecting mice with a composition comprising an antigen, verifying the presence of antibody production by removing a serum sample, removing the spleen to obtain B-lymphocytes, fusing the B-lymphocytes with myeloma cells to produce hybridomas, cloning the hybridomas, selecting positive clones which produce antibodies to the antigen, culturing the clones that produce antibodies to the antigen, and isolating the antibodies from the hybridoma cultures.

MAbs can be isolated and purified from hybridoma cultures by a variety of well-established techniques. Such isolation techniques include affinity chromatography with Protein-A Sepharose, size-exclusion chromatography, and ion-exchange chromatography. See, for example, Coligan at pages 2.7.1-2.7.12 and pages 2.9.1-2.9.3. Also, see Baines et al., "Purification of Immunoglobulin G (IgG)," in METHODS IN MOLECULAR BIOLOGY, VOL. 10, pages 79-104 (The Humana Press Inc. 1992).

After the initial raising of antibodies to the immunogen, the antibodies can be sequenced and subsequently prepared by recombinant techniques. Humanization and chimerization of murine antibodies and antibody fragments are well known to those skilled in the art. For example, humanized monoclonal antibodies are produced by transferring mouse complementary determining regions from heavy and light variable chains of the mouse immunoglobulin into a human variable domain, and then, substituting human residues in the framework regions of the murine counterparts. The use of antibody components derived from humanized monoclonal antibodies obviates potential problems associated with the immunogenicity of murine constant regions.

General techniques for cloning murine immunoglobulin variable domains are described, for example, by the publication of Orlandi et al., *Proc. Nat'l Acad. Sci. USA* 86: 3833 (1989), which is incorporated by reference in its entirety. Techniques for constructing chimeric antibodies are well known to those of skill in the art. As an example, Leung et al., *Hybridoma* 13:469 (1994), describe how they produced an LL2 chimera by combining DNA sequences encoding the V, and $V_H$ domains of LL2 monoclonal antibody, an anti-CD22 antibody, with respective human K and IgG, constant region domains. This publication also provides the nucleotide sequences of the LL2 light and heavy chain variable regions, $V_\kappa$ and $V_H$, respectively. Techniques for producing humanized MAbs are described, for example, by Jones et al., *Nature* 321: 522 (1986), Riechmann et al., *Nature* 332: 323 (1988), Verhoeyen et al., *Science* 239: 1534 (1988), Carter et al., Proc. Nat'l Acad. Sci. USA 89: 4285 (1992), Sandhu, Crit. Rev. Biotech. 12: 437 (1992), and Singer et al., J. Immun. 150: 2844 (1993), each of which is hereby incorporated by reference.

A chimeric antibody is a recombinant protein that contains the variable domains including the CDRs derived from one species of animal, such as a rodent antibody, while the remainder of the antibody molecule; i.e., the constant domains, is derived from a human antibody. Accordingly, a chimeric monoclonal antibody can also be humanized by replacing the sequences of the murine FR in the variable domains of the chimeric MAb with one or more different human FR. Specifically, mouse CDRs are transferred from heavy and light variable chains of the mouse immunoglobulin into the corresponding variable domains of a human antibody. As simply transferring mouse CDRs into human FRs often results in a reduction or even loss of antibody affinity, additional modification might be required in order to restore the original affinity of the murine antibody. This can be accomplished by the replacement of one or more human residues in the FR regions with their murine counterparts to obtain an antibody that possesses good binding affinity to its epitope. See, for example, Tempest et al., Biotechnology 9:266 (1991) and Verhoeyen et al., Science 239: 1534 (1988). Further, the affinity of humanized, chimeric and human MAbs to a specific epitope can be increased by mutagenesis of the CDRs, so that a lower dose of antibody may be as effective as a higher dose of a lower affinity MAb prior to mutagenesis. See for example, WO0029584A1.

Alternatively, a humanized version of an antibody can be produced by a strategy of retaining all CDR residues and those residues known to interact with the CDR residues and substituting only those residues of the mouse frameworks that are not found in the database of human frameworks at corresponding positions. In such cases if more than one amino acid residue of the human frameworks is known for the same position, the most common one is selected for humanization. This technique has been used to generate a humanized version of the murine anti-HSG antibody 679 that exhibits HSG binding affinity comparable to the murine forms.

Another method for producing the antibodies of the present invention is by production in the milk of transgenic livestock. See, e.g., Colman, A., Biochem. Soc. Symp., 63: 141-147, 1998; U.S. Pat. No. 5,827,690, both of which are incorporated in their entirety by reference. Two DNA constructs are prepared which contain respectively, DNA segments encoding paired immunoglobulin heavy and light chains. The DNA segments are cloned into expression vectors which contain a promoter sequence that is preferentially expressed in mammary epithelial cells. Examples include, but are not limited to, promoters from rabbit, cow and sheep casein genes, the cow α-lactoglobulin gene, the sheep β-lactoglobulin gene and the mouse whey acid protein gene. Preferably, the inserted fragment is flanked on its 3' side by cognate genomic sequences from a mammary-specific gene. This provides a polyadenylation site and transcript-stabilizing sequences. The expression cassettes are co-injected into the pronuclei of fertilized, mammalian eggs, which are then implanted into the uterus of a recipient female and allowed to gestate. After birth, the progeny are screened for the presence of both transgenes by Southern analysis. In order for the antibody to be present, both heavy and light chain genes must be expressed concurrently in the same cell. Milk from transgenic females is analyzed for the presence and functionality of the antibody or antibody fragment using standard immunological methods known in the art. The antibody can be purified from the milk using standard methods known in the art.

A fully human antibody of the present invention, i.e., human anti-CD20MAbs or other human antibodies, such as anti-CD22, anti-CD19, anti-CD23, or anti-CD21 MAbs for combination therapy with humanized, chimeric or human anti-CD20 antibodies, can be obtained from a transgenic non-human animal. See, e.g., Mendez et al., Nature Genetics, 15: 146-156 (1997); U.S. Pat. No. 5,633,425, which are incorporated in their entirety by reference. For example, a human antibody can be recovered from a transgenic mouse possessing human immunoglobulin loci. The mouse humoral immune system is humanized by inactivating the endogenous immunoglobulin genes and introducing human immunoglobulin loci. The human immunoglobulin loci are exceedingly complex and comprise a large number of discrete segments which together occupy almost 0.2% of the human genome. To ensure that transgenic mice are capable of producing adequate repertoires of antibodies, large portions of human heavy- and light-chain loci must be introduced into the mouse genome. This is accomplished in a stepwise process beginning with the formation of yeast artificial chromosomes (YACs) containing either human heavy- or light-chain immunoglobulin loci in germline configuration. Since each insert is approximately 1 Mb in size, YAC construction requires homologous recombination of overlapping fragments of the immunoglobulin loci. The two YACs, one containing the heavy-chain loci and one containing the light-chain loci, are introduced separately into mice via fusion of YAC-containing yeast spheroblasts with mouse embryonic stem cells. Embryonic stem cell clones are then microinjected into mouse blastocysts. Resulting chimeric males are screened for their ability to transmit the YAC through their germline and are bred with mice deficient in murine antibody production. Breeding the two transgenic strains, one containing the human heavy-chain loci and the other containing the human light-chain loci, creates progeny which produce human antibodies in response to immunization.

Further recent methods for producing bispecific mAbs include engineered recombinant mAbs which have additional cysteine residues so that they crosslink more strongly than the more common immunoglobulin isotypes. See, e.g., FitzGerald et al., Protein Eng. 10(10):1221-1225, 1997. Another approach is to engineer recombinant fusion proteins linking two or more different single-chain antibody or antibody fragment segments with the needed dual specificities. See, e.g., Coloma et al., Nature Biotech. 15:159-163, 1997. A variety of bispecific fusion proteins can be produced using molecular engineering. In one form, the bispecific fusion protein is monovalent, consisting of, for example, a scFv with a single binding site for one antigen and a Fab fragment with a single binding site for a second antigen. In another form, the bispecific fusion protein is divalent, consisting of, for example, an IgG with two binding sites for one antigen and two scFv with two binding sites for a second antigen.

Bispecific fusion proteins linking two or more different single-chain antibodies or antibody fragments are produced in similar manner. Recombinant methods can be used to produce a variety of fusion proteins. For example a fusion protein comprising a Fab fragment derived from a humanized monoclonal anti-CD20 antibody and a scFv derived from a murine anti-diDTPA can be produced. A flexible linker, such as GGGS (Residues 2-5 of SEQ ID NO: 1)connects the scFv to the constant region of the heavy chain of the anti-CD20 antibody. Alternatively, the scFv can be connected to the constant region of the light chain of another humanized antibody. Appropriate linker sequences necessary for the in-frame connection of the heavy chain Fd to the scFv are introduced into the VL and VK domains through PCR reactions. The DNA fragment encoding the scFv is then ligated into a staging vector containing a DNA sequence encoding the CH1 domain. The resulting scFv-CH1 construct is excised and ligated into a vector containing a DNA sequence encoding the VH region of an anti-CD20 antibody. The resulting vector can be used to transfect an appropriate host cell, such as a mammalian cell for the expression of the bispecific fusion protein.

4. Production Of Antibody Fragments

Antibody fragments which recognize specific epitopes can be generated by known techniques. The antibody fragments are antigen binding portions of an antibody, such as F(ab')$_2$, Fab', Fab, Fv, sFv and the like. Other antibody fragments include, but are not limited to: the F(ab)'$_2$ fragments which can be produced by pepsin digestion of the antibody molecule and the Fab' fragments, which can be generated by reducing disulfide bridges of the F(ab)'$_2$ fragments. Alternatively, Fab' expression libraries can be constructed (Huse et al., 1989, *Science,* 246:1274-1281) to allow rapid and easy identification of monoclonal Fab' fragments with the desired specificity. The present invention encompasses antibodies and antibody fragments.

A single chain Fv molecule (scFv) comprises a VL domain and a VH domain. The VL and VH domains associate to form a target binding site. These two domains are further covalently linked by a peptide linker (L). A scFv molecule is denoted as either VL-L-VH if the VL domain is the N-terminal part of the scFv molecule, or as VH-L-VL if the VH domain is the N-terminal part of the scFv molecule. Methods for making scFv molecules and designing suitable peptide linkers are described in U.S. Pat. No. 4,704,692, U.S. Pat. No. 4,946,778, R. Raag and M. Whitlow, "*Single Chain Fvs.*" FASEB Vol 9:73-80 (1995) and R. E. Bird and B. W. Walker, "*Single Chain Antibody Variable Regions,*" TIBTECH, Vol 9: 132-137 (1991). These references are incorporated herein by reference.

An antibody fragment can be prepared by proteolytic hydrolysis of the full length antibody or by expression in *E. coli* or another host of the DNA coding for the fragment. An antibody fragment can be obtained by pepsin or papain digestion of full length antibodies by conventional methods. For example, an antibody fragment can be produced by enzymatic cleavage of antibodies with pepsin to provide a 5S fragment denoted F(ab')$_2$. This fragment can be further cleaved using a thiol reducing agent, and optionally a blocking group for the sulfhydryl groups resulting from cleavage of disulfide linkages, to produce 3.5S Fab' monovalent fragments. Alternatively, an enzymatic cleavage using papain produces two monovalent Fab fragments and an Fc fragment directly. These methods are described, for example, by Goldenberg, U.S. Pat. Nos. 4,036,945 and 4,331,647 and references contained therein, which patents are incorporated herein in their entireties by reference. Also see Nisonoff et al., *Arch Biochem. Biophys.* 89: 230 (1960); Porter, *Biochem. J.* 73: 119 (1959), Edelman et al., in METHODS IN ENZYMOLOGY VOL. 1, page 422 (Academic Press 1967), and Coligan at pages 2.8.1-2.8.10 and 2.10.-2.10.4.

Another form of an antibody fragment is a peptide coding for a single complementarity-determining region (CDR). A CDR is a segment of the variable region of an antibody that is complementary in structure to the epitope to which the antibody binds and is more variable than the rest of the variable region. Accordingly, a CDR is sometimes referred to as hypervariable region. A variable region comprises three CDRs. CDR peptides can be obtained by constructing genes encoding the CDR of an antibody of interest. Such genes are prepared for example by using the polymerase chain reaction to synthesize the variable region from RNA of antibody-producing cells. See, for example, Larrick et al., *Methods: A Companion to Methods in Enzymology* 2: 106 (1991); Courtenay-Luck, "Genetic Manipulation of Monoclonal Antibodies," in MONOCLONAL ANTIBODIES: PRODUCTION, ENGINEERING AND CLINICAL APPLICATION, Ritter et al. (eds.), pages 166-179 (Cambridge University Press 1995); and Ward et al., "Genetic Manipulation and Expression of Antibodies," in MONOCLONAL ANTIBODIES: PRINCIPLES AND APPLICATIONS, Birch et al. (eds.), pages 137-185 (Wiley-Liss, Inc. 1995).

Other methods of cleaving antibodies, such as separation of heavy chains to form monovalent light-heavy chain fragments, further cleavage of fragments, or other enzymatic, chemical or genetic techniques may also be used, so long as the fragments bind to the antigen that is recognized by the intact antibody.

5. Multispecific and Multivalent Antibodies

The anti-CD20 antibodies, as well as other antibodies with different specificities for use in combination therapy, described herein, can also be made as multispecific antibodies (comprising at least one binding site to a CD20 epitope or antigen and at least one binding site to another epitope on CD20 or another antigen) and multivalent antibodies (comprising multiple binding sites to the same epitope or antigen). Multivalent target binding proteins are described in U.S. Ser. No. 09/911,610 (Leung et al.), which is incorporated herein by reference in its entirety.

The present invention provides a bispecific antibody or antibody fragment having at least a binding region that specifically binds a targeted cell marker and at least one other binding region that specifically binds a targetable conjugate. The targetable conjugate comprises a carrier portion which comprises or bears at least one epitope recognized by at least one binding region of the bispecific antibody or antibody fragment.

A variety of recombinant methods can be used to produce bispecific antibodies and antibody fragments as described above.

An anti-CD20 multivalent antibody is also contemplated in the present invention. This multivalent target binding protein is constructed by association of a first and a second polypeptide. The first polypeptide comprises a first single chain Fv molecule covalently linked to a first immunoglobulin-like domain which preferably is an immunoglobulin light chain variable region domain. The second polypeptide comprises a second single chain Fv molecule covalently linked to a second immunoglobulin-like domain which preferably is an immunoglobulin heavy chain variable region domain. Each of the first and second single chain Fv molecules forms a target binding site, and the first and second immunoglobulin-like domains associate to form a third target binding site.

A single chain Fv molecule with the VL-L-VH configuration, wherein L is a linker, may associate with another single chain Fv molecule with the VH-L-VL configuration to form a bivalent dimer. In this case, the VL domain of the first scFv and the VH domain of the second scFv molecule associate to form one target binding site, while the VH domain of the first scFv and the VL domain of the second scFv associate to form the other target binding site.

Another embodiment of the present invention is a CD20 bispecific, trivalent targeting protein comprising two heterologous polypeptide chains associated non-covalently to form three binding sites, two of which have affinity for one target and a third which has affinity for a hapten that can be made and attached to a carrier for a diagnostic and/or therapeutic agent. Preferably, the binding protein has two CD20 binding sites and one CD22 binding site. The bispecific, trivalent targeting agents have two different scFvs, one scFv contains two $V_H$ domains from one antibody connected by a short linker to the $V_L$ domain of another antibody and the second scFv contains two $V_L$ domains from the first antibody connected by a short linker to the $V_H$ domain of the other antibody. The methods for generating multivalent, multispecific agents from $V_H$ and $V_L$ domains provide that individual chains synthesized from a DNA plasmid in a host organism are composed entirely of $V_H$ domains (the $V_H$-chain) or entirely of $V_L$ domains (the $V_L$-chain) in such a way that any agent of multivalency and multispecificity can be produced by non-covalent association of one $V_H$-chain with one $V_L$-chain. For example, forming a trivalent, trispecific agent, the $V_H$-chain will consist of the amino acid sequences of three $V_H$ domains, each from an antibody of different specificity, joined by peptide linkers of variable lengths, and the $V_L$-chain will consist of complementary $V_L$ domains, joined by peptide linkers similar to those used for the $V_H$-chain. Since the $V_H$ and $V_L$ domains of antibodies associate in an anti-parallel fashion the preferred method in this invention has the $V_L$ domains in the $V_L$-chain arranged in the reverse order of the $V_H$ domains in the $V_H$-chain.

6. Diabodies, Triabodies and Tetrabodies

The anti-CD20 and anti-HSG antibodies of the present invention can also be used to prepare functional bispecific single-chain antibodies (bscAb), also called diabodies, and can be produced in mammalian cells using recombinant methods. See, e.g., Mack et al., Proc. Natl. Acad. Sci., 92: 7021-7025, 1995, incorporated. For example, bscAb are produced by joining two single-chain Fv fragments via a glycine-serine linker using recombinant methods. The V light-chain ($V_L$) and V heavy-chain ($V_H$) domains of two antibodies of interest are isolated using standard PCR methods. The $V_L$ and $V_H$ cDNA's obtained from each hybridoma are then joined to form a single-chain fragment in a two-step fusion PCR. The first PCR step introduces the $(Gly_4\text{-}Ser_1)_3$ linker, and the second step joins the $V_L$ and $V_H$ amplicons. Each single chain molecule is then cloned into a bacterial expression vector. Following amplification, one of the single-chain molecules is excised and sub-cloned into the other vector containing the second single-chain molecule of interest. The resulting bscAb fragment is subcloned into an eukaryotic expression vector. Functional protein expression can be obtained by transfecting the vector into chinese hamster ovary cells. Bispecific fusion proteins are prepared in a similar manner. Bispecific single-chain antibodies and bispecific fusion proteins are included within the scope of the present invention.

For example, a humanized, chimeric or human anti-CD20 monoclonal antibody can be used to produce antigen specific diabodies, triabodies, and tetrabodies. The monospecific diabodies, triabodies, and tetrabodies bind selectively to targeted antigens and as the number of binding sites on the molecule increases, the affinity for the target cell increases and a longer residence time is observed at the desired location. For diabodies, the two chains comprising the $V_H$ polypeptide of the humanized CD20 MAb connected to the $V_K$ polypeptide of the humanized CD20 MAb by a five amino acid residue linker are utilized. Each chain forms one half of the humanized CD20 diabody. In the case of triabodies, the three chains comprising $V_H$ polypeptide of the humanized CD20 MAb connected to the $V_K$ polypeptide of the humanized CD20 MAb by no linker are utilized. Each chain forms one third of the hCD20 triabody.

The ultimate use of the bispecific diabodies described herein is for pre-targeting CD20 positive tumors for subsequent specific delivery of diagnostic or therapeutic agents. These diabodies bind selectively to targeted antigens allowing for increased affinity and a longer residence time at the desired location. Moreover, non-antigen bound diabodies are cleared from the body quickly and exposure of normal tissues is minimized. Bispecific antibody point mutations for enhancing the rate of clearance can be found in U.S. Provisional Application No. 60/361,037 to Qu et al. (10/377, 109=US 2004018557), which is incorporated herein by reference in its entirety. Bispecific diabodies for affinity enhancement are disclosed in U.S. application Ser. No. 10/270,071 (Rossi et al.), Ser. No. 10/270,073 (Rossi et al.) and Ser. No. 10/328,190 (Rossi et al.), which are incorporated herein by reference in their entirety. The diagnostic and therapeutic agents can include isotopes, drugs, toxins, cytokines, hormones, growth factors, conjugates, radionuclides, and metals. For example, gadolinium metal is used for magnetic resonance imaging (MRI). Examples of radionuclides are $^{225}$Ac, $^{18}$F, $^{68}$Ga, $^{67}$Ga, $^{90}$Y, $^{86}$Y, $^{111}$In, $^{131}$I, $^{125}$I, $^{123}$I, $^{99m}$Tc, $^{94m}$Tc, $^{186}$Re, $^{188}$Re, $^{177}$Lu, $^{62}$Cu, $^{64}$CU, $^{67}$CU, $^{212}$Bi, $^{213}$Bi, $^{32}$P, $^{11}$C, $^{13}$N, $^{15}$O, $^{76}$Br, and $^{211}$At. Other radionuclides are also available as diagnostic and therapeutic agents, especially those in the energy range of 60 to 4,000 keV.

More recently, a tetravalent tandem diabody (termed tandab) with dual specificity has also been reported (Cochlovius et al., Cancer Research (2000) 60: 4336-4341). The bispecific tandab is a dimer of two identical polypeptides, each containing four variable domains of two different antibodies ($V_{H1}$, $V_{L1}$, $V_{H2}$, $V_{L2}$) linked in an orientation to facilitate the formation of two potential binding sites for each of the two different specificities upon self-association.

7. Conjugated Multivalent and Multispecific Anti-CD20 Antibodies

In another embodiment of the instant invention is a conjugated multivalent anti-CD20 antibody. Additional amino acid residues may be added to either the N- or C-terminus of the first or the second polypeptide. The additional amino acid residues may comprise a peptide tag, a signal peptide, a cytokine, an enzyme (for example, a pro-drug activating enzyme), a hormone, a peptide toxin, such as pseudomonas extoxin, a peptide drug, a cytotoxic protein or other functional proteins. As used herein, a functional protein is a protein which has a biological function.

In one embodiment, drugs, toxins, radioactive compounds, enzymes, hormones, cytotoxic proteins, chelates, cytokines and other functional agents may be conjugated to the multivalent target binding protein, preferably through covalent attachments to the side chains of the amino acid residues of the multivalent target binding protein, for example amine, carboxyl, phenyl, thiol or hydroxyl groups. Various conventional linkers may be used for this purpose, for example, diisocyanates, diisothiocyanates, bis(hydroxysuccinimide) esters, carbodiimides, maleimide-hydroxysuccinimide esters, glutaraldehyde and the like. Conjugation of agents to the multivalent protein preferably does not significantly affect the protein's binding specificity or affinity to its target. As used herein, a functional agent is an agent which has a biological function. A preferred functional agent is a cytotoxic agent.

In still other embodiments, bispecific antibody-directed delivery of therapeutics or prodrug polymers to in vivo targets can be combined with bispecific antibody delivery of radionuclides, such that combination chemotherapy and radioimmunotherapy is achieved. Each therapy can be conjugated to the targetable conjugate and administered simultaneously, or the nuclide can be given as part of a first targetable conjugate and the drug given in a later step as part of a second targetable conjugate.

In another embodiment, cytotoxic agents may be conjugated to a polymeric carrier, and the polymeric carrier may subsequently be conjugated to the multivalent target binding protein. For this method, see Ryser et al., *Proc. Natl. Acad. Sci. USA*, 75:3867-3870, 1978, U.S. Pat. Nos. 4,699,784 and 4,046,722, which are incorporated herein by reference. Conjugation preferably does not significantly affect the binding specificity or affinity of the multivalent binding protein.

8. Humanized, Chimeric and Human Antibodies Use For Treatment and Diagnosis

Humanized, chimeric and human monoclonal antibodies, i.e., anti-CD20MAbs and other MAbs described herein, in accordance with this invention are suitable for use in therapeutic methods and diagnostic methods. Accordingly, the present invention contemplates the administration of the humanized, chimeric and human antibodies of the present invention alone as a naked antibody or administered as a multimodal therapy, temporally according to a dosing regimen, but not conjugated to, a therapeutic agent. The efficacy of the naked anti-CD20 MAbs can be enhanced by supplementing naked antibodies with one or more other naked antibodies, i.e., MAbs to specific antigens, such as CD4, CD5, CD8, CD14, CD15, CD19, CD21, CD22, CD23, CD25, CD33, CD37, CD38, CD40, CD40L, CD46, CD52, CD54, CD74, CD80, CD126, B7, MUC1, Ia, HM1.24, or HLA-DR, tenascin, VEGF, P1GF, an oncogene, an oncogene product, or a combination thereof with one or more immunoconjugates of anti-CD20, or antibodies to theses recited antigens, conjugated with therapeutic agents, including drugs, toxins, immunomodulators, hormones, therapeutic radionuclides, etc., with one or more therapeutic agents, including drugs, oligonucleotide, toxins, immunomodulators, hormones, therapeutic radionuclides, etc., administered concurrently or sequentially or according to a prescribed dosing regimen, with the MAbs. Preferred B-cell antigens include those equivalent to human CD19, CD20, CD21, CD22, CD23, CD46, CD52, CD74, CD80, and CD5 antigens. Preferred T-cell antigens include those equivalent to human CD4, CD8 and CD25 (the IL-2 receptor) antigens. An equivalent to HLA-DR antigen can be used in treatment of both B-cell and T-cell disorders. Particularly preferred B-cell antigens are those equivalent to human CD19, CD22, CD21, CD23, CD74, CD80, and HLA-DR antigens. Particularly preferred T-cell antigens are those equivalent to human CD4, CD8 and CD25 antigens. CD46 is an antigen on the surface of cancer cells that block complement-dependent lysis (CDC).

Further, the present invention contemplates the administration of an immunoconjugate for diagnostic and therapeutic uses in B cell lymphomas and other disease or disorders. An immunoconjugate, as described herein, is a molecule comprising an antibody component and a therapeutic or diagnostic agent, including a peptide which may bear the diagnostic or therapeutic agent. An immunoconjugate retains the immunoreactivity of the antibody component, i.e., the antibody moiety has about the same or slightly reduced ability to bind the cognate antigen after conjugation as before conjugation.

A wide variety of diagnostic and therapeutic agents can be advantageously conjugated to the antibodies of the invention. The therapeutic agents recited here are those agents that also are useful for administration separately with the naked antibody as described above. Therapeutic agents include, for example, chemotherapeutic drugs such as vinca alkaloids, anthracyclines, epidophyllotoxin, taxanes, antimetabolites, alkylating agents, antikinase agents, antibiotics, Cox-2 inhibitors, antimitotics, antiangiogenic and apoptotoic agents, particularly doxorubicin, methotrexate, taxol, CPT-11, camptothecans, and others from these and other classes of anticancer agents, and the like. Other useful cancer chemotherapeutic drugs for the preparation of immunoconjugates and antibody fusion proteins include nitrogen mustards, alkyl sulfonates, nitrosoureas, triazenes, folic acid analogs, COX-2 inhibitors, pyrimidine analogs, purine analogs, platinum coordination complexes, hormones, and the like. Suitable chemotherapeutic agents are described in REMINGTON'S PHARMACEUTICAL SCIENCES, 19th Ed. (Mack Publishing Co. 1995), and in GOODMAN AND GILMAN'S THE PHARMACOLOGICAL BASIS OF THERAPEUTICS, 7th Ed. (MacMillan Publishing Co. 1985), as well as revised editions of these publications. Other suitable chemotherapeutic agents, such as experimental drugs, are known to those of skill in the art.

Additionally, a chelator such as DTPA (such as Mx-DTPA), DOTA, TETA, or NOTA or a suitable peptide, to which a detectable label, such as a fluorescent molecule, or cytotoxic agent, such as a heavy metal or radionuclide, can be conjugated. For example, a diagnostically or therapeutically useful immunoconjugate can be obtained by conjugating a photoactive agent or dye to an antibody composite. Fluorescent compositions, such as fluorochrome, and other chromogens, or dyes, such as porphyrins sensitive to visible light, have been used to detect and to treat lesions by directing the suitable light to the lesion. In therapy, this has been termed photoradiation, phototherapy, or photodynamic therapy (Jori et al. (eds.), PHOTODYNAMIC THERAPY OF TUMORS AND OTHER DISEASES (Libreria Progetto 1985); van den Bergh, *Chem. Britain* 22:430 (1986)). Moreover, monoclonal antibodies have been coupled with photoactivated dyes for achieving phototherapy. Mew et al., *J. Immunol.* 130:1473 (1983); idem., *Cancer Res.* 45:4380 (1985); Oseroff et al., *Proc. Natl. Acad. Sci. USA* 83:8744 (1986); idem., *Photochem. Photobiol.* 46:83 (1987); Hasan et al., *Prog. Clin. Biol. Res.* 288:471 (1989); Tatsuta et al., *Lasers Surg. Med.* 9:422 (1989); Pelegrin et al., *Cancer* 67:2529 (1991). However, these earlier studies did not include use of endoscopic therapy applications, especially with the use of antibody fragments or subfragments. Thus, the present invention contemplates the therapeutic use of immunoconjugates comprising photoactive agents or dyes.

Also contemplated by the present invention is the use of radioactive and non-radioactive agents as diagnostic agents. A suitable non-radioactive diagnostic agent is a contrast agent suitable for magnetic resonance imaging, computed tomography or ultrasound. Magnetic imaging agents include, for example, non-radioactive metals, such as manganese, iron and gadolinium, complexed with metal-chelate combinations that include 2-benzyl-DTPA and its monomethyl and cyclohexyl analogs, when used along with the antibodies of the invention. See U.S. Ser. No. 09/921,290 filed on Oct. 10, 2001, which is incorporated in its entirety by reference.

Furthermore, a radiolabeled antibody or immunoconjugate may comprise a R emitting radioisotope or a positron-emitter useful for diagnostic imaging. Suitable radioisotopes, particularly in the energy range of 60 to 4,000 keV, include $^{131}$I, $^{123}$I, $^{124}$I, $^{86}$Y, $^{62}$Cu, $^{64}$Cu, $^{111}$In, $^{67}$Ga, $^{68}$Ga, $^{99m}$Tc, $^{94m}$Tc, $^{18}$F, $^{11}$C, $^{13}$N, $^{15}$O, $^{75}$Br, and the like. See for example, U.S. patent application entitled "Labeling Targeting Agents with Gallium-68"-Inventors G. L. Griffiths and W. J. McBride, (U.S. Provisional Application No. 60/342,104), which discloses positron emitters, such as $^{18}$F, $^{68}$Ga, $^{94m}$Tc and the like, for imaging purposes and which is incorporated in its entirety by reference. Particularly useful therapeutic radionuclides include, but are not limited to, $^{32}$P, $^{33}$P, $^{47}$Sc, $^{64}$Cu, $^{67}$Cu, $^{67}$Ga, $^{90}$Y, $^{111}$Ag, $^{111}$In, $^{125}$I, $^{131}$I, $^{142}$Pr, $^{153}$Sm, $^{161}$Tb, $^{166}$Dy, $^{166}$Ho, $^{177}$Lu, $^{186}$Re, $^{188}$Re, $^{189}$Re, $^{212}$Pb, $^{212}$Bi, $^{213}$Bi, $^{211}$At, $^{223}$Ra and $^{225}$Ac. Particularly useful diagnostic/detection radionuclides include, but are not limited to, $^{18}$F$^{52}$Fe, $^{62}$Cu, $^{64}$Cu, $^{67}$Cu, $^{67}$Ga, $^{68}$Ga, $^{86}$Y, $^{89}$Zr, $^{94m}$Tc, $^{94}$Tc, $^{99m}$Tc, $^{111}$In, $^{123}$I, $^{124}$I, $^{125}$I, $^{131}$I, $^{154-158}$Gd, $^{32}$P, $^{90}$Y, $^{188}$Re , and $^{175}$Lu.

A toxin, such as *Pseudomonas* exotoxin, may also be complexed to or form the therapeutic agent portion of an antibody fusion protein of an anti-CD20 antibody of the present invention. Other toxins suitably employed in the preparation of such conjugates or other fusion proteins, include ricin, abrin, ribonuclease (RNase), DNase I, Staphylococcal enterotoxin-A, pokeweed antiviral protein, gelonin, diphtherin toxin, *Pseudomonas* exotoxin, and *Pseudomonas* endotoxin. See, for example, Pastan et al., *Cell* 47:641 (1986), and Goldenberg, C A —*A Cancer Journal for Clinicians* 44:43 (1994). Additional toxins suitable for use in the present invention are known to those of skill in the art and are disclosed in U.S. Pat. No. 6,077,499, which is incorporated in its entirety by reference.

An immunomodulator, such as a cytokine may also be conjugated to, or form the therapeutic agent portion of an antibody fusion protein or be administered with the humanized anti-CD20 antibodies of the present invention. Suitable cytokines for the present invention include, but are not limited to, interferons and interleukins, as described below.

An oligonucleotide, such as the antisense molecules inhibiting bcl-2 expression that are described in U.S. Pat. No. 5,734,033 (Reed) which is incorporated by reference in its entirety, may also be conjugated to, or form the therapeutic agent portion of an antibody fusion protein or be administered with the humanized anti-CD20 antibodies of the present invention.

Delivering a 679xhMN14 diagnostic or a therapeutic agent to a target for diagnosis or treatment in accordance with the invention includes administering a patient with the binding protein, waiting a sufficient amount of time for an amount of the non-binding protein to clear the patient's blood stream, and administering a diagnostic or therapeutic agent that binds to a binding site of the binding protein. Diagnosis further requires the step of detecting the bound proteins with known techniques. The diagnostic or therapeutic carrier molecule comprises a diagnostically or therapeutically efficient agent, a linking moiety, and one or more hapten moieties. The hapten moieties are positioned to permit simultaneous binding of the hapten moieties with the binding protein.

Administration of the binding protein and diagnostic or therapeutic agents of the present invention to a mammal may be intravenous, intraarterial, intraperitoneal, intramuscular, subcutaneous, intrapleural, intrathecal, by perfusion through a regional catheter, or by direct intralesional injection. When administering the binding moiety by injection, the administration may be by continuous infusion or by single or multiple boluses.

The unmixed diagnostic or therapeutic agent and bispecific antibody may be provided as a kit for human therapeutic and diagnostic use in a pharmaceutically acceptable injection vehicle, preferably phosphate-buffered saline (PBS) at physiological pH and concentration. The preparation preferably will be sterile especially if it is intended for use in humans. Optional components of such kits would normally be containers of stabilizers, buffers, labeling reagents, radioisotopes, paramagnetic compounds, second antibody for enhanced clearance, and conventional syringes, columns, vials and the like.

9. Preparation Of Immunoconjugates

Any of the antibodies or antibody fusion proteins of the present invention can be conjugated with one or more therapeutic or diagnostic agents. Generally, one therapeutic or diagnostic agent is attached to each antibody or antibody fragment but more than one therapeutic agent or diagnostic agent can be attached to the same antibody or antibody fragment. The antibody fusion proteins of the present invention comprise two or more antibodies or fragments thereof and each of the antibodies that composes this fusion protein can contain a therapeutic agent or diagnostic agent. Additionally, one or more of the antibodies of the antibody fusion protein can have more than one therapeutic of diagnostic agent attached. Further, the therapeutic agents do not need to be the same but can be different therapeutic agents. For example, one can attach a drug and a radioisotope to the same fusion protein. Particularly, an IgG can be radiolabeled with $^{131}$I and attached to a drug. The $^{131}$I can be incorporated into the tyrosine of the IgG and the drug attached to the epsilon amino group of the IgG lysines. Both therapeutic and diagnostic agents also can be attached to reduced SH groups and to the carbohydrate side chains.

Radionuclides suitable for treating a disease tissue substantially decay by beta-particle emission and include, but are not limited to: $^{32}$P, $^{33}$P, $^{47}$Sc, $^{59}$Fe, $^{64}$Cu $^{67}$Cu, $^{75}$Se, $^{77}$As, $^{89}$Sr, $^{90}$Y, $^{99}$Mo, $^{105}$Rh, $^{109}$Pd, $^{111}$Ag, $^{125}$I, $^{131}$I, $^{142}$Pr, $^{143}$Pr, $^{149}$Pm, $^{153}$Sm, $^{161}$Tb, $^{166}$Ho, $^{169}$Er, $^{177}$Lu, $^{186}$Re , $^{188}$Re , $^{189}$Re , $^{194}$Ir, $^{198}$Au, $^{199}$Au, $^{211}$Pb, $^{212}$Pb and $^{213}$Bi. Maximum decay energies of useful beta-particle-emitting nuclides are preferably 20-5,000 keV, more preferably 100-4,000 keV, and most preferably 500-2,500 keV. Also preferred are radionuclides that substantially decay with Auger-emitting particles. For example, $^{58}$Co, $^{67}$Ga, $^{80m}$Br, $^{99m}$Tc, $^{103}$mRh, $^{109}$Pt, $^{111}$In, $^{119}$Sb, $^{125}$I, $^{161}$Ho, $^{189m}$Os and $^{192}$Ir. Decay energies of useful Auger-particle-emitting nuclides are preferably <1,000 keV, more preferably <100 keV, and most preferably <70 keV. Also preferred are radionuclides that substantially decay with generation of alpha-particles. Such radionuclides include, but are not limited to: $^{152}$Dy, $^{211}$At, $^{212}$Bi, $^{223}$Ra, $^{219}$Rn, $^{215}$Po, $^{211}$Bi, $^{225}$Ac, $^{221}$Fr, $^{217}$At, $^{213}$Bi and $^{255}$Fm. Decay energies of useful alpha-particle-emitting radionuclides are preferably 2,000-10,000 keV, more preferably 3,000-8,000 keV, and most preferably 4,000-7,000 keV.

Radionuclides useful as diagnostic agents utilizing gamma-ray detection include, but are not limited to: $^{51}$Cr, $^{57}$Co, $^{58}$Co, $^{59}$Fe, $^{67}$Cu, $^{67}$Ga, $^{75}$Se, $^{97}$Ru, $^{99m}$Tc, $^{111}$In, $^{114m}$In, $^{123}$I, $^{125}$I, $^{131}$I, $^{169}$Yb, $^{197}$Hg, and $^{201}$TI. Decay energies of useful gamma-ray emitting radionuclides are preferably 20-2000 keV, more preferably 60-600 keV and most preferably 100-300 keV.

Radionuclides useful for positron emission tomography include, but are not limited to: $^{18}$F, $^{51}$Mn, $^{52m}$Mn, $^{52}$Fe, $^{55}$Co, $^{62}$Cu, $^{64}$Cu, $^{68}$Ga, $^{72}$As, $^{75}$Br, $^{76}$Br, $^{82m}$Rb, $^{83}$Sr, $^{86}$Y, $^{89}$Zr, 94mTc, $^{110}$In, $^{120}$I, and $^{124}$I. Total decay energies of useful positron-emitting radionuclides are preferably <2,000 keV, more preferably under 1,000 keV, and most preferably <700 keV.

Bispecific antibodies of the present invention are useful in pretargeting methods and provide a preferred way to deliver two therapeutic agents or two diagnostic agents to a subject. U.S. Ser. Nos. 09/382,186 and 09/337,756 discloses a method of pretargeting using a bispecific antibody, in which the bispecific antibody is labeled with $^{125}$I and delivered to a subject, followed by a divalent peptide labeled with $^{99m}$Tc, and are incorporated herein by reference in their entirety. Pretargeting methods are also described in U.S. Ser. No. 09/823,746 (Hansen et al.) and Ser. No. 10/150,654 (Goldenberg et al.), and US Provisional Application filed Jan. 31, 2003, entitled "Methods and Compositions for Administration of Therapeutic and Diagnostic Agents, Ser. No. 10/768,707 filed Feb. 2, 2002, now U.S. Pat. No. 7,534,431 (McBride et al.), which are all also incorporated herein by reference in their entirety. The delivery results in excellent tumor/normal tissue ratios for $^{125}$I and $^{99m}$Tc, thus showing the utility of two diagnostic radioisotopes. Any combination of known therapeutic agents or diagnostic agents can be used to label the antibodies and antibody fusion proteins. The binding specificity of the antibody component of the MAb conjugate, the efficacy of the therapeutic agent or diagnostic agent and the effector activity of the Fc portion of the antibody can be determined by standard testing of the conjugates.

The invention is directed to a method for pretargeting a cell in a patients suffering from a B-cell lymphoma or leukemia or an autoimmune disease comprising:
(i) administering an antibody fusion protein or fragment thereof that is multispecific having at least one arm that specifically binds the cell and at least one other arm that specifically binds a targetable conjugate;
(ii) optionally, administering to the patient a clearing composition, and allowing the composition to clear non-antigen bound antibody fusion protein or fragment thereof from circulation; and
(iii) administering to the patient a targetable conjugate comprising a carrier portion which comprises or bears at least one epitope recognizable by at least one other arm of the antibody fusion protein or fragment thereof, and is conjugated at least one first therapeutic or diagnostic agent.

The antibody fusion protein of the present invention should be a multispecific antibody. In a preferred embodiment the antibody is a bispecific antibody, and can be a diabody. The first therapeutic agent is selected from the group consisting of a radioactive label, an immunomodulator, a hormone, a photoactive therapeutic agent, a cytotoxic agent, an oligonucleotide and a combination thereof and wherein the first diagnostic agent is at least one of a radioactive label, a photoactive diagnostic agent or a non-radioactive label.

The antibody fusion protein or fragment thereof also may be conjugated to a second therapeutic, such as at least one radioactive label, an immunomodulator, a hormone, a photoactive therapeutic agent, a cytotoxic agent, an oligonucleotide and a combination thereof or may be conjugated the second diagnostic agent, such as at least one of a radioactive label, a photoactive diagnostic agent or a non-radioactive label. In one embodiment, the first and second therapeutic agent or diagnostic agent are the same.

A therapeutic or diagnostic agent can be attached at the hinge region of a reduced antibody component via disulfide bond formation. As an alternative, such peptides can be attached to the antibody component using a heterobifunctional cross-linker, such as N-succinyl 3-(2-pyridyldithio) propionate (SPDP). Yu et al., *Int. J. Cancer* 56: 244 (1994). General techniques for such conjugation are well-known in the art. See, for example, Wong, CHEMISTRY OF PROTEIN CONJUGATION AND CROSS-LINKING (CRC Press 1991); Upeslacis et al., "Modification of Antibodies by Chemical Methods," in MONOCLONAL ANTIBODIES: PRINCIPLES AND APPLICATIONS, Birch et al. (eds.), pages 187-230 (Wiley-Liss, Inc. 1995); Price, "Production and Characterization of Synthetic Peptide-Derived Antibodies," in MONOCLONAL ANTIBODIES: PRODUCTION, ENGINEERING AND CLINICAL APPLICATION, Ritter et al. (eds.), pages 60-84 (Cambridge University Press 1995). Alternatively, the therapeutic or diagnostic agent can be conjugated via a carbohydrate moiety in the Fc region of the antibody. The carbohydrate group can be used to increase the loading of the same peptide that is bound to a thiol group, or the carbohydrate moiety can be used to bind a different peptide.

Methods for conjugating peptides to antibody components via an antibody carbohydrate moiety are well-known to those of skill in the art. See, for example, Shih et al., *Int. J. Cancer* 41: 832 (1988); Shih et al., *Int. J. Cancer* 46: 1101 (1990); and Shih et al., U.S. Pat. No. 5,057,313, all of which are incorporated in their entirety by reference. The general method involves reacting an antibody component having an oxidized carbohydrate portion with a carrier polymer that has at least one free amine function and that is loaded with a plurality of peptide. This reaction results in an initial Schiff base (imine) linkage, which can be stabilized by reduction to a secondary amine to form the final conjugate.

The Fc region is absent if the antibody used as the antibody component of the immunoconjugate is an antibody fragment. However, it is possible to introduce a carbohydrate moiety into the light chain variable region of a full length antibody or antibody fragment. See, for example, Leung et al., *J. Immunol.* 154: 5919 (1995); Hansen et al., U.S. Pat. No. 5,443,953 (1995), Leung et al., U.S. Pat. No. 6,254,868, all of which are incorporated in their entirety by reference. The engineered carbohydrate moiety is used to attach the therapeutic or diagnostic agent.

10. Pharmaceutically Acceptable Excipients

The humanized, chimeric and human anti-CD20 mAbs to be delivered to a subject can consist of the MAb alone, immunoconjugate, fusion protein, or can comprise one or more pharmaceutically suitable excipients, one or more additional ingredients, or some combination of these.

The immunoconjugate or naked antibody of the present invention can be formulated according to known methods to prepare pharmaceutically useful compositions, whereby the immunoconjugate or naked antibody are combined in a mixture with a pharmaceutically suitable excipient. Sterile phosphate-buffered saline is one example of a pharmaceutically suitable excipient. Other suitable excipients are well-known to those in the art. See, for example, Ansel et al., PHARMACEUTICAL DOSAGE FORMS AND DRUG DELIVERY SYSTEMS, 5th Edition (Lea & Febiger 1990), and Gennaro (ed.), REMINGTON'S PHARMACEUTICAL SCIENCES, 18th Edition (Mack Publishing Company 1990), and revised editions thereof.

The immunoconjugate or naked antibody of the present invention can be formulated for intravenous administration via, for example, bolus injection or continuous infusion. Preferably, the antibody of the present invention is infused over a period of less than about 4 hours, and more preferably, over a period of less than about 3 hours. For example, the first 25-50 mg could be infused within 30 minutes preferably even 15 min, and the remainder infused over the next 2-3 hrs. Formulations for injection can be presented in unit dosage form, e.g., in ampules or in multi-dose containers, with an added preservative. The compositions can take such forms as suspensions, solutions or emulsions in oily or aqueous vehicles, and can contain formulatory agents such as suspending, stabilizing and/or dispersing agents. Alternatively, the active ingredient can be in powder form for constitution with a suitable vehicle, e.g., sterile pyrogen-free water, before use.

Additional pharmaceutical methods may be employed to control the duration of action of the therapeutic or diagnostic conjugate or naked antibody. Control release preparations can be prepared through the use of polymers to complex or adsorb the immunoconjugate or naked antibody. For example, biocompatible polymers include matrices of poly(ethylene-co-vinyl acetate) and matrices of a polyanhydride copolymer of a stearic acid dimer and sebacic acid. Sherwood et al., *Bio/Technology* 10: 1446 (1992). The rate of release of an immunoconjugate or antibody from such a matrix depends upon the molecular weight of the immunoconjugate or antibody, the amount of immunoconjugate, antibody within the matrix, and the size of dispersed particles. Saltzman et al., *Biophys. J.* 55: 163 (1989); Sherwood et al., supra. Other solid dosage forms are described in Ansel et al. PHARMACEUTICAL DOSAGE FORMS AND DRUG DELIVERY SYSTEMS, 5th Edition (Lea & Febiger 1990), and Gennaro (ed.), REMINGTON'S PHARMACEUTICAL SCIENCES, 18th Edition (Mack Publishing Company 1990), and revised editions thereof.

The immunoconjugate, antibody fusion proteins, or naked antibody may also be administered to a mammal subcutaneously or even by other parenteral routes. Moreover, the administration may be by continuous infusion or by single or multiple boluses. Preferably, the antibody of the present invention is infused over a period of less than about 4 hours, and more preferably, over a period of less than about 3 hours. This is preferably performed by infusing slowly at first. For example, a dose of 25 to 50 mg is infused within 15-30 minutes and the remainder of the dose is infused over a period of up to 2-3 hrs. In general, the dosage of an administered immunoconjugate, fusion protein or naked antibody for humans will vary depending upon such factors as the patient's age, weight, height, sex, general medical condition and previous medical history. Typically, it is desirable to provide the recipient with a dosage of immunoconjugate, antibody fusion protein or naked antibody that is in the range of from about 1 mg/kg to 20 mg/kg as a single intravenous infusion, although a lower or higher dosage also may be administered as circumstances dictate. Therefore, 1-20 mg/kg for a 70 kg patient, for example, is a dose of 70-1,400 mg, or 41-824 mg/m$^2$ for a 1.7-m patient. This dosage may be repeated as needed, for example, once per week for 4-10 weeks, preferably once per week for 8 weeks, and more preferably, once per week for 4 weeks. It may also be given less frequently, such as every other week for several months. More specifically, an antibody of the present invention, such as naked anti-CD20, may be administered as one dosage every 2 or 3 weeks repeated for a total of at least 3 dosages. Also preferred, the antibodies of the present invention may be administered once per week for 4-8 weeks. In other words, if the dosage is lowered to approximately 200-300 mg/m$^2$ (which is 340 mg per dosage for a 1.7-m patient, or 4.9 mg/kg for a 70 kg patient), it may be administered once weekly for 4 to 8 weeks. Alternatively, the dosage schedule may be decreased, namely every 2 or 3 weeks for 2-3 months; for example, if the dosage is 300-500 mg/m$^2$ (i.e., 510-850 mg for a 1.7-m patient, or 7.3-12 mg/kg for a 70 kg patient). The dosing schedule can optionally be repeated at other intervals and dosage may be given through various parenteral routes, with appropriate adjustment of the dose and schedule.

For purposes of therapy, the immunoconjugate, fusion protein, or naked antibody is administered to a mammal in a therapeutically effective amount. A suitable subject for the present invention are usually a human, although a non-human animal subject is also contemplated. An antibody preparation is said to be administered in a "therapeutically effective amount" if the amount administered is physiologically significant. An agent is physiologically significant if its presence results in a detectable change in the physiology of a recipient mammal. In particular, an antibody preparation of the present invention is physiologically significant if its presence invokes an antitumor response or mitigates the signs and symptoms of an autoimmune disease state. A physiologically significant effect could also be the evocation of a humoral and/or cellular immune response in the recipient mammal.

11. Methods Of Treatment

The present invention contemplates the use of naked anti-CD20 antibodies of the present invention as the primary composition for treatment of B cell disorders and other diseases. In particular, the compositions described herein are particularly useful for treatment of various autoimmune as well as indolent forms of B-cell lymphomas, aggressive forms of B-cell lymphomas, chronic lymphatic leukemias, acute lymphatic leukemias, and Waldenstrom's macroglobulinemia. For example, the humanized anti-CD20 antibody components and immunoconjugates can be used to treat both indolent and aggressive forms of non-Hodgkin's lymphoma.

The compositions for treatment contain at least one humanized, chimeric or human monoclonal anti-CD20 antibody alone or in combination with other antibodies, such as other humanized, chimeric, or human antibodies, therapeutic agents or immunomodulators. In particular, combination therapy with a fully human antibody is also contemplated and is produced by the methods as set forth above.

Naked or conjugated antibodies to the same or different epitope or antigen may be also be combined with one or more of the antibodies of the present invention. For example, a humanized, chimeric or human naked anti-CD20 antibody may be combined with another naked humanized, naked chimeric or naked human anti-CD20, a humanized, chimeric or human naked anti-CD20 antibody may be combined with an anti-CD20 immunoconjugate, a naked anti-CD20 antibody may be combined with an anti-CD22 radioconjugate or an anti-CD22 naked antibody may be combined with a humanized, chimeric or human anti-CD20 antibody conjugated to an isotope, or one or more chemotherapeutic agents, cytokines, toxins or a combination thereof. A fusion protein of a humanized, chimeric or human CD20 antibody and a toxin or immunomodulator, or a fusion protein of at least two different B-cell antibodies (e.g., a CD20 and a CD22 MAb) may also be used in this invention. Many different antibody combinations, targeting at least two different antigens associated with B-cell disorders, as listed already above, may be constructed, either as naked antibodies or as partly naked and partly conjugated with a therapeutic agent or immunomodulator, or merely in combination with another therapeutic agents, such as a cytotoxic drug or with radiation.

As used herein, the term "immunomodulator" includes cytokines, stem cell growth factors, lymphotoxins, such as tumor necrosis factor (TNF), and hematopoietic factors, such as interleukins (e.g., interleukin-1 (IL-1), IL-2, IL-3, IL-6, IL-10, IL-12, IL-21 and IL-18), colony stimulating factors (e.g., granulocyte-colony stimulating factor (G-CSF) and granulocyte macrophage-colony stimulating factor (GM-CSF)), interferons (e.g., interferons-$\alpha$, -$\beta$ and -$\gamma$), the stem cell growth factor designated "S1 factor," erythropoietin and thrombopoietin. Examples of suitable immunomodulator moieties include IL-2, IL-6, IL-10, IL-12, IL-18, IL-21, interferon-$\gamma$, TNF-$\alpha$, and the like. Alternatively, subjects can receive naked anti-CD20 antibodies and a separately administered cytokine, which can be administered before concurrently or after administration of the naked anti-CD20 antibodies. As discussed supra, the anti-CD20 antibody may also be conjugated to the immunomodulator. The immunomodulator may also be conjugated to a hybrid antibody consisting of one or more antibodies binding to different antigens.

Multimodal therapies of the present invention further include immunotherapy with naked anti-CD20 antibodies supplemented with administration of anti-CD22, anti-CD19, anti-CD21, anti-CD74, anti-CD80, anti-CD23, anti-CD46 or HLA-DR (including the invariant chain) antibodies in the form of naked antibodies fusion proteins, or as immunoconjugates. The naked anti-CD20 antibodies or fragments thereof may also be supplemented with naked antibodies against a MUC1 antigen that is expressed on certain B-cells. These antibodies include polyclonal, monoclonal, chimeric, human or humanized antibodies that recognize at least one epitope on these antigenic determinants. Anti-CD19 and anti-CD22 antibodies are known to those of skill in the art. See, for example, Ghetie et al., Cancer Res. 48:2610 (1988); Hekman et al., *Cancer Immunol. Immunother.* 32:364 (1991); Longo, Curr. Opin. Oncol. 8:353 (1996) and U.S. Pat. Nos. 5,798,554 and 6,187,287, incorporated in their entirety by reference.

In another form of multimodal therapy, subjects receive naked anti-CD20 antibodies, and/or immunoconjugates, in conjunction with standard cancer chemotherapy. For example, "CVB" (1.5 g/m$^2$ cyclophosphamide, 200-400 mg/m$^2$ etoposide, and 150-200 mg/m$^2$ carmustine) is a regimen used to treat non-Hodgkin's lymphoma. Patti et al., *Eur. J. Haematol.* 51: 18 (1993). Other suitable combination chemotherapeutic regimens are well-known to those of skill in the art. See, for example, Freedman et al., "Non-Hodgkin's Lymphomas," in CANCER MEDICINE, VOLUME 2, 3rd Edition, Holland et al. (eds.), pages 2028-2068 (Lea & Febiger 1993). As an illustration, first generation chemotherapeutic regimens for treatment of intermediate-grade non-Hodgkin's lymphoma (NHL) include C-MOPP (cyclophosphamide, vincristine, procarbazine and prednisone) and CHOP (cyclophosphamide, doxorubicin, vincristine, and prednisone). A useful second generation chemotherapeutic regimen is m-BACOD (methotrexate, bleomycin, doxorubicin, cyclophosphamide, vincristine, dexamethasone and leucovorin), while a suitable third generation regimen is MACOP-B (methotrexate, doxorubicin cyclophosphamide, vincristine, prednisone, bleomycin and leucovorin). Additional useful drugs include phenyl butyrate and brostatin-1. In a preferred multimodal therapy, both chemotherapeutic drugs and cytokines are co-administered with an antibody, immunoconjugate or fusion protein according to the present invention. The cytokines, chemotherapeutic drugs and antibody or immunoconjugate can be administered in any order, or together.

In a preferred embodiment, NHL or the autoimmune disease is treated with 4 weekly infusions of the humanized anti-CD20 antibody at a does of 200-400 mg/m$^2$ weekly for 4 consecutive weeks (iv over 2-6 hours), repeated as needed over the next months/yrs. Preferably, the humanized anti-CD-20 antibody is administered at a dose of 200-300 mg/m$^2$ once every other week or every third week, for 4 to 8 injections. Also preferred, NHL is treated with 4 weekly infusions as above, or injections less frequently as above, but combined with epratuzumAb (anti-CD22 humanized antibody) on the same days, at a dose of 360 mg/m$^2$, given as iv infusion over 1 hour, either before, during or after the anti-CD20 monoclonal antibody infusion. Or, the antibodies used in combination therapy may also be infused in alternative sequences, such that they are alternated on different weeks, resulting in each being given every other week for a total injection sequence for each of 4 to 8 or more doses. These dosage schedules can then be repeated at different intervals, such as every 3-6 months, depending on the patient's clinical status and response to each therapy regimen. Still preferred, NHL is treated with 4 weekly infusions, or less frequent infusions, of the anti-CD20 antibody as above, combined with one or more injections of CD22 MAb radiolabeled with a therapeutic isotope such as yttrium-90 (at a total dose of Y-90 between 5 and 35 mCi/meter-square as one or more injections over a period of weeks or months). U.S. Ser. No. 09/590,284 (Goldenberg et al.) discloses immunotherapy of autoimmune disorders using an anti-CD22 antibody, which is incorporated herein by reference in its entirety.

In addition, a therapeutic composition of the present invention can contain a mixture or hybrid molecules of monoclonal naked anti-CD20 antibodies directed to different, non-blocking CD20 epitopes. Accordingly, the present invention contemplates therapeutic compositions comprising a mixture of monoclonal anti-CD20 antibodies that bind at least two CD20 epitopes. Additionally, the therapeutic composition described herein may contain a mixture of anti-CD20 antibodies with varying CDR sequences.

Although naked anti-CD20 antibodies are the primary therapeutic compositions for treatment of B cell lymphoma and autoimmune diseases, the efficacy of such antibody therapy can be enhanced by supplementing the naked antibodies with supplemental agents, such as immunomodulators, like interferons, including IFNɑ, IFNβ and IFNγ, interleukins including IL-1, IL-2, IL-6, IL-12, IL-15, IL-18, IL-21, and cytokines including G-CSF and GM-CSF. Accordingly, the CD20 antibodies can be combined not only with antibodies and cytokines, either as mixtures (given separately or in some predetermined dosing regiment) or as conjugates or fusion proteins to the anti-CD20 antibody, but also can be given as a combination with drugs. For example, the anti-CD20 antibody may be combined with CHOP as a 4-drug chemotherapy regimen. Additionally a naked anti-CD20 antibody may be combined with a naked anti-CD22 antibodies and CHOP or fludarabine as a drug combination for NHL therapy. Immunotherapy of B-cell malignancies using an anti-CD22 antibody is described in U.S. Pat. No. 6,183,744 (Goldenberg et al.) and U.S. Ser. No. 09/307,816 (Goldenberg et al.), which are incorporated herein by reference in their entirety. The supplemental therapeutic compositions can be administered before concurrently or after administration of the anti-CD20 antibodies.

As discussed supra, the antibodies of the present invention can be used for treating B cell lymphoma and leukemia, and other B cell diseases or disorders. For example, anti-CD20 antibodies can be used to treat B-cell related autoimmune diseases, including Class III autoimmune diseases such as immune-mediated thrombocytopenias, such as acute idiopathic thrombocytopenic purpura and chronic idiopathic thrombocytopenic purpura, dermatomyositis, Sjögren's syndrome, multiple sclerosis, Sydenham's chorea, myasthenia gravis, systemic lupus erythematosus lupus nephritis, rheumatic fever, rheumatoid arthritis, polyglandular syndromes bullous pemphigoid, diabetes mellitus, Henoch-Schonlein purpura, post-streptococcal nephritis, erythema nodosum, Takayasu's arteritis, Addison's disease, rheumatoid arthritis, sarcoidosis, ulcerative colitis, erythema multiforme, IgA nephropathy, polyarteritis nodosa, ankylosing spondylitis, Goodpasture's syndrome, thromboangitis ubiterans, primary biliary cirrhosis, Hashimoto's thyroiditis, thyrotoxicosis scleroderma, chronic active hepatitis, polymyositis/dermatomyositis, polychondritis pamphigus vulgaris, Wegener's granulomatosis, membranous nephropathy, amyotrophic lateral sclerosis, tabes dorsalis, giant cell arteritis/polymyalgia, pernicious anemia, rapidly progressive glomerulonephritis and fibrosing alveolitis.

Anti-CD20 antibodies may also induce apoptosis in cells expressing the CD20 antigen. Evidence of this induction is supported in the literature. For example, it was demonstrated that apoptosis could be induced using lymphoid cells that have Fc-receptors reactive with the IgG1-Fc of CD20 MAbs that crosslinked. See Shan et al., *Cancer Immunol. Immunother.* 48(12):673-683 (2000). Further, it was reported that aggregates of a chimeric CD20 MAb, i.e., homopolymers, induced apoptosis. See Ghetie et al., Blood 97(5): 1392-1398 (2000) and Ghetie et al., Proc. Natl. Acad. Sci. USA 94(14): 7509-7514 (1997).

Antibodies specific to the CD20 surface antigen of B cells can be injected into a mammalian subject, which then bind to the CD20 cell surface antigen of both normal and malignant B cells. A mammalian subject includes humans and domestic animals, including pets, such as dogs and cats. The anti-CD20 mAbs of the present invention, i.e., humanized, chimeric, human, caninized and felinized, and even murine anti-CD20 mAbs, can be used to treat the non-human mammalian subjects when there is a species crossreactivity for the CD20 antigen. See Examples 10 and 11, below. The murine mAbs, which are immunogenic in humans, are usually less immunogenic in non-human mammalian subjects. The anti-CD20 antibody bound to the CD20 surface antigen leads to the destruction and depletion of neoplastic B cells. Because both normal and malignant B cells express the CD20 antigen, the anti-CD20 antibody will result in B cell death. However, only normal B cells will repopulate and the malignant B cells will be eradicated or significantly reduced. Additionally, chemical agents or radioactive labels having the potential to destroy the tumor can be conjugated to the anti-CD20 antibody such that the agent is specifically targeted to the neoplastic B cells.

12. Expression Vectors

The DNA sequence encoding a humanized, chimeric or human anti-CD20 MAb can be recombinantly engineered into a variety of known host vectors that provide for replication of the nucleic acid. These vectors can be designed, using known methods, to contain the elements necessary for directing transcription, translation, or both, of the nucleic acid in a cell to which it is delivered. Known methodology can be used to generate expression constructs the have a protein-coding sequence operably linked with appropriate transcriptional/translational control signals. These methods include in vitro recombinant DNA techniques and synthetic techniques. For example, see Sambrook et al., 1989, MOLECULAR CLONING: A LABORATORY MANUAL, Cold Spring Harbor Laboratory (New York); Ausubel et al., 1997, CURRENT PROTOCOLS IN MOLECULAR BIOLOGY, John Wiley & Sons (New York). Also provided for in this invention is the delivery of a polynucleotide not associated with a vector.

Vectors suitable for use in the instant invention can be viral or non-viral. Particular examples of viral vectors include adenovirus, AAV, herpes simplex virus lentivirus, and retrovirus vectors. An example of a non-viral vector is a plasmid. In a preferred embodiment, the vector is a plasmid.

An expression vector, as described herein, is a polynucleotide comprising a gene that is expressed in a host cell. Typically, gene expression is placed under the control of certain regulatory elements, including constitutive or inducible promoters, tissue-specific regulatory elements, and enhancers. Such a gene is said to be "operably linked to" the regulatory elements.

Preferably, the expression vector of the instant invention comprises the DNA sequence encoding a humanized, chimeric or human anti-CD20 MAb, which includes both the heavy and the light chain variable and constant regions. However two expression vectors may be used, with one comprising the heavy chain variable and constant regions and the other comprising the light chain variable and constant regions. Still preferred, the expression vector further comprises a promoter. Because any strong promoter can be used, a DNA sequence encoding a secretion signal peptide, a genomic sequence encoding a human IgG1 heavy chain constant region, an Ig enhancer element and at least one DNA sequence encoding a selection marker.

Also contemplated herein is a method for expressing a humanized anti-CD20 MAb, comprising (i) linearizing at least one expression vector comprising a DNA sequence encoding a humanized, chimeric, or human anti-CD20 MAb, (ii) transfecting mammalian cells with at least one of said linearized vector, (iii) selecting transfected cells which express a marker gene, and (iv) identifying the cells secreting the humanized anti-CD20 MAb from the transfected cells.

Figure 9:
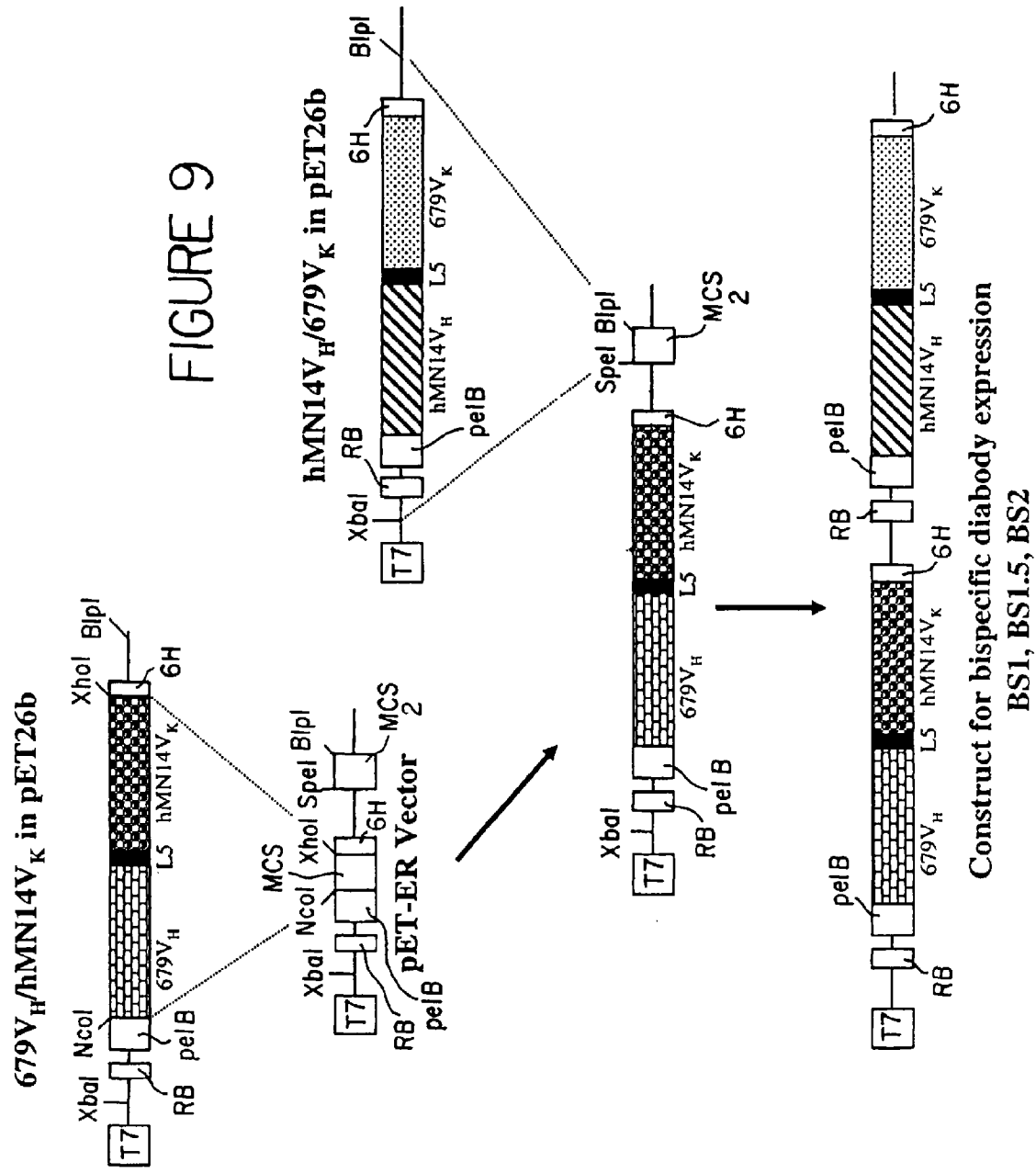
FIG. 9 shows a schematic representation of the steps involved in the generation of constructs used for expression of three 679xhMN14 bispecific diabody variants represented by BS1, BS1.5 and BS2. The '6H' is disclosed as SEQ ID NO: 2.

Di-cistronic expression vectors for 679xhMN14 were constructed through a series of sub-cloning procedures outlined in FIGS. 8 and 9 and described in Example 6. The di-cistronic expression cassette for bispecific hMN14x679 diabody is shown schematically in FIG. 10. The expression cassette may be contained in a plasmid, which is a small, double-stranded DNA forming an extra-chromosomal self-replicating genetic element in many bacteria and some eukaryotes and is widely used in genetic engineering as a cloning vector. A cloning vector is a DNA molecule that can replicate on its own in a microbial host cell. This invention describes a vector that expresses bispecific diabodies. A host cell accepts a vector for reproduction and the vector replicates each time the host cell divides. A commonly used host cell is Escherichia Coli (E. Coli), however, other host cells are available.

When the di-cistronic cassette as shown in FIG. 10 is expressed in E. coli, some of the polypeptides fold and spontaneously form soluble bispecific diabodies. The bispecific diabody shown in FIG. 10 forms one binding site having high affinity for HSG and one binding site having high affinity for CEA.

In this instance, the carboxyl terminal end of the $V_H$ segment of the 679 MAb is connected to the amino terminal end of the $V_K$ segment of the hMN14 MAb by a five amino acid residue linker, and the carboxyl terminal end of the $V_H$ segment of the hMN14 MAb is connected to the amino terminal end of the $V_K$ segment of the 679 MAb by the same five amino acid residue linker. Three variants of 679xhMN14 bispecific diabodies have been produced and tested. BS1 is composed of the wild-type sequences for both 679 and hMN14 variable regions. BS1.5 incorporates the $679V_H$ I3Q mutation. BS2 incorporates both the $679V_H$ I3Q and the $679V_K$ C101S mutations. The DNA coding sequences and the corresponding encoded amino acids for the two polypeptides of BS1, BS1.5, and BS2 are contained in FIGS. 30 & 31, 32 & 33, and 34 & 35 (Seq IDs), respectively. Additionally, a bispecific diabody of h679xhMN14 has been constructed and named BS1.5H (See FIGS. 37 & 38).

The ultimate use of these 679xhMN14 bispecific diabodies is for pre-targeting CEA positive tumors for subsequent specific delivery of therapeutic radioisotopes carried by HSG containing peptides. These diabodies bind selectively to targeted antigens and when combined with a bivalent di-HSG hapten allow for increased affinity and a longer residence time at the desired location. Moreover, non-antigen bound diabodies are cleared from the body quickly and exposure of normal tissues is minimized.

13. Methods Of Making Anti-CD20 Antibodies

In general, the $V_K$ (variable light chain) and $V_H$ (variable heavy chain) sequences for an anti-CD20 MAb can be obtained by a variety of molecular cloning procedures, such as RT-PCR, 5'-RACE, and cDNA library screening. Specifically, the V genes of an anti-CD20 MAb can be cloned by PCR amplification from a cell that expresses a murine or chimeric anti-CD20 MAb, sequenced. To confirm their authenticity, the cloned $V_L$ and $V_H$ genes can be expressed in cell culture as a chimeric Ab as described by Orlandi et al., (*Proc. Natl. Acad. Sci., USA*, 86: 3833 (1989)) which is incorporated by reference. Based on the V gene sequences, a humanized anti-CD20 MAb can then be designed and constructed as described by Leung et al. (*Mol. Immunol.*, 32: 1413 (1995)), which is incorporated by reference. cDNA can be prepared from any known hybridoma line or transfected cell line producing a murine or chimeric anti-CD20 MAb by general molecular cloning techniques (Sambrook et al., Molecular Cloning, A laboratory manual, $2^{nd}$ Ed (1989)). The $V_K$ sequence for the MAb may be amplified using the primers VK1 BACK and VK1 FOR (Orlandi et al., 1989) or the extended primer set described by Leung et al. (*BioTechniques*, 15: 286 (1993)), which is incorporated by reference, while $V_H$ sequences can be amplified using the primer pair VH1 BACK/VH1 FOR (Orlandi et al., 1989 above), or the primers annealing to the constant region of murine IgG described by Leung et al. (Hybridoma, 13:469 (1994)), which is incorporated by reference. The PCR reaction mixtures containing 10 µl of the first strand cDNA product, 10 µl of 10×PCR buffer [500 mM KCl, 100 mM Tris-HCl (pH 8.3), 15 mM $MgCl_2$, and 0.01% (w/v) gelatin] (Perkin Elmer Cetus, Norwalk, Conn.), 250 µM of each dNTP, 200 nM of the primers, and 5 units of Taq DNA polymerase (Perkin Elmer Cetus) can be subjected to 30 cycles of PCR. Each PCR cycle preferably consists of denaturation at 94° C. for 1 min, annealing at 50° C. for 1.5 min, and polymerization at 72° C. for 1.5 min. Amplified $V_K$ and $V_H$ fragments can be purified on 2% agarose (BioRad, Richmond, Calif.). Similarly, the humanized V genes can be constructed by a combination of long oligonucleotide template syntheses and PCR amplification as described by Leung et al. (*Mol. Immunol.*, 32: 1413 (1995)). See Example 3 for a method for the synthesis of an oligo A and an oligo B on an automated RNA/DNA synthesizer (Applied Biosystems, foster City, Calif.) for use in constructing humanized V genes.

PCR products for $V_K$ can be subcloned into a staging vector, such as a pBR327-based staging vector, VKPBR, that contains an Ig promoter, a signal peptide sequence and convenient restriction sites to facilitate in-frame ligation of the $V_K$ PCR products. PCR products for $V_H$ can be subcloned into a similar staging vector, such as the pBluescript-based VHPBS. Individual clones containing the respective PCR products may be sequenced by, for example, the method of Sanger et al. (*Proc. Natl. Acad. Sci., USA*, 74: 5463 (1977)), which is incorporated by reference.

The DNA sequences described herein are to be taken as including all alleles, mutants and variants thereof, whether occurring naturally or induced.

The expression cassettes containing the $V_K$ and VH, together with the promoter and signal peptide sequences can be excised from VKPBR and VHPBS, respectively, by double restriction digestion as HindIII-BamHI fragments. The $V_K$ and VH expression cassettes can then be ligated into appropriate expression vectors, such as pKh and pglg, respectively (Leung et al., Hybridoma, 13:469 (1994)). The expression vectors can be co-transfected into an appropriate cell, e.g., myeloma Sp2/0-Ag14 (ATCC, VA), colonies selected for hygromycin resistance, and supernatant fluids monitored for production of a chimeric or humanized anti-CD20MAb by, for example, an ELISA assay, as described below. Alternately, the $V_K$ and VH expression cassettes can be assembled in the modified staging vectors, VKpBR2 and VHpBS2, excised as XbaI/BamHI and XhoI/BamHI fragments, respectively, and subcloned into a single expression vector, such as pdHL2, as described by Gilles et al. (*J. Immunol. Methods* 125:191 (1989) and also shown in Losman et al., Cancer, 80:2660 (1997)) for the expression in Sp2/0-Ag14 cells.

Another vector that is useful in the present invention is the GS vector, as described in Barnes et al., *Cytotechnology* 32:109-123 (2000), which is preferably expressed in the NS0 cell line and CHO cells. Other appropriate mammalian expression systems are described in Werner et al. Arzneim.-Forsch./Drug Res. 48(II), Nr. 8, 870-880 (1998).

Co-transfection and assay for antibody secreting clones by ELISA, can be carried out as follows. About 10 µg of VKpKh (light chain expression vector) and 20 µg of VHpG1g (heavy chain expression vector) can be used for the transfection of $5×10^6$ SP2/0 myeloma cells by electroporation (BioRad, Richmond, Calif.) according to Co et al., *J. Immunol.*, 148: 1149 (1992) which is incorporated by reference. Following transfection, cells may be grown in 96-well microtiter plates in complete HSFM medium (Life Technologies, Inc., Grand Island, N.Y.) at 37° C., 5% $CO_2$. The selection process can be initiated after two days by the addition of hygromycin selection medium (Calbiochem, San Diego, Calif.) at a final concentration of 500 units/ml of hygromycin. Colonies typically emerge 2-3 weeks post-electroporation. The cultures can then be expanded for further analysis.

Transfectoma clones that are positive for the secretion of chimeric or humanized heavy chain can be identified by ELISA assay. Briefly, supernatant samples (~100 µl) from transfectoma cultures are added in triplicate to ELISA microtiter plates precoated with goat anti-human (GAH)-IgG, F(ab')$_2$ fragment-specific antibody (Jackson ImmunoResearch, West Grove, Pa.). Plates are incubated for 1 h at room temperature. Unbound proteins are removed by washing three times with wash buffer (PBS containing 0.05% polysorbate 20). Horseradish peroxidase (HRP) conjugated GAH-IgG, Fc fragment-specific antibodies (Jackson ImmunoResearch) are added to the wells, (100 µl of antibody stock diluted×$10^4$, supplemented with the unconjugated antibody to a final concentration of 1.0 µg/ml). Following an incubation of 1 h, the plates are washed, typically three times. A reaction solution, [100 µl, containing 167 µg of orthophenylene-diamine (OPD) (Sigma, St. Louis, Mo.), 0.025% hydrogen peroxide in PBS], is added to the wells. Color is allowed to develop in the dark for 30 minutes. The reaction is stopped by the addition of 50 µl of 4 N HCl solution into each well before measuring absorbance at 490 nm in an automated ELISA reader (Bio-Tek instruments, Winooski, Vt.). Bound chimeric antibodies are than determined relative to an irrelevant chimeric antibody standard (obtainable from Scotgen, Ltd., Edinburg, Scotland).

Antibodies can be isolated from cell culture media as follows. Transfectoma cultures are adapted to serum-free medium. For production of chimeric antibody, cells are grown as a 500 ml culture in roller bottles using HSFM. Cultures are centrifuged and the supernatant filtered through a 0.2µ membrane. The filtered medium is passed through a protein A column (1×3 cm) at a flow rate of 1 ml/min. The resin is then washed with about 10 column volumes of PBS and protein A-bound antibody is eluted from the column with 0.1 M glycine buffer (pH 3.5) containing 10 mM EDTA. Fractions of 1.0 ml are collected in tubes containing 10 µl of 3 M Tris (pH 8.6), and protein concentrations determined from the absorbance at 280/260 nm. Peak fractions are pooled, dialyzed against PBS, and the antibody concentrated, for example, with the Centricon 30 (Amicon, Beverly, Mass.). The antibody concentration is determined by ELISA, as before, and its concentration adjusted to about 1 mg/ml using PBS. Sodium azide, 0.01% (w/v), is conveniently added to the sample as preservative.

The following are the nucleotide sequences of the primers used to prepare the anti-CD20 antibodies:

```
hA20VKA                                      (SEQ ID NO: 16)
5'-CATCTCTGAG CGCATCTGTT GGAGATAGGG TCACTATGAC

TTGTAGGGCC AGCTCAAGTG TAAGTTACAT CCACTGGTTC

CAGCAGAAAC CAGGGAAAGC ACCTAAACCC TGGATTTATG-3' hA20VKB                                      (SEQ ID NO: 17)
5'-GGTGTCCCTG TCCGATTCTC TGGCAGCGGA TCTGGGACAG

ATTACACTTT CACCATCAGC TCTCTTCAAC CAGAAGACAT

TGCAACATAT TATTGTCAGC AGTGGACTAG TAACCCACCC

ACGTTCGGTG-3' hA20VKA-Backward                             (SEQ ID NO: 18)
5'-CAGCTGACCC AGTCTCCATC ATCTCTGAGC GCATCTGTTG-3' hA20VKA-Forward                              (SEQ ID NO: 19)
5'-AGGTTCGAAG TGGCATAAAT CCAGGGTTTA GGTGCT-3' hA20VKB Backward                             (SEQ ID NO: 20)
5'-CACTTCGAAC CTGGCTTCTG GTGTCCCTGT CCGATTCTC-3' hA20VKB Forward                              (SEQ ID NO: 21)
5'-ACGTTAGATC TCCAGCTTGG TCCCTCCACC GAACGTGGGT

GGGTTA-3' hA20VHA                                      (SEQ ID NO: 22)
5'-CTGAAGTCAA GAAACCTGGG TCATCGGTGA AGGTCTCCTG

CAAGGCTTCT GGCTACACCT TTACTAGTTA CAATATGCAC

TGGGTCAAGC AGGCACCTGG ACAGGGTCTG GAATGGATTG G-3' hA20VHB                                      (SEQ ID NO: 23)
5'-ATCAGAAGTT CAAGGGTAAA GCCACACTGA CTGCCGACGA

ATCCACCAAT ACAGCCTACA TGGAGCTGAG CAGCCTGAGG

TCTGAGGACA CGGCATTTTA TTACTGTGCA AGATCGACTT

ACTACGGCGG TGACTGGTAC TTCGATGTCT G-3' hA20VHA Backward                             (SEQ ID NO: 24)
5'-CAGCTGCAGC AATCAGGGGC TGAAGTCAAG AAACCTGGG-3' hA20VHA Forward                              (SEQ ID NO: 25)
5'-TTCCGGGATA AATAGCTCCA ATCCATTCCA GACCCTG-3' hA20VHB Backward                             (SEQ ID NO: 26)
5'-ATCCCGGAAA TGGTGATACT TCCTACAATC AGAAGTTCAA

GGGTAAAGCC A-3' hA20VHB Forward                              (SEQ ID NO: 27)
5'-GGAGACGGTG ACCGTGGTGC CTTGGCCCCA GACATCGAAG

TACCAG-3' hA20VH2A                                     (SEQ ID NO: 28)
5'-CTGAAGTCAA GAAACCTGGG TCATCAGTGA AGGTCTCCTG

CAAGGCTTCT GGCTACACCT TTAGTAGTTA CAATATGCAC

TGGGTCAGAC AGGCACCTGG ACAGGGTCTG GAATGGATGG G-3' hA20VH2B                                     (SEQ ID NO: 29)
5'-ATCAGAAGTT CAAGGGTAGA GCCACAATAA CTGCCGACGA

ATCCACCAAT ACAGCCTACA TGGAGCTGAG CAGCCTGAGG

TCTGAGGACA CGGCATTTTA TTTTTGTGCA AGATCGACTT

ACTACGGCGG TGACTGGTAC TTCGATGTCT G-3' hA20VH2A Forward                             (SEQ ID NO: 30)
5'-TTCCGGGATA AATAGCTCCC ATCCATTCCA GACCCTG-3' hA20VH2B Backward                            (SEQ ID NO: 31)
5'-ATCCCGGAAA TGGTGATACT TCCTACAATC AGAAGTTCAA

GGGTAGAGCC A-3'
```

The invention is further described by reference to the following examples, which are provided for illustration only. The invention is not limited to the examples but rather includes all variations that are evident from the teachings provided herein.

EXAMPLES

Example 1

Construction of a Humanized Anti-CD20 Antibody

Figure 41:
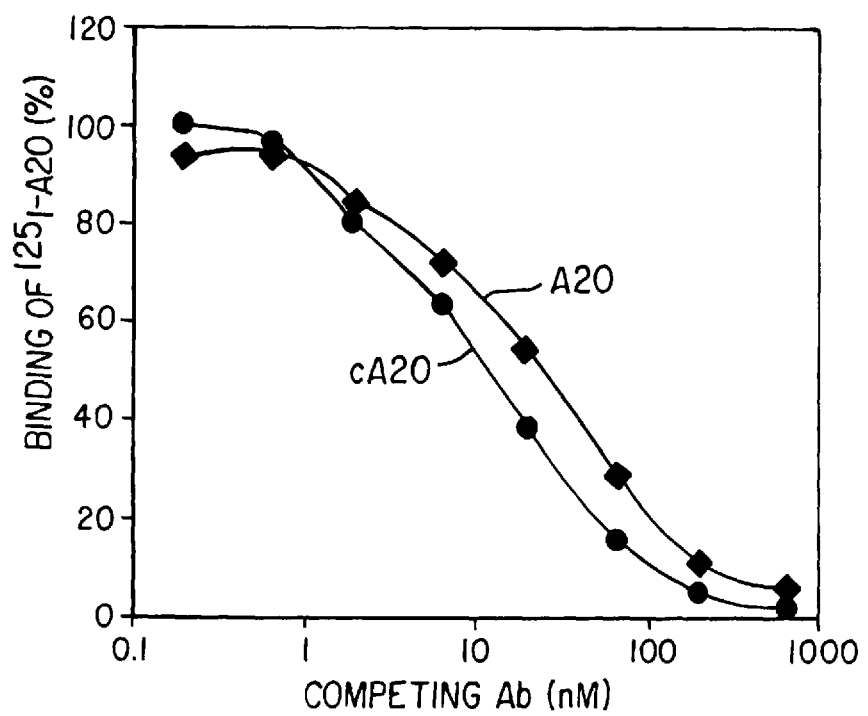
FIG. 41 shows a comparison of the binding affinities of the chimeric A20 (cA20), and murine A20, (A20), in a cell surface competitive binding assay against $^{125}$I-labled A20. Increasing concentrations of cA20 blocked the binding of radiolabeled A20 to Raji cells (as depicted by closed circles) in a comparable manner as that of murine A20 (depicted by closed diamonds).

The $V_H$ and $V_K$ genes of A20, an anti-CD20 antibody, was obtained by RT-PCR using the primer pairs VH1BACK/VH1FOR and VK1BACK/VK1FOR, respectively Orlandi et al., (*Proc. Natl. Acad. Sci., USA*, 86: 3833 (1989)). Multiple independent clones were sequenced to eliminate possible errors resulting from the PCR reaction. The cloned murine $V_H$ and $V_K$ sequences as the final PCR product were designated A20Vk (FIG. 39A) and A20$V_H$ (FIG. 39B), respectively. A chimeric A20 (cA20) antibody was constructed and expressed in Sp2/0 cell. The Vk and $V_H$ of sequences of cA20 are shown in FIG. 40. The cA20 antibody bound to Raji cell and competed with radiolabeled A20 purified from the hybridoma cell culture supernatant (FIG. 41). This result confirmed the authenticity of the cloned V genes.

A single light chain and two heavy chain variable region sequences encoding the humanized anti-hCD20 (hA20) antibody were designed and constructed. Human REI framework sequences were used for $V_K$ (FIG. 39A), and a combination of EU and NEWM framework sequences were used for $V_H$ (FIG. 39B). There are a number of amino acid changes in each chain outside of the CDR regions when compared to the starting human antibody frameworks. The heavy chain of hA20, hA20$V_H$1, contains nine changes, while hA20$V_H$2 contains three changes from the human EU frameworks (FIG. 42A). hA20$V_H$2 is preferred because it contains more amino acids from the human antibody framework region than hA20$V_H$1. The light chain of hA20, hA20$V_K$, contains seven amino acid changes from the REI framework (FIG. 42B).

Example 2

Method of hA20 Antibody Construction

Each variable chain was constructed in two parts, a 5'- and 3'-half designated as "A" and "B" respectively. Each half was produced by PCR amplification of a single strand synthetic oligonucleotide template with two short flanking primers, using Taq polymerase. The amplified fragments were first cloned into the pCR4TA cloning vector from Invitrogen (Carlsbad, Calif.) and subjected to DNA sequencing. The templates and primer pairs are listed as follows:

| Template | Primers |
|----------|---------|
| VKA | VkA-Backward/VkA-Forward |
| VKB | VkB-Backward/VkB-Forward |
| VH1A | VHA-Backward/VH1A-Forward |
| VH1B | VH1B-Backward/VHB-Forward |
| VH2A | VHA-Backward/VH2A-Forward |
| VH2B | VH2B-Backward/VHB-Forward |

Light Chain

Figure 45A:
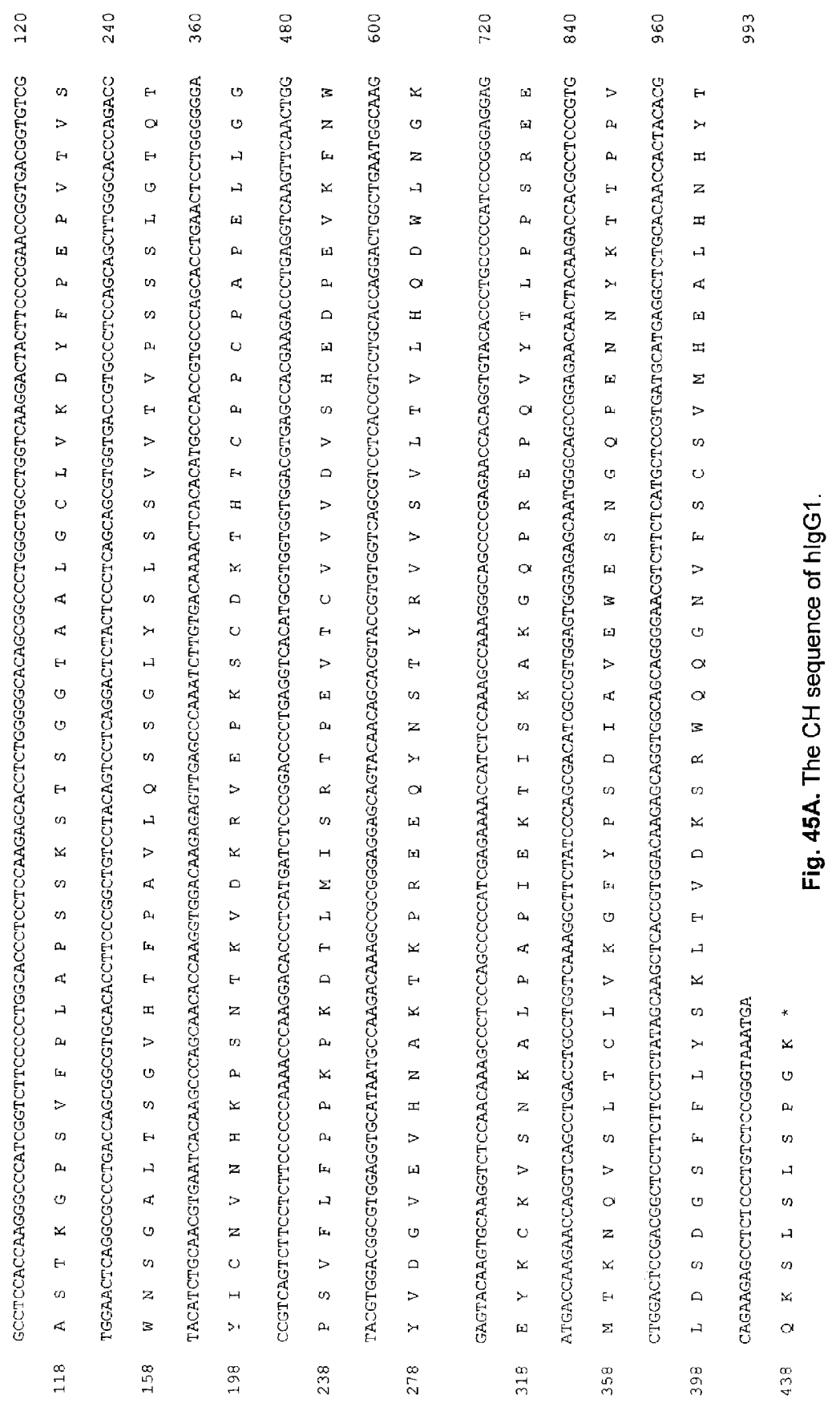

For constructing the full-length DNA of the humanized $V_K$ sequence, oligo hA20$V_K$A (120 mer) and hA20VKB (130 mer) were synthesized on an automated RNA/DNA synthesizer (Applied Biosystems). hA20VKA and B represent the nt 26-145 and 166-195, respectively, of the hA20 $V_K$. (See FIG. 43A) Oligo hA20$V_K$A and B were cleaved from the support and deprotected by treatment with concentrated ammonium hydroxide. After samples were vacuum-tried and resuspended in 100 µl of water, incomplete oligomers (less than 100-mer) were removed by centrifugation through a ChormaSpin-100 column (Clontech, Palo Alto, Calif.). All flanking primers were prepared similarly, except ChromaSpin-30 columns were used to remove synthesis by-products. 1 µl of ChromaSpin column purified hA20$V_K$A was PCR amplified in a reaction volume of 100 µl containing 10 µl of 10×PCR buffer [500 mM KCl, 100 mM Tris-HCl (pH 8.3), 15 mM MgCl$_2$, and 0.01% (w/v) gelatin] (Perkin Elmer Cetus, Norwalk, Conn.), 250 µM of each dNTP, 200 nM of VkA-Backward and VkA-Forward, and 5 units of Taq DNA polymerase (Perkin Elmer Cetus). This reaction mixture was subjected to 30 cycles of PCR reaction consisting of denaturation at 94° C. for 1 min, annealing at 50° C. for 1.5 min, and polymerization at 72° C. for 1.5 min. hA20$V_K$B was PCR-amplified by the primer pair VkB-Backward and VkB-Forward under similar condition. The amplified VKA and VKA fragments were purified on 2% agarose (BioRad, Richmond, Calif.). Unique restriction sites were designed at the ends of each fragment to facilitate joining through DNA ligation. The amplified VKA fragment contained a PvuII restriction site, CAGCTG, at its 5'-end and a BstBI restriction site, TTCGAA, at the 3'-end. The amplified VKB fragment contained a BstBI restriction site at its 5'-end and a BglII restriction site, AGATCT, at the 3'-end. Assembly of the full-length $V_K$ chain was accomplished by restriction enzyme digestion of each fragment with the appropriate 5'- and 3'-enzymes and ligation into the VKpBR2 vector previously digested with PvuII and BclI (BclI digested end is compatible with that of BglIII). The resulting ligated product contains the A fragment ligated to the PvuII site, the B fragment ligated to the BclI site, and the A and B fragments joined together at the BstBI site (FIG. 43A). VKpBR2 is a modified staging vector of VKPBR (Leung et al., Hybridoma, 13:469 (1994)), into which a XbaI restriction site was introduced at 14 bases upstream of the translation initiation codon. Upon confirmation of a correct open reading frame by DNA sequencing, the intact chain was removed from VKpBR2 as a XbaI to BamHI fragment and ligated into the pdHL2 expression vector. The vector containing only $V_K$ sequence was designated as hA20$V_K$pdHL2. pdHL2 contains the expression cassettes for both human IgG1 C1, C2, C3, and hinge regions (FIG. 45A) and the human kappa chain Ck (FIG. 45B) under the control of IgH enhancer and MT, promoter, as well as a mouse dhfr gene, controlled by a weak SV40 promotor, as a marker for selection of transfectants and co-amplification of the trans-genes (Gillies et al., J. Immunol. Methods 125:191 (1989); Losman et al., Cancer 80:2660 (1997)). By replacing the VK and VH segments of pdHL2, different chimeric or humanized Abs can be expressed.

Heavy Chain

For the construction of hA20VH1, oligo VH1A (121 mer) and VH1B (151 mer), representing the nt 23-143 and 179-329, respectively, (See FIG. 43B) were synthesized as described above. Similarly, for hA20VH2, oligo VH2A and VH2B were prepared. These oligos were PCR-amplified by their respective primer pairs as listed in Example 2. The same construction method as done for $V_K$ was carried out for both types of $V_H$, with the following modifications: the 5'-end restriction site of the A fragments was PstI (CTGCAG) and the 3'-end restriction site of B fragments was BstEII (GGTCACC). These fragments were joined together upon ligation into the VHpBS2 vector at a common NciI site (CCCGG), resulting in full-length $V_H$ sequences (FIGS. 43B and 43C) and confirmed by DNA sequencing. VHpBS2 is a modified staging vector of VHPBS (Leung et al., Hybridoma, 13:469 (1994)), into which a XhoI restriction site was introduced at 16 bases upstream of the translation initiation codon. The assembled $V_H$ genes were subcloned as XhoI-BamHI restriction fragments into the expression vector containing the $V_K$ sequence, hA20$V_K$pdHL2. Since the heavy chain region of pdHL2 lacks a BamHI restriction site, this ligation required use of the HNB linker to provide a bridge between the BamHI site of the variable chain and the HindIII site present in the pdHL2 vector. The resulting expression vectors were designated as hA20-1 pdHL2 and hA20-2pdHL2.

```
HNB linker                        (SEQ ID NO: 32)
5'-AGCT TGCGGCCGC-3'

(SEQ ID NO: 33)
3'-ACGCCGGCGCTAG-5'
```

Example 3

Transfection and Expression of hA20 Antibodies

Approximately 30 µg of the expression vectors for hA20 were linearized by digestion with SalI and transfected into Sp2/0-Ag14 cells by electroporation (450V and 25 pF). The transfected cells were plated into 96-well plates for 2 days and then selected for drug-resistance by adding MTX into the medium at a final concentration of 0.025 µM. MTX-resistant colonies emerged in the wells 2-3 weeks. Supernatants from colonies surviving selection were screened for human Ab secretion by ELISA assay. Briefly, 100 µl supernatants were added into the wells of a microtiter plate precoated with GAH-IgG, F(ab')$_2$ fragment-specific Ab and incubated for 1 h at room temperature. Unbound proteins were removed by washing three times with wash buffer (PBS containing 0.05% polysorbate 20). HRP-conjugated GAH-IgG, Fc fragment-specific Ab was added to the wells. Following an incubation of 1 h, the plate was washed. The bound HRP-conjugated Ab was revealed by reading A490 nm after the addition of a substrate solution containing 4 mM OPD and 0.04% H$_2$O$_2$. Positive cell clones were expanded and hA20-1 and hA20-2 were purified from cell culture supernatant by affinity chromatography on a Protein A column.

Example 4

Binding Activity of Anti-CD20 Antibodies

Figure 44A:
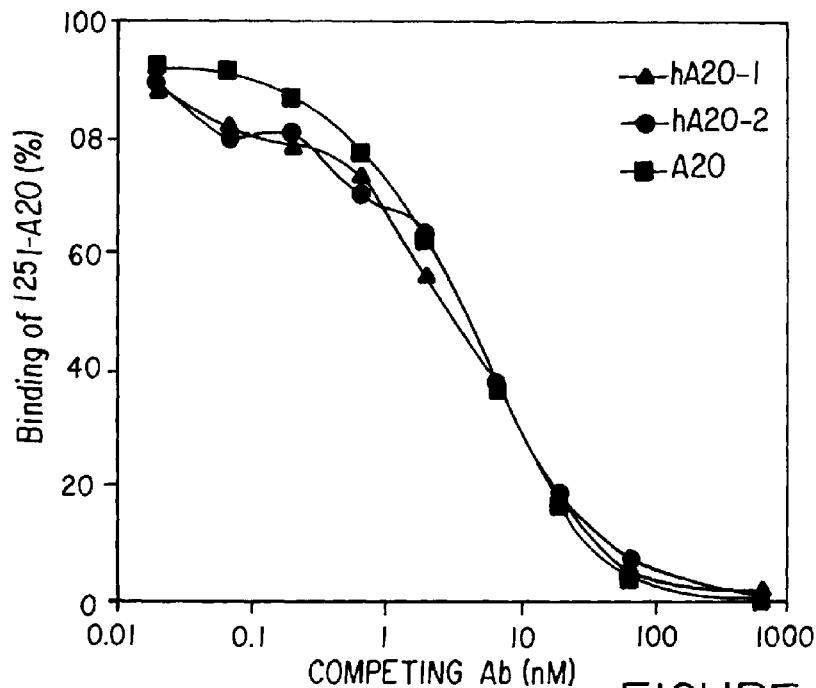
FIG. 44A shows hA20-1 (closed triangles) and hA20-2 (closed circles) and the murine anti-CD20 antibody, A20 (closed squares) competed equally well for the binding of $^{125}$I-A20 to Raji cells.
Figure 44B:
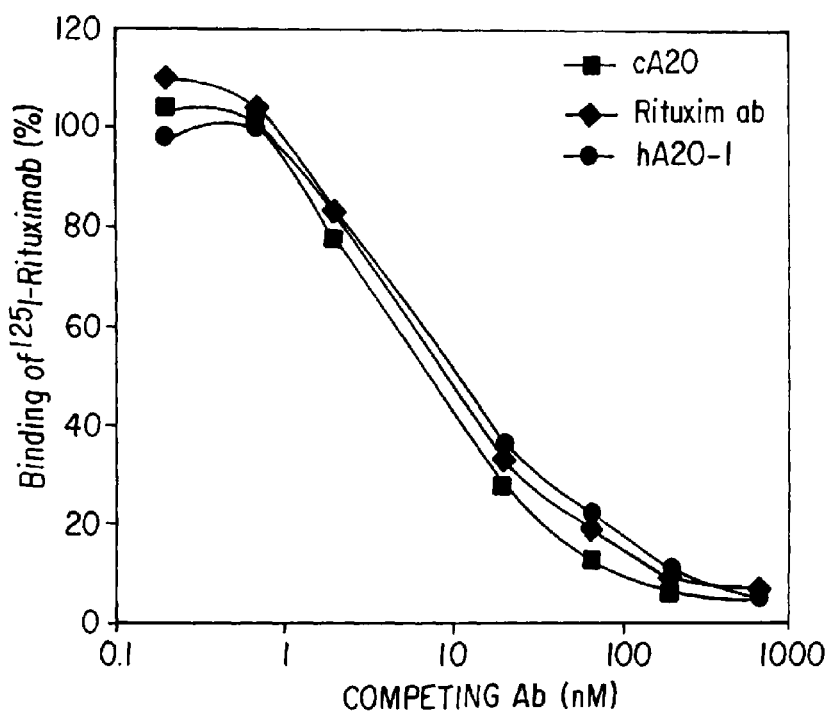
FIG. 44B shows hA20-1 (closed circles), cA20 (closed squares) and c2B8 (closed diamonds) competed equally well for the binding of $^{125}$I-c2B8 to Raji cells.

A competition cell-binding assay was carried out to assess the immunoreactivity of hA20 relative to the parent cA20 and the anti-CD20 Ab c2B8. A constant amount of $^{125}$I-labeled murine A20 or c2B8 (100,000 cpm, ~10 pCi/μg) was incubated with Raji cell in the presence of varying concentrations (0.2-700 nM) of hA20-1, -2, murine A20, cA20, or c2B8 at 4° C. for 1-2 h. Unbound Abs were removed by washing the cells in PBS. The radioactivity associated with cells was determined after washing. As shown in FIG. 44, both humanized A20 mAbs, hA20-1 and hA20-2, exhibited comparable binding activities as A20, the murine anti-CD20 MAb, cA20, and c2B8, a chimeric anti-CD20 MAb, when competing with binding of $^{125}$I-A20 or $^{125}$I-c2B8 to Raji cells.

By direct binding of radiolabeled Mabs to Raji cells and Scatchard plot anlaysis, the dissociation constants were measured to be 2.9 and 4.2 nm for cA20 and hA20, respectively, in comparison to 3.9 nM for C2B8. In vitro crosslinking experiments, using a goat anti-human IgG, Fc fragment specific antibody to complex with the antibodies showed similar killing of Raji NHL cells between cA20 and hA20 as well as C2B8.

Example 5

Treatment of a Patient with Relapsed Intermediate-Grade Non-Hodgkin's Lymphoma

A patient with intermediate grade non-Hodgkin's lymphoma has failed prior aggressive chemotherapy, consisting of CHOP×6, which led to a complete remission for four months, another course of CHOP×6, resulting in progression, D-MOPP×2, resulting in stable disease for three months, and CVB with peripheral stem cell transplantation, which led to a partial remission for five months. The patient presents with recurrent lymphoma in a neck lymph node, measurable by computerized tomography and palpation.

The patient is infused within 3 hrs with 450 mg of humanized CD20 monoclonal antibody A20 on days 0, 14, 28, and 42 with no serious adverse effects noted either during or immediately after the infusions. Eight weeks later, palpation of the neck node enlargement shows a measurable decrease of about 50%. Follow-up measurements made at twenty weeks post therapy show no evidence of the disease in the neck, and nowhere else, as confirmed by computed tomography studies of the body. Since new disease is not detected elsewhere, the patient is considered to be in complete remission. Follow-up studies every 10-12 weeks confirms a complete remission for at least ten months post therapy.

Example 6

Treatment of a Patient with Chronic Idiopathic Thrombocytopenia Purpura

A 45-year-old female with chronic idiopathic thrombocytopenia purpura has been treated with prednisone, gamma globulins, and high dose dexamethasone, but the disease progresses. She undergoes splenectomy, which fails to stabilize the disease. Her platelet count falls to less than 30,000/microliter, and hemorrhagic events increase in frequency. The patient is then treated with the humanized CD20A20 MAb, 500 mg intravenously on the first week, followed by a dose of 250 mg given once every other week for a total of 4 injections. Ten weeks after the last dose of A20 a marked increase in platelet number is observed, to 150,000/microliter, and the hemorrhagic events disappear. Five months after the last antibody infusion the disease is in remission.

Example 7

Treatment of a Patient with Progressive Rheumatoid Arthritis

A 70 year old female, with severe progressive rheumatoid arthritis of the finger joints, wrists, and elbows, has failed therapy with methotrexate, and obtains only minor relief when placed on Enbrel therapy. The patient is then treated with A20 humanized CD20 MAb, 300 mg intravenously each week, for a period of four weeks. After 3 months, a 40% improvement in measures of disease activity is observed, which is maintained for 5 months. The patient is again treated with A20, at the same dose and frequency. The patient continues to improve, and 6 months after the second A20 MAb therapy, a 60% improvement is observed. No human anti-A20 antibodies are observed at any time during, or after the A20 therapy. Although normal B-cells are depleted from the blood, no infectious complications, or other drug-related severe toxicity is observed.

Example 8

Treatment of a Patient with Myasthenia Gravis

A 65 year old male has failed all conventional therapy for myasthenia gravis, and is admitted to a neurological intensive therapy unit. The patient was stabilized by plasma exchange, and given intravenous immunoglobulin to reduce the titer of antiacetylcholine receptor antibody. The patient remained bedridden, and was then treated with A20 humanized CD20 MAb, 400 mg intravenously once every other week, for a period of ten weeks. One week after the last dose of A20, no blood B-cells were detectable, and a significant drop in the titer of the anti-acetylcholine antibody was observed. Four months after the last A20 MAb dose the patient was mobile, and was released from the hospital.

Example 9

Treatment of a Dog with Aggressive Non-Hodgkin's B-cell Lymphoma in Lymph Nodes and Bone Marrow A 65-pound, 7-year old male Golden Retriever is diagnosed with diffuse large cell aggressive lymphoma. The dog is placed on combination chemotherapy with vincristine, cyclophosphamide, prednisolone, and doxorubicin, with good response. However, the dog subsequently is characterized as having progressive lymphadenopathy, and seven months after this is found to have extensive lymphoma infiltration of bone marrow, extensive lymphoadenopathy of neck, chest, abdomen pelvis, and hepatosplenomegaly.

The dog is given therapy with 1F5 chimeric monoclonal antibody. The dog is infused intravenously with 120 mg of 1F5 antibody, and the treatment is repeated weekly for 4 weeks following this initial treatment. Four months after the final dose of 1F5, a computerized tomography scan of the patient shows no evidence of lymphoma, and all signs and symptoms of the disease were not evident.

Example 10

Treatment of a Dog with Relapsed Intermediate-Grade Non-Hodgkin's Lymphoma

A 78-pound, 9-year old, German Shepherd dog with intermediate grade non-Hodgkin's lymphoma receives chemotherapy, which initially leads to a complete remission for five months, followed by another course of chemotherapy which results in stable disease for six months. The dog then presents with recurrent lymphoma in the chest and in a neck lymph node, both measurable by computerized tomography and palpation, respectively.

The patient is infused with a $^{90}$Y-labeled immunoconjugate of L243 (HLA-DR) monoclonal antibody weekly for two weeks, at a radiation dose of 8 mCi in 50 mg of antibody protein, in combination with the A20 humanized CD20 antibody at a dose of 100 mg per each weekly infusion. Three weeks later, palpation of the neck node enlargement shows a measurable decrease, while a repeat computerized tomography scan of the chest shows a marked reduction in tumor. Follow-up measurements made at ten weeks post therapy show evidence of the disease in the neck or the chest being reduced by about 60 percent. Since new disease is not detected elsewhere, the patient is considered to be in partial remission. Follow-up studies every 10-12 weeks confirms a partial remission for at least 7 months post therapy.

Example 11

Treatment of a Cat with Relapsed Lymphoma

A 10-pound, 12-year-old, domestic short hair presents with enlargement of a single submandibular lymph node. After excision, there is recurrence of the lesion at 6 months. The lesion is again excised, but then reappears 6 months later. The cat is then given weekly treatments for 4 weeks with an $^{131}$I-labeled immunoconjugate of anti-CD20 B1 monoclonal antibody, at a radiation dose of 15 mCi in 45 mg antibody protein. The treatment is repeated 3 months later. When examined 3 months after the last treatment, a marked decrease can be palpated. No recurrence of the disease is observed for over one year.

Example 12

Evaluation of Chimeric and Humanized Anti-CD20 Mabs in Human NHL Cells in Culture or Xenografted in SCID Mice The properties of a chimeric (cA20) and humanized (hA20) CD20 antibody was assessed in NHL cell lines. The results demonstrate that cA20 and hA20 behave similarly to Rituximab, staining more than 99% of Raji, Ramos, RL, Daudi and Su-DHL-6 cells and reacting with approximately 5% of lymphocytes (expected % B-cells). In all B-cell lines, specific growth inhibition was seen with the Mabs, but the level of inhibition varied between the cell lines, with Su-DHL being the most sensitive. In the absence of cross-linking, murine anti-CD20, cA20, hA20 and rituximab all yielded between 77 and 90% inhibition. With cross-linking, inhibition of proliferataion ranged from 94-98%. Rituximab, cA20, and hA20 were also similar in their ability to induce apoptosis in Raji cells in the presence of a cross-linking second monoclonal antibody.

Figure 49:
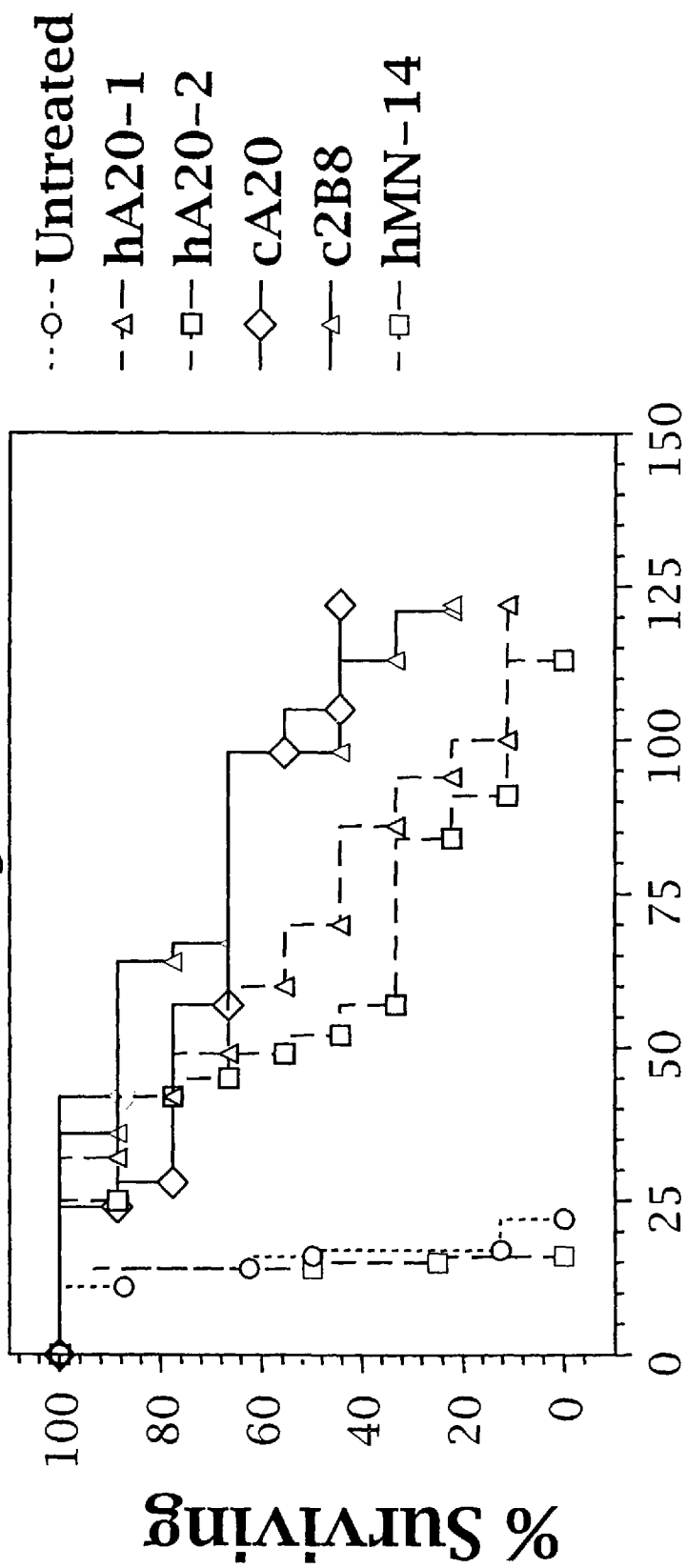
FIG. 49 is a graph of in vivo therapy studies with various anti-CD20 and other Abs. Raji cells administered i.v. to SCID mice, to create a Raji lymphoma model of disseminated disease.

Also, SCID mice were injected intravenously with 2.5X10$^6$ Raji cells on day 0. Injections of murine, chimeric and humanized anti-CD20 antibodies, and the cA20 F(ab')$_2$ fragment were initiated on day-1 with 100 µg/injection of intact antibody, or 67 µg/injection F(ab')$_2$ fragment, five times per week for two weeks, then twice weekly for three weeks. In one study, control mice died of disseminated disease with a median survivial time of 15 days post tumor innoculation, but median survival was extended to 38 days for cA20, 22.5 days for hA20, and 21 days for murine anti-CD20 treated mice (all statistically significant by log-rank analysis (p<0.005)). In another study, control mice died of disseminated disease manifested with CNS paralysis with a median survival time of 16.5 days post tumor innoculation, but median survival was extended to 105 days for cA20, 70 days for hA20, and 98 days for rituximab treated mice (all statistically significant extensions by log-rank analysis (p<0.0001), FIG. 49).

Example 13

Competitive Cell Surface Binding Assay

Figure 46A:
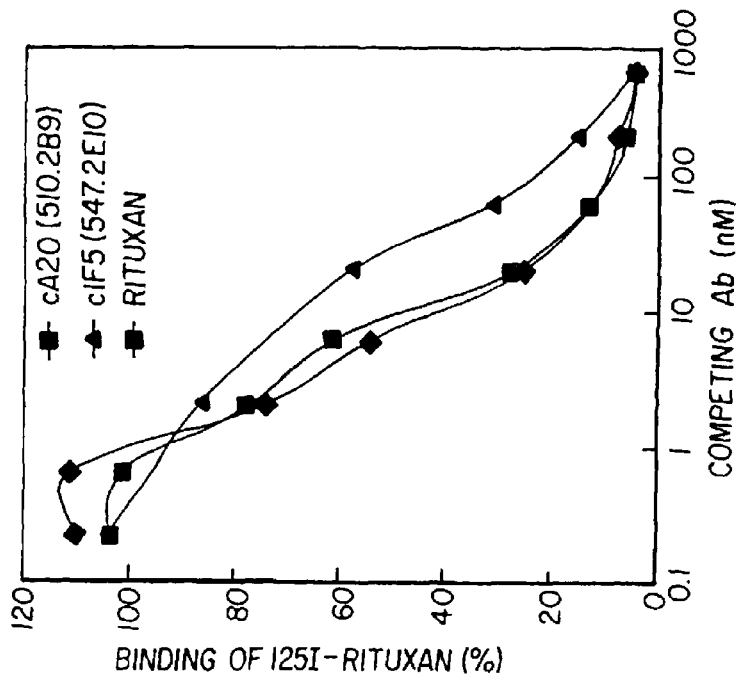
FIG. 46(A) is a comparison of the binding activities of cA20 (square), hA20-1 (triangle) and hA20-1 (circle) with that of m2B8 (diamond)
Figure 46B:
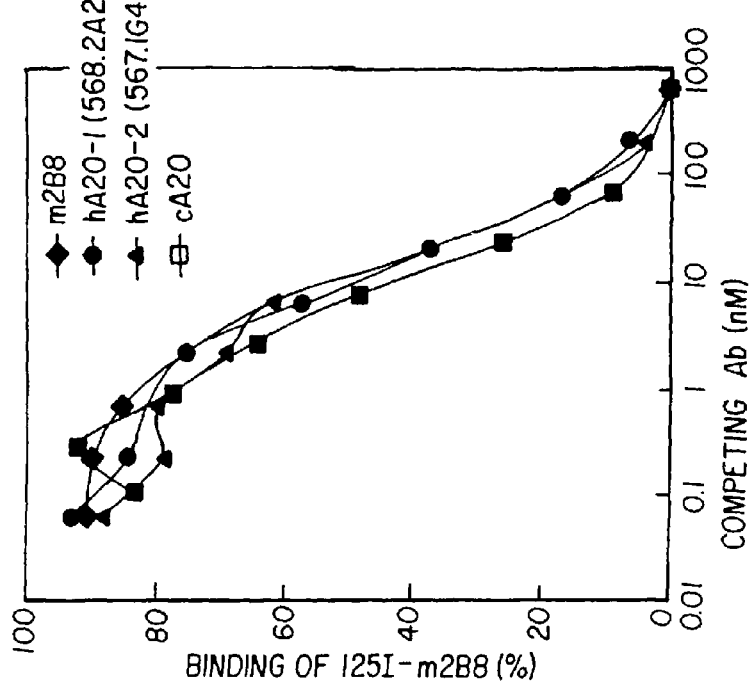
FIG. 46(B) compares of the binding activities of cA20 (square), c1F5 (triangle) and rituximab (diamond).
Figure 47:
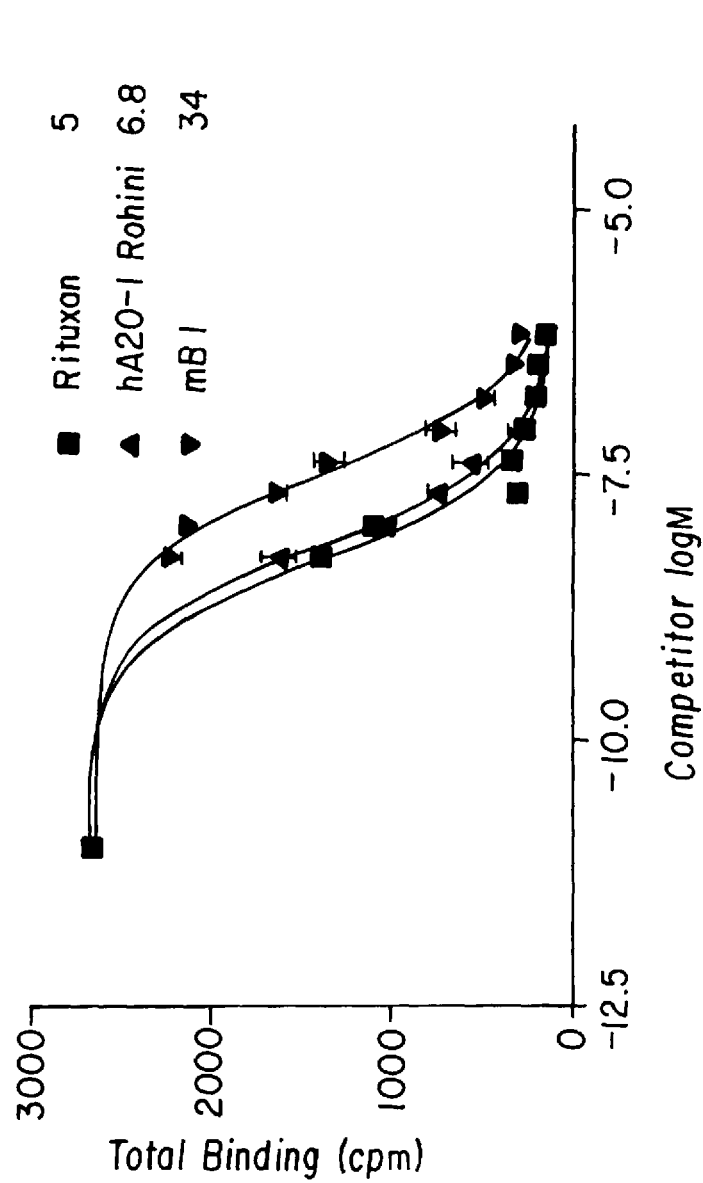
FIG. 47 is a study comparing the binding activities of hA20 with other anti-CD20 Abs, including rituximab and murine B1, by a cell surface competitive binding assay. A constant amount (100,000 cpm, ~10 iCi/ig) of $^{125}$I-labeled rituximab was incubated with Raji cells in the presence of varying concentrations (0.2-700 nM) of competing Abs, hA20 (triangle), mB1 (Downward triangle) or rituximab (square) at 4° C. for 1-2 h.

Ag-binding specificity and affinity studies of humanized anti-CD20 Abs (cA20, hA20, and c1F5), purified by affinity chromatography on a Protein A column) were evaluated by a cell surface competitive binding assay with murine 2B8 and rituximab (IDEC Pharmaceuticals Corp., San Diego, Calif.) (FIG. 46). Briefly, a constant amount (100,000 cpm, ~10 iCi/ig) of $^{125}$I-labeled (A) m2B8 or (B) rituximab was incubated with Raji cells in the presence of varying concentrations (0.2-700 nM) of competing Abs (cA20, hA20, m2B8, c1F5, or rituximab) at 4° C. for 1-2 h. Unbound Abs were removed by washing the cells with PBS. Radioactivity associated with the cells was determined after washing. FIG. 46(A) is a comparison of the binding activities of cA20 (square), hA20-1 (triangle) and hA20-1 (circle) with that of m2B8 (diamond); FIG. 46(B) Compares the binding activities of cA20 (square), c1F5 (triangle) and rituximab (diamond).

In another study, the binding activities of hA20 with other anti-CD20 Abs, rituximab and murine B1 were compared by a cell surface competitive binding assay (FIG. 9). Briefly, a constant amount (100,000 cpm, ~10 iCi/ig) of $^{125}$I-labeled rituximab was incubated with Raji cells in the presence of varying concentrations (0.2-700 nM) of competing Abs, hA20 (triangle), mB1 (Downward triangle) or rituximab (square) at 4° C. for 1-2 h. Unbound Abs were removed by washing the cells with PBS. Radioactivity associated with the cells was determined after washing. The IC$_{50}$ values for these three Abs were calculated to be 6.8, 34, and 5, respectively.

Example 14

Cytotoxic Effect of Crosslinked hA20 and Other CD20 Abs on Cultured Lymphoma Cells Raji cells were treated with various CD20 Abs in the presence of a crosslinker (an anti-human IgG, Fc fragment specific antibody) to complex the CD20 antibodies (FIG. 48). A final concentration of 5 ig/ml of hA20, cA20, rituximab, or a positive control Ab, hLL1, was incubated with Raji cells, with 20 µg/ml of the crosslinker (red), without the crosslinker (orange), or with an anti-mouse IgG, Fc fragment specific antibody (blue) for 48 h. Total cell and viable cell populations were measured by (A) trypan blue staining and cell counting or (B) MTT assay (B). The data show a similar effect of hA20 and rituximab on Raji NHL cell survival, and that the cytotoxic effect is dependent on the specific crosslinking of the antibodies.

Example 15

In Vivo Therapy with hA20 and hLL2

Figure 50:
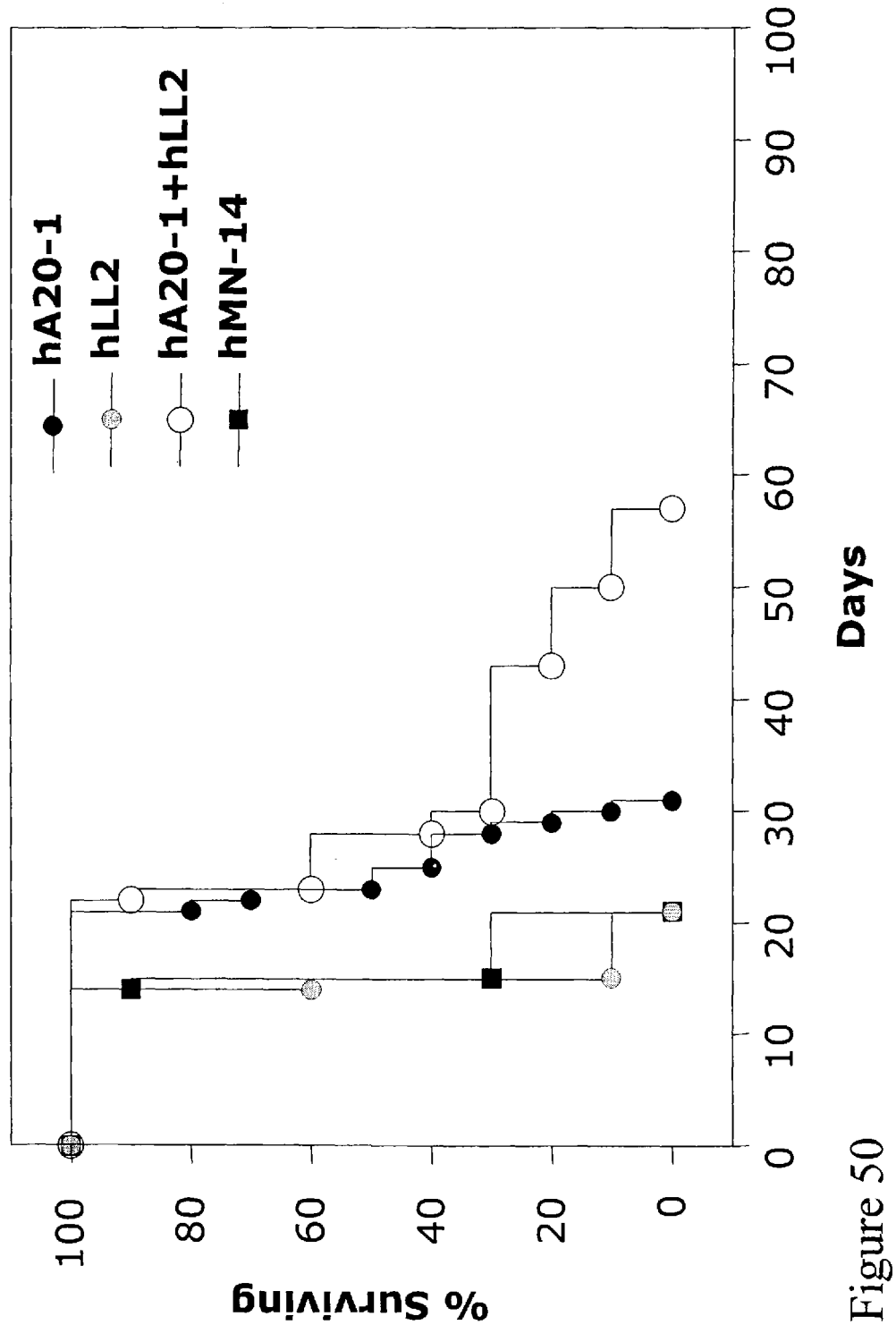
FIG. 50 is a graph depicting in vivo therapy with hA20 and hLL2. Raji cells administered i.v. to SCID mice, to create a Raji lymphoma model of disseminated disease.

Raji cells wer administered i.v. to 60 SCID mice, at 2.5× 10$^6$ cells/100 µl/mouse (FIG. 50). MAbs were administered i.p. on days 1 to 11, followed by MAb injections twice per week, for approximately 3 weeks. The body weight of the animals was measured weekly until the study was terminated. The animals were examined daily for paralysis of the hind legs. When paralysis occurred, the animals were sacrificed and necropsied for visual inspection of disseminated tumor nodules (specifically in lungs, kidneys, and ovaries). Control mice treated with a control humanized IgG1 Ab, hMN-14 (an anti-CEA antibody), died of disseminated disease manifested with CNS paralysis. The median survival time was 13 days post tumor i.v. inoculation. Median survival in the group treated with hA20 was extended to about 25 days. This value represents median survival increase of approximately 2 fold for hA20. Although the group treated with hLL2 alone showed the same median survival time compared to the control mice, treatment with combination of hA20 and hLL2 increased the median survival time of the mice to approximately 30 days.

Example 16

Construction of Plasmids for Expression of 679 Diabody in *E. coli*

Standard recombinant DNA methods were used to obtain 679-scFv-L5 as follows. A plasmid containing the $V_H$ sequence of 679 was used as the template for polymerase chain reaction (PCR) using Pfu polymerase and the two oligonucleotide primers specified below:

```
679 V_H-Left                              (SEQ ID NO: 34)
5'-TCAGCCATGGAAGTGATCCTGGTGGAGTCAGGGGGAGACT-3'

679V_H-Right (G_4S)                       (SEQ ID NO: 35)
5'-TGAGGATCCGCCACCTCCTGAGGAGACGGAGACCGTGGTC-3'
```

The left PCR primer contains a 5' NcoI restriction site. The right PCR primer contains the sequence for a 5 amino acid residue linker ($G_4S$) (SEQ ID NO: 1) and a BamHI restriction site. The PCR product was digested with NcoI and BamHI and ligated in frame with the pelB leader sequence into NcoI/BamHI digested pET-26b vector (Novagen) to generate 679V$_H$L5-pET26.

A plasmid containing the $V_K$ sequence of 679 was used as the template for PCR using Pfu polymerase and the two oligonucleotide primers specified below:

```
679 V_K-Left                              (SEQ ID NO: 36)
5'-CTGAGGATCCGACATTGTGATGTCACAATCT-3'

679V_K-Right                              (SEQ ID NO: 37)
5'-ATCCTCGAGCCGTTTCAGCTCCAGCTTGGT-3'
```

The left and right PCR primers contain BamHI and XhoI restriction sites respectively. The PCR product was digested with XhoI and BamHI and ligated (in frame with the 679V$_H$, $G_4S$ (SEQ ID NO: 1) linker, and 6His (SEQ ID NO: 2) sequences) into the XhoI/BamHI digested 679V$_H$L5-pET26 to generate the expression construct 679-scFv-L5. The DNA sequence of the inserted gene confirmed that the $V_H$ and $V_K$ sequences were identical to those of the original cDNA clones and the sequences of the ligation sites and linker regions were as designed. The gene construct, 679-scFv-L5, is illustrated in FIG. 1.

Example 17

Expression of 679 Diabody in *E. coli*

Competent *E. coli* BL21 (P-Lys-S) cells were transformed with 679-scFv-L5 by standard methods. Cultures were shaken in 2xYT media supplemented with 100 µg/ml kanamycin sulphate and 34 µg/ml chloramphenicol and grown at 37° C. to OD$_{600}$ of 1.6-1.8. An equal volume of room temperature 2xYT media supplemented with antibiotics and 0.8M sucrose was added to the cultures which were then transferred to 20° C. After 30 minutes at 20° C., expression was induced by the addition of 40 µM IPTG and continued at 20° C. for 15-18 hours.

The expression of 679 diabody was examined in (1) cell culture conditioned media, (2) soluble proteins extracted under non-denaturing conditions from the cell pellet following centrifugation, and (3) insoluble material remained in the pellet following several cycles of extraction and centrifugation.

Soluble proteins were extracted from bacterial cell pellets as follows. Pellets were frozen and thawed then re-suspended in lysis buffer (2% Triton-X 100; 300 mM NaCl; 10 mM imidazole; 5 mM MgSO$_4$; 25 units/ml benzonase; 50 mM NaH$_2$PO$_4$, pH 8.0) using an amount equal to 1% of the culture volume. The suspension was homogenized by sonication, clarified by centrifugation, and loaded onto Ni-NTA IMAC columns. After being washed with buffer containing 20 mM imidazole, the columns were eluted with 100 mM imidazole buffer (100 mM imidazole; 50 mM NaCl; 25 mM Tris, pH 7.5) and the eluate obtained was further purified on a Q-Sepharose column.

The insoluble material was solubilized in denaturing Ni-NTA binding buffer (8M urea; 10 mM imidazole; 0.1M NaH$_2$PO$_4$; 10 mM Tris, pH 8.0) and mixed with 1 ml of Ni-NTA agarose (Qiagen, inc.). The mixture was rocked at room temperature for 1 hour then the resin was washed once with 50 ml of the same buffer and loaded onto a column. The column was washed with 20 ml of the same buffer followed by 20 ml of wash buffer (8M urea; 20 mM imidazole; 0.1M NaH$_2$PO$_4$; 10 mM Tris, pH 8.0). Bound proteins were eluted with 5 ml of denaturing elution buffer (8M urea; 250 mM imidazole; 0.1M NaH$_2$PO$_4$; 10 mM Tris, pH 8.0).

Figure 2:
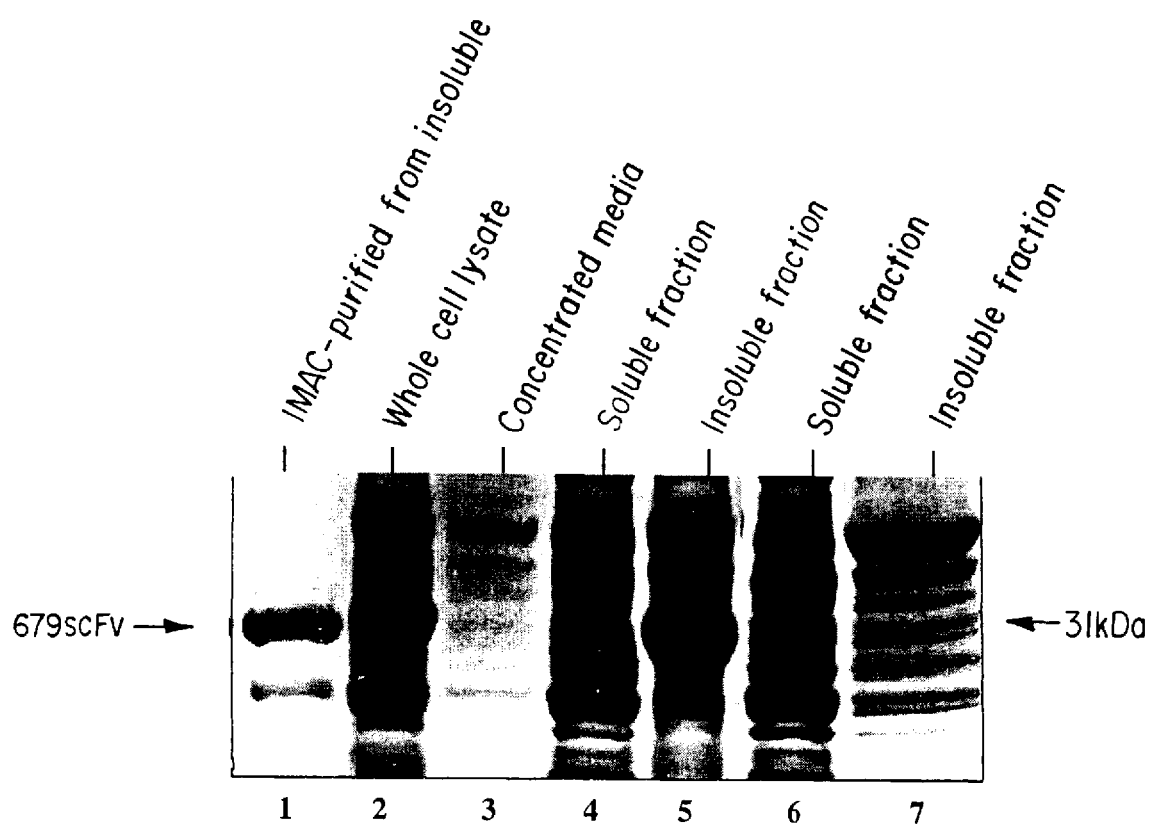
FIG. 2 shows a SDS-PAGE gel stained with Coomassie blue that is used to analyze the expression of 679 scFv from 679scFv-L5-transformed E. coli BL21 p-LysS cultures: lanes 1-5, induced with isopropyl-β-D-galactopyranoside (IPTG) overnight at 20° C.; lanes 6 and 7, not induced. In lane 3, the culture media was concentrated 10-fold. Soluble (lanes 4 and 6) and insoluble (lanes 5 and 7) proteins were fractionated by centrifugation of cell lysates (lane 2). 679scFv was purified from the insoluble fraction by Immobilized Metal Affinity Chromatography (IMAC) following solubilization in 8M urea (lane 1).

As shown by the results of reducing SDS-PAGE in FIG. 2, a robust induction was evident in the whole cell lysate (lane 2), which displayed a predominant band corresponding to a protein of approximately 28 kD (the predicted MW for 679 scFv). However, virtually all of the induced protein was present in the insoluble fraction (lane 5), and none was detected in the 10x concentrated culture media (lane 3). The induced protein was purified from the insoluble fraction following solubilization and elution of the bound material off a Ni-NTA column under denaturing conditions (lane 1). The soluble extract contained a trace amount of HSG-binding material, estimated to be about 1 ug per liter of culture by BIAcore analysis.

Example 18

679 Diabodies Formed from scFv Mutants

Two site-directed point mutations were made to increase the amount of 679 diabodies in soluble extracts. Specifically, converting residue 3 in the 679V$_H$ sequence from Ile to Gln (I3Q), or residue 101 in the 679V$_K$ sequence from Cys to Ser (C101S), or both (I3Q/C101S), resulted in at least a ten-fold increase in soluble expression levels. The mutations were introduced in synthetic oligonucleotides used for PCR. The $V_H$-I3Q mutation was incorporated in the oligonucleotide primer depicted below:

```
679V_H I3Q-Left                          (SEQ ID NO: 38)
5'-CCATGGAAGTGCAGCTGGTGGAGTCAGGG-3'
```

This primer was paired with 679$V_H$-Right (Example 16) to generate the $V_H$-I3Q mutant by PCR from 679-scFv-L5 template using Pfu polymerase.

The 679$V_K$-C101S mutation was incorporated in the oligonucleotide primer specified below:

```
679V_K C101S-Right                       (SEQ ID NO: 39)
5'-GCTCGAGCCGTTTCAGCTCCAGCTTGGTCCCAGCACCGAACGTG
CTC

AGATAATAAACTTGAG-3'
```

This primer was paired with 679-$V_K$ Left (Example 16) to generate 679$V_K$-C101S mutant by PCR from 679-scFv-L5 template using Pfu polymerase. The PCR products were cloned into pET26b following the same procedure as described above in Example 16.

Expression levels in the soluble fractions were estimated by BIAcore analysis using a HSG coupled sensor chip. The expression levels of I3Q, C101S, or I3Q/C101S mutant 679 diabody were about 10 ug/L as compared to about 1 ug/L for the wild type.

Example 19

Construction of Plasmids for Expression of hMN14 Diabody in E. Coli

Standard recombinant DNA methods were used to obtain hMN14-scFv-L5 as follows. The hMN14 $V_H$ and $V_K$ sequences were amplified from a vector constructed for expressing hMN14 Fab' (Leung et al., Cancer Research, Supp., 55, 5968s-5972s, 1995) by PCR with Pfu polymerase. The hMN14$V_H$ sequence was amplified using the oligonucleotide primers specified below:

```
hMN14V_H-Left                            (SEQ ID NO: 40)
5'-CGTACCATGGAGGTCCAACTGGTGGAGA-3' hMN14VH-Right (G4S)                      (SEQ ID NO: 41)
5'-CATAGGATCCACCGCCTCCGGAGACGGTGACCGGGGT-3'
```

The left PCR primer contains a 5' NcoI restriction site. The right PCR primer contains a sequence for a 5 amino acid residue linker (G$_4$S) (SEQ ID NO: 1) and a BamHI restriction site. The PCR product was digested with NcoI and BamHI and ligated, in frame with the pelB leader sequence, into NcoI/BamHI digested pET-26b vector to generate hMN14$V_H$L5-pET26. The hMN14$V_K$ sequence was amplified using the oligonucleotide primers specified below:

```
hMN14V_K-Left                            (SEQ ID NO: 42)
5'-CTGAGGATCCGACATCCAGCTGACCCAGAG-3' hMN14V_K-Right                           (SEQ ID NO: 43)
5'-GCTACTCGAGACGTTTGATTTCCACCTTGG-3'
```

The left and right PCR primers contain BamHI and XhoI restriction sites respectively. The PCR product was digested with XhoI and BamHI and ligated, in frame with the hMN14$V_H$, G$_4$S (SEQ ID NO: 1) linker and 6His (SEQ ID NO: 2) sequences, into the XhoI/BamHI digested hMN14$V_H$L5-pET26 construct to generate the expression construct hMN14-scFv-L5. The DNA sequence of this construct was verified by automated DNA sequencing. The gene construct, hMN14-scFv-L5, is illustrated in FIG. 3.

Example 20

Expression of hMN14 Diabody in E. coli

The hMN14-scFv-L5 construct was used to transform BL21(P-LysS) E. coli. Culture conditions, induction, and purification were carried out similar to those described for the 679 diabody in Example 16, except that the hMN14 diabody was purified by affinity chromatography, instead of Q-Sepharose anion exchange chromatography, via binding to an anti-id antibody immobilized on Affi-gel. Soluble proteins that bound and eluted from Ni-NTA resin were loaded on a W12 anti-idiotype affinity column. The column was washed with PBS and the product was eluted with 0.1M Glycine; 0.1M NaCl, pH 2.5 and neutralized immediately.

Figure 4A:
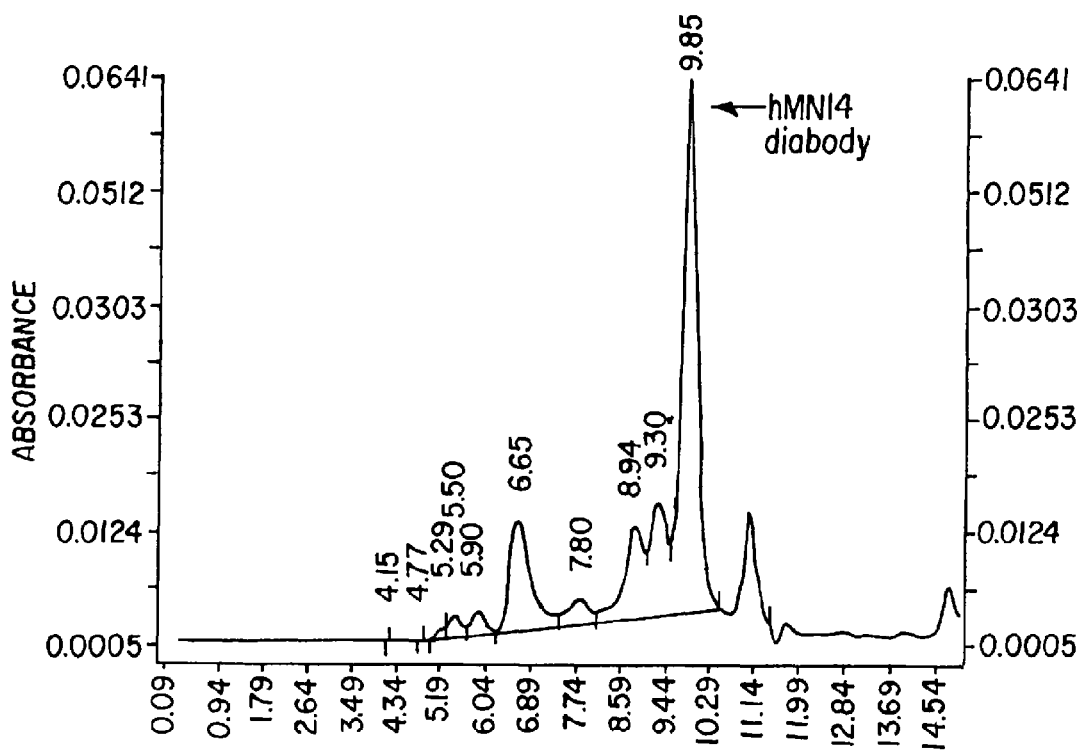
FIG. 4 shows size-exclusion High Performance Liquid Chromatography (HPLC) analysis of purified hMN14 diabody. Figure A is the HPLC elution profile of IMAC-purified hMN14 diabody. The HPLC elution peaks of hMN14 diabody in figures A and B are identified with an arrow. Figure B is the HPLC elution profile of hMN14 diabody purified by W12 anti-idiotype affinity chromatography. The *9.75 indicated on the x-axis of figure B is the HPLC retention time (9.75 min.) of control hMN14-Fab'-S-NEM (MW ~50 KDa).
Figure 4B:
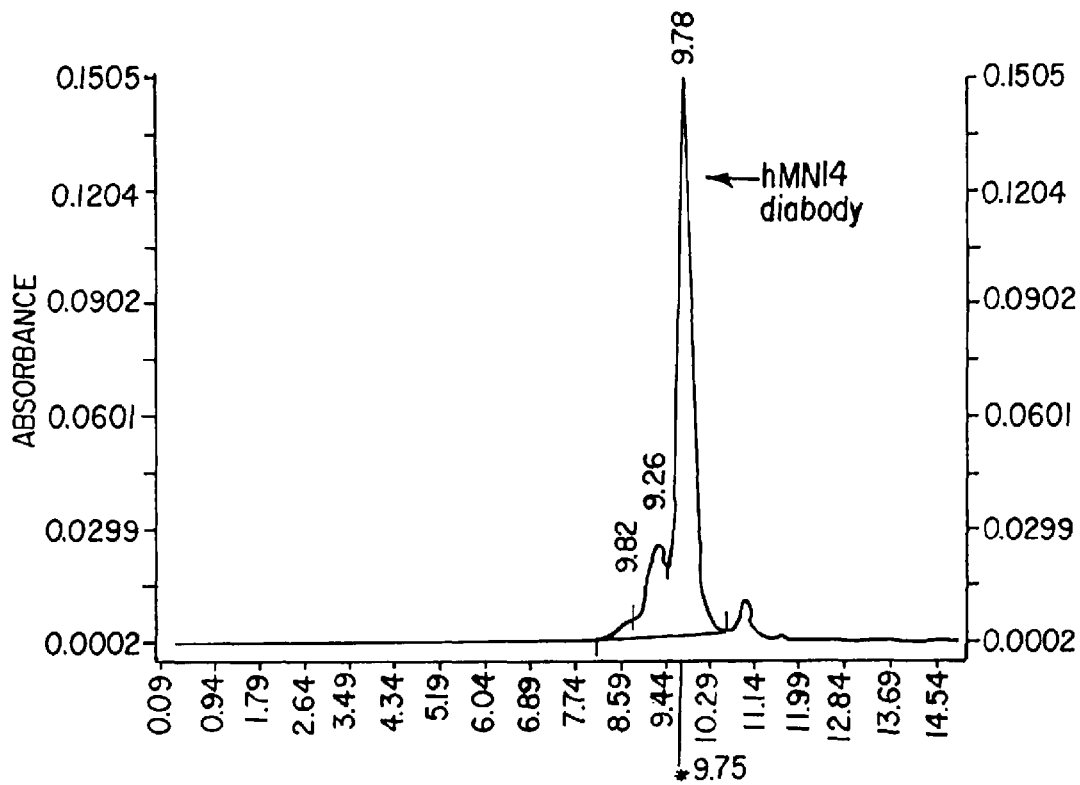
Figure 5A:
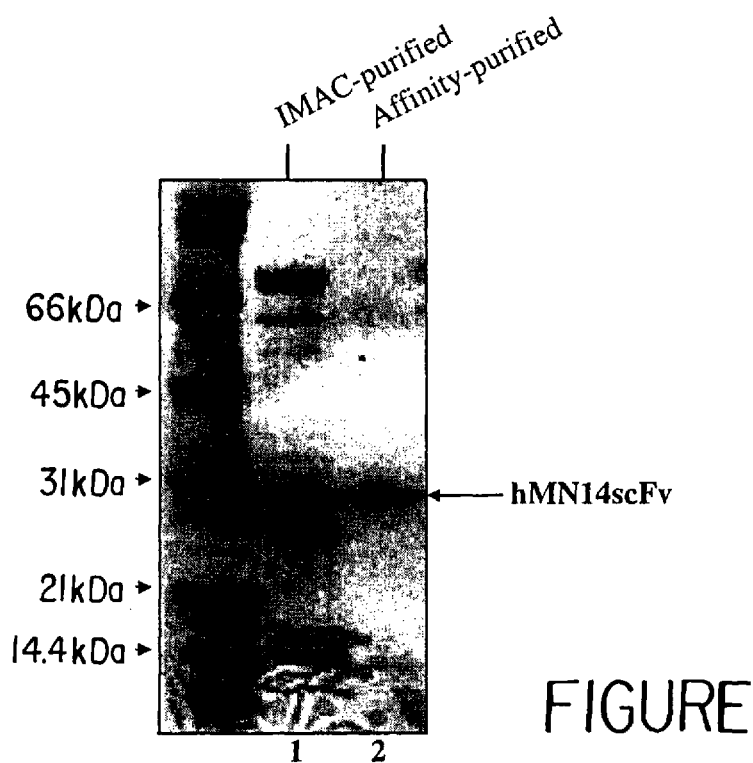
FIG. 5 shows reducing SDS-PAGE gel stained with Coomassie blue (figure A). The gel illustrates the purity of the hMN14 diabody samples following IMAC purification and W12 anti-idiotype affinity chromatography. The positions of the M$_r$ standards and the hMN14scFv polypeptide are indicated with arrows. Lane 1 of figure A contains IMAC-purified hMN14 diabody. Lane 2 of the same figure contains affinity purified hMN14 diabody. Figure B is an isoelectric focusing (IEF) gel. The positions of pI standards and hMN14 diabody are indicated with arrows. Lane 1 of Figure B contains the hMN14 Fab'-S-NEM used as a standard. Lane 2 of the same figure contains the W12 purified hMN14 diabody. Lane 3 contains the unbound flow through fraction from the W12 affinity column and shows the proteins that are removed by this process.
Figure 5B:
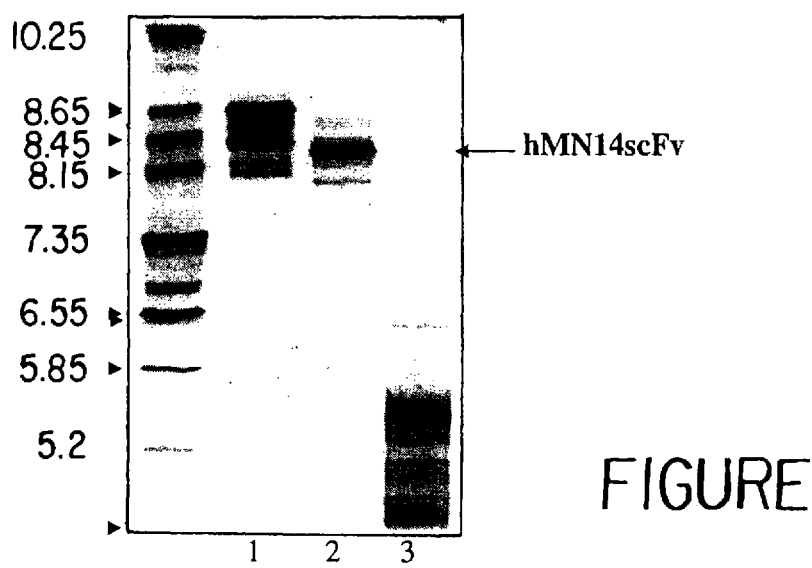

Although most of the hMN14scFv expressed was present as insoluble protein, approximately 1.5 mg/L culture of soluble hMN14scFv was purified from the soluble fraction. As shown by size-exclusion high performance liquid chromatography (HPLC), a predominant peak was observed in FIGS. 4A and 4B at 9.8 min for the IMAC purified as well as the affinity purified material. The retention time of hMN14 Fab', which has a molecular weight of approximately 50 kDa, was 9.75 minutes as indicated on the x-axis of FIG. 4B. The very similar retention time of hMN14scFv indicates that it exists in solution as a dimer or diabody since the calculated molecular weight of the monomeric hMN14scFv is 26 kDa. SDS-PAGE gel analysis in FIG. 5A shows a single band of the predicted $M_r$ at 26 kDa, and the isoelectric focusing (IEF) gel analysis in FIG. 5B yields a band with pI of 8.2, close to the calculated pI of 7.9. A competitive ELISA showed that the hMN14 diabody is functionally active and displays excellent binding properties.

Figure 6:
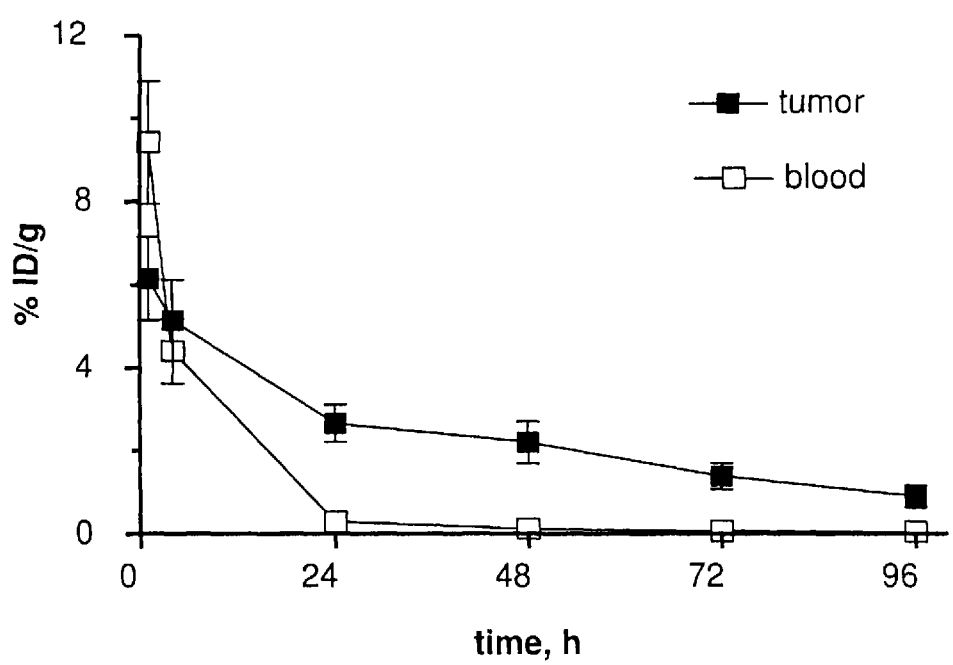
FIG. 6 shows the levels of $^{131}$I-hMN14 diabody observed in a tumor and the blood over the first 96 hours after injection of the diabody. The concentration of $^{131}$I-hMN14 diabody, measured as the percentage of the injected dose per gram of tissue (% ID/g), is plotted vs. time. Solid squares mark the data points for tumor samples and open boxes mark those of blood samples.
Figure 7:
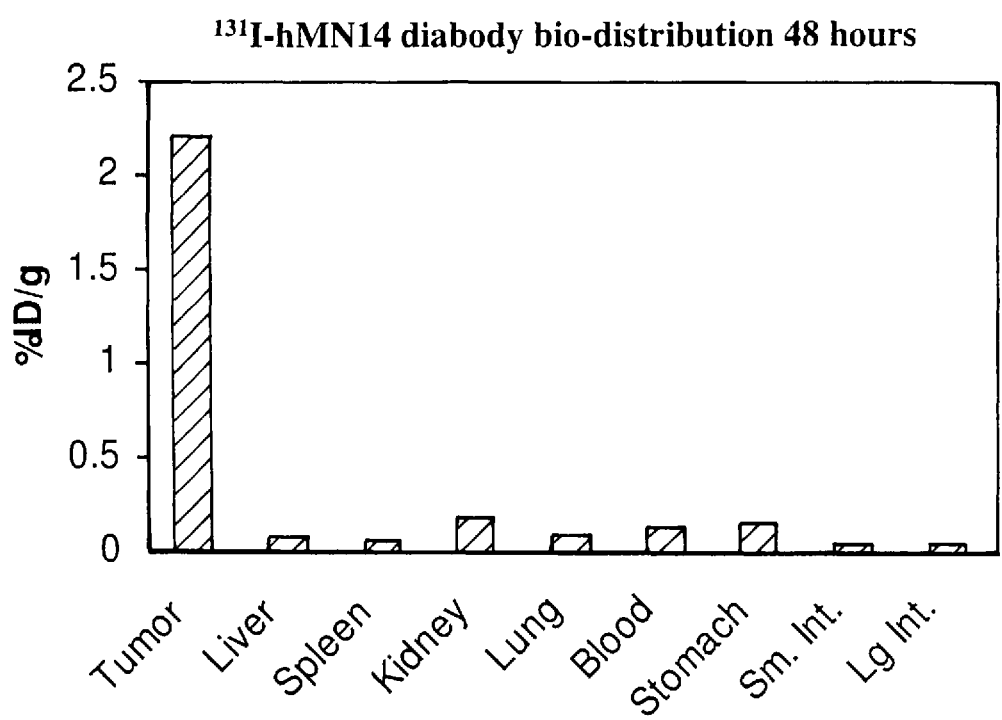
FIG. 7 shows the biodistribution of $^{131}$I-hMN14 diabody 48 hours after injection in tumors and normal tissues, including liver, spleen, kidney, lungs, blood, stomach, small intestine, and large intestine. The concentration of $^{131}$I-hMN14 diabody is displayed as the percentage of the injected dose per gram of tissue (% ID/g).

Nude mice bearing the CEA positive GW39 tumor were injected with 131I-labeled hMN14 diabody and the biodistribution was analyzed at various times post injection. While a significant amount of the diabody remained associated with the tumor for more than 96 hours, much of the free diabody cleared the blood rapidly as illustrated in FIG. 6. FIG. 7 shows the percentage of the injected dose that is associated with the tumor and with normal tissues, such as liver, spleen, kidney, lungs, blood, stomach, small intestine, and large intestine, at 48 hours after the injection. The amount of the injected dose in each normal tissue is very low when compared to the amount in the tumor. Table 1 summarizes the relative amounts of activity found in normal tissues compared to that in the tumor at 24, 48 and 72 hours.

TABLE 1

| | Tumor to non-tumor ratios | | |
|---|---|---|---|
| | 24 hrs | 48 hrs | 72 hrs |
| Tumor | 1.00 | 1.00 | 1.00 |
| Liver | 22.47 | 31.85 | 28.32 |
| Spleen | 25.41 | 39.51 | 41.03 |
| Kidney | 9.12 | 12.12 | 10.54 |
| Lung | 15.49 | 25.70 | 31.75 |
| Blood | 9.84 | 17.32 | 21.80 |
| Stomach | 9.98 | 17.50 | 23.13 |
| Sm. Int. | 37.23 | 65.60 | 50.58 |
| Lg. Int. | 35.87 | 66.54 | 45.66 |

Example 21

679×hMN14 Bispecific Diabody (BS1, BS1.5 and BS2)

Construction of PET-ER

Before proceeding to expression vectors that direct the synthesis of bispecific diabodies capable of binding to both HSG and CEA, a new vector (pET-ER) was generated by the addition of a multiple cloning site, MCS2, shown in FIG. 8A, into the pET-26b vector, shown in FIG. 8B. Two complimentary oligonucleotides were synthesized and phosphorylated with T4 polynucleotide kinase. The oligonucleotides were mixed in equal molar concentrations, heated to 95° C. then allowed to anneal as the mixture was slowly cooled to room temperature. The duplex structure, MCS2, was ligated into the Blpl restriction site of pET-26b to generate the pET-ER vector as illustrated in FIG. 8C. This vector facilitates the construction of di-cistronic expression cassettes and allows for stoichiometric expression of two heterologous polypeptides in a single *E. coli* cell.

Construction and Expression of 679×hMN14 Diabodies in *E. coli*

The di-cistronic expression vectors were constructed through a series of sub-cloning procedures that are outlined in FIG. 9. Initially, the $V_K$ sequences of 679-scFv-L5 and hMN14-scFv-L5 were exchanged by excision with BamHI and XhoI to generate two intermediate constructs in pET26b. A DNA fragment containing the sequence 679$V_H$-L5-hMN14$V_K$, excised from a pET26b construct with NcoI and XholI was ligated into the same restriction sites in pET-ER vector to generate an intermediate clone (679$V_H$-L5-hMN14$V_K$-pET -ER). A 900 bp DNA fragment, which includes a ribosomal binding site in addition to the coding sequence for polypeptide 2 (below), was excised from hMN14$V_H$-L5-679$V_K$-pET26b with XbaI and Blpl. This fragment was ligated into the SpeI and Blpl restriction sites of 679$V_H$-L5-hMN14$V_K$-pET-ER to create the final bispecific expression constructs. The di cistronic expression cassette for bispecific hMN14×679 diabody is shown schematically in FIG. 10. The DNA coding sequence of nucleic acids and the corresponding encoded amino acids for the first and second polypeptide sequences of BS1, BS1.5, and BS2 are contained in Figures, 30 & 31, 32 & 33, and 34 & 35 (Seq IDs), respectively. The di-cistronic expression cassette codes for two polypeptides that are arranged as follows:

Polypeptide 1

Pel B; 679$V_H$; GGGGS (SEQ ID NO: 1) linker; hMN14$V_K$; 6 His (SEQ ID NO: 2)

Polypeptide 2

Pel B; hMN14$V_H$; (SEQ ID NO: 1) linker; 679$V_K$; 6 His (SEQ ID NO: 2)

When this cassette is expressed in *E. coli*, some of the polypeptides fold and spontaneously form soluble bispecific diabodies. The bispecific diabody, having four polypeptides interacting with each other, is shown in FIG. 10. In this instance the carboxyl terminal end of the $V_H$ segment of the 679 MAb is connected to the amino terminal end of the $V_K$ segment of the hMN14 MAb by a five amino acid residue linker and the carboxyl terminal end of the $V_H$ segment of the hMN14 MAb is connected to the amino terminal end of the $V_K$ segment of the 679 MAb by the same five amino acid residue linker. Each chain forms one half of the 679×hMN14 diabody. The three constructs for expression of 679×hMN14 bispecific diabodies, BS1, BS1.5, and BS2 were expressed and purified as described for 679scFv in Example 1. The results are described in detail below for BS1.5.

Figure 11:
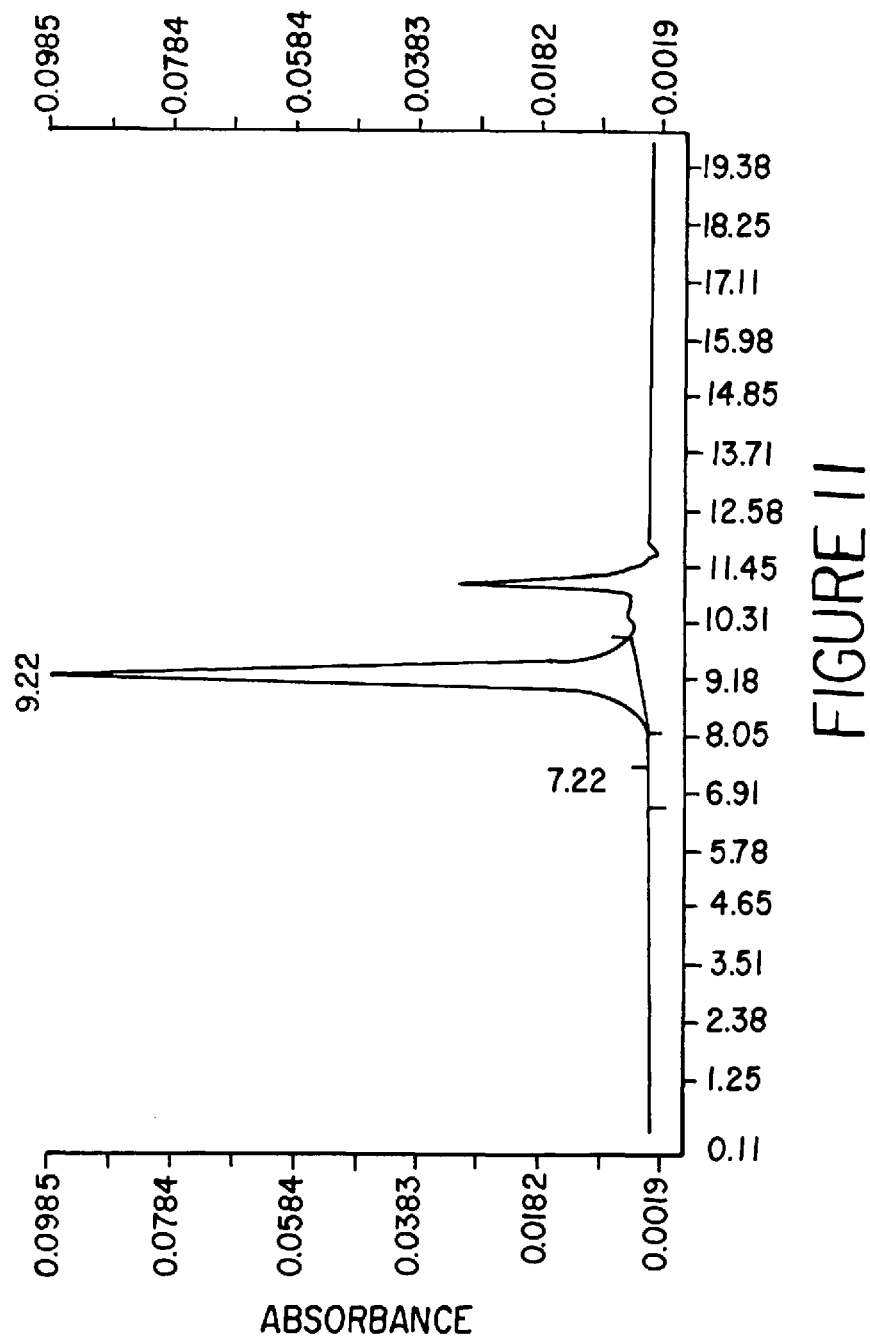
FIG. 11 shows a size-exclusion HPLC analysis of BS1.5 after purification. The HPLC elution peak of BS1.5 is at 9.22 min. Soluble proteins from an induced 5 L culture were purified by Ni-NTA IMAC followed by Q-Sepharose anion exchange chromatography. The flow through fraction of the Q-Sepharose column was injected for HPLC analysis.
Figure 12:
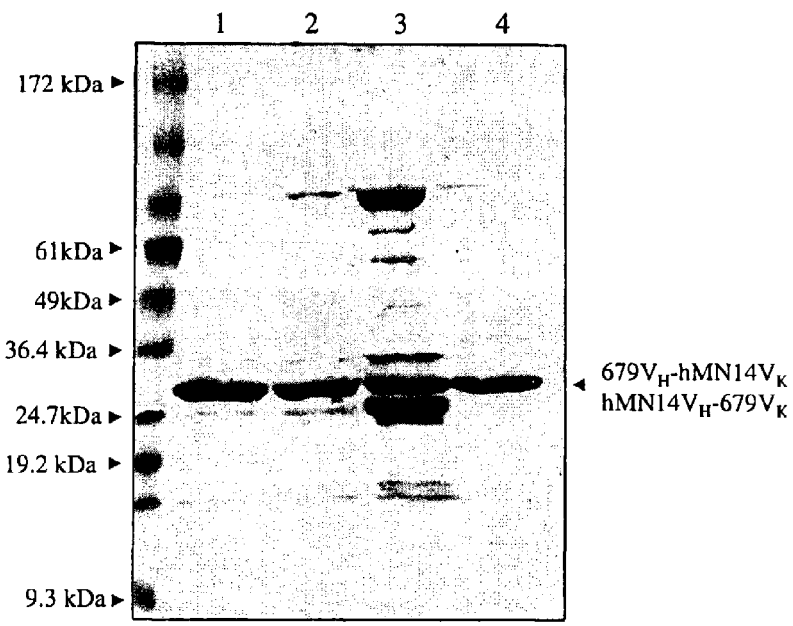
FIG. 12 shows a reducing SDS-PAGE gel stained with Coomassie blue and used to analyze the purification of BS2. Arrows indicate the positions of the M$_r$ standards and the BS2 polypeptide constituents, 679V$_H$-hMN14V$_K$ and hMN14V$_H$-679V$_K$. Soluble proteins from an induced 5 L culture were loaded on a 4 ml Ni-NTA column. The column was washed/eluted with a buffer containing 40 mM imidazole (lane 3) and then eluted in two fractions with 100 mM imidazole (lanes 1 and 2). Impurities in the 40 mM imidazole eluate were removed by passing the eluate over a Q-Sepharose anion exchange column (lane 4).
Figure 13:
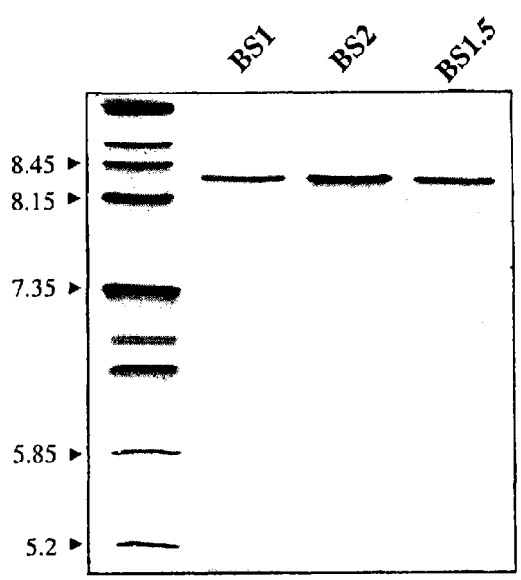
FIG. 13 shows the purity of BS1, BS2 and BS1.5 through an IEF gel. These three diabodies were purified from soluble protein extracts by Ni-NTA IMAC followed by Q-Sepharose anion exchange chromatography. The positions of pI markers are indicated by arrows and the samples are identified above the lanes.

Following IPTG induction, BS1.5-transformed *E. coli* (BL21-pLysS) cultures expressed 0.5 mg of soluble bispecific diabody per liter of culture. From 5 L induction, 2.4 mg of highly purified BS1.5 diabody was isolated following the procedures similar to those described in Example 16. Soluble cell extracts were loaded onto a 4 ml of Ni-NTA agarose column (Qiagen), which was washed with 20 bed volumes of 10 mM imidazole buffer and 5 bed volumes of 20 mM imidazole buffer. The diabody was eluted from the IMAC column in 15 ml of 100 mM imidazole elution buffer. The eluate was directly passed over a 4-ml Q-Sepharose anion exchange column and the highly purified BS1.5 was collected in the flow through fraction. HPLC analysis showed a single peak illustrated in FIG. 11 with a retention time of 9.2 minutes demonstrating that the two heterologous polypeptides, 679$V_H$-GGGGS-hMN14$V_K$ ('GGGGS'disclosed as SEQ ID NO: 1) and hMN14$V_H$-GGGGS-679$V_K$('GGGGS'disclosed as SEQ ID NO: 1, exclusively form a dimer or diabody. The purity of the three 679×hMN14 bispecific diabodies was further demonstrated by reducing SDS-PAGE and IEF. A single protein band is seen in FIG. 12 at approximately 27 kDa in a Coomassie blue-stained SDS-PAGE gel for BS2. The two polypeptides essentially co-migrate, since their calculated MWs are 26.5 kDa and 27.2 kDa. On IEF gel, as shown in FIG. 13, BS1, BS1.5 and BS2 each shows the presence of a single band with a pI of approximately 8.3, which is close to the predicted pI of 7.9 for the three bispecific diabodies.

Figure 14:
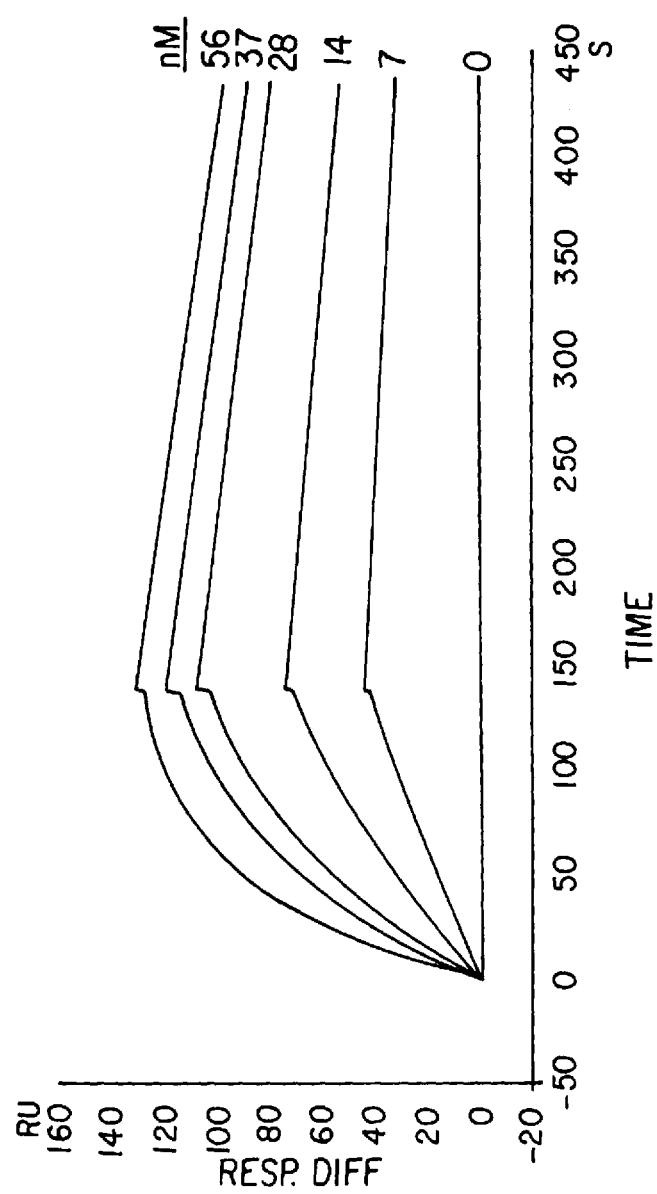
FIG. 14 shows BIAcore binding curves obtained for various concentrations of BS1.5 using a low-density HSG-coupled sensor chip. These data were used for calculation of the on-rates and off-rates.
Figure 15:
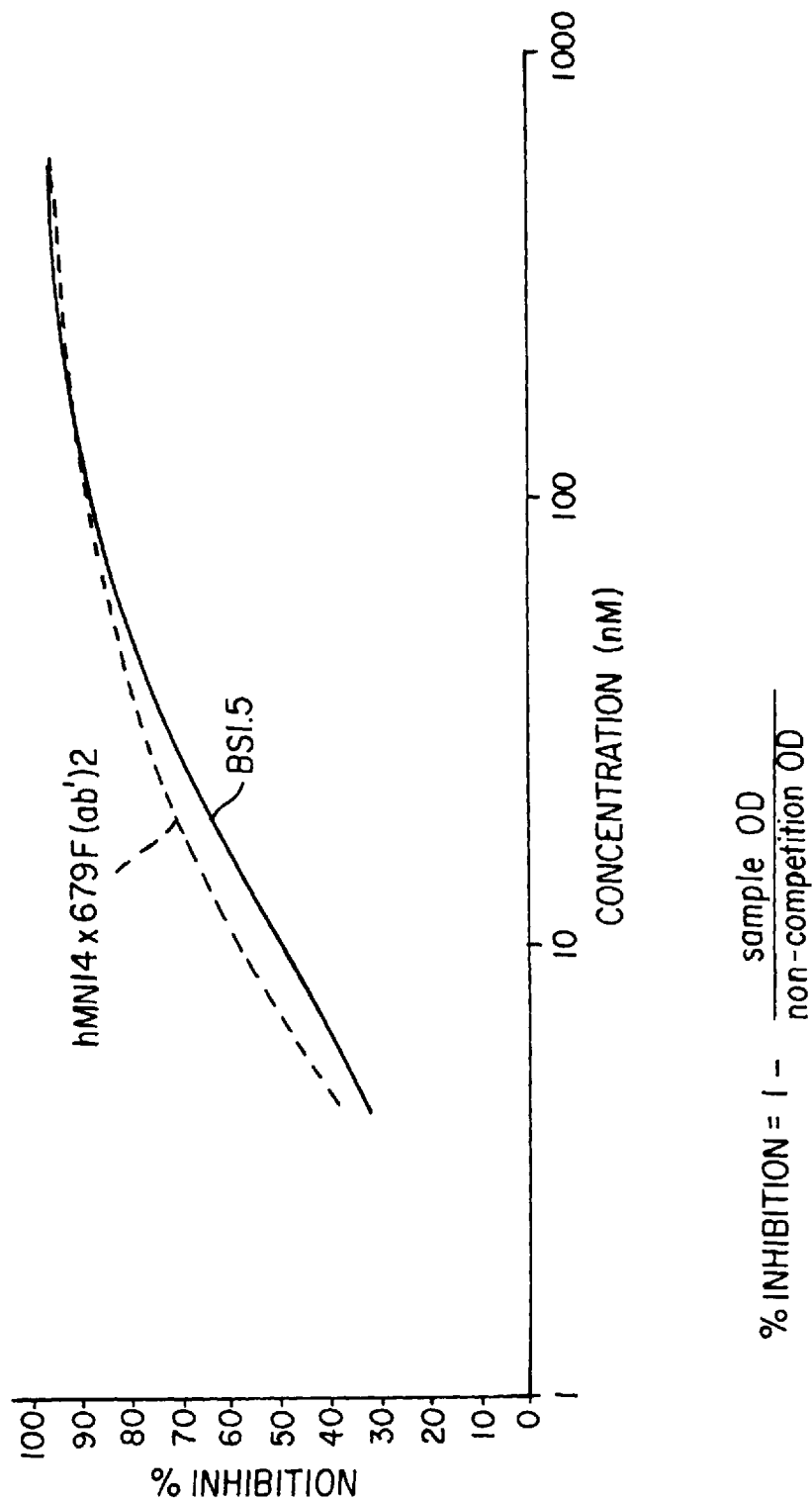
FIG. 15 is a graphical representation of the results of a competitive enzyme-linked immunosorbent assay (ELISA). HRP-conjugated hMN14 IgG (1 nM) was mixed with either BS1.5 or chemically linked 679×hMN14 F (ab')$_2$ at concentrations ranging from 4-500 nM, prior to incubation in CEA-coated (0.5 ag/well) wells. The % inhibition is plotted vs. nM concentration of sample.

The binding kinetics of BS1.5 was evaluated by BIAcore using a low density HSG-coupled sensor chip. Binding sensograms were obtained for BS1.5 concentrations from 0 to 54 nM and the resulting data were analyzed with the BIAcore BiaEvaluation software using 1:1 Langmuir binding model, yielding an association constant of the interaction, $K_d$, of 2.4 nM for the binding of BS1.5 to immobilized HSG. FIG. 14 shows the BIAcore binding curves at various concentrations of BS1.5. Using the same method, a chemically prepared 679×hMN14 F(ab')$_2$ conjugate yields a $K_d$ of 1.55 nM. The binding properties for BS1.5 as compared to BS1 and BS2 are summarized in Table 2. A lower $K_d$ suggests a higher affinity to the antigen. BS1.5 has the lowest $K_d$ and therefore exhibits the greatest affinity to HSG. $K_d$ is a measure of the ratio of the off rate and on rate constants, $K_{off}$ and $K_{on}$, where $K_d = K_{off}/K_{on}$.

TABLE 2

Properties of bispecific diabodies.

|  | $K_d$ | $k_{on}$ (1/Ms) | $k_{off}$(1/s) | Expression |
| --- | --- | --- | --- | --- |
| BS1 | 4.7 nM | 2.12e5 | 1.01e−3 | 0.25 mg/L |
| BS1.5 | 2.5 nM | 4.05e5 | 1.01e−3 | 0.5 mg/L |
| BS2 | 10.6 nM | 3.58e5 | 3.81e−3 | 1.0 mg/L |

The binding of BS1.5 to CEA was demonstrated by competitive ELISA. Microtiter plates were coated with 0.5 µg/well with soluble CEA (Scripps Laboratories). BS1.5 at concentrations ranging from 4-500 nM were allowed to compete for CEA binding with HRP-conjugated hMN14 IgG (1 nM). BS1.5 shows a competitive binding curve similar to that of the 679×hMN14 F(ab')$_2$ chemical conjugate. These data indicate that the BS1.5 has a CEA binding affinity similar to the parental hMN14 antibody. The bispecific binding properties of BS1.5 was also analyzed by BIAcore with a high-density HSG-coupled biosensor chip. BS1.5 was pre-bound to the sensor chip before injection of an anti-idiotype MAb designated W12 that is highly specific for hMN14. Soluble CEA was also used in place of W12 and gave similar results.

Figure 16:
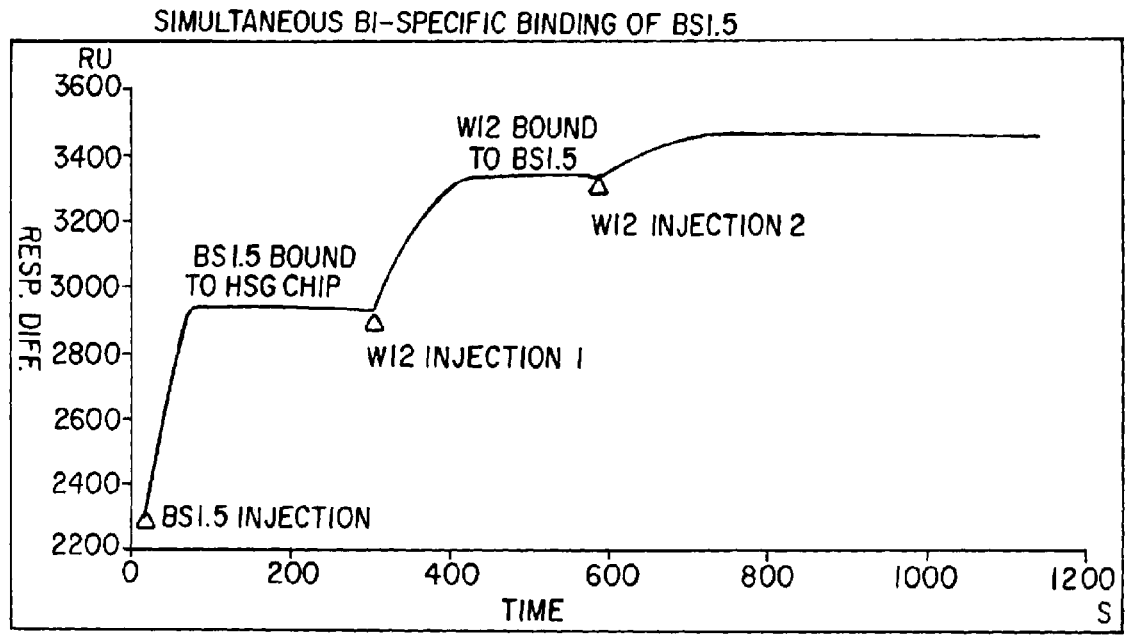
FIG. 16 is a BIAcore sensorgram showing bispecific binding properties of BS1.5 for HSG and W12. BS1.5 (60 ng) was loaded on a high-density HSG-coupled sensor chip and two 400 ng injections of the hMN14-binding anti-idiotype MAb, W12, were allowed to bind to the immobilized BS1.5. Arrows indicate injection times.

As shown in FIG. 16, injection of 60 ng of BS1.5 gave a relative response of 620 RU. Subsequent injection of 400 ng of W12 increased the signal by 400 RU. Binding approached saturation with a second W12 injection (400 ng), as a total of 520 RU were added to the 620RU signal of BS1.5. Injection of W12 following pre-binding with 679 F(ab')$_2$ or without pre-binding yielded a negligible response. These data demonstrate that BS1.5 has the capability of binding HSG and CEA simultaneously.

BS1 and BS2 each differ from BS1.5 by single point mutations in the 679 component of the diabody. Some of the properties of these molecules are summarized in Table 2. ELISA experiments demonstrate that each of these proteins exhibits similar CEA binding properties, which is not surprising given that the hMN14 component of the diabody is consistent among the three diabodies. Further, BS1 and BS2 are demonstrated by BIAcore analysis to be bispecific and capable of binding to CEA and HSG simultaneously. BS1.5 includes the 679V$_H$I3Q mutation that is not included in BS1, which is composed entirely of the wildtype sequences. This mutation doubles the yield of soluble diabody that is expressed without compromising the binding affinity for HSG. BS2 includes the additional 679V$_K$C101S mutation as well as the 679V$_H$I3Q. With this second change, soluble BS2 is expressed at twice the level of BS1.5, however, the binding affinity for HSG decreased measurably.

Example 22

In Vivo Targeting

Figure 17:
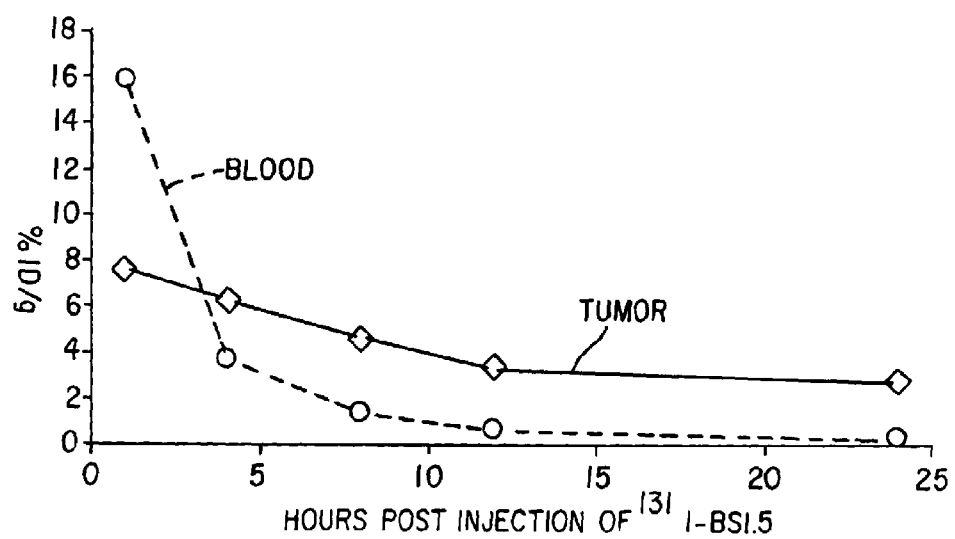
FIG. 17 shows the levels of $^{131}$I-BS1.5 diabody in the tumor and the blood over the first 96 hours after injection of the diabody. The concentration of $^{131}$I-BS1.5 diabody, measured as the percentage of the injected dose per gram of tissue (% ID/g), is plotted vs. time. Diamonds mark the data points for tumor samples and filled circles mark those of blood samples.
Figure 18:
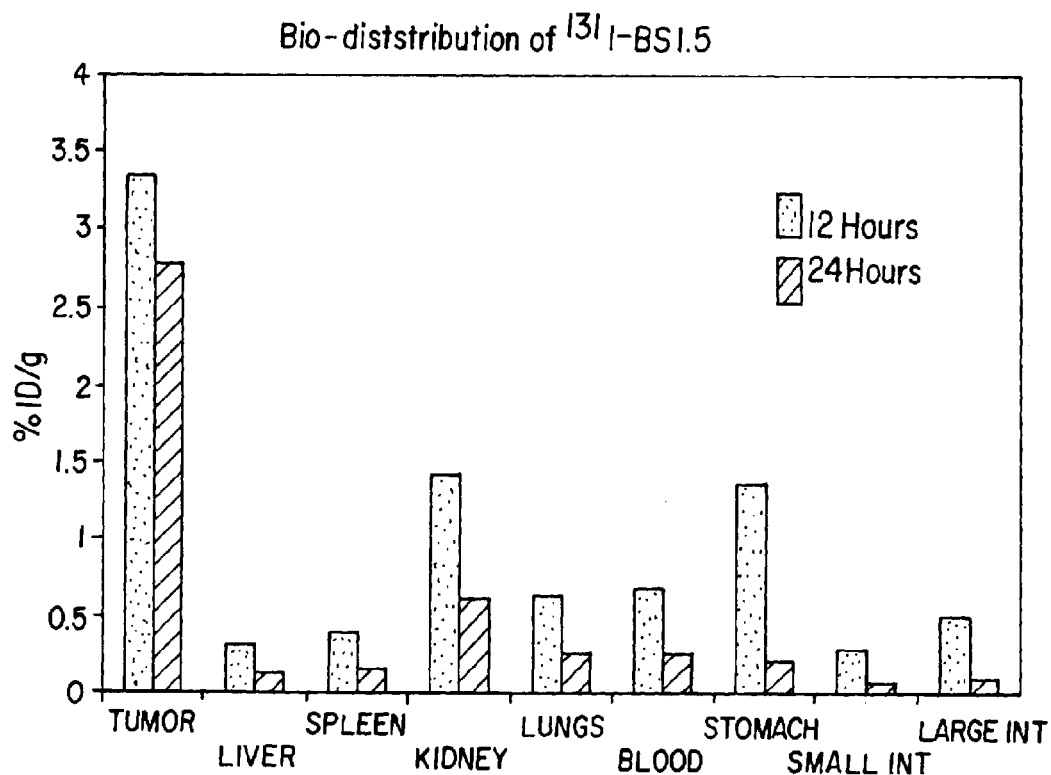
FIG. 18 shows the biodistribution of $^{131}$I-BS1.5 diabody after 12 and 24 hours post injection in tumor and normal tissue, including liver, spleen, kidney, lungs, blood, stomach, small intestine, and large intestine. The concentration of $^{131}$I-BS1.5 was measured as the percentage of the injected dose per gram of tissue (% ID/g).
Figure 19:
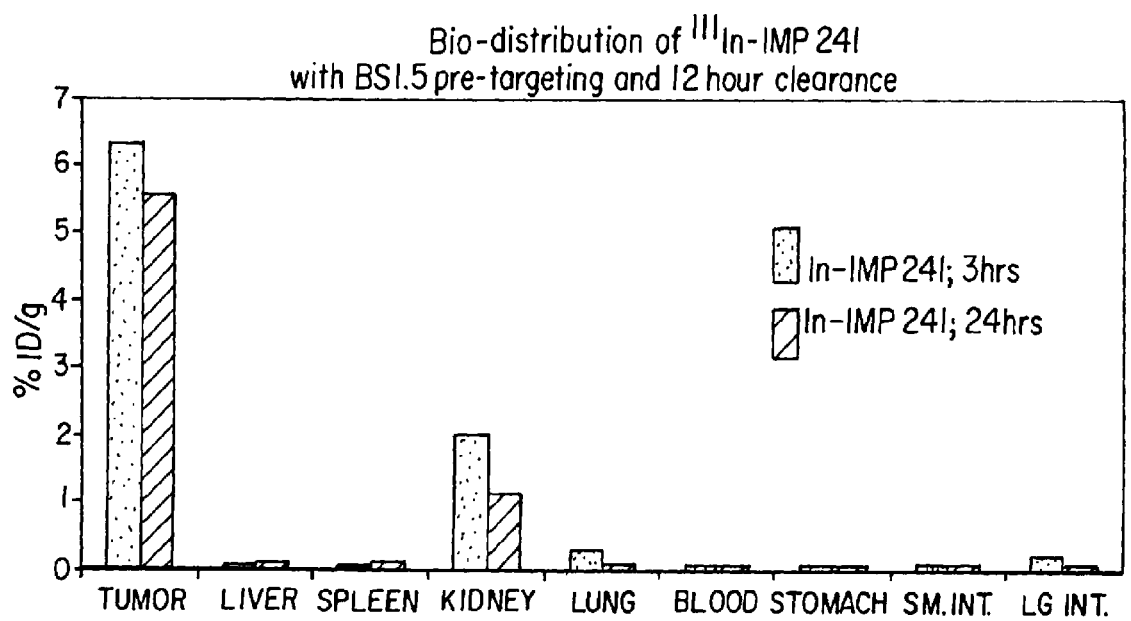
FIG. 19 shows the biodistribution of $^{111}$In-IMP241 peptide in tumor bearing mice pretargeted with BS1.5. GW39 tumor-bearing nude mice were injected with BS1.5 diabody. After 12 hours of clearance, the $^{111}$Indium-labeled IMP241 peptide was injected. Radioactivity in the tumor and in normal tissues, including liver, spleen, kidney, lungs, blood, stomach, small intestine, and large intestine, was measured at 3 and 24 hours post injection of $^{111}$In-IMP241. The concentration of $^{111}$In-IMP241 was measured as the percentage of the injected dose per gram of tissue (% ID/g).

The potential of these bispecific diabodies for use as pre-targeting CEA positive tumors for subsequent specific delivery of therapeutic radioisotopes carried by HSG containing peptides is demonstrated by BS1.5. Nude mice bearing GW39 (CEA positive) tumors were pre-targeted with BS1.5. Initially, the bio-distribution was followed with $^{131}$I-labeled BS1.5. The results are shown in FIG. 17. The diabody rapidly accumulated in the tumor within one hour and slowly cleared. The diabody also accumulated in the blood within one hour, however, significant blood clearance occurred within 8 to 12 hours. At 12 and 24 hour clearance times, the tumors were enriched appreciably with $^{131}$I-BS1.5 as compared to normal tissues, such as liver, spleen, kidney, lungs, blood, stomach, small intestine, and large intestine, as illustrated in FIG. 18. Pre-targeting experiments were performed with 12 or 24 hour clearance times following injection of BS1.5 (unlabeled). IMP241, a peptide containing two HSG groups and a DOTA moiety, was loaded with $^{111}$Indium and injected in BS1.5 pre-targeted mice. The bio-distribution of the $^{111}$In-IMP241 was examined at 3 and 24 hours after injection. FIG. 19 shows the activity in the tumor and normal tissues in pre-targeted mice with 12 hour clearance. Substantial radioactivity accumulates in tumors within 3 hours with only minimal loss after 24 hours. Small amounts of radioactivity was detected in all normal tissues besides the kidney at both time points, suggesting that the diabody is specific to the tumor and radioactive isotopes, but avoids uptake into normal tissues. The tumor to non-tumor ratios of $^{111}$In-IMP241 are summarized in Table 3.

TABLE 3

Tumor to non-tumor ratios for $^{111}$In-IMP241 after BS1.5 injection and 12-hour clearance.

|  | 3 hrs post $^{111}$I-IMP241 | 24 hrs post $^{111}$I-IMP241 |
| --- | --- | --- |
| Tumor | 1.00 | 1.00 |
| Kidney | 3.30 | 4.96 |
| Liver | 82.34 | 60.66 |
| Spleen | 179.23 | 67.79 |
| Lung | 28.57 | 74.75 |
| Blood | 154.78 | 157.18 |
| Stomach | 494.84 | 328.03 |
| Sm. Int. | 132.72 | 184.14 |
| Lg Int. | 34.60 | 172.47 |

Example 23

Humanization of 679 V Domains

A humanized version of 679-based diabody has been generated that exhibits HSG binding affinity comparable to the murine forms. The strategy employed was to retain all CDR residues and those residues known to interact with the CDR residues while substituting only those residues of the mouse frameworks that are not found in the database of human frameworks at corresponding positions. In such cases if more than one amino acid residue of the human frameworks is known for the same position, the most common one is selected for humanization.

The amino acid sequence for each of the framework regions of m679V$_H$ or m679V$_K$ were used to query the NCBI database and aligned with human antibody (h-Ab) sequences. Most amino acid residues of the murine 679 frameworks are identical with some or all of the human frameworks in the database at corresponding positions and therefore they are conserved for h679. For those amino acid residues of the murine 679 frameworks that are not found in any of the human frameworks, they are substituted with the most common residue found in the homologous h-Abs at the corresponding positions. However, if a residue in a particular position is likely to interact with the CDRs or to be involved in the V$_H$ and V$_K$ association (E. A. Padlan Molecular Immunology, 31, 169-217, 1994), the residue in m679 is retained in h679. Substitutions FIG. 20 shows an alignment of m679 and humanized h679. The Kabat numbering system is used and framework regions (FR) as well as CDRs are indicated. Arrows signify amino acid substitutions. For all of the considerations below, human sequences with high levels of sequence identity were compared to m679.

V$_H$ Framework Region 1 (VHFR-1)

All but one of the m679 V$_H$FR-1 amino acids is commonly found in the h-Abs and were therefore left unchanged in h679. At position V$_H$-3, glutamine (Q), which is always in this position in the h-Abs, was substituted for isoleucine (1), which is not found in the h-Abs. The V$_H$I3Q substitution has previously been introduced into both m679 diabodies and bi-specific diabodies and was found to increase the solubility levels of expressed products.

V$_H$ Framework Region 2 (VHFR-2)

This region is small yet divergent. Residues found in three positions in VHFR-2 of m679 are not found in h-Abs. In m679, leucine (L) is in position V$_H$-37, which in h-Abs is almost always valine. However, the leucine was retained in h679 because this position is known to be strongly involved in V$_H$ to V$_K$ association and often is in contact with CDR residues. Positions $V_H$ 42 and 44 are always glycine in the h-Abs and do not contact the $V_K$ or CDRs. Therefore, glutamic acid (E) at $V_H$-42 and arginine (R) at $V_H$-44 were each substituted with glycine.

$V_H$ Framework Region 3 (VHFR-3)

Substitutions at three of 32 positions in VHFR-3 made this region of h679 entirely humanized. None of the three positions are known to be involved in $V_H$-VK or CDR contact so the following substitutions were made with the most common h-Ab amino acid for the respective positions; serine (S) for asparagine (N) at $V_H$-77; alanine (A) for serine (S) at $V_H$-84; and glutamic acid (E) for alanine (A) at $V_H$-85.

$V_H$ Framework Region 4 (VHFR-4)

Substitution of threonine (T) for serine (S) at $V_H$-110 would make this region completely humanized. However, for technical reasons, we chose to keep T in the $V_H$FR-4 of h679.

$V_K$ framework region 1 (VKFR-1)

This region has considerable variability amongst the h-Abs. The m679 amino acids at 20 of the 23 positions in VKFR-1 are acceptable for h-Abs. The following substitutions were made at three positions with the most common h-Ab amino acid for the respective positions: threonine (T) for serine (S) at $V_K$-5; arginine (R) for lysine (K) at $V_K$-18; and leucine (L) for methionine (M) at $V_K$-21. These positions are not known to be involved in $V_H$-$V_K$ or CDR contacts.

$V_K$ Framework Region 2 (VKFR-2)

This short region resembles the human sequences and is acceptable as is.

$V_K$ Framework Region 3 (VKFR-3)

This large (31 amino acids) region requires four substitutions for complete humanization. Serine (S), always found in h-Abs at $V_K$-63, replaced threonine (T). Leucine (L), always found in h-Abs at $V_K$-78, replaced valine (V). Alanine (A), usually found in h-Abs at $V_K$-80, replaced serine (S). Valine (V), always found in h-Abs at $V_K$-83, replaced leucine (L). None of these positions are known to be involved in $V_H$-$V_K$ or CDR contacts.

$V_K$ Framework Region 4 ($V_K$FR-4)

This short region resembles the human sequences and is acceptable as is.

With a total of only 13 amino acid substitutions made in the $V_H$ and VK frameworks of m679 as described above, the new frameworks contain all residues found in h-Abs, except two, namely, leucine at position $V_H$-37, which is retained due to its involvement in the $V_H$ and $V_K$ contact, and threonine at position $V_H$-110, which is retained because of technical reasons.

Methods

Figure 21:
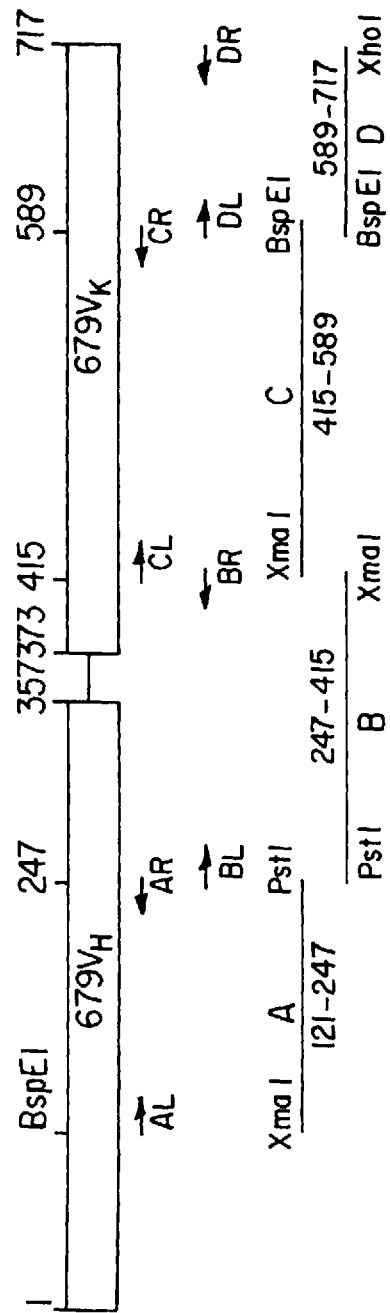
FIG. 21 shows the relative locations of the PCR primers used for humanization of 679scFv-L5. Arrows signify the primers. The intermediate PCR products are also shown (A, B, C and D). All numbering represent nucleic acid positions in 679scFv-L5.

Eight oligonucleotide PCR primers, which together contain 12 of the 13 mutations described above to convert m679scFv into h679 diabody, were synthesized and used to generate 4 PCR products. The mutant sequences were amplified from the 679scFv-L5 plasmid construct using Taq polymerase. Restriction sites were engineered into the primers to allow ligation of the PCR products while conserving the encoded amino acid sequence. The sequences, coding regions, restriction sites and specific mutations contained on each of the primers are summarized in Table 4. The relative location of the primers and the PCR products are shown schematically in FIG. 21. The PCR products were each cloned into the PCR cloning vector pGemT (Promega). Through several rounds of sub-cloning using standard methods, the four PCR sequences were assembled and added to the first 120 nucleotides of 679$V_H$I3Q to generate the h679scFv-L5-pGemT construct. From this construct the $V_H$ and $V_K$ domains were transferred together into the pET26b expression vector for h679 diabody or individually to make fully humanized bi-specific diabodies. The sub-cloning process is described in detail below.

TABLE 4

PCR Primers for humanization of 679scFv-L5.

| Primer | Base Pairs | Restriction Site | Mutations | Sequence | SEQ ID NO: |
|---|---|---|---|---|---|
| A-Left | 121-150 | Xma I | VH-E42G VH-R44G | 5'GCTTCCCGGGAAAG GGGCTGGAGTGGGTCG CAACC3' | 104 |
| A-Right | 212-247 | Pst I | VH-N77S | 5'CGATCTGCAGATAT AGGCTGTTCTTGGCAT TGTCTCTGG3' | 105 |
| B-Left | 241-284 | Pst I | VH-S84A VH-A85E | 5'CTGCAGATGAACAG TCTAAGGGCTGAGGAC ACGGCCTTGTATTA3' | 106 |
| B-Right | 365-421 | Xma I | VK-S5T | 5'CCCCGGGTGACACA GCCAGGGAGGATGAG ATTGTGTCATCACAAT GTCGGATCCGC3' | 107 |
| C-Left | 414-455 | Xma I | VK-K18R VK-M21L | 5'ACCCGGGGAGAGGG TCACTCTGACCTGCAA ATCCAGTCAGAG3' | 108 |
| C-Right | 565-595 | Bsp EI | VK-T63S | 5'TTCCGGATCCACTG CCTGAGAAGCGATCAG GGACCCCAGA3' | 109 |
| D-Left | 588-659 | Bsp EI | VK-V78L VK-S80A VK-L83V | 5'ATCCGGAACAGATT TCACTCTCACCATCAA CAGTCTGCAGGCTGAA GACGTGGCAGTTTATT ACTGCACTCA3' | 110 |
| D-Right | 687-717 | Xho I | None | 5'ATCCTCGAGCCGTT TCAGCTCCAGCTTGG T3' | 37 |

Construct A. 1-247 with 3 $V_H$ Mutations

A plasmid clone containing the 679$V_H$-I3Q mutation (679$V_H$I3Q-pGemT) was digested with the restriction enzymes BspEI (base pair 121) and PstI (in pGemT vector 3' of the insert), leaving the first 121 base pairs of 679$V_H$I3Q with the vector. This vector fragment was ligated with PCR product A that was digested with XmaI (5' end) and Pst I (3' end) to generate construct A. It is important to note that the BspEI-XmaI ligation destroys both sites as each of these restriction enzymes was used in subsequent steps.

Construct B. 1-415 with 2 Additional $V_H$ and 1 $V_K$ Mutations

PCR product B was cloned into pGem T and screened for clones in the T7 orientation. The B fragment was excised from the pGemT clone with PstI and ligated into the PstI site of construct A. Clones were screened for proper insert orientation for construct B.

Construct C. 1-589 with 3 Additional $V_K$ Mutations

PCR product C was cloned into pGem T and screened for clones in the T7 orientation. The C fragment was excised from the pGemT clone with XmaI and NdeI (vector site) and then ligated into construct B that was digested with the same enzymes.

Construct D. Humanized 679scFv in pGemT

PCR product D was cloned into pGem T and screened for clones in the T7 orientation. The D fragment was excised from the pGemT clone with BspEI and NdeI and then ligated into construct C that was digested with the same enzymes.

H679scFv-L5 Construction and Production of h679 Diabody

The h679scFv-L5 sequence was excised from the pGemT construct with NcoI and XhoI and ligated into similarly digested pET26b vector. This construct was used to transform BL21 (P-LysS) E. coli. Culture conditions, induction, and purification were carried out similar to those described for the m679 diabody in Example 2. Expression levels in the soluble fractions were estimated by BIAcore analysis using a HSG coupled sensor chip. The expression level of h679 diabody was 50 µg/L as compared to 1 ug/L for the wild type m679 diabody or 10 ug/L for m67913Q diabody. The h679 diabody displayed comparable binding properties to the m67913Q diabody with BIAcore analysis.

Example 24

BS1.5H

Using the methods described in Example 6, the h679$V_H$ and h679$V_K$ domains were incorporated into the pET-ER vector with the $V_H$ and $V_K$ of hMN14 to make the fully humanized BS1.5H bispecific diabody construct. The di-cistronic expression vector was constructed through a series of sub-cloning procedures that are outlined in FIG. 9. Initially, the $V_K$ sequences of h679-scFv-L5 and hMN14-scFv-L5 were exchanged by excision with BamHI and XhoI to generate two intermediate constructs in pET26b. A DNA fragment containing the sequence h679$V_H$-L5-hMN14$V_K$, excised from a pET26b construct with NcoI and XhoI, was ligated into the same restriction sites in pET-ER vector to generate an intermediate clone (h679$V_H$-L5-hMN14$V_K$-pET-ER). A 900 bp DNA fragment, which includes a ribosomal binding site in addition to the coding sequence for polypeptide 2 (below), was excised from hMN14$V_H$-L5-h679$V_K$-pET26b with XbaI and BlpI. This fragment was ligated into the SpeI and BlpI restriction sites of h679$V_H$-L5-hMN14$V_K$-pET-ER to create the final bispecific expression construct, BS1.5H. The di-cistronic expression cassette codes for two polypeptides that are arranged as follows:

Polypeptide 1
Pel B; h679$V_H$; GGGGS (SEQ ID NO: 1) linker; hMN14$V_K$; 6 His (SEQ ID NO: 2)

Polypeptide 2
Pel B; hMN14$V_H$; GGGGS SEQ ID NO: 1) linker; h679$V_K$; 6 His (SEQ ID NO: 2)

When this cassette is expressed in E. coli, some of the polypeptides fold and spontaneously form soluble bispecific diabodies.

Figure 22:
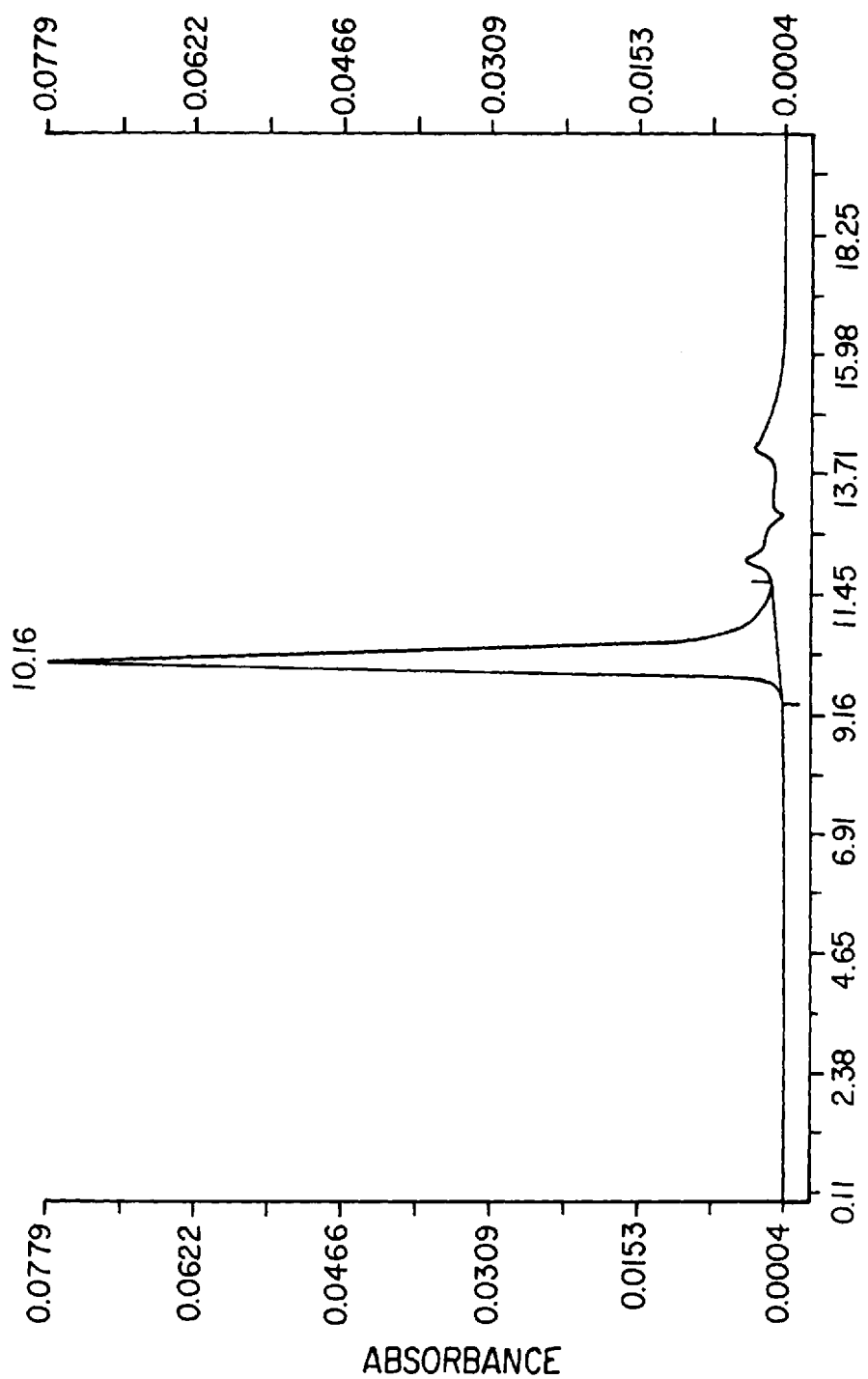
FIG. 22 shows size-exclusion HPLC analysis of the BS1.5H after purification. The HPLC elution peak of BS1.5H is at 10.16 min. Soluble proteins from an induced 5 L culture were purified by Ni-NTA IMAC followed by Q-Sepharose anion exchange chromatography. The flow through fraction of the Q-Sepharose column was injected for HPLC analysis.
Figure 23:
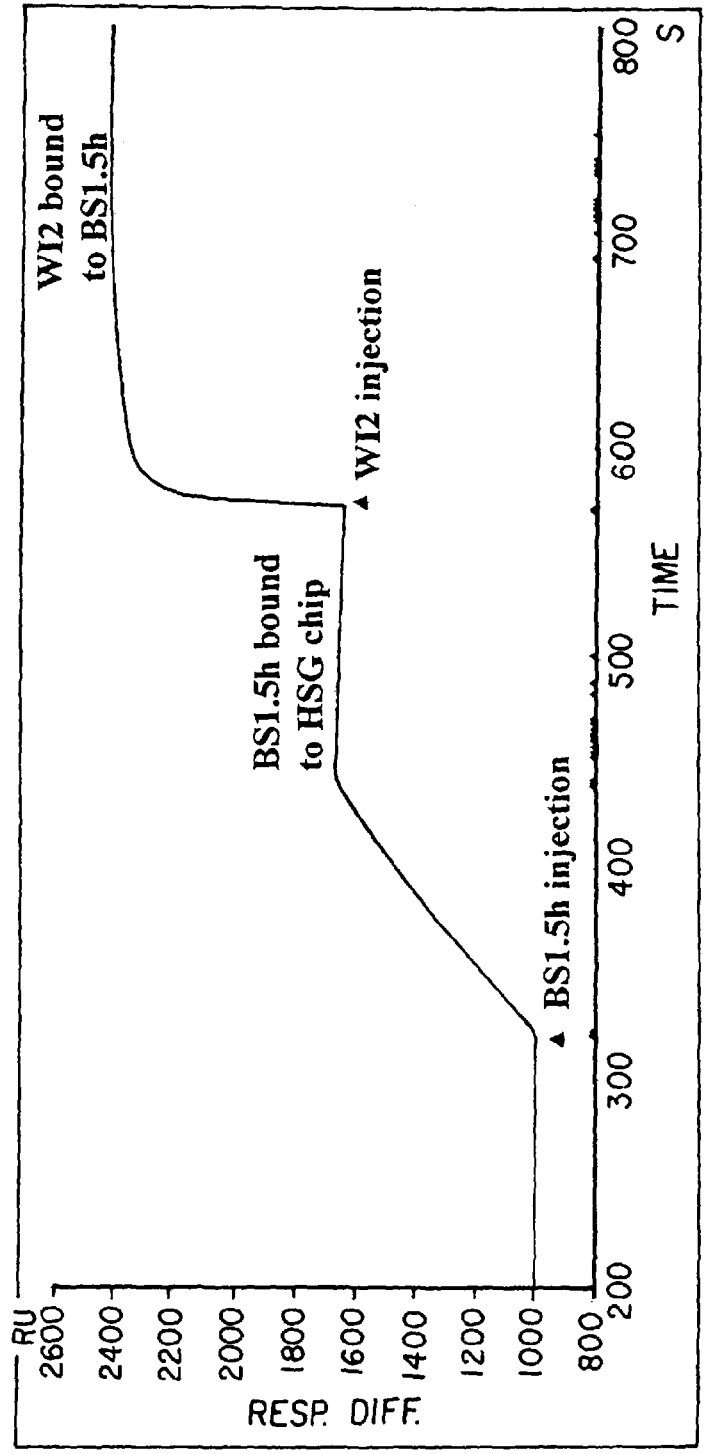
FIG. 23 is a BIAcore sensorgram showing bispecific binding properties of BS1.5H for HSG and W12. BS1.5H (60 ng) was loaded on a high-density HSG-coupled sensor chip and a 1 μg injection of the hMN14-binding anti-idiotype MAb, W12, was allowed to bind to the immobilized BS1.5H. Arrows indicate injection times.
Figure 24:
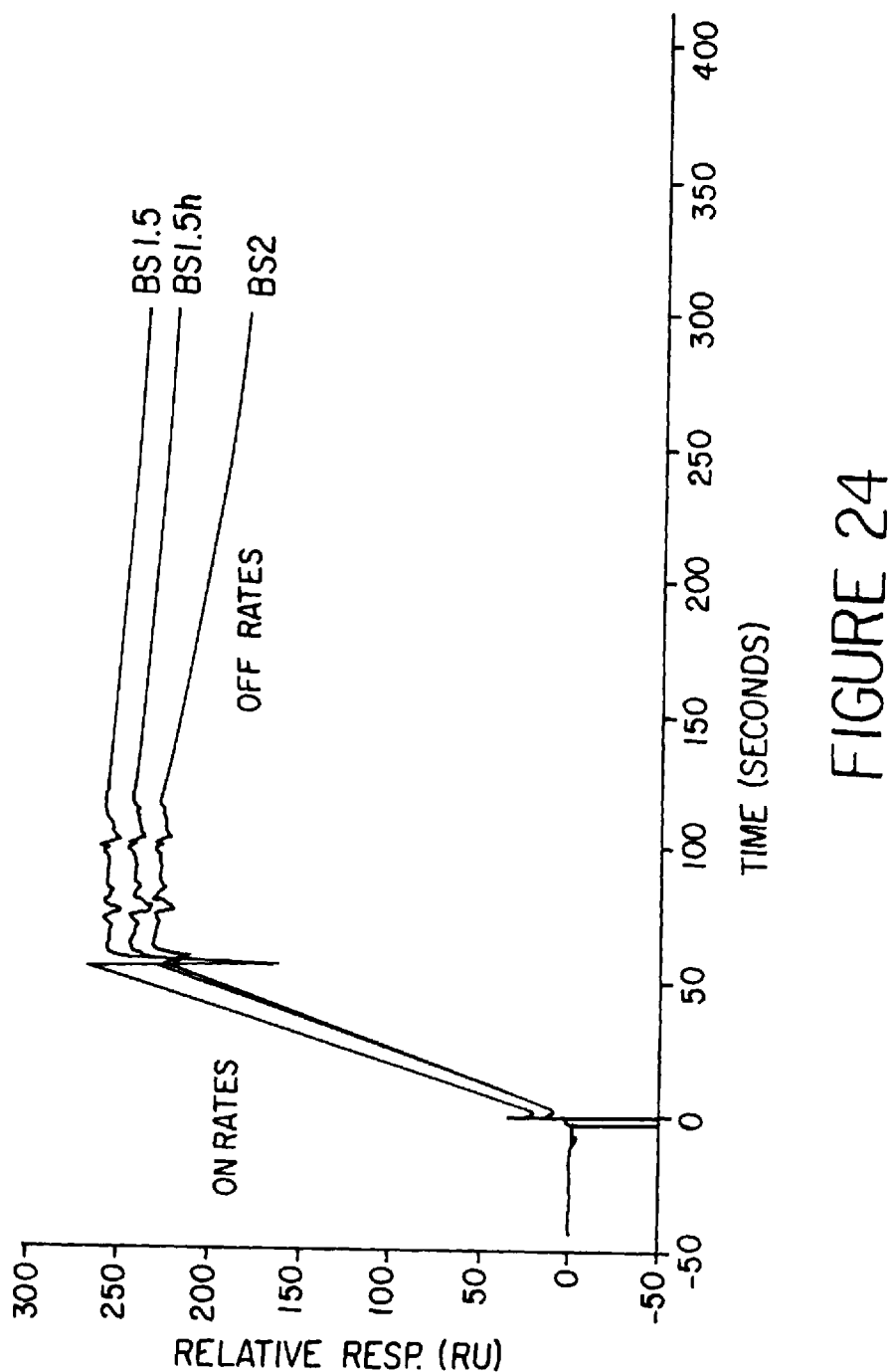
FIG. 24 shows the comparison of BIAcore binding curves between BS1.5H, BS1.5 and BS2. Similar amounts of the bispecific diabodies were injected on a low density HSG-coupled sensor chip and the resulting binding curves were superimposed.

The BS1.5H construct was used to transform E. coli (BL21-pLysS) cells. The recombinant BS1.5H protein was expressed and purified as described in Example 6. The level of soluble protein expression was 0.55 mg/L, about 10% higher than BS1.5. Size exclusion HPLC analysis of the purified BS1.5H yielded a single protein peak at 10.16 minutes (FIG. 22). Comparatively, BS2 had a retention time of 10.04 minutes under identical conditions, indicating that BS1.5H polypeptides exclusively form diabodies. The bispecific (CEA/HSG) binding properties of BS1.5H were confirmed by BIAcore analysis (FIG. 23). BS1.5H was pre-bound to a HSG-coupled sensor chip before injection of W12 (hMN14-specific anti-idiotype MAb). As shown in FIG. 23, injection of 60 ng of BS1.5H gave a relative response of 660 RU. Subsequent injection of 1 µg of W12 increased the signal by 760 RU. Injection of W12 following pre-binding with 679 F(ab')$_2$ or without pre-binding yielded a negligible response. These data demonstrate that BS1.5H has the capability of binding HSG and CEA simultaneously. BS1.5H differs from BS1.5 by the humanization of the 679 moiety, which was accomplished by substitutions of 13 amino acid residues. To determine if the HSG binding affinity was affected by these changes, BIAcore binding curves for HSG binding of BS1.5H were compared with those of BS1.5 and BS2. As exemplified in FIG. 24, the off rates for BS1.5H were very similar to those of BS1.5 and not BS2, which has lower HSG binding affinity. This was consistently the case over a range of analyte concentrations, demonstrating that the HSG binding affinity was largely unaffected by the humanization.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention, which is defined by the following claims.

All of the publications and patent applications and patents cited in this specification are herein incorporated in their entirety by reference.

What is claimed is:

1. A method of producing a humanized antibody, comprising:
- separately comparing the amino acid sequence of each individual framework region of a non-human antibody against a database of amino acid sequences of framework regions for human antibodies;
- identifying, for each individual framework region, those amino acid residues in the framework regions of the non-human antibody that differ from amino acid residues at the corresponding positions for human antibodies in the database;
- substituting those amino acid residues in the framework regions of the non-human antibody that differ from the amino acid residues at the corresponding positions for human antibodies in the database with an amino acid residue from the corresponding position in one of the human antibodies; and
- retaining complementarity determining regions of the non-human antibody and all amino acid residues in the framework region of the non-human antibody that interact with amino acid residues in the complementarity determining regions.

2. The method according to claim 1, wherein different human framework regions in the database have different amino acid residues at corresponding positions, and the amino acid residue that is substituted in the framework region of the non-human antibody is the one that occurs most commonly in the database.

3. The method according to claim 1, wherein the non-human antibody is a murine antibody.

* * * * *

UNITED STATES PATENT AND TRADEMARK OFFICE
CERTIFICATE OF CORRECTION

PATENT NO. : 9,184,781 B2
APPLICATION NO. : 12/250396
DATED : November 10, 2015
INVENTOR(S) : Hans Hansen et al.

Page 1 of 1

It is certified that error appears in the above-identified patent and that said Letters Patent is hereby corrected as shown below:

In the Specification

In column 6, line 64, the word "sequence" is missing. It should read:
--BS1, BS1.5 and BS2. The '6H' sequence is disclosed as SEQ ID NO: 2.--

In column 11, lines 15 and 16, the word "appearance" is misspelled. It should read:
--appearance) (FIG. 43B) and hA20VH2 (SEQ ID NOS 97-99, respectively, in order of appearance) (FIG. 43C), as well as--

In column 55, line 32, "(SEQ ID NO: 1)" is omitted. It should read:
--679V.sub.H-Right (G.sub.4S) (SEQ ID NO: 1)        (SEQ ID NO: 35)--

In column 57, line 46, "(SEQ ID NO: 1)" is omitted. It should read:
--hMN14VH-Right (G4S) (SEQ ID NO: 1)        (SEQ ID NO: 41)--

In column 60, line 18, the ")" is missing. It should read:
--as SEQ ID NO: 1), exclusively form a dimer or diabody. The--

Signed and Sealed this
Twenty-third Day of August, 2016

Michelle K. Lee
*Director of the United States Patent and Trademark Office*

SEQUENCE LISTING

```
<160> NUMBER OF SEQ ID NOS: 110

<210> SEQ ID NO 1
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 1

Gly Gly Gly Gly Ser
1               5

<210> SEQ ID NO 2
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag
```

```
<400> SEQUENCE: 2

His His His His His His
1               5

<210> SEQ ID NO 3
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Arg Ala Ser Ser Ser Val Ser Tyr Ile His
1               5                   10

<210> SEQ ID NO 4
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Arg Ala Ser Ser Ser Leu Ser Phe Met His
1               5                   10

<210> SEQ ID NO 5
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Arg Ala Ser Ser Ser Val Ser Tyr Met His
1               5                   10

<210> SEQ ID NO 6
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Ala Thr Ser Asn Leu Ala Ser
1               5

<210> SEQ ID NO 7
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Gln Gln Trp Thr Ser Asn Pro Pro Thr
1               5

<210> SEQ ID NO 8
<211> LENGTH: 9
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

His Gln Trp Ser Ser Asn Pro Leu Thr
1               5

<210> SEQ ID NO 9
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Gln Gln Ser Phe Ser Asn Pro Pro Thr
1               5

<210> SEQ ID NO 10
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Ser Tyr Asn Met His
1               5

<210> SEQ ID NO 11
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Ala Ile Tyr Pro Gly Asn Gly Asp Thr Ser Tyr Asn Gln Lys Phe Lys
1               5                   10                  15

Gly

<210> SEQ ID NO 12
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Ser Thr Tyr Tyr Gly Gly Asp Trp Tyr Phe Asp Val
1               5                   10

<210> SEQ ID NO 13
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13
```

```
Ser Thr Tyr Tyr Gly Gly Asp Trp Tyr Phe Asn Val
1               5                   10
```

<210> SEQ ID NO 14
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

```
Ser His Tyr Gly Ser Asn Tyr Val Asp Tyr Phe Asp Val
1               5                   10
```

<210> SEQ ID NO 15
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

```
Val Val Tyr Tyr Ser Asn Ser Tyr Trp Tyr Phe Asp Val
1               5                   10
```

<210> SEQ ID NO 16
<211> LENGTH: 120
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 16

```
catctctgag cgcatctgtt ggagataggg tcactatgac ttgtagggcc agctcaagtg    60
taagttacat ccactggttc cagcagaaac cagggaaagc acctaaaccc tggatttatg   120
```

<210> SEQ ID NO 17
<211> LENGTH: 130
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 17

```
ggtgtccctg tccgattctc tggcagcgga tctgggacag attacacttt caccatcagc    60
tctcttcaac cagaagacat tgcaacatat tattgtcagc agtggactag taacccaccc   120
acgttcggtg                                                          130
```

<210> SEQ ID NO 18
<211> LENGTH: 40
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 18

```
cagctgaccc agtctccatc atctctgagc gcatctgttg                          40
```

<210> SEQ ID NO 19

```
<211> LENGTH: 36
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 19
aggttcgaag tggcataaat ccagggttta ggtgct                            36

<210> SEQ ID NO 20
<211> LENGTH: 39
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 20
cacttcgaac ctggcttctg gtgtccctgt ccgattctc                         39

<210> SEQ ID NO 21
<211> LENGTH: 46
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 21
acgttagatc tccagcttgg tccctccacc gaacgtgggt gggtta                 46

<210> SEQ ID NO 22
<211> LENGTH: 121
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 22
ctgaagtcaa gaaacctggg tcatcggtga aggtctcctg caaggcttct ggctacacct   60
ttactagtta caatatgcac tgggtcaagc aggcacctgg acagggtctg gaatggattg  120
g                                                                 121

<210> SEQ ID NO 23
<211> LENGTH: 151
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 23
atcagaagtt caagggtaaa gccacactga ctgccgacga atccaccaat acagcctaca   60
tggagctgag cagcctgagg tctgaggaca cggcatttta ttactgtgca agatcgactt  120
actacggcgg tgactggtac ttcgatgtct g                                151

<210> SEQ ID NO 24
<211> LENGTH: 39
<212> TYPE: DNA
<213> ORGANISM: Artificial Sequence
<220> FEATURE:
<223> OTHER INFORMATION: Description of Artificial Sequence: Synthetic
      primer
```

-continued

```
<400> SEQUENCE: 24
cagctgcagc aatcaggggc tgaagtcaag aaacctggg                                  39

<210> SEQ ID NO 25
<211> LENGTH: 37
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 25
ttccgggata aatagctcca atccattcca gaccctg                                    37

<210> SEQ ID NO 26
<211> LENGTH: 51
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 26
atcccggaaa tggtgatact tcctacaatc agaagttcaa gggtaaagcc a                    51

<210> SEQ ID NO 27
<211> LENGTH: 46
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 27
ggagacggtg accgtggtgc cttggcccca gacatcgaag taccag                          46

<210> SEQ ID NO 28
<211> LENGTH: 121
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 28
ctgaagtcaa gaaacctggg tcatcagtga aggtctcctg caaggcttct ggctacacct          60
ttagtagtta caatatgcac tgggtcagac aggcacctgg acagggtctg gaatggatgg         120
g                                                                         121

<210> SEQ ID NO 29
<211> LENGTH: 151
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 29
atcagaagtt caagggtaga gccacaataa ctgccgacga atccaccaat acagcctaca          60
tggagctgag cagcctgagg tctgaggaca cggcatttta ttttgtgca agatcgactt         120 actacggcgg tgactggtac ttcgatgtct g                                        151
```

-continued

```
<210> SEQ ID NO 30
<211> LENGTH: 37
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 30
ttccgggata aatagctccc atccattcca gaccctg                              37

<210> SEQ ID NO 31
<211> LENGTH: 51
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 31
atcccggaaa tggtgatact tcctacaatc agaagttcaa gggtagagcc a              51

<210> SEQ ID NO 32
<211> LENGTH: 13
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 32
agcttgcggc cgc                                                        13

<210> SEQ ID NO 33
<211> LENGTH: 13
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 33
gatcgcggcc gca                                                        13

<210> SEQ ID NO 34
<211> LENGTH: 40
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 34
tcagccatgg aagtgatcct ggtggagtca gggggagact                           40

<210> SEQ ID NO 35
<211> LENGTH: 40
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 35
tgaggatccg ccacctcctg aggagacgga gaccgtggtc                           40

<210> SEQ ID NO 36
```

```
<211> LENGTH: 31
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 36
ctgaggatcc gacattgtga tgtcacaatc t                              31

<210> SEQ ID NO 37
<211> LENGTH: 30
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 37
atcctcgagc cgtttcagct ccagcttggt                                30

<210> SEQ ID NO 38
<211> LENGTH: 29
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 38
ccatggaagt gcagctggtg gagtcaggg                                 29

<210> SEQ ID NO 39
<211> LENGTH: 63
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 39
gctcgagccg tttcagctcc agcttggtcc cagcaccgaa cgtgctcaga taataaactt   60
gag                                                              63

<210> SEQ ID NO 40
<211> LENGTH: 28
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 40
cgtaccatgg aggtccaact ggtggaga                                  28

<210> SEQ ID NO 41
<211> LENGTH: 37
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 41
cataggatcc accgcctccg gagacggtga ccggggt                        37
```

-continued

<210> SEQ ID NO 42
<211> LENGTH: 30
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 42
ctgaggatcc gacatccagc tgacccagag                                        30

<210> SEQ ID NO 43
<211> LENGTH: 30
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 43
gctactcgag acgtttgatt tccaccttgg                                        30

<210> SEQ ID NO 44
<211> LENGTH: 44
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 44
tgaccggtct gcagactagt ggtaccgtcg acaggcctgc tagc                        44

<210> SEQ ID NO 45
<211> LENGTH: 44
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 45
tcagctagca ggcctgtcga cggtaccact agtctgcaga ccgg                        44

<210> SEQ ID NO 46
<211> LENGTH: 119
<212> TYPE: PRT
<213> ORGANISM: Mus sp.

<400> SEQUENCE: 46

Glu Val Ile Leu Val Glu Ser Gly Gly Asp Leu Val Lys Pro Gly Gly
1               5                   10                  15

Ser Leu Lys Leu Ser Cys Ala Ala Ser Gly Phe Thr Phe Ser Ile Tyr
            20                  25                  30

Thr Met Ser Trp Leu Arg Gln Thr Pro Glu Lys Arg Leu Glu Trp Val
        35                  40                  45

Ala Thr Leu Ser Gly Asp Gly Asp Ile Tyr Tyr Pro Asp Ser Val
    50                  55                  60

Lys Gly Arg Phe Thr Ile Ser Arg Asp Asn Ala Lys Asn Asn Leu Tyr
65                  70                  75                  80

Leu Gln Met Asn Ser Leu Arg Ser Ala Asp Thr Ala Leu Tyr Tyr Cys
                85                  90                  95

Ala Arg Val Arg Leu Gly Asp Trp Asp Phe Asp Val Trp Gly Gln Gly
            100                 105                 110

Thr Thr Val Ser Val Ser Ser
        115

<210> SEQ ID NO 47
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 47

Glu Val Gln Leu Val Glu Ser Gly Gly Asp Leu Val Lys Pro Gly Gly
1               5                   10                  15

Ser Leu Lys Leu Ser Cys Ala Ala Ser Gly Phe Thr Phe Ser Ile Tyr
            20                  25                  30

Thr Met Ser Trp Leu Arg Gln Thr Pro Glu Lys Arg Leu Glu Trp Val
        35                  40                  45

Ala Thr Leu Ser Gly Asp Gly Asp Ile Tyr Tyr Pro Asp Ser Val
    50                  55                  60

Lys Gly Arg Phe Thr Ile Ser Arg Asp Asn Ala Lys Asn Asn Leu Tyr
65                  70                  75                  80

Leu Gln Met Asn Ser Leu Arg Ser Ala Asp Thr Ala Leu Tyr Tyr Cys
                85                  90                  95

Ala Arg Val Arg Leu Gly Asp Trp Asp Phe Asp Val Trp Gly Gln Gly
                100                 105                 110

Thr Thr Val Ser Val Ser Ser
        115

<210> SEQ ID NO 48
<211> LENGTH: 113
<212> TYPE: PRT
<213> ORGANISM: Mus sp.

<400> SEQUENCE: 48

Asp Ile Val Met Ser Gln Ser Pro Ser Ser Leu Ala Val Ser Pro Gly
1               5                   10                  15

Glu Lys Val Thr Met Thr Cys Lys Ser Ser Gln Ser Leu Phe Asn Ser
            20                  25                  30

Arg Thr Arg Lys Asn Tyr Leu Gly Trp Tyr Gln Gln Lys Pro Gly Gln
        35                  40                  45

Ser Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Asn Ser Val Gln Ser Glu Asp Leu Ala Val Tyr Tyr Cys Thr Gln
                85                  90                  95

Val Tyr Tyr Leu Ser Thr Phe Gly Ala Gly Thr Lys Leu Glu Leu Lys
                100                 105                 110

Arg

<210> SEQ ID NO 49
<211> LENGTH: 113
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 49

```
Asp Ile Val Met Thr Gln Ser Pro Ser Ser Leu Ala Val Ser Pro Gly
1               5                   10                  15

Glu Arg Val Thr Leu Thr Cys Lys Ser Ser Gln Ser Leu Phe Asn Ser
            20                  25                  30

Arg Thr Arg Lys Asn Tyr Leu Gly Trp Tyr Gln Gln Lys Pro Gly Gln
        35                  40                  45

Ser Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Asn Ser Leu Gln Ala Glu Asp Val Ala Val Tyr Tyr Cys Thr Gln
                85                  90                  95

Val Tyr Tyr Leu Cys Thr Phe Gly Ala Gly Thr Lys Leu Glu Leu Lys
            100                 105                 110

Arg
```

<210> SEQ ID NO 50
<211> LENGTH: 807
<212> TYPE: DNA
<213> ORGANISM: Artificial Sequence
<220> FEATURE:
<223> OTHER INFORMATION: Description of Artificial Sequence: Synthetic polynucleotide
<220> FEATURE:
<221> NAME/KEY: CDS
<222> LOCATION: (1)..(804)

<400> SEQUENCE: 50

```
atg aaa tac ctg ctg ccg acc gct gct gct ggt ctg ctg ctc ctc gct      48
Met Lys Tyr Leu Leu Pro Thr Ala Ala Ala Gly Leu Leu Leu Leu Ala
1               5                   10                  15 gcc cag ccg gcg atg gcc atg gaa gtg atc ctg gtg gag tca ggg gga      96
Ala Gln Pro Ala Met Ala Met Glu Val Ile Leu Val Glu Ser Gly Gly
            20                  25                  30 gac tta gtg aag cct gga ggg tcc ctg aaa ctc tcc tgt gca gcc tct     144
Asp Leu Val Lys Pro Gly Gly Ser Leu Lys Leu Ser Cys Ala Ala Ser
        35                  40                  45 gga ttc act ttc agt att tac acc atg tct tgg ctt cgc cag act ccg     192
Gly Phe Thr Phe Ser Ile Tyr Thr Met Ser Trp Leu Arg Gln Thr Pro
    50                  55                  60 gaa aag agg ctg gag tgg gtc gca acc ctg agt ggt gat ggt gat gac     240
Glu Lys Arg Leu Glu Trp Val Ala Thr Leu Ser Gly Asp Gly Asp Asp
65                  70                  75                  80 atc tac tat cca gac agt gtg aag ggt cga ttc acc atc tcc aga gac     288
Ile Tyr Tyr Pro Asp Ser Val Lys Gly Arg Phe Thr Ile Ser Arg Asp
                85                  90                  95 aat gcc aag aac aac cta tat ctg caa atg aac agt cta agg tct gcg     336
Asn Ala Lys Asn Asn Leu Tyr Leu Gln Met Asn Ser Leu Arg Ser Ala
            100                 105                 110 gac acg gcc ttg tat tac tgt gca agg gtg cga ctt ggg gac tgg gac     384
Asp Thr Ala Leu Tyr Tyr Cys Ala Arg Val Arg Leu Gly Asp Trp Asp
        115                 120                 125 ttc gat gtc tgg ggc caa ggg acc acg gtc tcc gtc tcc tca gga ggt     432
Phe Asp Val Trp Gly Gln Gly Thr Thr Val Ser Val Ser Ser Gly Gly
    130                 135                 140 ggc gga tcc gac att gtg atg tca caa tct cca tcc tcc ctg gct gtg     480
Gly Gly Ser Asp Ile Val Met Ser Gln Ser Pro Ser Ser Leu Ala Val
145                 150                 155                 160
```

```
tca cca gga gag aag gtc act atg acc tgc aaa tcc agt cag agt ctg     528
Ser Pro Gly Glu Lys Val Thr Met Thr Cys Lys Ser Ser Gln Ser Leu
            165                 170                 175 ttc aac agt aga acc cga aag aac tac ttg ggt tgg tac cag cag aaa     576
Phe Asn Ser Arg Thr Arg Lys Asn Tyr Leu Gly Trp Tyr Gln Gln Lys
        180                 185                 190 cca ggg cag tct cct aaa ctt ctg atc tac tgg gca tct act cgg gaa     624
Pro Gly Gln Ser Pro Lys Leu Leu Ile Tyr Trp Ala Ser Thr Arg Glu
    195                 200                 205 tct ggg gtc cct gat cgc ttc aca ggc agt gga tct ggg aca gat ttc     672
Ser Gly Val Pro Asp Arg Phe Thr Gly Ser Gly Ser Gly Thr Asp Phe
210                 215                 220 act ctc acc atc aac agt gtg cag tct gaa gac ctg gca gtt tat tac     720
Thr Leu Thr Ile Asn Ser Val Gln Ser Glu Asp Leu Ala Val Tyr Tyr
225                 230                 235                 240 tgc act caa gtt tat tat ctg tgc acg ttc ggt gct ggg acc aag ctg     768
Cys Thr Gln Val Tyr Tyr Leu Cys Thr Phe Gly Ala Gly Thr Lys Leu
                245                 250                 255 gag ctg aaa cgg ctc gag cac cac cac cac cac cac tga                 807
Glu Leu Lys Arg Leu Glu His His His His His His
            260                 265
```

<210> SEQ ID NO 51
<211> LENGTH: 268
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

```
Met Lys Tyr Leu Leu Pro Thr Ala Ala Ala Gly Leu Leu Leu Leu Ala
1               5                   10                  15

Ala Gln Pro Ala Met Ala Met Glu Val Ile Leu Val Glu Ser Gly Gly
            20                  25                  30

Asp Leu Val Lys Pro Gly Gly Ser Leu Lys Leu Ser Cys Ala Ala Ser
        35                  40                  45

Gly Phe Thr Phe Ser Ile Tyr Thr Met Ser Trp Leu Arg Gln Thr Pro
    50                  55                  60

Glu Lys Arg Leu Glu Trp Val Ala Thr Leu Ser Gly Asp Gly Asp Asp
65                  70                  75                  80

Ile Tyr Tyr Pro Asp Ser Val Lys Gly Arg Phe Thr Ile Ser Arg Asp
                85                  90                  95

Asn Ala Lys Asn Asn Leu Tyr Leu Gln Met Asn Ser Leu Arg Ser Ala
            100                 105                 110

Asp Thr Ala Leu Tyr Tyr Cys Ala Arg Val Arg Leu Gly Asp Trp Asp
        115                 120                 125

Phe Asp Val Trp Gly Gln Gly Thr Thr Val Ser Val Ser Ser Gly Gly
    130                 135                 140

Gly Gly Ser Asp Ile Val Met Ser Gln Ser Pro Ser Ser Leu Ala Val
145                 150                 155                 160

Ser Pro Gly Glu Lys Val Thr Met Thr Cys Lys Ser Ser Gln Ser Leu
                165                 170                 175

Phe Asn Ser Arg Thr Arg Lys Asn Tyr Leu Gly Trp Tyr Gln Gln Lys
            180                 185                 190

Pro Gly Gln Ser Pro Lys Leu Leu Ile Tyr Trp Ala Ser Thr Arg Glu
        195                 200                 205

Ser Gly Val Pro Asp Arg Phe Thr Gly Ser Gly Ser Gly Thr Asp Phe
```

```
                    210                 215                 220
Thr Leu Thr Ile Asn Ser Val Gln Ser Glu Asp Leu Ala Val Tyr Tyr
225                 230                 235                 240

Cys Thr Gln Val Tyr Tyr Leu Cys Thr Phe Gly Ala Gly Thr Lys Leu
                245                 250                 255

Glu Leu Lys Arg Leu Glu His His His His His His
            260                 265

<210> SEQ ID NO 52
<211> LENGTH: 807
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(804)

<400> SEQUENCE: 52 atg aaa tac ctg ctg ccg acc gct gct gct ggt ctg ctg ctc ctc gct    48
Met Lys Tyr Leu Leu Pro Thr Ala Ala Ala Gly Leu Leu Leu Leu Ala
1               5                  10                  15 gcc cag ccg gcg atg gcc atg gaa gtg cag ctg gtg gag tca ggg gga    96
Ala Gln Pro Ala Met Ala Met Glu Val Gln Leu Val Glu Ser Gly Gly
            20                  25                  30 gac tta gtg aag cct gga ggg tcc ctg aaa ctc tcc tgt gca gcc tct   144
Asp Leu Val Lys Pro Gly Gly Ser Leu Lys Leu Ser Cys Ala Ala Ser
        35                  40                  45 gga ttc act ttc agt att tac acc atg tct tgg ctt cgc cag act ccg   192
Gly Phe Thr Phe Ser Ile Tyr Thr Met Ser Trp Leu Arg Gln Thr Pro
    50                  55                  60 gaa aag agg ctg gag tgg gtc gca acc ctg agt ggt gat ggt gat gac   240
Glu Lys Arg Leu Glu Trp Val Ala Thr Leu Ser Gly Asp Gly Asp Asp
65                  70                  75                  80 atc tac tat cca gac agt gtg aag ggt cga ttc acc atc tcc aga gac   288
Ile Tyr Tyr Pro Asp Ser Val Lys Gly Arg Phe Thr Ile Ser Arg Asp
                85                  90                  95 aat gcc aag aac aac cta tat ctg caa atg aac agt cta agg tct gcg   336
Asn Ala Lys Asn Asn Leu Tyr Leu Gln Met Asn Ser Leu Arg Ser Ala
            100                 105                 110 gac acg gcc ttg tat tac tgt gca agg gtg cga ctt ggg gac tgg gac   384
Asp Thr Ala Leu Tyr Tyr Cys Ala Arg Val Arg Leu Gly Asp Trp Asp
        115                 120                 125 ttc gat gtc tgg ggc caa ggg acc acg gtc tcc gtc tcc tca gga ggt   432
Phe Asp Val Trp Gly Gln Gly Thr Thr Val Ser Val Ser Ser Gly Gly
    130                 135                 140 ggc gga tcc gac att gtg atg tca caa tct cca tcc tcc ctg gct gtg   480
Gly Gly Ser Asp Ile Val Met Ser Gln Ser Pro Ser Ser Leu Ala Val
145                 150                 155                 160 tca cca gga gag aag gtc act atg acc tgc aaa tcc agt cag agt ctg   528
Ser Pro Gly Glu Lys Val Thr Met Thr Cys Lys Ser Ser Gln Ser Leu
                165                 170                 175 ttc aac agt aga acc cga aag aac tac ttg ggt tgg tac cag cag aaa   576
Phe Asn Ser Arg Thr Arg Lys Asn Tyr Leu Gly Trp Tyr Gln Gln Lys
            180                 185                 190 cca ggg cag tct cct aaa ctt ctg atc tac tgg gca tct act cgg gaa   624
Pro Gly Gln Ser Pro Lys Leu Leu Ile Tyr Trp Ala Ser Thr Arg Glu
        195                 200                 205 tct ggg gtc cct gat cgc ttc aca ggc agt gga tct ggg aca gat ttc   672
Ser Gly Val Pro Asp Arg Phe Thr Gly Ser Gly Ser Gly Thr Asp Phe
```

```
                     210                 215                 220
act ctc acc atc aac agt gtg cag tct gaa gac ctg gca gtt tat tac        720
Thr Leu Thr Ile Asn Ser Val Gln Ser Glu Asp Leu Ala Val Tyr Tyr
225                 230                 235                 240 tgc act caa gtt tat tat ctg tgc acg ttc ggt gct ggg acc aag ctg        768
Cys Thr Gln Val Tyr Tyr Leu Cys Thr Phe Gly Ala Gly Thr Lys Leu
                245                 250                 255 gag ctg aaa cgg ctc gag cac cac cac cac cac cac tga                    807
Glu Leu Lys Arg Leu Glu His His His His His His
                260                 265
```

<210> SEQ ID NO 53
<211> LENGTH: 268
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 53

```
Met Lys Tyr Leu Leu Pro Thr Ala Ala Gly Leu Leu Leu Leu Ala
1               5                   10                  15

Ala Gln Pro Ala Met Ala Met Glu Val Gln Leu Val Glu Ser Gly Gly
                20                  25                  30

Asp Leu Val Lys Pro Gly Gly Ser Leu Lys Leu Ser Cys Ala Ala Ser
                35                  40                  45

Gly Phe Thr Phe Ser Ile Tyr Thr Met Ser Trp Leu Arg Gln Thr Pro
            50                  55                  60

Glu Lys Arg Leu Glu Trp Val Ala Thr Leu Ser Gly Asp Gly Asp Asp
65                  70                  75                  80

Ile Tyr Tyr Pro Asp Ser Val Lys Gly Arg Phe Thr Ile Ser Arg Asp
                    85                  90                  95

Asn Ala Lys Asn Asn Leu Tyr Leu Gln Met Asn Ser Leu Arg Ser Ala
                100                 105                 110

Asp Thr Ala Leu Tyr Tyr Cys Ala Arg Val Arg Leu Gly Asp Trp Asp
            115                 120                 125

Phe Asp Val Trp Gly Gln Gly Thr Thr Val Ser Val Ser Ser Gly Gly
        130                 135                 140

Gly Gly Ser Asp Ile Val Met Ser Gln Ser Pro Ser Ser Leu Ala Val
145                 150                 155                 160

Ser Pro Gly Glu Lys Val Thr Met Thr Cys Lys Ser Ser Gln Ser Leu
                165                 170                 175

Phe Asn Ser Arg Thr Arg Lys Asn Tyr Leu Gly Trp Tyr Gln Gln Lys
                180                 185                 190

Pro Gly Gln Ser Pro Lys Leu Leu Ile Tyr Trp Ala Ser Thr Arg Glu
            195                 200                 205

Ser Gly Val Pro Asp Arg Phe Thr Gly Ser Gly Ser Gly Thr Asp Phe
        210                 215                 220

Thr Leu Thr Ile Asn Ser Val Gln Ser Glu Asp Leu Ala Val Tyr Tyr
225                 230                 235                 240

Cys Thr Gln Val Tyr Tyr Leu Cys Thr Phe Gly Ala Gly Thr Lys Leu
                245                 250                 255

Glu Leu Lys Arg Leu Glu His His His His His His
                260                 265
```

<210> SEQ ID NO 54
<211> LENGTH: 807

```
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(804)

<400> SEQUENCE: 54
```

| | | | | | | | | | | | | | | | | |
|---|---|---|---|---|---|---|---|---|---|---|---|---|---|---|---|---|
| atg | aaa | tac | ctg | ctg | ccg | acc | gct | gct | gct | ggt | ctg | ctg | ctc | ctc | gct | 48 |
| Met | Lys | Tyr | Leu | Leu | Pro | Thr | Ala | Ala | Ala | Gly | Leu | Leu | Leu | Leu | Ala | |
| 1 | | | | 5 | | | | | 10 | | | | | 15 | | |
| gcc | cag | ccg | gcg | atg | gcc | atg | gaa | gtg | atc | ctg | gtg | gag | tca | ggg | gga | 96 |
| Ala | Gln | Pro | Ala | Met | Ala | Met | Glu | Val | Ile | Leu | Val | Glu | Ser | Gly | Gly | |
| | | | 20 | | | | | 25 | | | | | 30 | | | |
| gac | tta | gtg | aag | cct | gga | ggg | tcc | ctg | aaa | ctc | tcc | tgt | gca | gcc | tct | 144 |
| Asp | Leu | Val | Lys | Pro | Gly | Gly | Ser | Leu | Lys | Leu | Ser | Cys | Ala | Ala | Ser | |
| | | 35 | | | | | 40 | | | | | 45 | | | | |
| gga | ttc | act | ttc | agt | att | tac | acc | atg | tct | tgg | ctt | cgc | cag | act | ccg | 192 |
| Gly | Phe | Thr | Phe | Ser | Ile | Tyr | Thr | Met | Ser | Trp | Leu | Arg | Gln | Thr | Pro | |
| 50 | | | | | 55 | | | | | 60 | | | | | | |
| gaa | aag | agg | ctg | gag | tgg | gtc | gca | acc | ctg | agt | ggt | gat | ggt | gat | gac | 240 |
| Glu | Lys | Arg | Leu | Glu | Trp | Val | Ala | Thr | Leu | Ser | Gly | Asp | Gly | Asp | Asp | |
| 65 | | | | 70 | | | | | 75 | | | | | 80 | | |
| atc | tac | tat | cca | gac | agt | gtg | aag | ggt | cga | ttc | acc | atc | tcc | aga | gac | 288 |
| Ile | Tyr | Tyr | Pro | Asp | Ser | Val | Lys | Gly | Arg | Phe | Thr | Ile | Ser | Arg | Asp | |
| | | | 85 | | | | | 90 | | | | | 95 | | | |
| aat | gcc | aag | aac | aac | cta | tat | ctg | caa | atg | aac | agt | cta | agg | tct | gcg | 336 |
| Asn | Ala | Lys | Asn | Asn | Leu | Tyr | Leu | Gln | Met | Asn | Ser | Leu | Arg | Ser | Ala | |
| | | 100 | | | | | 105 | | | | | 110 | | | | |
| gac | acg | gcc | ttg | tat | tac | tgt | gca | agg | gtg | cga | ctt | ggg | gac | tgg | gac | 384 |
| Asp | Thr | Ala | Leu | Tyr | Tyr | Cys | Ala | Arg | Val | Arg | Leu | Gly | Asp | Trp | Asp | |
| | 115 | | | | | 120 | | | | | 125 | | | | | |
| ttc | gat | gtc | tgg | ggc | caa | ggg | acc | acg | gtc | tcc | gtc | tcc | tca | gga | ggt | 432 |
| Phe | Asp | Val | Trp | Gly | Gln | Gly | Thr | Thr | Val | Ser | Val | Ser | Ser | Gly | Gly | |
| 130 | | | | | 135 | | | | | 140 | | | | | | |
| ggc | gga | tcc | gac | att | gtg | atg | tca | caa | tct | cca | tcc | tcc | ctg | gct | gtg | 480 |
| Gly | Gly | Ser | Asp | Ile | Val | Met | Ser | Gln | Ser | Pro | Ser | Ser | Leu | Ala | Val | |
| 145 | | | | | 150 | | | | | 155 | | | | | 160 | |
| tca | cca | gga | gag | aag | gtc | act | atg | acc | tgc | aaa | tcc | agt | cag | agt | ctg | 528 |
| Ser | Pro | Gly | Glu | Lys | Val | Thr | Met | Thr | Cys | Lys | Ser | Ser | Gln | Ser | Leu | |
| | | | | 165 | | | | | 170 | | | | | 175 | | |
| ttc | aac | agt | aga | acc | cga | aag | aac | tac | ttg | ggt | tgg | tac | cag | cag | aaa | 576 |
| Phe | Asn | Ser | Arg | Thr | Arg | Lys | Asn | Tyr | Leu | Gly | Trp | Tyr | Gln | Gln | Lys | |
| | | | 180 | | | | | 185 | | | | | 190 | | | |
| cca | ggg | cag | tct | cct | aaa | ctt | ctg | atc | tac | tgg | gca | tct | act | cgg | gaa | 624 |
| Pro | Gly | Gln | Ser | Pro | Lys | Leu | Leu | Ile | Tyr | Trp | Ala | Ser | Thr | Arg | Glu | |
| | | 195 | | | | | 200 | | | | | 205 | | | | |
| tct | ggg | gtc | cct | gat | cgc | ttc | aca | ggc | agt | gga | tct | ggg | aca | gat | ttc | 672 |
| Ser | Gly | Val | Pro | Asp | Arg | Phe | Thr | Gly | Ser | Gly | Ser | Gly | Thr | Asp | Phe | |
| 210 | | | | | 215 | | | | | 220 | | | | | | |
| act | ctc | acc | atc | aac | agt | gtg | cag | tct | gaa | gac | ctg | gca | gtt | tat | tac | 720 |
| Thr | Leu | Thr | Ile | Asn | Ser | Val | Gln | Ser | Glu | Asp | Leu | Ala | Val | Tyr | Tyr | |
| 225 | | | | | 230 | | | | | 235 | | | | | 240 | |
| tgc | act | caa | gtt | tat | tat | ctg | agc | acg | ttc | ggt | gct | ggg | acc | aag | ctg | 768 |
| Cys | Thr | Gln | Val | Tyr | Tyr | Leu | Ser | Thr | Phe | Gly | Ala | Gly | Thr | Lys | Leu | |
| | | | | 245 | | | | | 250 | | | | | 255 | | |
| gag | ctg | aaa | cgg | ctc | gag | cac | cac | cac | cac | cac | cac | tga | | | | 807 |
| Glu | Leu | Lys | Arg | Leu | Glu | His | His | His | His | His | His | | | | | |
| | | | 260 | | | | | 265 | | | | | | | | |

<210> SEQ ID NO 55
<211> LENGTH: 268
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 55

```
Met Lys Tyr Leu Leu Pro Thr Ala Ala Ala Gly Leu Leu Leu Leu Ala
1               5                   10                  15

Ala Gln Pro Ala Met Ala Met Glu Val Ile Leu Val Glu Ser Gly Gly
            20                  25                  30

Asp Leu Val Lys Pro Gly Gly Ser Leu Lys Leu Ser Cys Ala Ala Ser
        35                  40                  45

Gly Phe Thr Phe Ser Ile Tyr Thr Met Ser Trp Leu Arg Gln Thr Pro
    50                  55                  60

Glu Lys Arg Leu Glu Trp Val Ala Thr Leu Ser Gly Asp Gly Asp Asp
65                  70                  75                  80

Ile Tyr Tyr Pro Asp Ser Val Lys Gly Arg Phe Thr Ile Ser Arg Asp
                85                  90                  95

Asn Ala Lys Asn Asn Leu Tyr Leu Gln Met Asn Ser Leu Arg Ser Ala
            100                 105                 110

Asp Thr Ala Leu Tyr Tyr Cys Ala Arg Val Arg Leu Gly Asp Trp Asp
        115                 120                 125

Phe Asp Val Trp Gly Gln Gly Thr Thr Val Ser Val Ser Ser Gly Gly
    130                 135                 140

Gly Gly Ser Asp Ile Val Met Ser Gln Ser Pro Ser Ser Leu Ala Val
145                 150                 155                 160

Ser Pro Gly Glu Lys Val Thr Met Thr Cys Lys Ser Ser Gln Ser Leu
                165                 170                 175

Phe Asn Ser Arg Thr Arg Lys Asn Tyr Leu Gly Trp Tyr Gln Gln Lys
            180                 185                 190

Pro Gly Gln Ser Pro Lys Leu Leu Ile Tyr Trp Ala Ser Thr Arg Glu
        195                 200                 205

Ser Gly Val Pro Asp Arg Phe Thr Gly Ser Gly Ser Gly Thr Asp Phe
    210                 215                 220

Thr Leu Thr Ile Asn Ser Val Gln Ser Glu Asp Leu Ala Val Tyr Tyr
225                 230                 235                 240

Cys Thr Gln Val Tyr Tyr Leu Ser Thr Phe Gly Ala Gly Thr Lys Leu
                245                 250                 255

Glu Leu Lys Arg Leu Glu His His His His His
            260                 265
```

<210> SEQ ID NO 56
<211> LENGTH: 807
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(804)

<400> SEQUENCE: 56

```
atg aaa tac ctg ctg ccg acc gct gct gct ggt ctg ctg ctc ctc gct     48
Met Lys Tyr Leu Leu Pro Thr Ala Ala Ala Gly Leu Leu Leu Leu Ala
1               5                   10                  15
```

```
gcc cag ccg gcg atg gcc atg gaa gtg cag ctg gtg gag tca ggg gga    96
Ala Gln Pro Ala Met Ala Met Glu Val Gln Leu Val Glu Ser Gly Gly
            20                  25                  30 gac tta gtg aag cct gga ggg tcc ctg aaa ctc tcc tgt gca gcc tct   144
Asp Leu Val Lys Pro Gly Gly Ser Leu Lys Leu Ser Cys Ala Ala Ser
        35                  40                  45 gga ttc act ttc agt att tac acc atg tct tgg ctt cgc cag act ccg   192
Gly Phe Thr Phe Ser Ile Tyr Thr Met Ser Trp Leu Arg Gln Thr Pro
    50                  55                  60 gaa aag agg ctg gag tgg gtc gca acc ctg agt ggt gat ggt gat gac   240
Glu Lys Arg Leu Glu Trp Val Ala Thr Leu Ser Gly Asp Gly Asp Asp
65                  70                  75                  80 atc tac tat cca gac agt gtg aag ggt cga ttc acc atc tcc aga gac   288
Ile Tyr Tyr Pro Asp Ser Val Lys Gly Arg Phe Thr Ile Ser Arg Asp
                85                  90                  95 aat gcc aag aac aac cta tat ctg caa atg aac agt cta agg tct gcg   336
Asn Ala Lys Asn Asn Leu Tyr Leu Gln Met Asn Ser Leu Arg Ser Ala
            100                 105                 110 gac acg gcc ttg tat tac tgt gca agg gtg cga ctt ggg gac tgg gac   384
Asp Thr Ala Leu Tyr Tyr Cys Ala Arg Val Arg Leu Gly Asp Trp Asp
        115                 120                 125 ttc gat gtc tgg ggc caa ggg acc acg gtc tcc gtc tca gga ggt       432
Phe Asp Val Trp Gly Gln Gly Thr Thr Val Ser Val Ser Ser Gly Gly
    130                 135                 140 ggc gga tcc gac att gtg atg tca caa tct cca tcc tcc ctg gct gtg   480
Gly Gly Ser Asp Ile Val Met Ser Gln Ser Pro Ser Ser Leu Ala Val
145                 150                 155                 160 tca cca gga gag aag gtc act atg acc tgc aaa tcc agt cag agt ctg   528
Ser Pro Gly Glu Lys Val Thr Met Thr Cys Lys Ser Ser Gln Ser Leu
                165                 170                 175 ttc aac agt aga acc cga aag aac tac ttg ggt tgg tac cag cag aaa   576
Phe Asn Ser Arg Thr Arg Lys Asn Tyr Leu Gly Trp Tyr Gln Gln Lys
            180                 185                 190 cca ggg cag tct cct aaa ctt ctg atc tac tgg gca tct act cgg gaa   624
Pro Gly Gln Ser Pro Lys Leu Leu Ile Tyr Trp Ala Ser Thr Arg Glu
        195                 200                 205 tct ggg gtc cct gat cgc ttc aca ggc agt gga tct ggg aca gat ttc   672
Ser Gly Val Pro Asp Arg Phe Thr Gly Ser Gly Ser Gly Thr Asp Phe
    210                 215                 220 act ctc acc atc aac agt gtg cag tct gaa gac ctg gca gtt tat tac   720
Thr Leu Thr Ile Asn Ser Val Gln Ser Glu Asp Leu Ala Val Tyr Tyr
225                 230                 235                 240 tgc act caa gtt tat tat ctg agc acg ttc ggt gct ggg acc aag ctg   768
Cys Thr Gln Val Tyr Tyr Leu Ser Thr Phe Gly Ala Gly Thr Lys Leu
                245                 250                 255 gag ctg aaa cgg ctc gag cac cac cac cac cac cac tga                807
Glu Leu Lys Arg Leu Glu His His His His His His
            260                 265
```

<210> SEQ ID NO 57
<211> LENGTH: 268
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 57

Met Lys Tyr Leu Leu Pro Thr Ala Ala Ala Gly Leu Leu Leu Leu Ala
1               5                   10                  15

```
Ala Gln Pro Ala Met Ala Met Glu Val Gln Leu Val Glu Ser Gly Gly
             20                  25                  30

Asp Leu Val Lys Pro Gly Gly Ser Leu Lys Leu Ser Cys Ala Ala Ser
         35                  40                  45

Gly Phe Thr Phe Ser Ile Tyr Thr Met Ser Trp Leu Arg Gln Thr Pro
     50                  55                  60

Glu Lys Arg Leu Glu Trp Val Ala Thr Leu Ser Gly Asp Gly Asp Asp
65                  70                  75                  80

Ile Tyr Tyr Pro Asp Ser Val Lys Gly Arg Phe Thr Ile Ser Arg Asp
                 85                  90                  95

Asn Ala Lys Asn Asn Leu Tyr Leu Gln Met Asn Ser Leu Arg Ser Ala
            100                 105                 110

Asp Thr Ala Leu Tyr Tyr Cys Ala Arg Val Arg Leu Gly Asp Trp Asp
        115                 120                 125

Phe Asp Val Trp Gly Gln Gly Thr Thr Val Ser Val Ser Ser Gly Gly
    130                 135                 140

Gly Gly Ser Asp Ile Val Met Ser Gln Ser Pro Ser Ser Leu Ala Val
145                 150                 155                 160

Ser Pro Gly Glu Lys Val Thr Met Thr Cys Lys Ser Ser Gln Ser Leu
                165                 170                 175

Phe Asn Ser Arg Thr Arg Lys Asn Tyr Leu Gly Trp Tyr Gln Gln Lys
            180                 185                 190

Pro Gly Gln Ser Pro Lys Leu Leu Ile Tyr Trp Ala Ser Thr Arg Glu
        195                 200                 205

Ser Gly Val Pro Asp Arg Phe Thr Gly Ser Gly Ser Gly Thr Asp Phe
    210                 215                 220

Thr Leu Thr Ile Asn Ser Val Gln Ser Glu Asp Leu Ala Val Tyr Tyr
225                 230                 235                 240

Cys Thr Gln Val Tyr Tyr Leu Ser Thr Phe Gly Ala Gly Thr Lys Leu
                245                 250                 255

Glu Leu Lys Arg Leu Glu His His His His His His
            260                 265

<210> SEQ ID NO 58
<211> LENGTH: 786
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(783)

<400> SEQUENCE: 58 atg aaa tac ctg ctg ccg acc gct gct gct ggt ctg ctg ctc ctc gct      48
Met Lys Tyr Leu Leu Pro Thr Ala Ala Ala Gly Leu Leu Leu Leu Ala
1               5                  10                  15 gcc cag ccg gcg atg gcc atg gag gtc caa ctg gtg gag agc ggt gga      96
Ala Gln Pro Ala Met Ala Met Glu Val Gln Leu Val Glu Ser Gly Gly
             20                  25                  30 ggt gtt gtg caa cct ggc cgg tcc ctg cgc ctg tcc tgc tcc gca tct     144
Gly Val Val Gln Pro Gly Arg Ser Leu Arg Leu Ser Cys Ser Ala Ser
         35                  40                  45 ggc ttc gat ttc acc aca tat tgg atg agt tgg gtg aga cag gca cct     192
Gly Phe Asp Phe Thr Thr Tyr Trp Met Ser Trp Val Arg Gln Ala Pro
     50                  55                  60 gga aaa ggt ctt gag tgg att gga gaa att cat cca gat agc agt acg     240
```

```
Gly Lys Gly Leu Glu Trp Ile Gly Glu Ile His Pro Asp Ser Ser Thr
 65                  70                  75                  80 att aac tat gcg ccg tct cta aag gat aga ttt aca ata tcg cga gac      288
Ile Asn Tyr Ala Pro Ser Leu Lys Asp Arg Phe Thr Ile Ser Arg Asp
                 85                  90                  95 aac gcc aag aac aca ttg ttc ctg caa atg gac agc ctg aga ccc gaa      336
Asn Ala Lys Asn Thr Leu Phe Leu Gln Met Asp Ser Leu Arg Pro Glu
            100                 105                 110 gac acc ggg gtc tat ttt tgt gca agc ctt tac ttc ggc ttc ccc tgg      384
Asp Thr Gly Val Tyr Phe Cys Ala Ser Leu Tyr Phe Gly Phe Pro Trp
        115                 120                 125 ttt gct tat tgg ggc caa ggg acc ccg gtc acc gtc tcc gga ggc ggt      432
Phe Ala Tyr Trp Gly Gln Gly Thr Pro Val Thr Val Ser Gly Gly Gly
    130                 135                 140 gga tcc gac atc cag ctg acc cag agc cca agc agc ctg agc gcc agc      480
Gly Ser Asp Ile Gln Leu Thr Gln Ser Pro Ser Ser Leu Ser Ala Ser
145                 150                 155                 160 gtg ggt gac aga gtg acc atc acc tgt aag gcc agt cag gat gtg ggt      528
Val Gly Asp Arg Val Thr Ile Thr Cys Lys Ala Ser Gln Asp Val Gly
                165                 170                 175 act tct gta gcc tgg tac cag cag aag cca ggt aag gct cca aag ctg      576
Thr Ser Val Ala Trp Tyr Gln Gln Lys Pro Gly Lys Ala Pro Lys Leu
            180                 185                 190 ctg atc tac tgg aca tcc acc cgg cac act ggt gtg cca agc aga ttc      624
Leu Ile Tyr Trp Thr Ser Thr Arg His Thr Gly Val Pro Ser Arg Phe
        195                 200                 205 agc ggt agc ggt agc ggt acc gac ttc acc ttc acc atc agc agc ctc      672
Ser Gly Ser Gly Ser Gly Thr Asp Phe Thr Phe Thr Ile Ser Ser Leu
    210                 215                 220 cag cca gag gac atc gcc acc tac tac tgc cag caa tat agc ctc tat      720
Gln Pro Glu Asp Ile Ala Thr Tyr Tyr Cys Gln Gln Tyr Ser Leu Tyr
225                 230                 235                 240 cgg tcg ttc ggc caa ggg acc aag gtg gaa atc aaa cgt ctc gag cac      768
Arg Ser Phe Gly Gln Gly Thr Lys Val Glu Ile Lys Arg Leu Glu His
                245                 250                 255 cac cac cac cac cac tga                                              786
His His His His His
            260

<210> SEQ ID NO 59
<211> LENGTH: 261
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 59

Met Lys Tyr Leu Leu Pro Thr Ala Ala Ala Gly Leu Leu Leu Leu Ala
 1               5                  10                  15

Ala Gln Pro Ala Met Ala Met Glu Val Gln Leu Val Glu Ser Gly Gly
            20                  25                  30

Gly Val Val Gln Pro Gly Arg Ser Leu Arg Leu Ser Cys Ser Ala Ser
        35                  40                  45

Gly Phe Asp Phe Thr Thr Tyr Trp Met Ser Trp Val Arg Gln Ala Pro
    50                  55                  60

Gly Lys Gly Leu Glu Trp Ile Gly Glu Ile His Pro Asp Ser Ser Thr
 65                  70                  75                  80

Ile Asn Tyr Ala Pro Ser Leu Lys Asp Arg Phe Thr Ile Ser Arg Asp
                 85                  90                  95
```

-continued

```
Asn Ala Lys Asn Thr Leu Phe Leu Gln Met Asp Ser Leu Arg Pro Glu
            100                 105                 110
Asp Thr Gly Val Tyr Phe Cys Ala Ser Leu Tyr Phe Gly Phe Pro Trp
        115                 120                 125
Phe Ala Tyr Trp Gly Gln Gly Thr Pro Val Thr Val Ser Gly Gly Gly
    130                 135                 140
Gly Ser Asp Ile Gln Leu Thr Gln Ser Pro Ser Ser Leu Ser Ala Ser
145                 150                 155                 160
Val Gly Asp Arg Val Thr Ile Thr Cys Lys Ala Ser Gln Asp Val Gly
                165                 170                 175
Thr Ser Val Ala Trp Tyr Gln Gln Lys Pro Gly Lys Ala Pro Lys Leu
            180                 185                 190
Leu Ile Tyr Trp Thr Ser Thr Arg His Thr Gly Val Pro Ser Arg Phe
        195                 200                 205
Ser Gly Ser Gly Ser Gly Thr Asp Phe Thr Phe Thr Ile Ser Ser Leu
    210                 215                 220
Gln Pro Glu Asp Ile Ala Thr Tyr Tyr Cys Gln Gln Tyr Ser Leu Tyr
225                 230                 235                 240
Arg Ser Phe Gly Gln Gly Thr Lys Val Glu Ile Lys Arg Leu Glu His
                245                 250                 255
His His His His His
            260
```

<210> SEQ ID NO 60
<211> LENGTH: 789
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(786)

<400> SEQUENCE: 60

```
atg aaa tac ctg ctg ccg acc gct gct gct ggt ctg ctg ctc ctc gct     48
Met Lys Tyr Leu Leu Pro Thr Ala Ala Ala Gly Leu Leu Leu Leu Ala
1               5                   10                  15 gcc cag ccg gcg atg gcc atg gaa gtg atc ctg gtg gag tca ggg gga     96
Ala Gln Pro Ala Met Ala Met Glu Val Ile Leu Val Glu Ser Gly Gly
            20                  25                  30 gac tta gtg aag cct gga ggg tcc ctg aaa ctc tcc tgt gca gcc tct    144
Asp Leu Val Lys Pro Gly Gly Ser Leu Lys Leu Ser Cys Ala Ala Ser
        35                  40                  45 gga ttc act ttc agt att tac acc atg tct tgg ctt cgc cag act ccg    192
Gly Phe Thr Phe Ser Ile Tyr Thr Met Ser Trp Leu Arg Gln Thr Pro
    50                  55                  60 gaa aag agg ctg gag tgg gtc gca acc ctg agt ggt gat ggt gat gac    240
Glu Lys Arg Leu Glu Trp Val Ala Thr Leu Ser Gly Asp Gly Asp Asp
65                  70                  75                  80 atc tac tat cca gac agt gtg aag ggt cga ttc acc atc tcc aga gac    288
Ile Tyr Tyr Pro Asp Ser Val Lys Gly Arg Phe Thr Ile Ser Arg Asp
                85                  90                  95 aat gcc aag aac aac cta tat ctg caa atg aac agt cta agg tct gcg    336
Asn Ala Lys Asn Asn Leu Tyr Leu Gln Met Asn Ser Leu Arg Ser Ala
            100                 105                 110 gac acg gcc ttg tat tac tgt gca agg gtg cga ctt ggg gac tgg gac    384
Asp Thr Ala Leu Tyr Tyr Cys Ala Arg Val Arg Leu Gly Asp Trp Asp
        115                 120                 125
```

```
ttc gat gtc tgg ggc caa ggg acc acg gtc tcc gtc tcc tca gga ggt      432
Phe Asp Val Trp Gly Gln Gly Thr Thr Val Ser Val Ser Ser Gly Gly
    130                 135                 140 ggc gga tcc gac atc cag ctg acc cag agc cca agc agc ctg agc gcc      480
Gly Gly Ser Asp Ile Gln Leu Thr Gln Ser Pro Ser Ser Leu Ser Ala
145                 150                 155                 160 agc gtg ggt gac aga gtg acc atc acc tgt aag gcc agt cag gat gtg      528
Ser Val Gly Asp Arg Val Thr Ile Thr Cys Lys Ala Ser Gln Asp Val
                165                 170                 175 ggt act tct gta gcc tgg tac cag cag aag cca ggt aag gct cca aag      576
Gly Thr Ser Val Ala Trp Tyr Gln Gln Lys Pro Gly Lys Ala Pro Lys
            180                 185                 190 ctg ctg atc tac tgg aca tcc acc cgg cac act ggt gtg cca agc aga      624
Leu Leu Ile Tyr Trp Thr Ser Thr Arg His Thr Gly Val Pro Ser Arg
        195                 200                 205 ttc agc ggt agc ggt agc ggt acc gac ttc acc ttc acc atc agc agc      672
Phe Ser Gly Ser Gly Ser Gly Thr Asp Phe Thr Phe Thr Ile Ser Ser
    210                 215                 220 ctc cag cca gag gac atc gcc acc tac tac tgc cag caa tat agc ctc      720
Leu Gln Pro Glu Asp Ile Ala Thr Tyr Tyr Cys Gln Gln Tyr Ser Leu
225                 230                 235                 240 tat cgg tcg ttc ggc caa ggg acc aag gtg gaa atc aaa cgt ctc gag      768
Tyr Arg Ser Phe Gly Gln Gly Thr Lys Val Glu Ile Lys Arg Leu Glu
                245                 250                 255 cac cac cac cac cac cac tga                                          789
His His His His His His
            260

<210> SEQ ID NO 61
<211> LENGTH: 262
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 61

Met Lys Tyr Leu Leu Pro Thr Ala Ala Ala Gly Leu Leu Leu Leu Ala
1               5                   10                  15

Ala Gln Pro Ala Met Ala Met Glu Val Ile Leu Val Glu Ser Gly Gly
            20                  25                  30

Asp Leu Val Lys Pro Gly Gly Ser Leu Lys Leu Ser Cys Ala Ala Ser
        35                  40                  45

Gly Phe Thr Phe Ser Ile Tyr Thr Met Ser Trp Leu Arg Gln Thr Pro
    50                  55                  60

Glu Lys Arg Leu Glu Trp Val Ala Thr Leu Ser Gly Asp Gly Asp Asp
65                  70                  75                  80

Ile Tyr Tyr Pro Asp Ser Val Lys Gly Arg Phe Thr Ile Ser Arg Asp
                85                  90                  95

Asn Ala Lys Asn Asn Leu Tyr Leu Gln Met Asn Ser Leu Arg Ser Ala
            100                 105                 110

Asp Thr Ala Leu Tyr Tyr Cys Ala Arg Val Arg Leu Gly Asp Trp Asp
        115                 120                 125

Phe Asp Val Trp Gly Gln Gly Thr Thr Val Ser Val Ser Ser Gly Gly
    130                 135                 140

Gly Gly Ser Asp Ile Gln Leu Thr Gln Ser Pro Ser Ser Leu Ser Ala
145                 150                 155                 160

Ser Val Gly Asp Arg Val Thr Ile Thr Cys Lys Ala Ser Gln Asp Val
```

```
                         165                 170                 175
Gly Thr Ser Val Ala Trp Tyr Gln Gln Lys Pro Gly Lys Ala Pro Lys
                180                 185                 190

Leu Leu Ile Tyr Trp Thr Ser Thr Arg His Thr Gly Val Pro Ser Arg
            195                 200                 205

Phe Ser Gly Ser Gly Ser Gly Thr Asp Phe Thr Phe Thr Ile Ser Ser
        210                 215                 220

Leu Gln Pro Glu Asp Ile Ala Thr Tyr Tyr Cys Gln Gln Tyr Ser Leu
225                 230                 235                 240

Tyr Arg Ser Phe Gly Gln Gly Thr Lys Val Glu Ile Lys Arg Leu Glu
                245                 250                 255

His His His His His His
            260

<210> SEQ ID NO 62
<211> LENGTH: 804
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(801)

<400> SEQUENCE: 62 atg aaa tac ctg ctg ccg acc gct gct gct ggt ctg ctg ctc ctc gct      48
Met Lys Tyr Leu Leu Pro Thr Ala Ala Ala Gly Leu Leu Leu Leu Ala
1               5                   10                  15 gcc cag ccg gcg atg gcc atg gag gtc caa ctg gtg gag agc ggt gga      96
Ala Gln Pro Ala Met Ala Met Glu Val Gln Leu Val Glu Ser Gly Gly
                20                  25                  30 ggt gtt gtg caa cct ggc cgg tcc ctg cgc ctg tcc tgc tcc gca tct     144
Gly Val Val Gln Pro Gly Arg Ser Leu Arg Leu Ser Cys Ser Ala Ser
            35                  40                  45 ggc ttc gat ttc acc aca tat tgg atg agt tgg gtg aga cag gca cct     192
Gly Phe Asp Phe Thr Thr Tyr Trp Met Ser Trp Val Arg Gln Ala Pro
        50                  55                  60 gga aaa ggt ctt gag tgg att gga gaa att cat cca gat agc agt acg     240
Gly Lys Gly Leu Glu Trp Ile Gly Glu Ile His Pro Asp Ser Ser Thr
65                  70                  75                  80 att aac tat gcg ccg tct cta aag gat aga ttt aca ata tcg cga gac     288
Ile Asn Tyr Ala Pro Ser Leu Lys Asp Arg Phe Thr Ile Ser Arg Asp
                85                  90                  95 aac gcc aag aac aca ttg ttc ctg caa atg gac agc ctg aga ccc gaa     336
Asn Ala Lys Asn Thr Leu Phe Leu Gln Met Asp Ser Leu Arg Pro Glu
            100                 105                 110 gac acc ggg gtc tat ttt tgt gca agc ctt tac ttc ggc ttc ccc tgg     384
Asp Thr Gly Val Tyr Phe Cys Ala Ser Leu Tyr Phe Gly Phe Pro Trp
        115                 120                 125 ttt gct tat tgg ggc caa ggg acc ccg gtc acc gtc tcc gga ggc ggt     432
Phe Ala Tyr Trp Gly Gln Gly Thr Pro Val Thr Val Ser Gly Gly Gly
    130                 135                 140 gga tcc gac att gtg atg tca caa tct cca tcc tcc ctg gct gtg tca     480
Gly Ser Asp Ile Val Met Ser Gln Ser Pro Ser Ser Leu Ala Val Ser
145                 150                 155                 160 cca gga gag aag gtc act atg acc tgc aaa tcc agt cag agt ctg ttc     528
Pro Gly Glu Lys Val Thr Met Thr Cys Lys Ser Ser Gln Ser Leu Phe
                165                 170                 175 aac agt aga acc cga aag aac tac ttg ggt tgg tac cag cag aaa cca     576
```

```
Asn Ser Arg Thr Arg Lys Asn Tyr Leu Gly Trp Tyr Gln Gln Lys Pro
                180                 185                 190 ggg cag tct cct aaa ctt ctg atc tac tgg gca tct act cgg gaa tct      624
Gly Gln Ser Pro Lys Leu Leu Ile Tyr Trp Ala Ser Thr Arg Glu Ser
            195                 200                 205 ggg gtc cct gat cgc ttc aca ggc agt gga tct ggg aca gat ttc act      672
Gly Val Pro Asp Arg Phe Thr Gly Ser Gly Ser Gly Thr Asp Phe Thr
210                 215                 220 ctc acc atc aac agt gtg cag tct gaa gac ctg gca gtt tat tac tgc      720
Leu Thr Ile Asn Ser Val Gln Ser Glu Asp Leu Ala Val Tyr Tyr Cys
225                 230                 235                 240 act caa gtt tat tat ctg tgc acg ttc ggt gct ggg acc aag ctg gag      768
Thr Gln Val Tyr Tyr Leu Cys Thr Phe Gly Ala Gly Thr Lys Leu Glu
                245                 250                 255 ctg aaa cgg ctc gag cac cac cac cac cac cac tga                      804
Leu Lys Arg Leu Glu His His His His His His
            260                 265
```

<210> SEQ ID NO 63
<211> LENGTH: 267
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 63

```
Met Lys Tyr Leu Leu Pro Thr Ala Ala Ala Gly Leu Leu Leu Leu Ala
1               5                   10                  15

Ala Gln Pro Ala Met Ala Met Glu Val Gln Leu Val Glu Ser Gly Gly
            20                  25                  30

Gly Val Val Gln Pro Gly Arg Ser Leu Arg Leu Ser Cys Ser Ala Ser
        35                  40                  45

Gly Phe Asp Phe Thr Thr Tyr Trp Met Ser Trp Val Arg Gln Ala Pro
    50                  55                  60

Gly Lys Gly Leu Glu Trp Ile Gly Glu Ile His Pro Asp Ser Ser Thr
65                  70                  75                  80

Ile Asn Tyr Ala Pro Ser Leu Lys Asp Arg Phe Thr Ile Ser Arg Asp
                85                  90                  95

Asn Ala Lys Asn Thr Leu Phe Leu Gln Met Asp Ser Leu Arg Pro Glu
            100                 105                 110

Asp Thr Gly Val Tyr Phe Cys Ala Ser Leu Tyr Phe Gly Phe Pro Trp
        115                 120                 125

Phe Ala Tyr Trp Gly Gln Gly Thr Pro Val Thr Val Ser Gly Gly Gly
    130                 135                 140

Gly Ser Asp Ile Val Met Ser Gln Ser Pro Ser Ser Leu Ala Val Ser
145                 150                 155                 160

Pro Gly Glu Lys Val Thr Met Thr Cys Lys Ser Ser Gln Ser Leu Phe
                165                 170                 175

Asn Ser Arg Thr Arg Lys Asn Tyr Leu Gly Trp Tyr Gln Gln Lys Pro
            180                 185                 190

Gly Gln Ser Pro Lys Leu Leu Ile Tyr Trp Ala Ser Thr Arg Glu Ser
        195                 200                 205

Gly Val Pro Asp Arg Phe Thr Gly Ser Gly Ser Gly Thr Asp Phe Thr
    210                 215                 220

Leu Thr Ile Asn Ser Val Gln Ser Glu Asp Leu Ala Val Tyr Tyr Cys
225                 230                 235                 240
```

Thr Gln Val Tyr Tyr Leu Cys Thr Phe Gly Ala Gly Thr Lys Leu Glu
            245                 250                 255

Leu Lys Arg Leu Glu His His His His His His
        260                 265

<210> SEQ ID NO 64
<211> LENGTH: 789
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(786)

<400> SEQUENCE: 64

| atg aaa tac ctg ctg ccg acc gct gct gct ggt ctg ctc ctc gct | 48 |
|---|---|
| Met Lys Tyr Leu Leu Pro Thr Ala Ala Ala Gly Leu Leu Leu Ala | |
| 1               5                   10                  15 | |

| gcc cag ccg gcg atg gcc atg gaa gtg cag ctg gtg gag tca ggg gga | 96 |
|---|---|
| Ala Gln Pro Ala Met Ala Met Glu Val Gln Leu Val Glu Ser Gly Gly | |
|             20                  25                  30 | |

| gac tta gtg aag cct gga ggg tcc ctg aaa ctc tcc tgt gca gcc tct | 144 |
|---|---|
| Asp Leu Val Lys Pro Gly Gly Ser Leu Lys Leu Ser Cys Ala Ala Ser | |
|         35                  40                  45 | |

| gga ttc act ttc agt att tac acc atg tct tgg ctt cgc cag act ccg | 192 |
|---|---|
| Gly Phe Thr Phe Ser Ile Tyr Thr Met Ser Trp Leu Arg Gln Thr Pro | |
|     50                  55                  60 | |

| gaa aag agg ctg gag tgg gtc gca acc ctg agt ggt gat ggt gat gac | 240 |
|---|---|
| Glu Lys Arg Leu Glu Trp Val Ala Thr Leu Ser Gly Asp Gly Asp Asp | |
| 65                  70                  75                  80 | |

| atc tac tat cca gac agt gtg aag ggt cga ttc acc atc tcc aga gac | 288 |
|---|---|
| Ile Tyr Tyr Pro Asp Ser Val Lys Gly Arg Phe Thr Ile Ser Arg Asp | |
|                 85                  90                  95 | |

| aat gcc aag aac aac cta tat ctg caa atg aac agt cta agg tct gcg | 336 |
|---|---|
| Asn Ala Lys Asn Asn Leu Tyr Leu Gln Met Asn Ser Leu Arg Ser Ala | |
|             100                 105                 110 | |

| gac acg gcc ttg tat tac tgt gca agg gtg cga ctt ggg gac tgg gac | 384 |
|---|---|
| Asp Thr Ala Leu Tyr Tyr Cys Ala Arg Val Arg Leu Gly Asp Trp Asp | |
|         115                 120                 125 | |

| ttc gat gtc tgg ggc caa ggg acc acg gtc tcc gtc tcc tca gga ggt | 432 |
|---|---|
| Phe Asp Val Trp Gly Gln Gly Thr Thr Val Ser Val Ser Ser Gly Gly | |
|     130                 135                 140 | |

| ggc gga tcc gac atc cag ctg acc cag agc cca agc agc ctg agc gcc | 480 |
|---|---|
| Gly Gly Ser Asp Ile Gln Leu Thr Gln Ser Pro Ser Ser Leu Ser Ala | |
| 145                 150                 155                 160 | |

| agc gtg ggt gac aga gtg acc atc acc tgt aag gcc agt cag gat gtg | 528 |
|---|---|
| Ser Val Gly Asp Arg Val Thr Ile Thr Cys Lys Ala Ser Gln Asp Val | |
|                 165                 170                 175 | |

| ggt act tct gta gcc tgg tac cag cag aag cca ggt aag gct cca aag | 576 |
|---|---|
| Gly Thr Ser Val Ala Trp Tyr Gln Gln Lys Pro Gly Lys Ala Pro Lys | |
|             180                 185                 190 | |

| ctg ctg atc tac tgg aca tcc acc cgg cac act ggt gtg cca agc aga | 624 |
|---|---|
| Leu Leu Ile Tyr Trp Thr Ser Thr Arg His Thr Gly Val Pro Ser Arg | |
|         195                 200                 205 | |

| ttc agc ggt agc ggt agc ggt acc gac ttc acc ttc acc atc agc agc | 672 |
|---|---|
| Phe Ser Gly Ser Gly Ser Gly Thr Asp Phe Thr Phe Thr Ile Ser Ser | |
|     210                 215                 220 | |

| ctc cag cca gag gac atc gcc acc tac tac tgc cag caa tat agc ctc | 720 |
|---|---|
| Leu Gln Pro Glu Asp Ile Ala Thr Tyr Tyr Cys Gln Gln Tyr Ser Leu | |
| 225                 230                 235                 240 | |

```
tat cgg tcg ttc ggc caa ggg acc aag gtg gaa atc aaa cgt ctc gag    768
Tyr Arg Ser Phe Gly Gln Gly Thr Lys Val Glu Ile Lys Arg Leu Glu
                245                 250                 255 cac cac cac cac cac cac tga                                        789
His His His His His His
            260
```

<210> SEQ ID NO 65
<211> LENGTH: 262
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 65

```
Met Lys Tyr Leu Leu Pro Thr Ala Ala Gly Leu Leu Leu Leu Ala
1               5                   10                  15

Ala Gln Pro Ala Met Ala Met Glu Val Gln Leu Val Glu Ser Gly Gly
                20                  25                  30

Asp Leu Val Lys Pro Gly Gly Ser Leu Lys Leu Ser Cys Ala Ala Ser
            35                  40                  45

Gly Phe Thr Phe Ser Ile Tyr Thr Met Ser Trp Leu Arg Gln Thr Pro
    50                  55                  60

Glu Lys Arg Leu Glu Trp Val Ala Thr Leu Ser Gly Asp Gly Asp Asp
65                  70                  75                  80

Ile Tyr Tyr Pro Asp Ser Val Lys Gly Arg Phe Thr Ile Ser Arg Asp
                85                  90                  95

Asn Ala Lys Asn Asn Leu Tyr Leu Gln Met Asn Ser Leu Arg Ser Ala
            100                 105                 110

Asp Thr Ala Leu Tyr Tyr Cys Ala Arg Val Arg Leu Gly Asp Trp Asp
        115                 120                 125

Phe Asp Val Trp Gly Gln Gly Thr Thr Val Ser Val Ser Ser Gly Gly
    130                 135                 140

Gly Gly Ser Asp Ile Gln Leu Thr Gln Ser Pro Ser Ser Leu Ser Ala
145                 150                 155                 160

Ser Val Gly Asp Arg Val Thr Ile Thr Cys Lys Ala Ser Gln Asp Val
                165                 170                 175

Gly Thr Ser Val Ala Trp Tyr Gln Gln Lys Pro Gly Lys Ala Pro Lys
            180                 185                 190

Leu Leu Ile Tyr Trp Thr Ser Thr Arg His Thr Gly Val Pro Ser Arg
        195                 200                 205

Phe Ser Gly Ser Gly Ser Gly Thr Asp Phe Thr Phe Thr Ile Ser Ser
    210                 215                 220

Leu Gln Pro Glu Asp Ile Ala Thr Tyr Tyr Cys Gln Gln Tyr Ser Leu
225                 230                 235                 240

Tyr Arg Ser Phe Gly Gln Gly Thr Lys Val Glu Ile Lys Arg Leu Glu
                245                 250                 255

His His His His His His
            260
```

<210> SEQ ID NO 66
<211> LENGTH: 804
<212> TYPE: DNA
<213> ORGANISM: Artificial Sequence
<220> FEATURE:
<223> OTHER INFORMATION: Description of Artificial Sequence: Synthetic
      polynucleotide

<220> FEATURE:
<221> NAME/KEY: CDS
<222> LOCATION: (1)..(801)

<400> SEQUENCE: 66

| | | | | | | | | | | | | | | | | |
|---|---|---|---|---|---|---|---|---|---|---|---|---|---|---|---|---|
| atg | aaa | tac | ctg | ctg | ccg | acc | gct | gct | gct | ggt | ctg | ctg | ctc | ctc | gct | 48 |
| Met | Lys | Tyr | Leu | Leu | Pro | Thr | Ala | Ala | Ala | Gly | Leu | Leu | Leu | Leu | Ala | |
| 1 | | | | 5 | | | | | 10 | | | | | 15 | | |
| gcc | cag | ccg | gcg | atg | gcc | atg | gag | gtc | caa | ctg | gtg | gag | agc | ggt | gga | 96 |
| Ala | Gln | Pro | Ala | Met | Ala | Met | Glu | Val | Gln | Leu | Val | Glu | Ser | Gly | Gly | |
| | | | 20 | | | | | 25 | | | | | 30 | | | |
| ggt | gtt | gtg | caa | cct | ggc | cgg | tcc | ctg | cgc | ctg | tcc | tgc | tcc | gca | tct | 144 |
| Gly | Val | Val | Gln | Pro | Gly | Arg | Ser | Leu | Arg | Leu | Ser | Cys | Ser | Ala | Ser | |
| | | 35 | | | | | 40 | | | | | 45 | | | | |
| ggc | ttc | gat | ttc | acc | aca | tat | tgg | atg | agt | tgg | gtg | aga | cag | gca | cct | 192 |
| Gly | Phe | Asp | Phe | Thr | Thr | Tyr | Trp | Met | Ser | Trp | Val | Arg | Gln | Ala | Pro | |
| | 50 | | | | | 55 | | | | | 60 | | | | | |
| gga | aaa | ggt | ctt | gag | tgg | att | gga | gaa | att | cat | cca | gat | agc | agt | acg | 240 |
| Gly | Lys | Gly | Leu | Glu | Trp | Ile | Gly | Glu | Ile | His | Pro | Asp | Ser | Ser | Thr | |
| 65 | | | | | 70 | | | | | 75 | | | | | 80 | |
| att | aac | tat | gcg | ccg | tct | cta | aag | gat | aga | ttt | aca | ata | tcg | cga | gac | 288 |
| Ile | Asn | Tyr | Ala | Pro | Ser | Leu | Lys | Asp | Arg | Phe | Thr | Ile | Ser | Arg | Asp | |
| | | | | 85 | | | | | 90 | | | | | 95 | | |
| aac | gcc | aag | aac | aca | ttg | ttc | ctg | caa | atg | gac | agc | ctg | aga | ccc | gaa | 336 |
| Asn | Ala | Lys | Asn | Thr | Leu | Phe | Leu | Gln | Met | Asp | Ser | Leu | Arg | Pro | Glu | |
| | | | 100 | | | | | 105 | | | | | 110 | | | |
| gac | acc | ggg | gtc | tat | ttt | tgt | gca | agc | ctt | tac | ttc | ggc | ttc | ccc | tgg | 384 |
| Asp | Thr | Gly | Val | Tyr | Phe | Cys | Ala | Ser | Leu | Tyr | Phe | Gly | Phe | Pro | Trp | |
| | | 115 | | | | | 120 | | | | | 125 | | | | |
| ttt | gct | tat | tgg | ggc | caa | ggg | acc | ccg | gtc | acc | gtc | tcc | gga | ggc | ggt | 432 |
| Phe | Ala | Tyr | Trp | Gly | Gln | Gly | Thr | Pro | Val | Thr | Val | Ser | Gly | Gly | Gly | |
| | 130 | | | | | 135 | | | | | 140 | | | | | |
| gga | tcc | gac | att | gtg | atg | tca | caa | tct | cca | tcc | tcc | ctg | gct | gtg | tca | 480 |
| Gly | Ser | Asp | Ile | Val | Met | Ser | Gln | Ser | Pro | Ser | Ser | Leu | Ala | Val | Ser | |
| 145 | | | | | 150 | | | | | 155 | | | | | 160 | |
| cca | gga | gag | aag | gtc | act | atg | acc | tgc | aaa | tcc | agt | cag | agt | ctg | ttc | 528 |
| Pro | Gly | Glu | Lys | Val | Thr | Met | Thr | Cys | Lys | Ser | Ser | Gln | Ser | Leu | Phe | |
| | | | | 165 | | | | | 170 | | | | | 175 | | |
| aac | agt | aga | acc | cga | aag | aac | tac | ttg | ggt | tgg | tac | cag | cag | aaa | cca | 576 |
| Asn | Ser | Arg | Thr | Arg | Lys | Asn | Tyr | Leu | Gly | Trp | Tyr | Gln | Gln | Lys | Pro | |
| | | | 180 | | | | | 185 | | | | | 190 | | | |
| ggg | cag | tct | cct | aaa | ctt | ctg | atc | tac | tgg | gca | tct | act | cgg | gaa | tct | 624 |
| Gly | Gln | Ser | Pro | Lys | Leu | Leu | Ile | Tyr | Trp | Ala | Ser | Thr | Arg | Glu | Ser | |
| | | 195 | | | | | 200 | | | | | 205 | | | | |
| ggg | gtc | cct | gat | cgc | ttc | aca | ggc | agt | gga | tct | ggg | aca | gat | ttc | act | 672 |
| Gly | Val | Pro | Asp | Arg | Phe | Thr | Gly | Ser | Gly | Ser | Gly | Thr | Asp | Phe | Thr | |
| | 210 | | | | | 215 | | | | | 220 | | | | | |
| ctc | acc | atc | aac | agt | gtg | cag | tct | gaa | gac | ctg | gca | gtt | tat | tac | tgc | 720 |
| Leu | Thr | Ile | Asn | Ser | Val | Gln | Ser | Glu | Asp | Leu | Ala | Val | Tyr | Tyr | Cys | |
| 225 | | | | | 230 | | | | | 235 | | | | | 240 | |
| act | caa | gtt | tat | tat | ctg | tgc | acg | ttc | ggt | gct | ggg | acc | aag | ctg | gag | 768 |
| Thr | Gln | Val | Tyr | Tyr | Leu | Cys | Thr | Phe | Gly | Ala | Gly | Thr | Lys | Leu | Glu | |
| | | | | 245 | | | | | 250 | | | | | 255 | | |
| ctg | aaa | cgg | ctc | gag | cac | cac | cac | cac | cac | cac | tga | | | | | 804 |
| Leu | Lys | Arg | Leu | Glu | His | His | His | His | His | His | | | | | | |
| | | | 260 | | | | | 265 | | | | | | | | |

<210> SEQ ID NO 67
<211> LENGTH: 267
<212> TYPE: PRT
<213> ORGANISM: Artificial Sequence
<220> FEATURE:
<223> OTHER INFORMATION: Description of Artificial Sequence: Synthetic
     polypeptide

<400> SEQUENCE: 67

```
Met Lys Tyr Leu Leu Pro Thr Ala Ala Ala Gly Leu Leu Leu Leu Ala
1               5                   10                  15

Ala Gln Pro Ala Met Ala Met Glu Val Gln Leu Val Glu Ser Gly Gly
            20                  25                  30

Gly Val Val Gln Pro Gly Arg Ser Leu Arg Leu Ser Cys Ser Ala Ser
        35                  40                  45

Gly Phe Asp Phe Thr Thr Tyr Trp Met Ser Trp Val Arg Gln Ala Pro
    50                  55                  60

Gly Lys Gly Leu Glu Trp Ile Gly Glu Ile His Pro Asp Ser Ser Thr
65                  70                  75                  80

Ile Asn Tyr Ala Pro Ser Leu Lys Asp Arg Phe Thr Ile Ser Arg Asp
                85                  90                  95

Asn Ala Lys Asn Thr Leu Phe Leu Gln Met Asp Ser Leu Arg Pro Glu
            100                 105                 110

Asp Thr Gly Val Tyr Phe Cys Ala Ser Leu Tyr Phe Gly Phe Pro Trp
        115                 120                 125

Phe Ala Tyr Trp Gly Gln Gly Thr Pro Val Thr Val Ser Gly Gly Gly
    130                 135                 140

Gly Ser Asp Ile Val Met Ser Gln Ser Pro Ser Ser Leu Ala Val Ser
145                 150                 155                 160

Pro Gly Glu Lys Val Thr Met Thr Cys Lys Ser Ser Gln Ser Leu Phe
                165                 170                 175

Asn Ser Arg Thr Arg Lys Asn Tyr Leu Gly Trp Tyr Gln Gln Lys Pro
            180                 185                 190

Gly Gln Ser Pro Lys Leu Leu Ile Tyr Trp Ala Ser Thr Arg Glu Ser
        195                 200                 205

Gly Val Pro Asp Arg Phe Thr Gly Ser Gly Ser Gly Thr Asp Phe Thr
    210                 215                 220

Leu Thr Ile Asn Ser Val Gln Ser Glu Asp Leu Ala Val Tyr Tyr Cys
225                 230                 235                 240

Thr Gln Val Tyr Tyr Leu Cys Thr Phe Gly Ala Gly Thr Lys Leu Glu
                245                 250                 255

Leu Lys Arg Leu Glu His His His His His
            260                 265
```

<210> SEQ ID NO 68
<211> LENGTH: 789
<212> TYPE: DNA
<213> ORGANISM: Artificial Sequence
<220> FEATURE:
<223> OTHER INFORMATION: Description of Artificial Sequence: Synthetic
     polynucleotide
<220> FEATURE:
<221> NAME/KEY: CDS
<222> LOCATION: (1)..(786)

<400> SEQUENCE: 68

```
atg aaa tac ctg ctg ccg acc gct gct gct ggt ctg ctg ctc ctc gct    48
Met Lys Tyr Leu Leu Pro Thr Ala Ala Ala Gly Leu Leu Leu Leu Ala
1               5                   10                  15 gcc cag ccg gcg atg gcc atg gaa gtg cag ctg gtg gag tca ggg gga    96
Ala Gln Pro Ala Met Ala Met Glu Val Gln Leu Val Glu Ser Gly Gly
            20                  25                  30
```

```
gac tta gtg aag cct gga ggg tcc ctg aaa ctc tcc tgt gca gcc tct    144
Asp Leu Val Lys Pro Gly Gly Ser Leu Lys Leu Ser Cys Ala Ala Ser
         35                  40                  45 gga ttc act ttc agt att tac acc atg tct tgg ctt cgc cag act ccg    192
Gly Phe Thr Phe Ser Ile Tyr Thr Met Ser Trp Leu Arg Gln Thr Pro
 50                  55                  60 gaa aag agg ctg gag tgg gtc gca acc ctg agt ggt gat ggt gat gac    240
Glu Lys Arg Leu Glu Trp Val Ala Thr Leu Ser Gly Asp Gly Asp Asp
 65                  70                  75                  80 atc tac tat cca gac agt gtg aag ggt cga ttc acc atc tcc aga gac    288
Ile Tyr Tyr Pro Asp Ser Val Lys Gly Arg Phe Thr Ile Ser Arg Asp
                 85                  90                  95 aat gcc aag aac aac cta tat ctg caa atg aac agt cta agg tct gcg    336
Asn Ala Lys Asn Asn Leu Tyr Leu Gln Met Asn Ser Leu Arg Ser Ala
            100                 105                 110 gac acg gcc ttg tat tac tgt gca agg gtg cga ctt ggg gac tgg gac    384
Asp Thr Ala Leu Tyr Tyr Cys Ala Arg Val Arg Leu Gly Asp Trp Asp
        115                 120                 125 ttc gat gtc tgg ggc caa ggg acc acg gtc tcc gtc tcc tca gga ggt    432
Phe Asp Val Trp Gly Gln Gly Thr Thr Val Ser Val Ser Ser Gly Gly
130                 135                 140 ggc gga tcc gac atc cag ctg acc cag agc cca agc agc ctg agc gcc    480
Gly Gly Ser Asp Ile Gln Leu Thr Gln Ser Pro Ser Ser Leu Ser Ala
145                 150                 155                 160 agc gtg ggt gac aga gtg acc atc acc tgt aag gcc agt cag gat gtg    528
Ser Val Gly Asp Arg Val Thr Ile Thr Cys Lys Ala Ser Gln Asp Val
                165                 170                 175 ggt act tct gta gcc tgg tac cag cag aag cca ggt aag gct cca aag    576
Gly Thr Ser Val Ala Trp Tyr Gln Gln Lys Pro Gly Lys Ala Pro Lys
            180                 185                 190 ctg ctg atc tac tgg aca tcc acc cgg cac act ggt gtg cca agc aga    624
Leu Leu Ile Tyr Trp Thr Ser Thr Arg His Thr Gly Val Pro Ser Arg
        195                 200                 205 ttc agc ggt agc ggt agc ggt acc gac ttc acc ttc acc atc agc agc    672
Phe Ser Gly Ser Gly Ser Gly Thr Asp Phe Thr Phe Thr Ile Ser Ser
    210                 215                 220 ctc cag cca gag gac atc gcc acc tac tac tgc cag caa tat agc ctc    720
Leu Gln Pro Glu Asp Ile Ala Thr Tyr Tyr Cys Gln Gln Tyr Ser Leu
225                 230                 235                 240 tat cgg tcg ttc ggc caa ggg acc aag gtg gaa atc aaa cgt ctc gag    768
Tyr Arg Ser Phe Gly Gln Gly Thr Lys Val Glu Ile Lys Arg Leu Glu
                245                 250                 255 cac cac cac cac cac cac tga                                        789
His His His His His His
            260

<210> SEQ ID NO 69
<211> LENGTH: 262
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 69

Met Lys Tyr Leu Leu Pro Thr Ala Ala Gly Leu Leu Leu Leu Ala
 1               5                  10                  15

Ala Gln Pro Ala Met Ala Met Glu Val Gln Leu Val Glu Ser Gly Gly
                 20                  25                  30

Asp Leu Val Lys Pro Gly Gly Ser Leu Lys Leu Ser Cys Ala Ala Ser
         35                  40                  45
```

```
Gly Phe Thr Phe Ser Ile Tyr Thr Met Ser Trp Leu Arg Gln Thr Pro
         50                  55                  60

Glu Lys Arg Leu Glu Trp Val Ala Thr Leu Ser Gly Asp Gly Asp Asp
 65                  70                  75                  80

Ile Tyr Tyr Pro Asp Ser Val Lys Gly Arg Phe Thr Ile Ser Arg Asp
                     85                  90                  95

Asn Ala Lys Asn Asn Leu Tyr Leu Gln Met Asn Ser Leu Arg Ser Ala
                100                 105                 110

Asp Thr Ala Leu Tyr Tyr Cys Ala Arg Val Arg Leu Gly Asp Trp Asp
            115                 120                 125

Phe Asp Val Trp Gly Gln Gly Thr Thr Val Ser Val Ser Ser Gly Gly
        130                 135                 140

Gly Gly Ser Asp Ile Gln Leu Thr Gln Ser Pro Ser Ser Leu Ser Ala
145                 150                 155                 160

Ser Val Gly Asp Arg Val Thr Ile Thr Cys Lys Ala Ser Gln Asp Val
                165                 170                 175

Gly Thr Ser Val Ala Trp Tyr Gln Gln Lys Pro Gly Lys Ala Pro Lys
            180                 185                 190

Leu Leu Ile Tyr Trp Thr Ser Thr Arg His Thr Gly Val Pro Ser Arg
        195                 200                 205

Phe Ser Gly Ser Gly Ser Gly Thr Asp Phe Thr Phe Thr Ile Ser Ser
210                 215                 220

Leu Gln Pro Glu Asp Ile Ala Thr Tyr Tyr Cys Gln Gln Tyr Ser Leu
225                 230                 235                 240

Tyr Arg Ser Phe Gly Gln Gly Thr Lys Val Glu Ile Lys Arg Leu Glu
                245                 250                 255

His His His His His His
            260
```

<210> SEQ ID NO 70
<211> LENGTH: 804
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(801)

<400> SEQUENCE: 70

```
atg aaa tac ctg ctg ccg acc gct gct gct ggt ctg ctg ctc ctc gct     48
Met Lys Tyr Leu Leu Pro Thr Ala Ala Ala Gly Leu Leu Leu Leu Ala
 1               5                  10                  15 gcc cag ccg gcg atg gcc atg gag gtc caa ctg gtg gag agc ggt gga     96
Ala Gln Pro Ala Met Ala Met Glu Val Gln Leu Val Glu Ser Gly Gly
                20                  25                  30 ggt gtt gtg caa cct ggc cgg tcc ctg cgc ctg tcc tgc tcc gca tct    144
Gly Val Val Gln Pro Gly Arg Ser Leu Arg Leu Ser Cys Ser Ala Ser
            35                  40                  45 ggc ttc gat ttc acc aca tat tgg atg agt tgg gtg aga cag gca cct    192
Gly Phe Asp Phe Thr Thr Tyr Trp Met Ser Trp Val Arg Gln Ala Pro
         50                  55                  60 gga aaa ggt ctt gag tgg att gga gaa att cat cca gat agc agt acg    240
Gly Lys Gly Leu Glu Trp Ile Gly Glu Ile His Pro Asp Ser Ser Thr
 65                  70                  75                  80 att aac tat gcg ccg tct cta aag gat aga ttt aca ata tcg cga gac    288
Ile Asn Tyr Ala Pro Ser Leu Lys Asp Arg Phe Thr Ile Ser Arg Asp
                 85                  90                  95
```

```
aac gcc aag aac aca ttg ttc ctg caa atg gac agc ctg aga ccc gaa     336
Asn Ala Lys Asn Thr Leu Phe Leu Gln Met Asp Ser Leu Arg Pro Glu
        100                 105                 110 gac acc ggg gtc tat ttt tgt gca agc ctt tac ttc ggc ttc ccc tgg     384
Asp Thr Gly Val Tyr Phe Cys Ala Ser Leu Tyr Phe Gly Phe Pro Trp
            115                 120                 125 ttt gct tat tgg ggc caa ggg acc ccg gtc acc gtc tcc gga ggc ggt     432
Phe Ala Tyr Trp Gly Gln Gly Thr Pro Val Thr Val Ser Gly Gly Gly
130                 135                 140 gga tcc gac att gtg atg tca caa tct cca tcc tcc ctg gct gtg tca     480
Gly Ser Asp Ile Val Met Ser Gln Ser Pro Ser Ser Leu Ala Val Ser
145                 150                 155                 160 cca gga gag aag gtc act atg acc tgc aaa tcc agt cag agt ctg ttc     528
Pro Gly Glu Lys Val Thr Met Thr Cys Lys Ser Ser Gln Ser Leu Phe
                165                 170                 175 aac agt aga acc cga aag aac tac ttg ggt tgg tac cag cag aaa cca     576
Asn Ser Arg Thr Arg Lys Asn Tyr Leu Gly Trp Tyr Gln Gln Lys Pro
            180                 185                 190 ggg cag tct cct aaa ctt ctg atc tac tgg gca tct act cgg gaa tct     624
Gly Gln Ser Pro Lys Leu Leu Ile Tyr Trp Ala Ser Thr Arg Glu Ser
        195                 200                 205 ggg gtc cct gat cgc ttc aca ggc agt gga tct ggg aca gat ttc act     672
Gly Val Pro Asp Arg Phe Thr Gly Ser Gly Ser Gly Thr Asp Phe Thr
    210                 215                 220 ctc acc atc aac agt gtg cag tct gaa gac ctg gca gtt tat tac tgc     720
Leu Thr Ile Asn Ser Val Gln Ser Glu Asp Leu Ala Val Tyr Tyr Cys
225                 230                 235                 240 act caa gtt tat tat ctg agc acg ttc ggt gct ggg acc aag ctg gag     768
Thr Gln Val Tyr Tyr Leu Ser Thr Phe Gly Ala Gly Thr Lys Leu Glu
                245                 250                 255 ctg aaa cgg ctc gag cac cac cac cac cac cac tga                     804
Leu Lys Arg Leu Glu His His His His His His
            260                 265

<210> SEQ ID NO 71
<211> LENGTH: 267
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 71

Met Lys Tyr Leu Leu Pro Thr Ala Ala Ala Gly Leu Leu Leu Leu Ala
1               5                   10                  15

Ala Gln Pro Ala Met Ala Met Glu Val Gln Leu Val Glu Ser Gly Gly
            20                  25                  30

Gly Val Val Gln Pro Gly Arg Ser Leu Arg Leu Ser Cys Ser Ala Ser
        35                  40                  45

Gly Phe Asp Phe Thr Thr Tyr Trp Met Ser Trp Val Arg Gln Ala Pro
    50                  55                  60

Gly Lys Gly Leu Glu Trp Ile Gly Glu Ile His Pro Asp Ser Ser Thr
65                  70                  75                  80

Ile Asn Tyr Ala Pro Ser Leu Lys Asp Arg Phe Thr Ile Ser Arg Asp
                85                  90                  95

Asn Ala Lys Asn Thr Leu Phe Leu Gln Met Asp Ser Leu Arg Pro Glu
            100                 105                 110

Asp Thr Gly Val Tyr Phe Cys Ala Ser Leu Tyr Phe Gly Phe Pro Trp
```

```
                  115                 120                 125
Phe Ala Tyr Trp Gly Gln Gly Thr Pro Val Thr Val Ser Gly Gly Gly
            130                 135                 140

Gly Ser Asp Ile Val Met Ser Gln Ser Pro Ser Ser Leu Ala Val Ser
145                 150                 155                 160

Pro Gly Glu Lys Val Thr Met Thr Cys Lys Ser Ser Gln Ser Leu Phe
                165                 170                 175

Asn Ser Arg Thr Arg Lys Asn Tyr Leu Gly Trp Tyr Gln Gln Lys Pro
            180                 185                 190

Gly Gln Ser Pro Lys Leu Leu Ile Tyr Trp Ala Ser Thr Arg Glu Ser
        195                 200                 205

Gly Val Pro Asp Arg Phe Thr Gly Ser Gly Ser Gly Thr Asp Phe Thr
    210                 215                 220

Leu Thr Ile Asn Ser Val Gln Ser Glu Asp Leu Ala Val Tyr Tyr Cys
225                 230                 235                 240

Thr Gln Val Tyr Tyr Leu Ser Thr Phe Gly Ala Gly Thr Lys Leu Glu
                245                 250                 255

Leu Lys Arg Leu Glu His His His His His His
            260                 265

<210> SEQ ID NO 72
<211> LENGTH: 807
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(804)

<400> SEQUENCE: 72 atg aaa tac ctg ctg ccg acc gct gct gct ggt ctg ctg ctc ctc gct      48
Met Lys Tyr Leu Leu Pro Thr Ala Ala Ala Gly Leu Leu Leu Leu Ala
1               5                   10                  15 gcc cag ccg gcg atg gcc atg gaa gtg cag ctg gtg gag tca ggg gga      96
Ala Gln Pro Ala Met Ala Met Glu Val Gln Leu Val Glu Ser Gly Gly
                20                  25                  30 gac tta gtg aag cct gga ggg tcc ctg aaa ctc tcc tgt gca gcc tct     144
Asp Leu Val Lys Pro Gly Gly Ser Leu Lys Leu Ser Cys Ala Ala Ser
            35                  40                  45 gga ttc act ttc agt att tac acc atg tct tgg ctt cgc cag act ccg     192
Gly Phe Thr Phe Ser Ile Tyr Thr Met Ser Trp Leu Arg Gln Thr Pro
    50                  55                  60 gga aag ggg ctg gag tgg gtc gca acc ctg agt ggt gat ggt gat gac     240
Gly Lys Gly Leu Glu Trp Val Ala Thr Leu Ser Gly Asp Gly Asp Asp
65                  70                  75                  80 atc tac tat cca gac agt gtg aag ggt cga ttc acc atc tcc aga gac     288
Ile Tyr Tyr Pro Asp Ser Val Lys Gly Arg Phe Thr Ile Ser Arg Asp
                85                  90                  95 aat gcc aag aac agc cta tat ctg cag atg aac agt cta agg gct gag     336
Asn Ala Lys Asn Ser Leu Tyr Leu Gln Met Asn Ser Leu Arg Ala Glu
            100                 105                 110 gac acg gcc ttg tat tac tgt gca agg gtg cga ctt ggg gac tgg gac     384
Asp Thr Ala Leu Tyr Tyr Cys Ala Arg Val Arg Leu Gly Asp Trp Asp
    115                 120                 125 ttc gat gtc tgg ggc caa ggg acc acg gtc tcc gtc tcc tca gga ggt     432
Phe Asp Val Trp Gly Gln Gly Thr Thr Val Ser Val Ser Ser Gly Gly
130                 135                 140
```

```
ggc gga tcc gac att gtg atg aca caa tct cca tcc tcc ctg gct gtg      480
Gly Gly Ser Asp Ile Val Met Thr Gln Ser Pro Ser Ser Leu Ala Val
145                 150                 155                 160 tca ccc ggg gag agg gtc act ctg acc tgc aaa tcc agt cag agt ctg      528
Ser Pro Gly Glu Arg Val Thr Leu Thr Cys Lys Ser Ser Gln Ser Leu
                165                 170                 175 ttc aac agt aga acc cga aag aac tac ttg ggt tgg tac cag cag aaa      576
Phe Asn Ser Arg Thr Arg Lys Asn Tyr Leu Gly Trp Tyr Gln Gln Lys
            180                 185                 190 cca ggg cag tct cct aaa ctt ctg atc tac tgg gca tct act cgg gaa      624
Pro Gly Gln Ser Pro Lys Leu Leu Ile Tyr Trp Ala Ser Thr Arg Glu
        195                 200                 205 tct ggg gtc cct gat cgc ttc tca ggc agt gga tcc gga aca gat ttc      672
Ser Gly Val Pro Asp Arg Phe Ser Gly Ser Gly Ser Gly Thr Asp Phe
    210                 215                 220 act ctc acc atc aac agt ctg cag gct gaa gac gtg gca gtt tat tac      720
Thr Leu Thr Ile Asn Ser Leu Gln Ala Glu Asp Val Ala Val Tyr Tyr
225                 230                 235                 240 tgc act caa gtt tat tat ctg tgc acg ttc ggt gct ggg acc aag ctg      768
Cys Thr Gln Val Tyr Tyr Leu Cys Thr Phe Gly Ala Gly Thr Lys Leu
                245                 250                 255 gag ctg aaa cgg ctc gag cac cac cac cac cac cac tga                  807
Glu Leu Lys Arg Leu Glu His His His His His His
            260                 265
```

<210> SEQ ID NO 73
<211> LENGTH: 268
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 73

```
Met Lys Tyr Leu Leu Pro Thr Ala Ala Ala Gly Leu Leu Leu Leu Ala
1               5                   10                  15

Ala Gln Pro Ala Met Ala Met Glu Val Gln Leu Val Glu Ser Gly Gly
            20                  25                  30

Asp Leu Val Lys Pro Gly Gly Ser Leu Lys Leu Ser Cys Ala Ala Ser
        35                  40                  45

Gly Phe Thr Phe Ser Ile Tyr Thr Met Ser Trp Leu Arg Gln Thr Pro
    50                  55                  60

Gly Lys Gly Leu Glu Trp Val Ala Thr Leu Ser Gly Asp Gly Asp Asp
65                  70                  75                  80

Ile Tyr Tyr Pro Asp Ser Val Lys Gly Arg Phe Thr Ile Ser Arg Asp
                85                  90                  95

Asn Ala Lys Asn Ser Leu Tyr Leu Gln Met Asn Ser Leu Arg Ala Glu
            100                 105                 110

Asp Thr Ala Leu Tyr Tyr Cys Ala Arg Val Arg Leu Gly Asp Trp Asp
        115                 120                 125

Phe Asp Val Trp Gly Gln Gly Thr Thr Val Ser Val Ser Ser Gly Gly
    130                 135                 140

Gly Gly Ser Asp Ile Val Met Thr Gln Ser Pro Ser Ser Leu Ala Val
145                 150                 155                 160

Ser Pro Gly Glu Arg Val Thr Leu Thr Cys Lys Ser Ser Gln Ser Leu
                165                 170                 175

Phe Asn Ser Arg Thr Arg Lys Asn Tyr Leu Gly Trp Tyr Gln Gln Lys
            180                 185                 190
```

```
Pro Gly Gln Ser Pro Lys Leu Leu Ile Tyr Trp Ala Ser Thr Arg Glu
            195                 200                 205

Ser Gly Val Pro Asp Arg Phe Ser Gly Ser Gly Thr Asp Phe
    210                 215                 220

Thr Leu Thr Ile Asn Ser Leu Gln Ala Glu Asp Val Ala Val Tyr Tyr
225                 230                 235                 240

Cys Thr Gln Val Tyr Tyr Leu Cys Thr Phe Gly Ala Gly Thr Lys Leu
                245                 250                 255

Glu Leu Lys Arg Leu Glu His His His His His
            260                 265

<210> SEQ ID NO 74
<211> LENGTH: 789
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(786)

<400> SEQUENCE: 74
```

| | | | | | | | | | | | | | | | | |
|---|---|---|---|---|---|---|---|---|---|---|---|---|---|---|---|---|
| atg | aaa | tac | ctg | ctg | ccg | acc | gct | gct | gct | ggt | ctg | ctg | ctc | ctc | gct | 48 |
| Met | Lys | Tyr | Leu | Leu | Pro | Thr | Ala | Ala | Ala | Gly | Leu | Leu | Leu | Leu | Ala | |
| 1 | | | | 5 | | | | | 10 | | | | | 15 | | |
| gcc | cag | ccg | gcg | atg | gcc | atg | gaa | gtg | cag | ctg | gtg | gag | tca | ggg | gga | 96 |
| Ala | Gln | Pro | Ala | Met | Ala | Met | Glu | Val | Gln | Leu | Val | Glu | Ser | Gly | Gly | |
| | | | 20 | | | | | 25 | | | | | 30 | | | |
| gac | tta | gtg | aag | cct | gga | ggg | tcc | ctg | aaa | ctc | tcc | tgt | gca | gcc | tct | 144 |
| Asp | Leu | Val | Lys | Pro | Gly | Gly | Ser | Leu | Lys | Leu | Ser | Cys | Ala | Ala | Ser | |
| | | 35 | | | | | 40 | | | | | 45 | | | | |
| gga | ttc | act | ttc | agt | att | tac | acc | atg | tct | tgg | ctt | cgc | cag | act | ccg | 192 |
| Gly | Phe | Thr | Phe | Ser | Ile | Tyr | Thr | Met | Ser | Trp | Leu | Arg | Gln | Thr | Pro | |
| | 50 | | | | | 55 | | | | | 60 | | | | | |
| gga | aag | ggg | ctg | gag | tgg | gtc | gca | acc | ctg | agt | ggt | gat | ggt | gat | gac | 240 |
| Gly | Lys | Gly | Leu | Glu | Trp | Val | Ala | Thr | Leu | Ser | Gly | Asp | Gly | Asp | Asp | |
| 65 | | | | | 70 | | | | | 75 | | | | | 80 | |
| atc | tac | tat | cca | gac | agt | gtg | aag | ggt | cga | ttc | acc | atc | tcc | aga | gac | 288 |
| Ile | Tyr | Tyr | Pro | Asp | Ser | Val | Lys | Gly | Arg | Phe | Thr | Ile | Ser | Arg | Asp | |
| | | | | 85 | | | | | 90 | | | | | 95 | | |
| aat | gcc | aag | aac | agc | cta | tat | ctg | cag | atg | aac | agt | cta | agg | gct | gag | 336 |
| Asn | Ala | Lys | Asn | Ser | Leu | Tyr | Leu | Gln | Met | Asn | Ser | Leu | Arg | Ala | Glu | |
| | | | 100 | | | | | 105 | | | | | 110 | | | |
| gac | acg | gcc | ttg | tat | tac | tgt | gca | agg | gtg | cga | ctt | ggg | gac | tgg | gac | 384 |
| Asp | Thr | Ala | Leu | Tyr | Tyr | Cys | Ala | Arg | Val | Arg | Leu | Gly | Asp | Trp | Asp | |
| | | 115 | | | | | 120 | | | | | 125 | | | | |
| ttc | gat | gtc | tgg | ggc | caa | ggg | acc | acg | gtc | tcc | gtc | tcc | tca | gga | ggt | 432 |
| Phe | Asp | Val | Trp | Gly | Gln | Gly | Thr | Thr | Val | Ser | Val | Ser | Ser | Gly | Gly | |
| | 130 | | | | | 135 | | | | | 140 | | | | | |
| ggc | gga | tcc | gac | atc | cag | ctg | acc | cag | agc | cca | agc | agc | ctg | agc | gcc | 480 |
| Gly | Gly | Ser | Asp | Ile | Gln | Leu | Thr | Gln | Ser | Pro | Ser | Ser | Leu | Ser | Ala | |
| 145 | | | | | 150 | | | | | 155 | | | | | 160 | |
| agc | gtg | ggt | gac | aga | gtg | acc | atc | acc | tgt | aag | gcc | agt | cag | gat | gtg | 528 |
| Ser | Val | Gly | Asp | Arg | Val | Thr | Ile | Thr | Cys | Lys | Ala | Ser | Gln | Asp | Val | |
| | | | | 165 | | | | | 170 | | | | | 175 | | |
| ggt | act | tct | gta | gct | tgg | tac | cag | cag | aag | cca | ggt | aag | gct | cca | aag | 576 |
| Gly | Thr | Ser | Val | Ala | Trp | Tyr | Gln | Gln | Lys | Pro | Gly | Lys | Ala | Pro | Lys | |
| | | | 180 | | | | | 185 | | | | | 190 | | | |
| ctg | ctg | atc | tac | tgg | aca | tcc | acc | cgg | cac | act | ggt | gtg | cca | agc | aga | 624 |
| Leu | Leu | Ile | Tyr | Trp | Thr | Ser | Thr | Arg | His | Thr | Gly | Val | Pro | Ser | Arg | |

```
                    195                 200                 205
ttc agc ggt agc ggt agc ggt acc gac ttc acc ttc acc atc agc agc      672
Phe Ser Gly Ser Gly Ser Gly Thr Asp Phe Thr Phe Thr Ile Ser Ser
210                 215                 220 ctc cag cca gag gac atc gcc acc tac tac tgc cag caa tat agc ctc      720
Leu Gln Pro Glu Asp Ile Ala Thr Tyr Tyr Cys Gln Gln Tyr Ser Leu
225                 230                 235                 240 tat cgg tcg ttc ggc caa ggg acc aag gtg gaa atc aaa cgt ctc gag      768
Tyr Arg Ser Phe Gly Gln Gly Thr Lys Val Glu Ile Lys Arg Leu Glu
                245                 250                 255 cac cac cac cac cac cac tga                                          789
His His His His His His
            260

<210> SEQ ID NO 75
<211> LENGTH: 262
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 75

Met Lys Tyr Leu Leu Pro Thr Ala Ala Ala Gly Leu Leu Leu Leu Ala
1               5                   10                  15

Ala Gln Pro Ala Met Ala Met Glu Val Gln Leu Val Glu Ser Gly Gly
            20                  25                  30

Asp Leu Val Lys Pro Gly Gly Ser Leu Lys Leu Ser Cys Ala Ala Ser
        35                  40                  45

Gly Phe Thr Phe Ser Ile Tyr Thr Met Ser Trp Leu Arg Gln Thr Pro
    50                  55                  60

Gly Lys Gly Leu Glu Trp Val Ala Thr Leu Ser Gly Asp Gly Asp Asp
65                  70                  75                  80

Ile Tyr Tyr Pro Asp Ser Val Lys Gly Arg Phe Thr Ile Ser Arg Asp
                85                  90                  95

Asn Ala Lys Asn Ser Leu Tyr Leu Gln Met Asn Ser Leu Arg Ala Glu
            100                 105                 110

Asp Thr Ala Leu Tyr Tyr Cys Ala Arg Val Arg Leu Gly Asp Trp Asp
        115                 120                 125

Phe Asp Val Trp Gly Gln Gly Thr Thr Val Ser Val Ser Ser Gly Gly
    130                 135                 140

Gly Gly Ser Asp Ile Gln Leu Thr Gln Ser Pro Ser Ser Leu Ser Ala
145                 150                 155                 160

Ser Val Gly Asp Arg Val Thr Ile Thr Cys Lys Ala Ser Gln Asp Val
                165                 170                 175

Gly Thr Ser Val Ala Trp Tyr Gln Gln Lys Pro Gly Lys Ala Pro Lys
            180                 185                 190

Leu Leu Ile Tyr Trp Thr Ser Thr Arg His Thr Gly Val Pro Ser Arg
        195                 200                 205

Phe Ser Gly Ser Gly Ser Gly Thr Asp Phe Thr Phe Thr Ile Ser Ser
    210                 215                 220

Leu Gln Pro Glu Asp Ile Ala Thr Tyr Tyr Cys Gln Gln Tyr Ser Leu
225                 230                 235                 240

Tyr Arg Ser Phe Gly Gln Gly Thr Lys Val Glu Ile Lys Arg Leu Glu
                245                 250                 255

His His His His His His
            260
```

<210> SEQ ID NO 76
<211> LENGTH: 804
<212> TYPE: DNA
<213> ORGANISM: Artificial Sequence
<220> FEATURE:
<223> OTHER INFORMATION: Description of Artificial Sequence: Synthetic polynucleotide
<220> FEATURE:
<221> NAME/KEY: CDS
<222> LOCATION: (1)..(801)

<400> SEQUENCE: 76

```
atg aaa tac ctg ctg ccg acc gct gct gct ggt ctg ctg ctc ctc gct        48
Met Lys Tyr Leu Leu Pro Thr Ala Ala Ala Gly Leu Leu Leu Leu Ala
1               5                   10                  15 gcc cag ccg gcg atg gcc atg gag gtc caa ctg gtg gag agc ggt gga        96
Ala Gln Pro Ala Met Ala Met Glu Val Gln Leu Val Glu Ser Gly Gly
                20                  25                  30 ggt gtt gtg caa cct ggc cgg tcc ctg cgc ctg tcc tgc tcc gca tct       144
Gly Val Val Gln Pro Gly Arg Ser Leu Arg Leu Ser Cys Ser Ala Ser
            35                  40                  45 ggc ttc gat ttc acc aca tat tgg atg agt tgg gtg aga cag gca cct       192
Gly Phe Asp Phe Thr Thr Tyr Trp Met Ser Trp Val Arg Gln Ala Pro
        50                  55                  60 gga aaa ggt ctt gag tgg att gga gaa att cat cca gat agc agt acg       240
Gly Lys Gly Leu Glu Trp Ile Gly Glu Ile His Pro Asp Ser Ser Thr
65                  70                  75                  80 att aac tat gcg ccg tct cta aag gat aga ttt aca ata tcg cga gac       288
Ile Asn Tyr Ala Pro Ser Leu Lys Asp Arg Phe Thr Ile Ser Arg Asp
                85                  90                  95 aac gcc aag aac aca ttg ttc ctg caa atg gac agc ctg aga ccc gaa       336
Asn Ala Lys Asn Thr Leu Phe Leu Gln Met Asp Ser Leu Arg Pro Glu
            100                 105                 110 gac acc ggg gtc tat ttt tgt gca agc ctt tac ttc ggc ttc ccc tgg       384
Asp Thr Gly Val Tyr Phe Cys Ala Ser Leu Tyr Phe Gly Phe Pro Trp
        115                 120                 125 ttt gct tat tgg ggc caa ggg acc ccg gtc acc gtc tcc gga ggc ggt       432
Phe Ala Tyr Trp Gly Gln Gly Thr Pro Val Thr Val Ser Gly Gly Gly
    130                 135                 140 gga tcc gac att gtg atg aca caa tct cca tcc tcc ctg gct gtg tca       480
Gly Ser Asp Ile Val Met Thr Gln Ser Pro Ser Ser Leu Ala Val Ser
145                 150                 155                 160 ccc ggg gag agg gtc act ctg acc tgc aaa tcc agt cag agt ctg ttc       528
Pro Gly Glu Arg Val Thr Leu Thr Cys Lys Ser Ser Gln Ser Leu Phe
                165                 170                 175 aac agt aga acc cga aag aac tac ttg ggt tgg tac cag cag aaa cca       576
Asn Ser Arg Thr Arg Lys Asn Tyr Leu Gly Trp Tyr Gln Gln Lys Pro
            180                 185                 190 ggg cag tct cct aaa ctt ctg atc tac tgg gca tct act cgg gaa tct       624
Gly Gln Ser Pro Lys Leu Leu Ile Tyr Trp Ala Ser Thr Arg Glu Ser
        195                 200                 205 ggg gtc cct gat cgc ttc tca ggc agt gga tcc gga aca gat ttc act       672
Gly Val Pro Asp Arg Phe Ser Gly Ser Gly Ser Gly Thr Asp Phe Thr
    210                 215                 220 ctc acc atc aac agt ctg cag gct gaa gac gtg gca gtt tat tac tgc       720
Leu Thr Ile Asn Ser Leu Gln Ala Glu Asp Val Ala Val Tyr Tyr Cys
225                 230                 235                 240 act caa gtt tat tat ctg tgc acg ttc ggt gct ggg acc aag ctg gag       768
Thr Gln Val Tyr Tyr Leu Cys Thr Phe Gly Ala Gly Thr Lys Leu Glu
                245                 250                 255
```

```
ctg aaa cgg ctc gag cac cac cac cac cac cac tga                                    804
Leu Lys Arg Leu Glu His His His His His His
        260                 265
```

<210> SEQ ID NO 77
<211> LENGTH: 267
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 77

```
Met Lys Tyr Leu Leu Pro Thr Ala Ala Ala Gly Leu Leu Leu Leu Ala
1               5                   10                  15

Ala Gln Pro Ala Met Ala Met Glu Val Gln Leu Val Glu Ser Gly Gly
                20                  25                  30

Gly Val Val Gln Pro Gly Arg Ser Leu Arg Leu Ser Cys Ser Ala Ser
            35                  40                  45

Gly Phe Asp Phe Thr Thr Tyr Trp Met Ser Trp Val Arg Gln Ala Pro
    50                  55                  60

Gly Lys Gly Leu Glu Trp Ile Gly Glu Ile His Pro Asp Ser Ser Thr
65                  70                  75                  80

Ile Asn Tyr Ala Pro Ser Leu Lys Asp Arg Phe Thr Ile Ser Arg Asp
                85                  90                  95

Asn Ala Lys Asn Thr Leu Phe Leu Gln Met Asp Ser Leu Arg Pro Glu
                100                 105                 110

Asp Thr Gly Val Tyr Phe Cys Ala Ser Leu Tyr Phe Gly Phe Pro Trp
            115                 120                 125

Phe Ala Tyr Trp Gly Gln Gly Thr Pro Val Thr Val Ser Gly Gly Gly
    130                 135                 140

Gly Ser Asp Ile Val Met Thr Gln Ser Pro Ser Ser Leu Ala Val Ser
145                 150                 155                 160

Pro Gly Glu Arg Val Thr Leu Thr Cys Lys Ser Ser Gln Ser Leu Phe
                165                 170                 175

Asn Ser Arg Thr Arg Lys Asn Tyr Leu Gly Trp Tyr Gln Gln Lys Pro
                180                 185                 190

Gly Gln Ser Pro Lys Leu Leu Ile Tyr Trp Ala Ser Thr Arg Glu Ser
            195                 200                 205

Gly Val Pro Asp Arg Phe Ser Gly Ser Gly Ser Gly Thr Asp Phe Thr
    210                 215                 220

Leu Thr Ile Asn Ser Leu Gln Ala Glu Asp Val Ala Val Tyr Tyr Cys
225                 230                 235                 240

Thr Gln Val Tyr Tyr Leu Cys Thr Phe Gly Ala Gly Thr Lys Leu Glu
                245                 250                 255

Leu Lys Arg Leu Glu His His His His His His
                260                 265
```

<210> SEQ ID NO 78
<211> LENGTH: 319
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(315)

<400> SEQUENCE: 78

```
gac att cag ctg acc cag tct cca gca atc ctg tct gca tct cca ggg        48
Asp Ile Gln Leu Thr Gln Ser Pro Ala Ile Leu Ser Ala Ser Pro Gly
1               5                   10                  15 gag aag gtc aca atg act tgc agg gcc agc tca agt gta agt tac atc        96
Glu Lys Val Thr Met Thr Cys Arg Ala Ser Ser Val Ser Tyr Ile
            20                  25                  30 cac tgg ttc cag cag aag cca gga tcc tcc ccc aaa ccc tgg att tat       144
His Trp Phe Gln Gln Lys Pro Gly Ser Ser Pro Lys Pro Trp Ile Tyr
        35                  40                  45 gcc aca tcc aac ctg gct tct gga gtc cct gtt cgc ttc agt ggc agt       192
Ala Thr Ser Asn Leu Ala Ser Gly Val Pro Val Arg Phe Ser Gly Ser
    50                  55                  60 ggg tct ggg act tct tac tct ctc aca atc agc aga gtg gag gct gaa       240
Gly Ser Gly Thr Ser Tyr Ser Leu Thr Ile Ser Arg Val Glu Ala Glu
65                  70                  75                  80 gat gct gcc act tat tac tgc cag cag tgg act agt aac cca ccc acg       288
Asp Ala Ala Thr Tyr Tyr Cys Gln Gln Trp Thr Ser Asn Pro Pro Thr
                85                  90                  95 ttc gga ggg ggg acc aag ctg gag atc taac                              319
Phe Gly Gly Gly Thr Lys Leu Glu Ile
            100                 105

<210> SEQ ID NO 79
<211> LENGTH: 105
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 79

Asp Ile Gln Leu Thr Gln Ser Pro Ala Ile Leu Ser Ala Ser Pro Gly
1               5                   10                  15

Glu Lys Val Thr Met Thr Cys Arg Ala Ser Ser Ser Val Ser Tyr Ile
            20                  25                  30

His Trp Phe Gln Gln Lys Pro Gly Ser Ser Pro Lys Pro Trp Ile Tyr
        35                  40                  45

Ala Thr Ser Asn Leu Ala Ser Gly Val Pro Val Arg Phe Ser Gly Ser
    50                  55                  60

Gly Ser Gly Thr Ser Tyr Ser Leu Thr Ile Ser Arg Val Glu Ala Glu
65                  70                  75                  80

Asp Ala Ala Thr Tyr Tyr Cys Gln Gln Trp Thr Ser Asn Pro Pro Thr
                85                  90                  95

Phe Gly Gly Gly Thr Lys Leu Glu Ile
            100                 105

<210> SEQ ID NO 80
<211> LENGTH: 360
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(360)

<400> SEQUENCE: 80 gta caa ctg cag cag cct ggg gct gag ctg gtg aag cct ggg gcc tca        48
Val Gln Leu Gln Gln Pro Gly Ala Glu Leu Val Lys Pro Gly Ala Ser
1               5                   10                  15
```

```
gtg aag atg tcc tgc aag gct tct ggc tac aca ttt acc agt tac aat      96
Val Lys Met Ser Cys Lys Ala Ser Gly Tyr Thr Phe Thr Ser Tyr Asn
         20                  25                  30 atg cac tgg gta aaa cag aca cct ggt cgg ggc ctg gaa tgg att gga     144
Met His Trp Val Lys Gln Thr Pro Gly Arg Gly Leu Glu Trp Ile Gly
     35                  40                  45 gct att tat ccc gga aat ggt gat act tcc tac aat cag aag ttc aaa     192
Ala Ile Tyr Pro Gly Asn Gly Asp Thr Ser Tyr Asn Gln Lys Phe Lys
 50                  55                  60 ggc aag gcc aca ttg act gca gac aaa tcc tcc agc aca gcc tac atg     240
Gly Lys Ala Thr Leu Thr Ala Asp Lys Ser Ser Ser Thr Ala Tyr Met
65                  70                  75                  80 cag ctc agc agc ctg aca tct gag gac tct gcg gtc tat tac tgt gca     288
Gln Leu Ser Ser Leu Thr Ser Glu Asp Ser Ala Val Tyr Tyr Cys Ala
                 85                  90                  95 aga tcg act tac tac ggc ggt gac tgg tac ttc gat gtc tgg ggc caa     336
Arg Ser Thr Tyr Tyr Gly Gly Asp Trp Tyr Phe Asp Val Trp Gly Gln
            100                 105                 110 ggg acc acg gtc acc gtc tcc tca                                     360
Gly Thr Thr Val Thr Val Ser Ser
        115                 120

<210> SEQ ID NO 81
<211> LENGTH: 120
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 81

Val Gln Leu Gln Gln Pro Gly Ala Glu Leu Val Lys Pro Gly Ala Ser
1               5                   10                  15

Val Lys Met Ser Cys Lys Ala Ser Gly Tyr Thr Phe Thr Ser Tyr Asn
            20                  25                  30

Met His Trp Val Lys Gln Thr Pro Gly Arg Gly Leu Glu Trp Ile Gly
        35                  40                  45

Ala Ile Tyr Pro Gly Asn Gly Asp Thr Ser Tyr Asn Gln Lys Phe Lys
    50                  55                  60

Gly Lys Ala Thr Leu Thr Ala Asp Lys Ser Ser Ser Thr Ala Tyr Met
65                  70                  75                  80

Gln Leu Ser Ser Leu Thr Ser Glu Asp Ser Ala Val Tyr Tyr Cys Ala
                85                  90                  95

Arg Ser Thr Tyr Tyr Gly Gly Asp Trp Tyr Phe Asp Val Trp Gly Gln
            100                 105                 110

Gly Thr Thr Val Thr Val Ser Ser
        115                 120

<210> SEQ ID NO 82
<211> LENGTH: 318
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(318)

<400> SEQUENCE: 82 gac atc cag ctg acc cag tct cca gca atc ctg tct gca tct cca ggg      48
Asp Ile Gln Leu Thr Gln Ser Pro Ala Ile Leu Ser Ala Ser Pro Gly
```

```
1               5                   10                  15
gag aag gtc aca atg act tgc agg gcc agc tca agt gta agt tac atc      96
Glu Lys Val Thr Met Thr Cys Arg Ala Ser Ser Ser Val Ser Tyr Ile
            20                  25                  30 cac tgg ttc cag cag aag cca gga tcc tcc ccc aaa ccc tgg att tat     144
His Trp Phe Gln Gln Lys Pro Gly Ser Ser Pro Lys Pro Trp Ile Tyr
        35                  40                  45 gcc aca tcc aac ctg gct tct gga gtc cct gtt cgc ttc agt ggc agt     192
Ala Thr Ser Asn Leu Ala Ser Gly Val Pro Val Arg Phe Ser Gly Ser
    50                  55                  60 ggg tct ggg act tct tac tct ctc aca atc agc aga gtg gag gct gaa     240
Gly Ser Gly Thr Ser Tyr Ser Leu Thr Ile Ser Arg Val Glu Ala Glu
65                  70                  75                  80 gat gct gcc act tat tac tgc cag cag tgg act agt aac cca ccc acg     288
Asp Ala Ala Thr Tyr Tyr Cys Gln Gln Trp Thr Ser Asn Pro Pro Thr
                85                  90                  95 ttc gga ggg ggg acc aag ctg gag atc aaa                             318
Phe Gly Gly Gly Thr Lys Leu Glu Ile Lys
                100                 105

<210> SEQ ID NO 83
<211> LENGTH: 106
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 83

Asp Ile Gln Leu Thr Gln Ser Pro Ala Ile Leu Ser Ala Ser Pro Gly
1               5                   10                  15

Glu Lys Val Thr Met Thr Cys Arg Ala Ser Ser Ser Val Ser Tyr Ile
            20                  25                  30

His Trp Phe Gln Gln Lys Pro Gly Ser Ser Pro Lys Pro Trp Ile Tyr
        35                  40                  45

Ala Thr Ser Asn Leu Ala Ser Gly Val Pro Val Arg Phe Ser Gly Ser
    50                  55                  60

Gly Ser Gly Thr Ser Tyr Ser Leu Thr Ile Ser Arg Val Glu Ala Glu
65                  70                  75                  80

Asp Ala Ala Thr Tyr Tyr Cys Gln Gln Trp Thr Ser Asn Pro Pro Thr
                85                  90                  95

Phe Gly Gly Gly Thr Lys Leu Glu Ile Lys
                100                 105

<210> SEQ ID NO 84
<211> LENGTH: 363
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (1)..(363)

<400> SEQUENCE: 84 cag gtc caa ctg cag cag cct ggg gct gag ctg gtg aag cct ggg gcc      48
Gln Val Gln Leu Gln Gln Pro Gly Ala Glu Leu Val Lys Pro Gly Ala
1               5                   10                  15 tca gtg aag atg tcc tgc aag gct tct ggc tac aca ttt acc agt tac      96
Ser Val Lys Met Ser Cys Lys Ala Ser Gly Tyr Thr Phe Thr Ser Tyr
            20                  25                  30
```

```
aat atg cac tgg gta aaa cag aca cct ggt cgg ggc ctg gaa tgg att      144
Asn Met His Trp Val Lys Gln Thr Pro Gly Arg Gly Leu Glu Trp Ile
        35                  40                  45 gga gct att tat ccc gga aat ggt gat act tcc tac aat cag aag ttc      192
Gly Ala Ile Tyr Pro Gly Asn Gly Asp Thr Ser Tyr Asn Gln Lys Phe
 50                  55                  60 aaa ggc aag gcc aca ttg act gca gac aaa tcc tcc agc aca gcc tac      240
Lys Gly Lys Ala Thr Leu Thr Ala Asp Lys Ser Ser Ser Thr Ala Tyr
65                   70                  75                  80 atg cag ctc agc agc ctg aca tct gag gac tct gcg gtc tat tac tgt      288
Met Gln Leu Ser Ser Leu Thr Ser Glu Asp Ser Ala Val Tyr Tyr Cys
                 85                  90                  95 gca aga tcg act tac tac ggc ggt gac tgg tac ttc gat gtc tgg ggc      336
Ala Arg Ser Thr Tyr Tyr Gly Gly Asp Trp Tyr Phe Asp Val Trp Gly
             100                 105                 110 caa ggg acc acg gtc acc gtc tcc tca                                  363
Gln Gly Thr Thr Val Thr Val Ser Ser
        115                 120

<210> SEQ ID NO 85
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 85

Gln Val Gln Leu Gln Gln Pro Gly Ala Glu Leu Val Lys Pro Gly Ala
1               5                   10                  15

Ser Val Lys Met Ser Cys Lys Ala Ser Gly Tyr Thr Phe Thr Ser Tyr
            20                  25                  30

Asn Met His Trp Val Lys Gln Thr Pro Gly Arg Gly Leu Glu Trp Ile
        35                  40                  45

Gly Ala Ile Tyr Pro Gly Asn Gly Asp Thr Ser Tyr Asn Gln Lys Phe
    50                  55                  60

Lys Gly Lys Ala Thr Leu Thr Ala Asp Lys Ser Ser Ser Thr Ala Tyr
65                   70                  75                  80

Met Gln Leu Ser Ser Leu Thr Ser Glu Asp Ser Ala Val Tyr Tyr Cys
                 85                  90                  95

Ala Arg Ser Thr Tyr Tyr Gly Gly Asp Trp Tyr Phe Asp Val Trp Gly
            100                 105                 110

Gln Gly Thr Thr Val Thr Val Ser Ser
        115                 120

<210> SEQ ID NO 86
<211> LENGTH: 116
<212> TYPE: PRT
<213> ORGANISM: Homo sapiens

<400> SEQUENCE: 86

Pro Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Ser Arg Ser
            20                  25                  30

Ala Ile Ile Trp Val Arg Gln Ala Pro Gly Gln Gly Leu Glu Trp Met
        35                  40                  45

Gly Gly Ile Val Pro Met Phe Gly Pro Pro Asn Tyr Ala Gln Lys Phe
    50                  55                  60
```

```
Gln Gly Arg Val Thr Ile Thr Ala Asp Glu Ser Thr Asn Thr Ala Tyr
 65                  70                  75                  80

Met Glu Leu Ser Ser Leu Arg Ser Glu Asp Thr Ala Phe Tyr Phe Cys
                 85                  90                  95

Ala Gly Gly Tyr Gly Ile Tyr Ser Pro Glu Glu Tyr Asn Gly Gly Leu
            100                 105                 110

Val Thr Val Ser
        115

<210> SEQ ID NO 87
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 87

Gln Val Gln Leu Gln Gln Ser Gly Ala Glu Val Lys Lys Pro Gly Ser
 1               5                  10                  15

Ser Val Lys Val Ser Cys Lys Ala Ser Gly Tyr Thr Phe Thr Ser Tyr
             20                  25                  30

Asn Met His Trp Val Lys Gln Ala Pro Gly Gln Gly Leu Glu Trp Ile
         35                  40                  45

Gly Ala Ile Tyr Pro Gly Asn Gly Asp Thr Ser Tyr Asn Gln Lys Phe
     50                  55                  60

Lys Gly Lys Ala Thr Leu Thr Ala Asp Glu Ser Thr Asn Thr Ala Tyr
 65                  70                  75                  80

Met Glu Leu Ser Ser Leu Arg Ser Glu Asp Thr Ala Phe Tyr Tyr Cys
                 85                  90                  95

Ala Arg Ser Thr Tyr Tyr Gly Gly Asp Trp Tyr Phe Asp Val Trp Gly
            100                 105                 110

Gln Gly Thr Thr Val Thr Val Ser Ser
        115                 120

<210> SEQ ID NO 88
<211> LENGTH: 121
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

Gln Val Gln Leu Gln Gln Ser Gly Ala Glu Val Lys Lys Pro Gly Ser
 1               5                  10                  15

Ser Val Lys Val Ser Cys Lys Ala Ser Gly Tyr Thr Phe Ser Ser Tyr
             20                  25                  30

Asn Met His Trp Val Arg Gln Ala Pro Gly Gln Gly Leu Glu Trp Met
         35                  40                  45

Gly Ala Ile Tyr Pro Gly Asn Gly Asp Thr Ser Tyr Asn Gln Lys Phe
     50                  55                  60

Lys Gly Arg Ala Thr Ile Thr Ala Asp Glu Ser Thr Asn Thr Ala Tyr
 65                  70                  75                  80

Met Glu Leu Ser Ser Leu Arg Ser Glu Asp Thr Ala Phe Tyr Phe Cys
                 85                  90                  95

Ala Arg Ser Thr Tyr Tyr Gly Gly Asp Trp Tyr Phe Asp Val Trp Gly
            100                 105                 110
```

```
Gln Gly Thr Thr Val Thr Val Ser Ser
        115                 120

<210> SEQ ID NO 89
<211> LENGTH: 11
<212> TYPE: PRT
<213> ORGANISM: Homo sapiens

<400> SEQUENCE: 89

Trp Gly Gln Gly Ser Leu Val Thr Val Ser Ser
1               5                   10

<210> SEQ ID NO 90
<211> LENGTH: 107
<212> TYPE: PRT
<213> ORGANISM: Homo sapiens

<400> SEQUENCE: 90

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ile Lys Tyr
            20                  25                  30

Leu Asn Trp Tyr Gln Gln Thr Pro Gly Lys Ala Pro Lys Leu Leu Ile
        35                  40                  45

Tyr Glu Ala Ser Asn Leu Gln Ala Gly Val Pro Ser Arg Phe Ser Gly
    50                  55                  60

Ser Gly Ser Gly Thr Asp Tyr Thr Phe Thr Ile Ser Ser Leu Gln Pro
65                  70                  75                  80

Glu Asp Ile Ala Thr Tyr Tyr Cys Gln Gln Tyr Gln Ser Leu Pro Tyr
                85                  90                  95

Thr Phe Gly Gln Gly Thr Lys Leu Gln Ile Thr
            100                 105

<210> SEQ ID NO 91
<211> LENGTH: 516
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (21)..(65)
<220> FEATURE:
<221> NAME/KEY: CDS
<222> LOCATION: (148)..(477)

<400> SEQUENCE: 91
tctagacaca ggacctcacc atg gga tgg agc tgt atc atc ctc ttc ttg gta    53
                     Met Gly Trp Ser Cys Ile Ile Leu Phe Leu Val
                      1               5                   10 gca aca gct aca ggtaagggc tcacagtagc aggcttgagg tctggacata          105
Ala Thr Ala Thr
            15 tatatgggtg acaatgacat ccactttgcc tttctctcca ca ggt gtc cac tcc      159
                                              Gly Val His Ser gac atc cag ctg acc cag tct cca tca tct ctg agc gca tct gtt gga    207
Asp Ile Gln Leu Thr Gln Ser Pro Ser Ser Leu Ser Ala Ser Val Gly
20                  25                  30                  35 gat agg gtc act atg act tgt agg gcc agc tca agt gta agt tac atc    255
Asp Arg Val Thr Met Thr Cys Arg Ala Ser Ser Ser Val Ser Tyr Ile
                40                  45                  50
```

```
cac tgg ttc cag cag aaa cca ggg aaa gca cct aaa ccc tgg att tat    303
His Trp Phe Gln Gln Lys Pro Gly Lys Ala Pro Lys Pro Trp Ile Tyr
             55                  60                  65 gcc act tcg aac ctg gct tct ggt gtc cct gtc cga ttc tct ggc agc    351
Ala Thr Ser Asn Leu Ala Ser Gly Val Pro Val Arg Phe Ser Gly Ser
         70                  75                  80 gga tct ggg aca gat tac act ttc acc atc agc tct ctt caa cca gaa    399
Gly Ser Gly Thr Asp Tyr Thr Phe Thr Ile Ser Ser Leu Gln Pro Glu
     85                  90                  95 gac att gca aca tat tat tgt cag cag tgg act agt aac cca ccc acg    447
Asp Ile Ala Thr Tyr Tyr Cys Gln Gln Trp Thr Ser Asn Pro Pro Thr
100                 105                 110                 115 ttc ggt gga ggg acc aag ctg gag atc aaa cgtgagtaga atttaaactt      497
Phe Gly Gly Gly Thr Lys Leu Glu Ile Lys
                120                 125 tgcttcctca gttggatcc                                               516

<210> SEQ ID NO 92
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 92

Met Gly Trp Ser Cys Ile Ile Leu Phe Leu Val Ala Thr Ala Thr
1               5                   10                  15

<210> SEQ ID NO 93
<211> LENGTH: 110
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 93

Gly Val His Ser Asp Ile Gln Leu Thr Gln Ser Pro Ser Ser Leu Ser
1               5                   10                  15

Ala Ser Val Gly Asp Arg Val Thr Met Thr Cys Arg Ala Ser Ser Ser
            20                  25                  30

Val Ser Tyr Ile His Trp Phe Gln Gln Lys Pro Gly Lys Ala Pro Lys
        35                  40                  45

Pro Trp Ile Tyr Ala Thr Ser Asn Leu Ala Ser Gly Val Pro Val Arg
    50                  55                  60

Phe Ser Gly Ser Gly Ser Gly Thr Asp Tyr Thr Phe Thr Ile Ser Ser
65                  70                  75                  80

Leu Gln Pro Glu Asp Ile Ala Thr Tyr Tyr Cys Gln Gln Trp Thr Ser
                85                  90                  95

Asn Pro Pro Thr Phe Gly Gly Gly Thr Lys Leu Glu Ile Lys
            100                 105                 110

<210> SEQ ID NO 94
<211> LENGTH: 726
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
```

<222> LOCATION: (23)..(67)
<220> FEATURE:
<221> NAME/KEY: CDS
<222> LOCATION: (150)..(524)

<400> SEQUENCE: 94

```
ctcgagcaca caggacctca cc atg gga tgg agc tgt atc atc ctc ttc ttg        52
                         Met Gly Trp Ser Cys Ile Ile Leu Phe Leu
                          1               5                  10 gta gca aca gct aca ggtaagggc tcacagtagc aggcttgagg tctggacata         107
Val Ala Thr Ala Thr
             15 tatatgggtg acaatgacat ccactttgcc tttctctcca ca ggt gtc cac tcc         161
                                                Gly Val His Ser cag gtc caa ctg cag caa tca ggg gct gaa gtc aag aaa cct ggg tca        209
Gln Val Gln Leu Gln Gln Ser Gly Ala Glu Val Lys Lys Pro Gly Ser
 20              25                  30                  35 tcg gtg aag gtc tcc tgc aag gct tct ggc tac acc ttt act agt tac        257
Ser Val Lys Val Ser Cys Lys Ala Ser Gly Tyr Thr Phe Thr Ser Tyr
             40                  45                  50 aat atg cac tgg gtc aag cag gca cct gga cag ggt ctg gaa tgg att        305
Asn Met His Trp Val Lys Gln Ala Pro Gly Gln Gly Leu Glu Trp Ile
         55                  60                  65 gga gct att tat ccc gga aat ggt gat act tcc tac aat cag aag ttc        353
Gly Ala Ile Tyr Pro Gly Asn Gly Asp Thr Ser Tyr Asn Gln Lys Phe
     70                  75                  80 aag ggt aaa gcc aca ctg act gcc gac gaa tcc acc aat aca gcc tac        401
Lys Gly Lys Ala Thr Leu Thr Ala Asp Glu Ser Thr Asn Thr Ala Tyr
 85                  90                  95 atg gag ctg agc agc ctg agg tct gag gac acg gca ttt tat tac tgt        449
Met Glu Leu Ser Ser Leu Arg Ser Glu Asp Thr Ala Phe Tyr Tyr Cys
100                 105                 110                 115 gca aga tcg act tac tac ggc ggt gac tgg tac ttc gat gtc tgg ggc        497
Ala Arg Ser Thr Tyr Tyr Gly Gly Asp Trp Tyr Phe Asp Val Trp Gly
                120                 125                 130 caa ggc acc acg gtc acc gtc tcc tca ggtgagtcct tacaacctct              544
Gln Gly Thr Thr Val Thr Val Ser Ser
                135                 140 ctcttctatt cagcttaaat agattttact gcatttgttg gggggaaat gtgtgtatct       604 gaatttcagg tcatgaagga ctagggacac cttgggagtc agaagggtc attgggagcc       664 cgggctgatg cagacagaca tcctcagctc ccagacttca tggccagaga tttataggat      724
cc                                                                     726
```

<210> SEQ ID NO 95
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 95

```
Met Gly Trp Ser Cys Ile Ile Leu Phe Leu Val Ala Thr Ala Thr
 1               5                  10                  15
```

<210> SEQ ID NO 96
<211> LENGTH: 125
<212> TYPE: PRT
<213> ORGANISM: Artificial Sequence
<220> FEATURE:
<223> OTHER INFORMATION: Description of Artificial Sequence: Synthetic -continued polypeptide

<400> SEQUENCE: 96

Gly Val His Ser Gln Val Gln Leu Gln Gln Ser Gly Ala Glu Val Lys
1               5                   10                  15

Lys Pro Gly Ser Ser Val Lys Val Ser Cys Lys Ala Ser Gly Tyr Thr
            20                  25                  30

Phe Thr Ser Tyr Asn Met His Trp Val Lys Gln Ala Pro Gly Gln Gly
        35                  40                  45

Leu Glu Trp Ile Gly Ala Ile Tyr Pro Gly Asn Gly Asp Thr Ser Tyr
    50                  55                  60

Asn Gln Lys Phe Lys Gly Lys Ala Thr Leu Thr Ala Asp Glu Ser Thr
65                  70                  75                  80

Asn Thr Ala Tyr Met Glu Leu Ser Ser Leu Arg Ser Glu Asp Thr Ala
                85                  90                  95

Phe Tyr Tyr Cys Ala Arg Ser Thr Tyr Tyr Gly Gly Asp Trp Tyr Phe
            100                 105                 110

Asp Val Trp Gly Gln Gly Thr Thr Val Thr Val Ser Ser
        115                 120                 125

<210> SEQ ID NO 97
<211> LENGTH: 726
<212> TYPE: DNA
<213> ORGANISM: Artificial Sequence
<220> FEATURE:
<223> OTHER INFORMATION: Description of Artificial Sequence: Synthetic
      polynucleotide
<220> FEATURE:
<221> NAME/KEY: CDS
<222> LOCATION: (23)..(67)
<220> FEATURE:
<221> NAME/KEY: CDS
<222> LOCATION: (150)..(524)

<400> SEQUENCE: 97
ctcgagcaca caggacctca cc atg gga tgg agc tgt atc atc ctc ttc ttg      52
                        Met Gly Trp Ser Cys Ile Ile Leu Phe Leu
                        1               5                   10 gta gca aca gct aca ggtaagggc tcacagtagc aggcttgagg tctggacata      107
Val Ala Thr Ala Thr
                15 tatatgggtg acaatgacat ccactttgcc tttctctcca ca ggt gtc cac tcc       161
                                                Gly Val His Ser cag gtc caa ctg cag caa tca ggg gct gaa gtc aag aaa cct ggg tca      209
Gln Val Gln Leu Gln Gln Ser Gly Ala Glu Val Lys Lys Pro Gly Ser
20                  25                  30                  35 tca gtg aag gtc tcc tgc aag gct tct ggc tac acc ttt agt agt tac      257
Ser Val Lys Val Ser Cys Lys Ala Ser Gly Tyr Thr Phe Ser Ser Tyr
                40                  45                  50 aat atg cac tgg gtc aga cag gca cct gga cag ggt ctg gaa tgg atg      305
Asn Met His Trp Val Arg Gln Ala Pro Gly Gln Gly Leu Glu Trp Met
            55                  60                  65 gga gct att tat ccc gga aat ggt gat act tcc tac aat cag aag ttc      353
Gly Ala Ile Tyr Pro Gly Asn Gly Asp Thr Ser Tyr Asn Gln Lys Phe
        70                  75                  80 aag ggt aga gcc aca ata act gcc gac gaa tcc acc aat aca gcc tac      401
Lys Gly Arg Ala Thr Ile Thr Ala Asp Glu Ser Thr Asn Thr Ala Tyr
    85                  90                  95 atg gag ctg agc agc ctg agg tct gag gac acg gca ttt tat ttt tgt      449
Met Glu Leu Ser Ser Leu Arg Ser Glu Asp Thr Ala Phe Tyr Phe Cys
100                 105                 110                 115

```
gca aga tcg act tac tac ggc ggt gac tgg tac ttc gat gtc tgg ggc      497
Ala Arg Ser Thr Tyr Tyr Gly Gly Asp Trp Tyr Phe Asp Val Trp Gly
            120                 125                 130 caa ggc acc acg gtc acc gtc tcc tca ggtgagtcct tacaacctct            544
Gln Gly Thr Thr Val Thr Val Ser Ser
        135                 140 ctcttctatt cagcttaaat agattttact gcatttgttg ggggggaaat gtgtgtatct    604
gaatttcagg tcatgaagga ctagggacac cttgggagtc agaaagggtc attgggagcc    664
cgggctgatg cagacagaca tcctcagctc ccagacttca tggccagaga tttataggat    724
cc                                                                   726

<210> SEQ ID NO 98
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 98

Met Gly Trp Ser Cys Ile Ile Leu Phe Leu Val Ala Thr Ala Thr
1               5                   10                  15

<210> SEQ ID NO 99
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 99

Gly Val His Ser Gln Val Gln Leu Gln Gln Ser Gly Ala Glu Val Lys
1               5                   10                  15

Lys Pro Gly Ser Ser Val Lys Val Ser Cys Lys Ala Ser Gly Tyr Thr
            20                  25                  30

Phe Ser Ser Tyr Asn Met His Trp Val Arg Gln Ala Pro Gly Gln Gly
        35                  40                  45

Leu Glu Trp Met Gly Ala Ile Tyr Pro Gly Asn Gly Asp Thr Ser Tyr
    50                  55                  60

Asn Gln Lys Phe Lys Gly Arg Ala Thr Ile Thr Ala Asp Glu Ser Thr
65                  70                  75                  80

Asn Thr Ala Tyr Met Glu Leu Ser Ser Leu Arg Ser Glu Asp Thr Ala
                85                  90                  95

Phe Tyr Phe Cys Ala Arg Ser Thr Tyr Tyr Gly Gly Asp Trp Tyr Phe
            100                 105                 110

Asp Val Trp Gly Gln Gly Thr Thr Val Thr Val Ser Ser
        115                 120                 125

<210> SEQ ID NO 100
<211> LENGTH: 993
<212> TYPE: DNA
<213> ORGANISM: Homo sapiens
<220> FEATURE:
<221> NAME/KEY: CDS
<222> LOCATION: (1)..(993)

<400> SEQUENCE: 100 gcc tcc acc aag ggc cca tcg gtc ttc ccc ctg gca ccc tcc tcc aag      48
Ala Ser Thr Lys Gly Pro Ser Val Phe Pro Leu Ala Pro Ser Ser Lys
```

|   |   |   |   |   |   |   |   |   |   |   |   |   |   |   |   |     |
|---|---|---|---|---|---|---|---|---|---|---|---|---|---|---|---|-----|
| 1 |   |   |   | 5 |   |   |   |   | 10|   |   |   |   | 15|   |     |
| agc | acc | tct | ggg | ggc | aca | gcg | gcc | ctg | ggc | tgc | ctg | gtc | aag | gac | tac | 96 |
| Ser | Thr | Ser | Gly | Gly | Thr | Ala | Ala | Leu | Gly | Cys | Leu | Val | Lys | Asp | Tyr |    |
|   |   |   | 20  |   |   |   |   | 25  |   |   |   |   | 30  |   |   |     |
| ttc | ccc | gaa | ccg | gtg | acg | gtg | tcg | tgg | aac | tca | ggc | gcc | ctg | acc | agc | 144 |
| Phe | Pro | Glu | Pro | Val | Thr | Val | Ser | Trp | Asn | Ser | Gly | Ala | Leu | Thr | Ser |    |
|   |   |   | 35  |   |   |   |   | 40  |   |   |   |   | 45  |   |   |     |
| ggc | gtg | cac | acc | ttc | ccg | gct | gtc | cta | cag | tcc | tca | gga | ctc | tac | tcc | 192 |
| Gly | Val | His | Thr | Phe | Pro | Ala | Val | Leu | Gln | Ser | Ser | Gly | Leu | Tyr | Ser |    |
|   |   | 50  |   |   |   |   | 55  |   |   |   |   | 60  |   |   |   |     |
| ctc | agc | agc | gtg | gtg | acc | gtg | ccc | tcc | agc | agc | ttg | ggc | acc | cag | acc | 240 |
| Leu | Ser | Ser | Val | Val | Thr | Val | Pro | Ser | Ser | Ser | Leu | Gly | Thr | Gln | Thr |    |
| 65 |   |   |   |   | 70  |   |   |   |   | 75  |   |   |   |   | 80  |     |
| tac | atc | tgc | aac | gtg | aat | cac | aag | ccc | agc | aac | acc | aag | gtg | gac | aag | 288 |
| Tyr | Ile | Cys | Asn | Val | Asn | His | Lys | Pro | Ser | Asn | Thr | Lys | Val | Asp | Lys |    |
|   |   |   |   | 85  |   |   |   |   | 90  |   |   |   |   | 95  |   |     |
| aga | gtt | gag | ccc | aaa | tct | tgt | gac | aaa | act | cac | aca | tgc | cca | ccg | tgc | 336 |
| Arg | Val | Glu | Pro | Lys | Ser | Cys | Asp | Lys | Thr | His | Thr | Cys | Pro | Pro | Cys |    |
|   |   |   | 100 |   |   |   |   | 105 |   |   |   |   | 110 |   |   |     |
| cca | gca | cct | gaa | ctc | ctg | ggg | gga | ccg | tca | gtc | ttc | ctc | ttc | ccc | cca | 384 |
| Pro | Ala | Pro | Glu | Leu | Leu | Gly | Gly | Pro | Ser | Val | Phe | Leu | Phe | Pro | Pro |    |
|   |   |   | 115 |   |   |   |   | 120 |   |   |   |   | 125 |   |   |     |
| aaa | ccc | aag | gac | acc | ctc | atg | atc | tcc | cgg | acc | cct | gag | gtc | aca | tgc | 432 |
| Lys | Pro | Lys | Asp | Thr | Leu | Met | Ile | Ser | Arg | Thr | Pro | Glu | Val | Thr | Cys |    |
| 130|   |   |   |   | 135 |   |   |   |   | 140 |   |   |   |   |   |     |
| gtg | gtg | gtg | gac | gtg | agc | cac | gaa | gac | cct | gag | gtc | aag | ttc | aac | tgg | 480 |
| Val | Val | Val | Asp | Val | Ser | His | Glu | Asp | Pro | Glu | Val | Lys | Phe | Asn | Trp |    |
| 145|   |   |   |   | 150 |   |   |   |   | 155 |   |   |   |   | 160 |     |
| tac | gtg | gac | ggc | gtg | gag | gtg | cat | aat | gcc | aag | aca | aag | ccg | cgg | gag | 528 |
| Tyr | Val | Asp | Gly | Val | Glu | Val | His | Asn | Ala | Lys | Thr | Lys | Pro | Arg | Glu |    |
|   |   |   |   | 165 |   |   |   |   | 170 |   |   |   |   | 175 |   |     |
| gag | cag | tac | aac | agc | acg | tac | cgt | gtg | gtc | agc | gtc | ctc | acc | gtc | ctg | 576 |
| Glu | Gln | Tyr | Asn | Ser | Thr | Tyr | Arg | Val | Val | Ser | Val | Leu | Thr | Val | Leu |    |
|   |   |   | 180 |   |   |   |   | 185 |   |   |   |   | 190 |   |   |     |
| cac | cag | gac | tgg | ctg | aat | ggc | aag | gag | tac | aag | tgc | aag | gtc | tcc | aac | 624 |
| His | Gln | Asp | Trp | Leu | Asn | Gly | Lys | Glu | Tyr | Lys | Cys | Lys | Val | Ser | Asn |    |
|   |   |   | 195 |   |   |   |   | 200 |   |   |   |   | 205 |   |   |     |
| aaa | gcc | ctc | cca | gcc | ccc | atc | gag | aaa | acc | atc | tcc | aaa | gcc | aaa | ggg | 672 |
| Lys | Ala | Leu | Pro | Ala | Pro | Ile | Glu | Lys | Thr | Ile | Ser | Lys | Ala | Lys | Gly |    |
|   | 210 |   |   |   |   | 215 |   |   |   |   | 220 |   |   |   |   |     |
| cag | ccc | cga | gaa | cca | cag | gtg | tac | acc | ctg | ccc | cca | tcc | cgg | gag | gag | 720 |
| Gln | Pro | Arg | Glu | Pro | Gln | Val | Tyr | Thr | Leu | Pro | Pro | Ser | Arg | Glu | Glu |    |
| 225|   |   |   |   | 230 |   |   |   |   | 235 |   |   |   |   | 240 |     |
| atg | acc | aag | aac | cag | gtc | agc | ctg | acc | tgc | ctg | gtc | aaa | ggc | ttc | tat | 768 |
| Met | Thr | Lys | Asn | Gln | Val | Ser | Leu | Thr | Cys | Leu | Val | Lys | Gly | Phe | Tyr |    |
|   |   |   |   | 245 |   |   |   |   | 250 |   |   |   |   | 255 |   |     |
| ccc | agc | gac | atc | gcc | gtg | gag | tgg | gag | agc | aat | ggg | cag | ccg | gag | aac | 816 |
| Pro | Ser | Asp | Ile | Ala | Val | Glu | Trp | Glu | Ser | Asn | Gly | Gln | Pro | Glu | Asn |    |
|   |   |   | 260 |   |   |   |   | 265 |   |   |   |   | 270 |   |   |     |
| aac | tac | aag | acc | acg | cct | ccc | gtg | ctg | gac | tcc | gac | ggc | tcc | ttc | ttc | 864 |
| Asn | Tyr | Lys | Thr | Thr | Pro | Pro | Val | Leu | Asp | Ser | Asp | Gly | Ser | Phe | Phe |    |
|   |   | 275 |   |   |   |   | 280 |   |   |   |   | 285 |   |   |   |     |
| ctc | tat | agc | aag | ctc | acc | gtg | gac | aag | agc | agg | tgg | cag | cag | ggg | aac | 912 |
| Leu | Tyr | Ser | Lys | Leu | Thr | Val | Asp | Lys | Ser | Arg | Trp | Gln | Gln | Gly | Asn |    |
|   | 290 |   |   |   |   | 295 |   |   |   |   | 300 |   |   |   |   |     |
| gtc | ttc | tca | tgc | tcc | gtg | atg | cat | gag | gct | ctg | cac | aac | cac | tac | acg | 960 |
| Val | Phe | Ser | Cys | Ser | Val | Met | His | Glu | Ala | Leu | His | Asn | His | Tyr | Thr |    |
| 305|   |   |   |   | 310 |   |   |   |   | 315 |   |   |   |   | 320 |     |
| cag | aag | agc | ctc | tcc | ctg | tct | ccg | ggt | aaa | tga |   |   |   |   |   | 993 |

Gln Lys Ser Leu Ser Leu Ser Pro Gly Lys
            325                 330

<210> SEQ ID NO 101
<211> LENGTH: 330
<212> TYPE: PRT
<213> ORGANISM: Homo sapiens

<400> SEQUENCE: 101

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 102
<211> LENGTH: 324
<212> TYPE: DNA
<213> ORGANISM: Homo sapiens

```
<220> FEATURE:
<221> NAME/KEY: CDS
<222> LOCATION: (1)..(324)

<400> SEQUENCE: 102 cga act gtg gct gca cca tct gtc ttc atc ttc ccg cca tct gat gag      48
Arg Thr Val Ala Ala Pro Ser Val Phe Ile Phe Pro Pro Ser Asp Glu
1               5                   10                  15 cag ttg aaa tct gga act gcc tct gtt gtg tgc ctg ctg aat aac ttc      96
Gln Leu Lys Ser Gly Thr Ala Ser Val Val Cys Leu Leu Asn Asn Phe
            20                  25                  30 tat ccc aga gag gcc aaa gta cag tgg aag gtg gat aac gcc ctc caa     144
Tyr Pro Arg Glu Ala Lys Val Gln Trp Lys Val Asp Asn Ala Leu Gln
        35                  40                  45 tcg ggt aac tcc cag gag agt gtc aca gag cag gac agc aag gac agc     192
Ser Gly Asn Ser Gln Glu Ser Val Thr Glu Gln Asp Ser Lys Asp Ser
    50                  55                  60 acc tac agc ctc agc agc acc ctg acg ctg agc aaa gca gac tac gag     240
Thr Tyr Ser Leu Ser Ser Thr Leu Thr Leu Ser Lys Ala Asp Tyr Glu
65                  70                  75                  80 aaa cac aaa gtc tac gcc tgc gaa gtc acc cat cag ggc ctg agc tcg     288
Lys His Lys Val Tyr Ala Cys Glu Val Thr His Gln Gly Leu Ser Ser
                85                  90                  95 ccc gtc aca aag agc ttc aac agg gga gag tgt tga                     324
Pro Val Thr Lys Ser Phe Asn Arg Gly Glu Cys
            100                 105

<210> SEQ ID NO 103
<211> LENGTH: 107
<212> TYPE: PRT
<213> ORGANISM: Homo sapiens

<400> SEQUENCE: 103

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 104
<211> LENGTH: 35
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 104
gcttcccggg aaaggggctg gagtgggtcg caacc                               35

<210> SEQ ID NO 105
<211> LENGTH: 39
```

```
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 105
cgatctgcag atataggctg ttcttggcat tgtctctgg                              39

<210> SEQ ID NO 106
<211> LENGTH: 44
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 106
ctgcagatga acagtctaag ggctgaggac acggccttgt atta                        44

<210> SEQ ID NO 107
<211> LENGTH: 57
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 107
ccccgggtga cacagccagg gaggatggag attgtgtcat cacaatgtcg gatccgc          57

<210> SEQ ID NO 108
<211> LENGTH: 42
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 108
acccggggag agggtcactc tgacctgcaa atccagtcag ag                          42

<210> SEQ ID NO 109
<211> LENGTH: 40
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 109
ttccggatcc actgcctgag aagcgatcag ggaccccaga                             40

<210> SEQ ID NO 110
<211> LENGTH: 72
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 110
atccggaaca gatttcactc tcaccatcaa cagtctgcag gctgaagacg tggcagttta       60
ttactgcact ca                                                           72
```